United States Patent [19]

Hiyama et al.

[11] Patent Number: 5,379,757
[45] Date of Patent: Jan. 10, 1995

[54] METHOD OF COMPRESSING ENDOSCOPE IMAGE DATA BASED ON IMAGE CHARACTERISTICS

[75] Inventors: Keiichi Hiyama, Akishima; Takao Tsuruoka; Kazunari Nakamura, both of Hachioji; Yutaka Konomura, Tachikawa; Masahide Kanno; Shinichiro Hattori, both of Hachioji, all of Japan

[73] Assignee: Olympus Optical Co. Ltd., Tokyo, Japan

[21] Appl. No.: 983,237

[22] Filed: Nov. 30, 1992

Related U.S. Application Data

[62] Division of Ser. No. 574,401, Aug. 28, 1990, Pat. No. 5,209,220.

[30] Foreign Application Priority Data

Oct. 16, 1990 [JP] Japan .................. 2-275437

[51] Int. Cl.$^6$ .......................... A61B 1/06
[52] U.S. Cl. .......................... 128/6; 348/76; 348/397
[58] Field of Search ............. 128/6; 348/65, 76, 390, 348/393, 397, 399, 222; 382/6, 56; 364/413.15

[56] References Cited

U.S. PATENT DOCUMENTS

| | | | |
|---|---|---|---|
| 4,797,741 | 1/1989 | Sato et al. | 348/399 |
| 4,845,553 | 7/1989 | Konomura et al. | 348/399 X |
| 4,926,247 | 5/1990 | Nagasaki et al. | 348/222 |
| 5,079,630 | 1/1992 | Golin et al. | 348/390 |
| 5,130,786 | 7/1992 | Murata et al. | 348/390 |
| 5,134,476 | 7/1992 | Aravind et al. | 348/390 |

Primary Examiner—Richard J. Apley
Assistant Examiner—John P. Leubecker
Attorney, Agent, or Firm—Armstrong, Westerman, Hattori, McLeland & Naughton

[57] ABSTRACT

An endoscope image data compressing apparatus comprises a plurality of image compressing apparatus not equivalent to each other for compressing input endoscope image data and outputting the compressed data and a selecting apparatus for selecting the compressed data output from at least one of the image compressing apparatus. The selecting apparatus selects the compressing method in response to the kind of the endoscope, characteristic of the image, picture quality of the compressed image, recording time intervals and others.

A method for compressing endoscope image data is realized by an image compressing apparatus capable of compressing image data at different compressing rates. The endoscope image data is determined to be either ordinary image data or dyed image data and, based on this determination, is compressed at different rates. The compressing rate for dyed image data is lowered below the rate for ordinary image data.

1 Claim, 72 Drawing Sheets

FIG. 4(A)     FIG. 4(B)
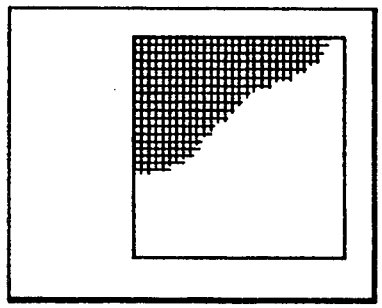   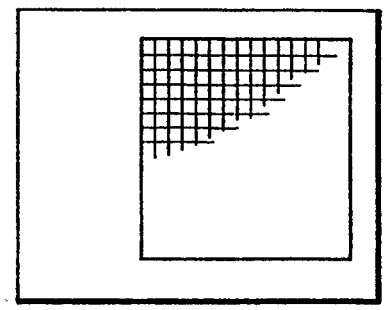
FIG. 5
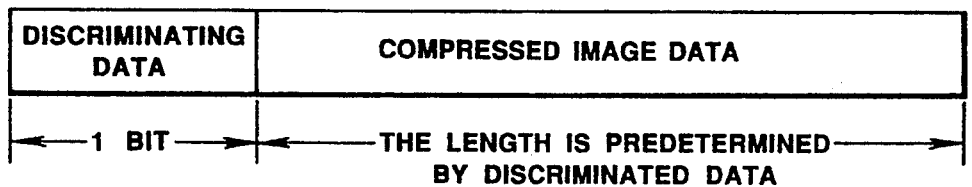
FIG. 8(A)     FIG. 8(B)     FIG. 8(C)
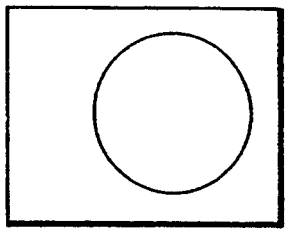   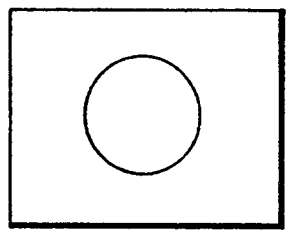   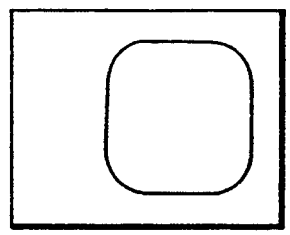

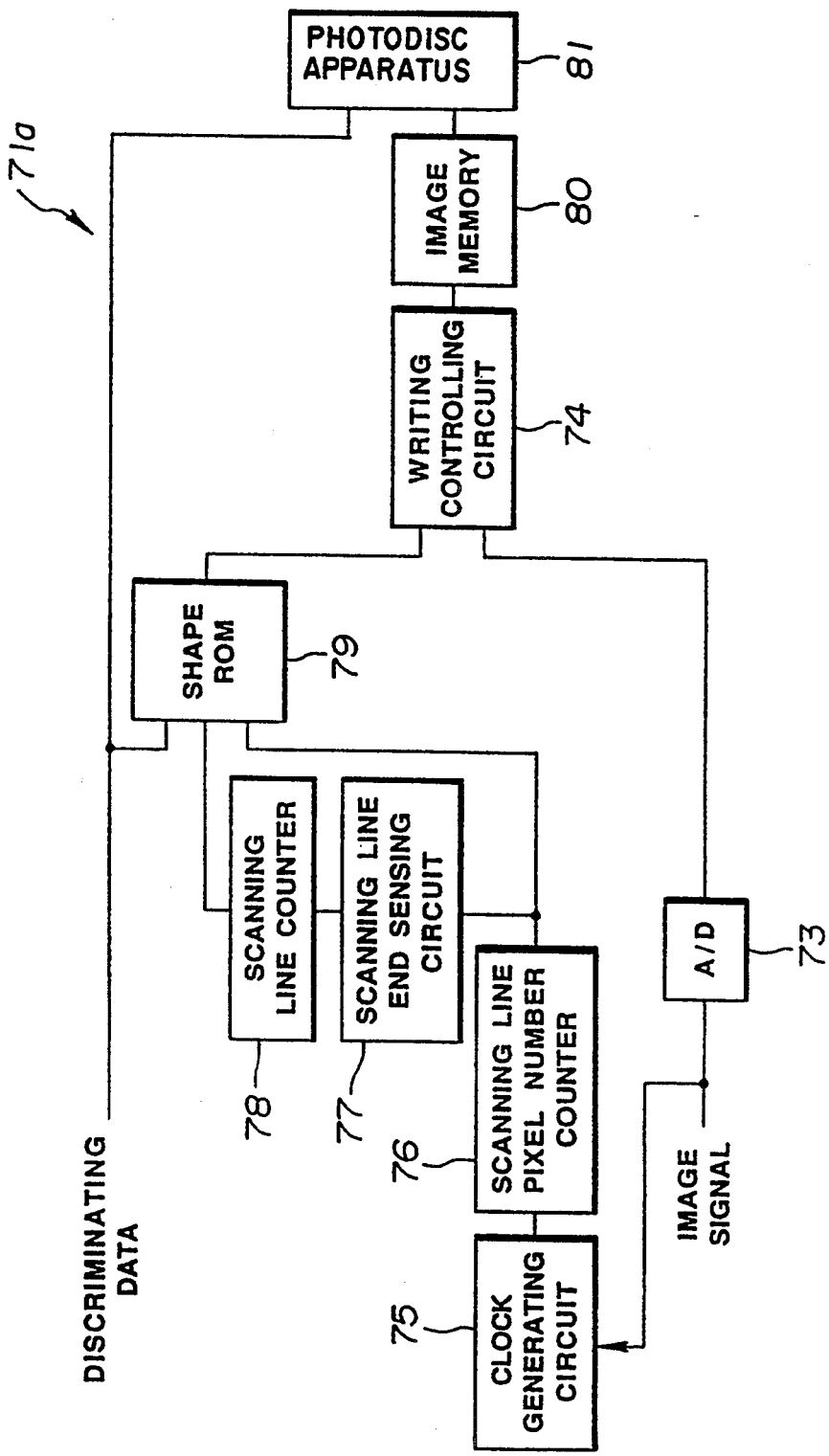

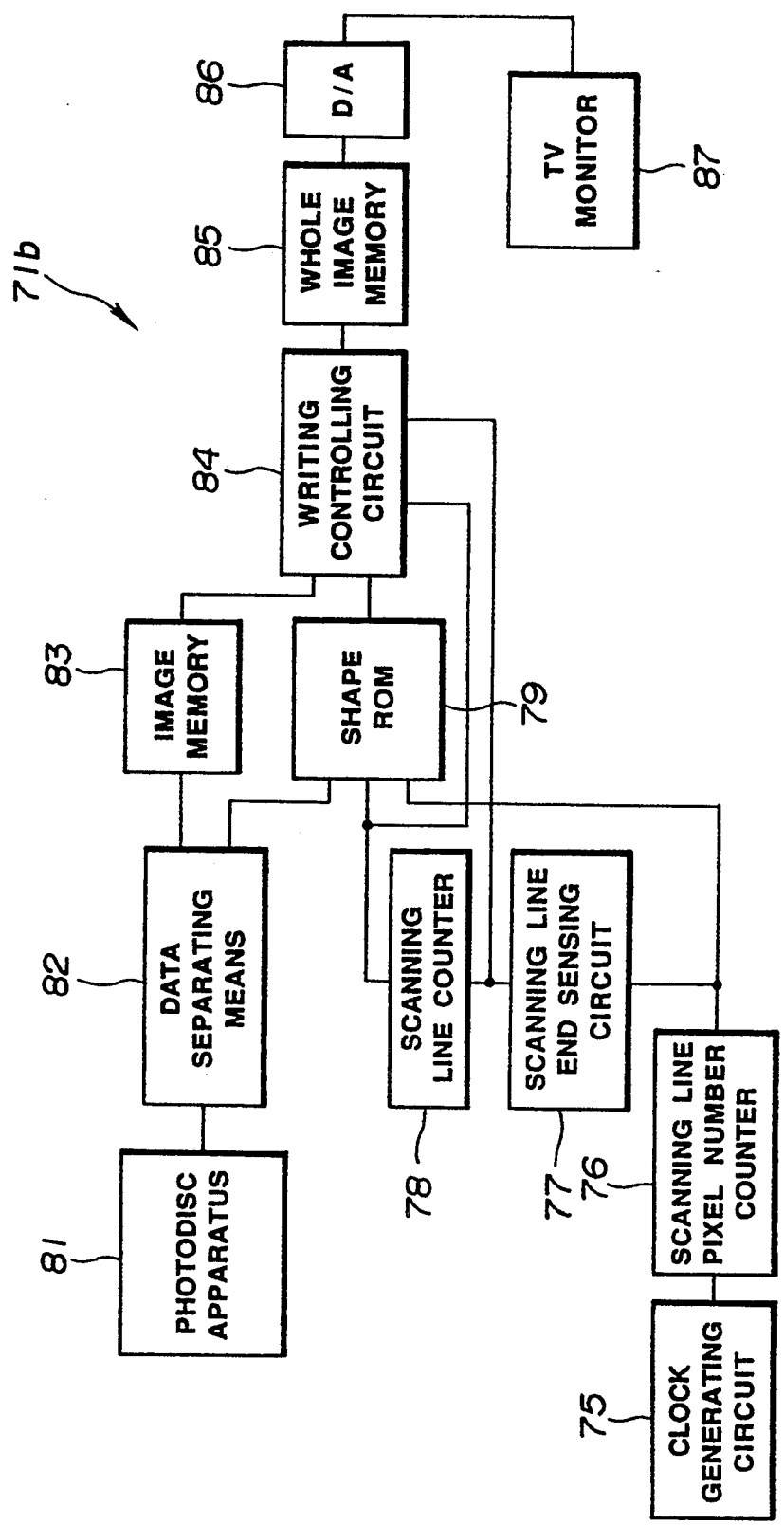

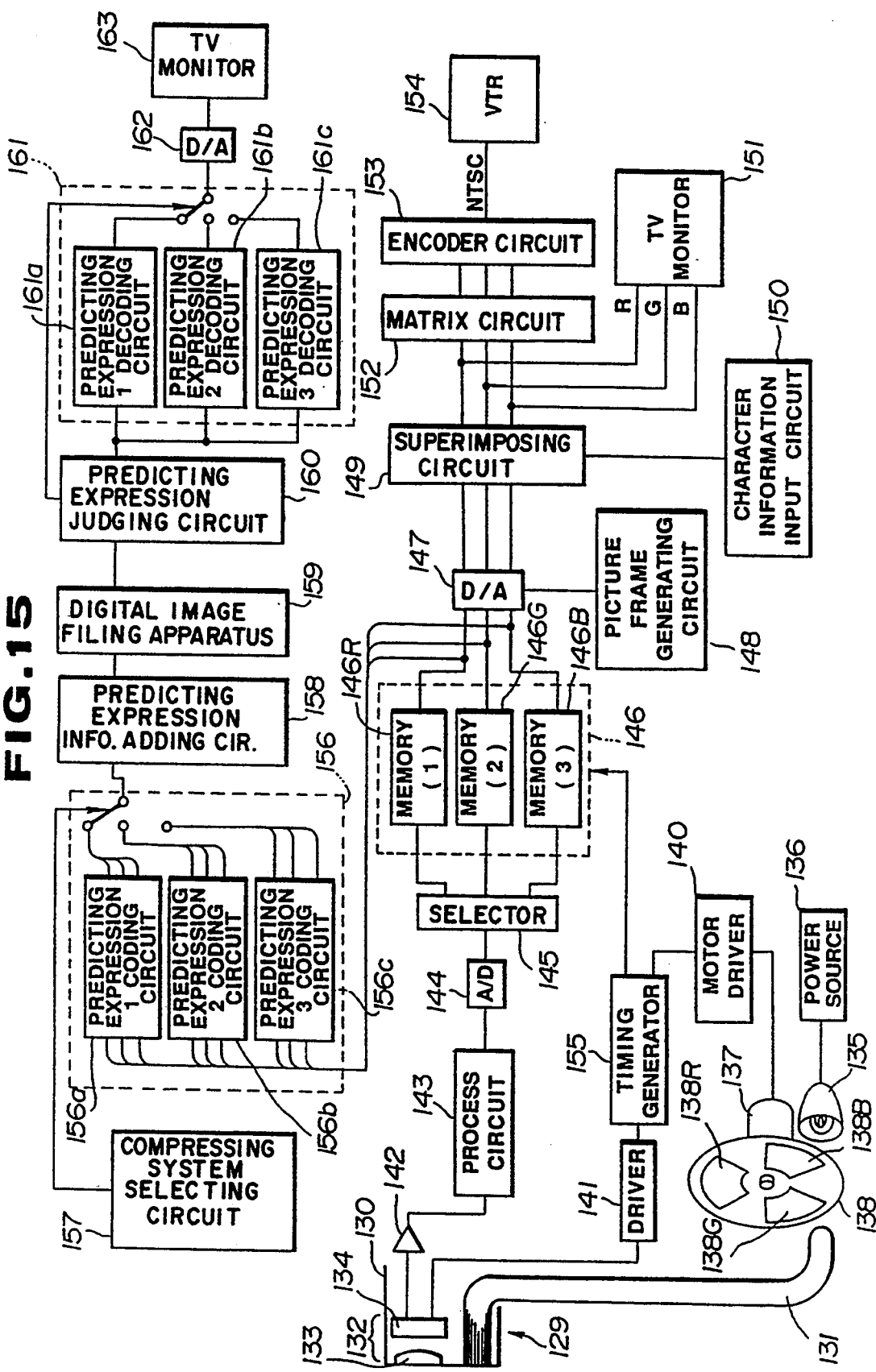

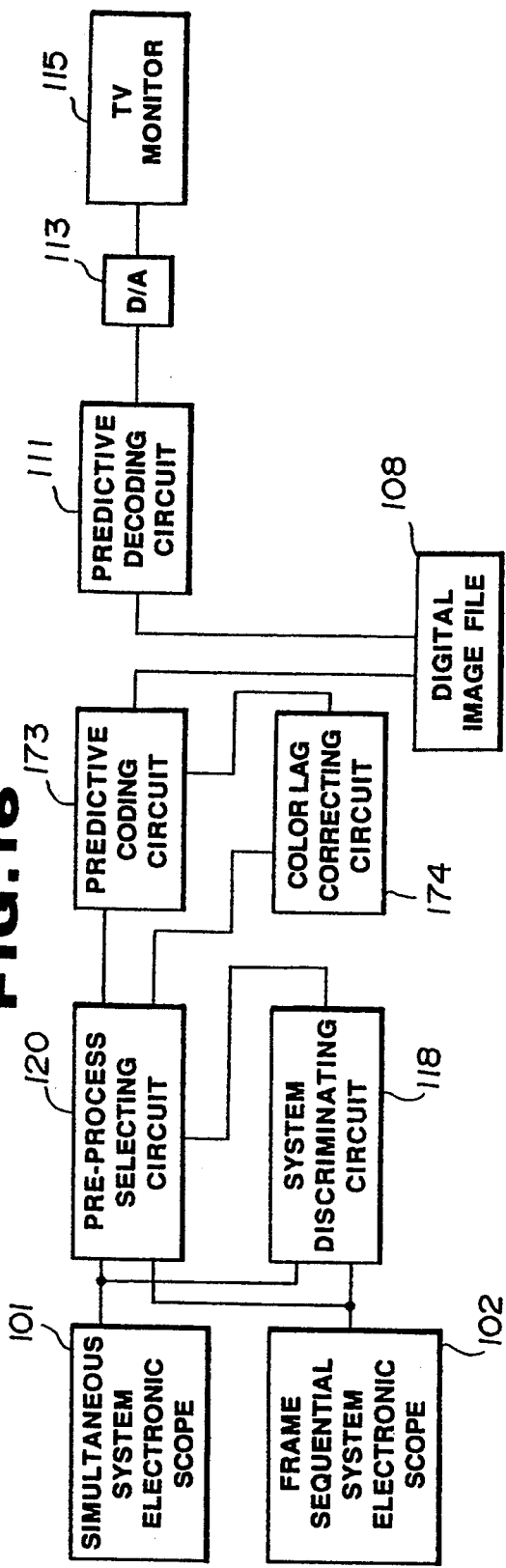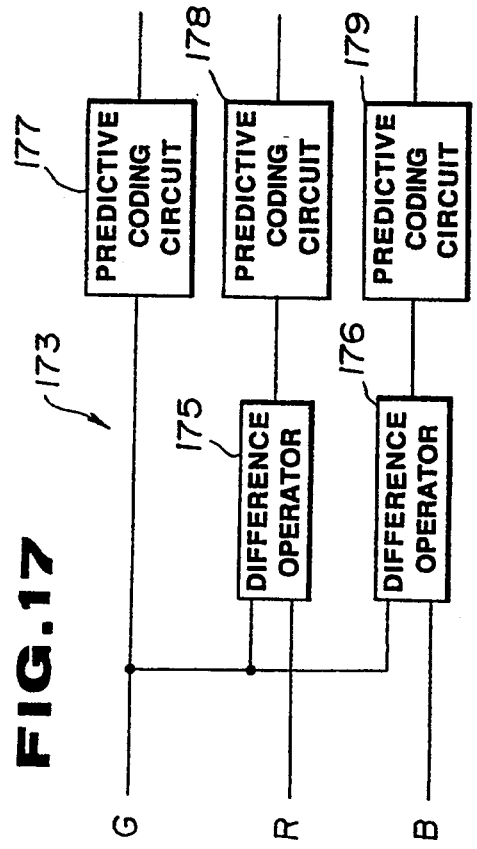

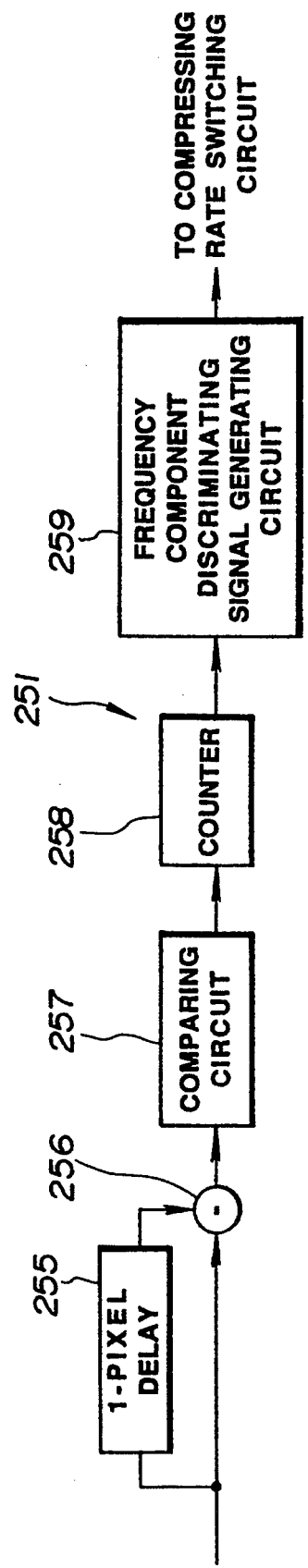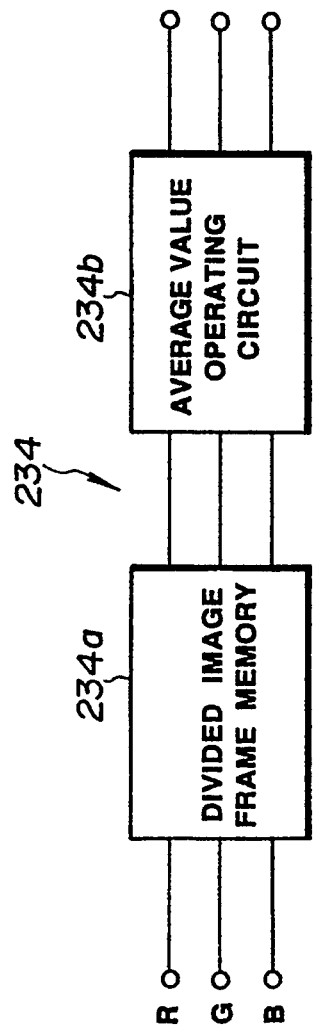

FIG. 30
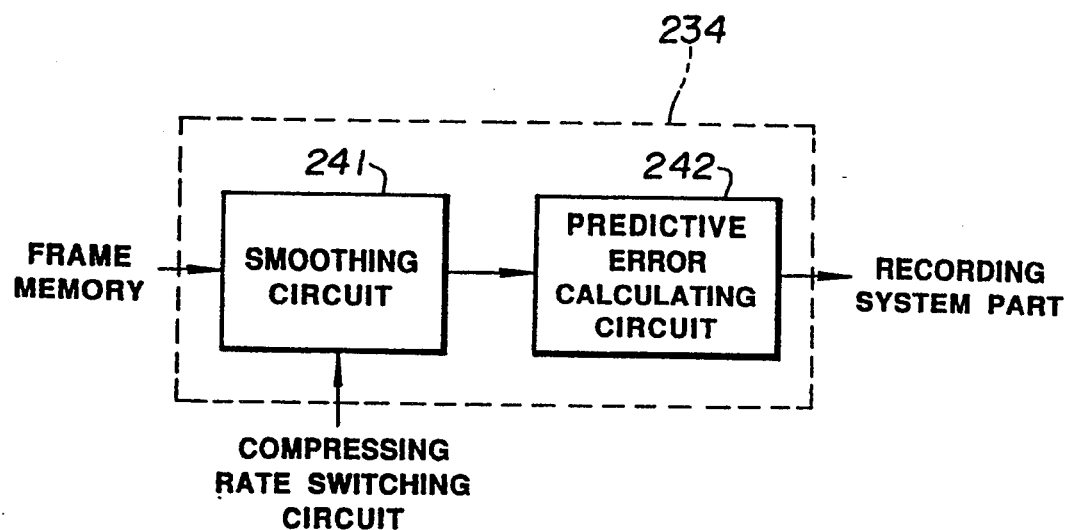
FIG. 31
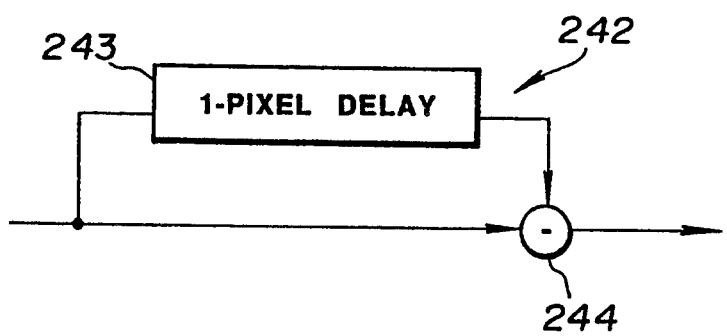
FIG. 32
$X(I-1, J-1)$  $X(I, J-1)$  $X(I+1, J-1)$
     o              o              o
      $X(I-1, J)$  $X(I, J)$
           o            o

| k/8 | k/8 | k/8 |
|-----|-----|-----|
| k/8 | 1-K | k/8 |
| k/8 | k/8 | k/8 |

FIG. 39(A) FIG. 39(B)

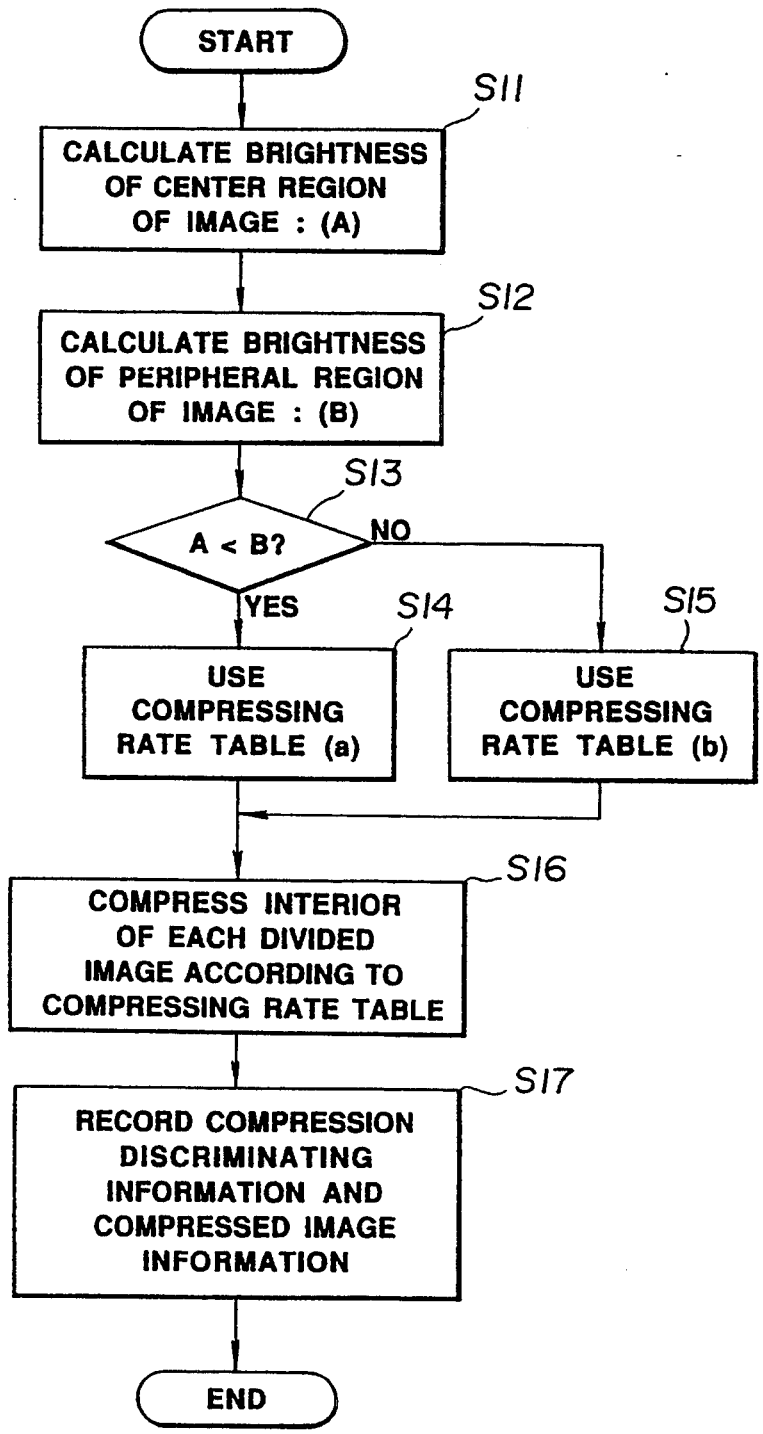

| COMPRESSION DISCRIMINATING INFORMATION | AVERAGE VALUE OF BLOCK | COMPRESSION DISCRIMINATING INFORMATION | AVERAGE VALUE OF BLOCK | |
|---|---|---|---|---|

1-IMAGE INFORMATION

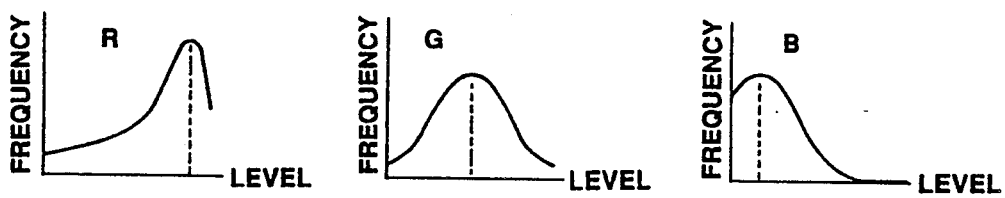
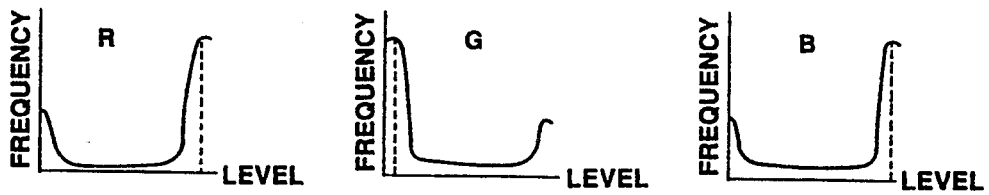
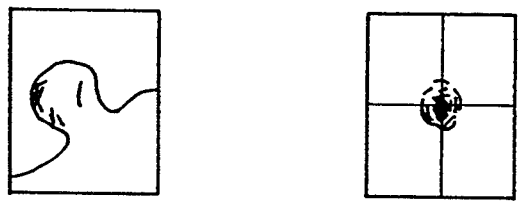

| 1 | 2 | 1 | 1 |
|---|---|---|---|
| 0 | 3 | 0 | 1 |
| 3 | 2 | 1 | 1 |
| 1 | 2 | 2 | 1 |

| 1 | 2 | 1 | 1 |
|---|---|---|---|
| 0 | 3 | 0 | 1 |
| 3 | 2 | 1 | 1 |
| 1 | 2 | 2 | 1 |

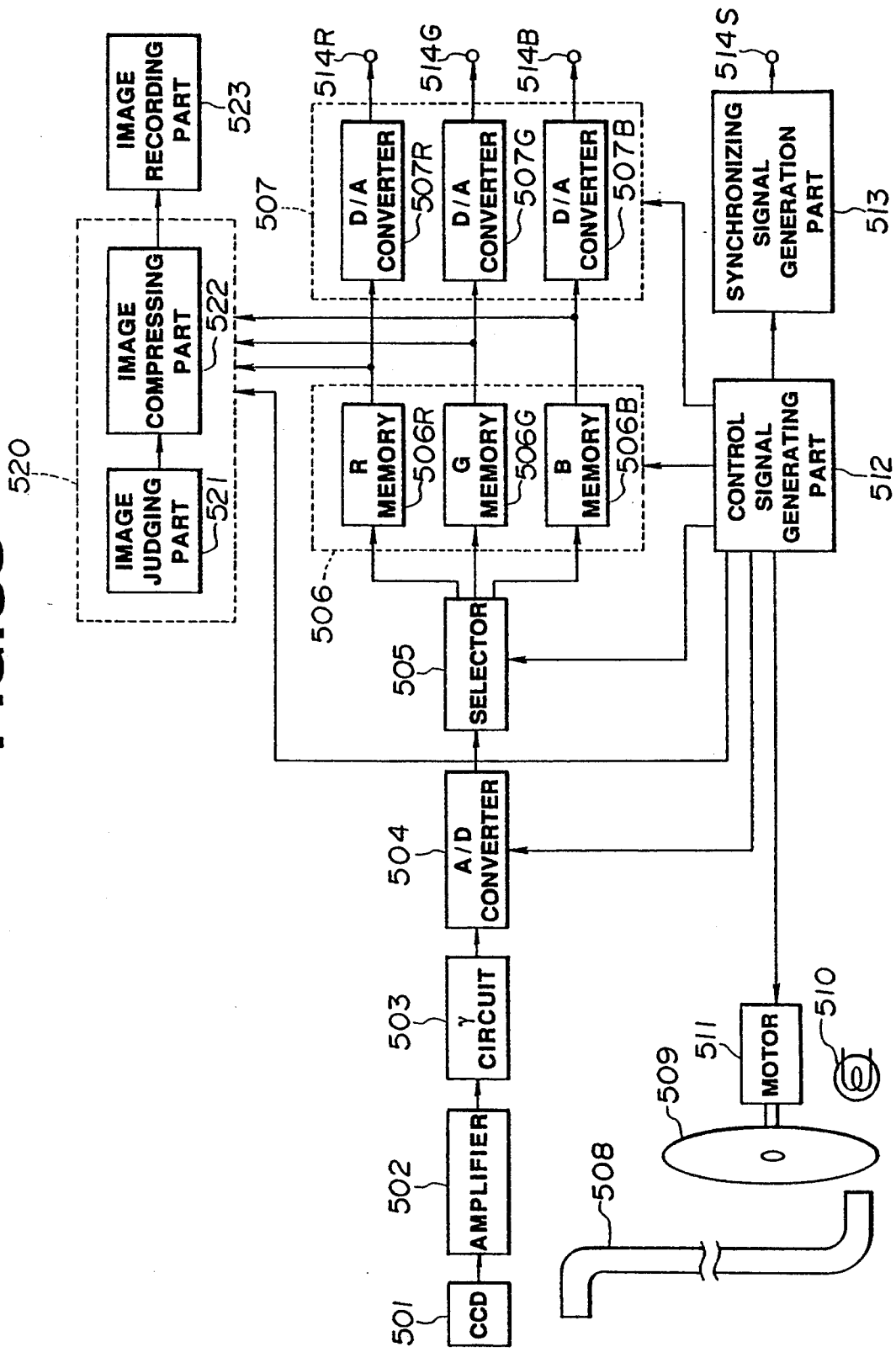

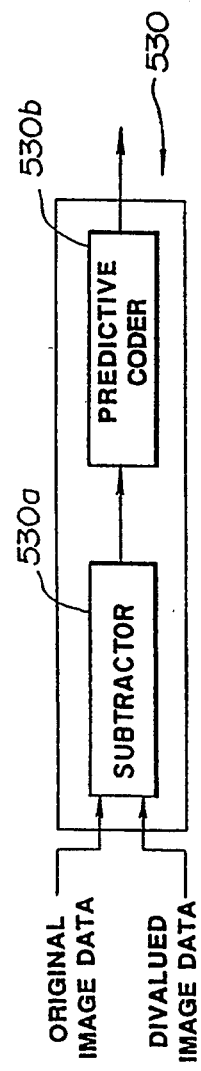
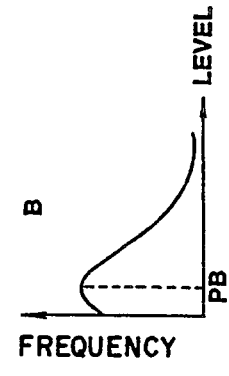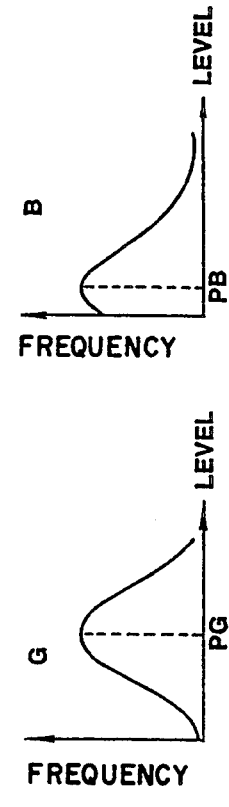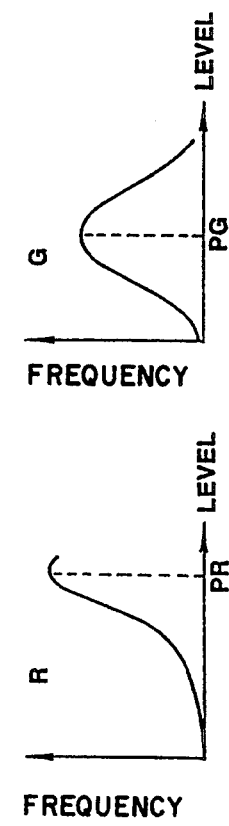
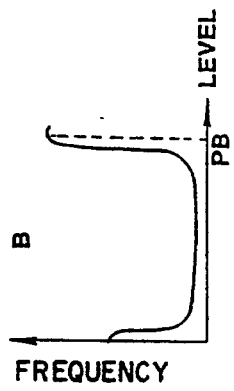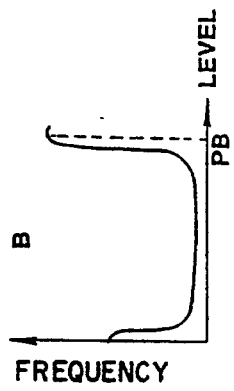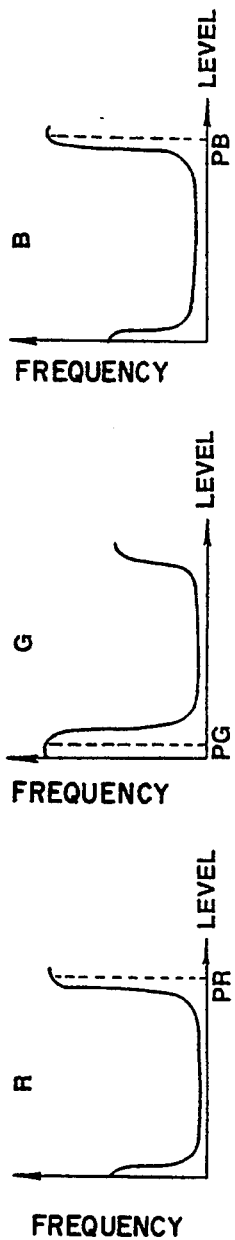

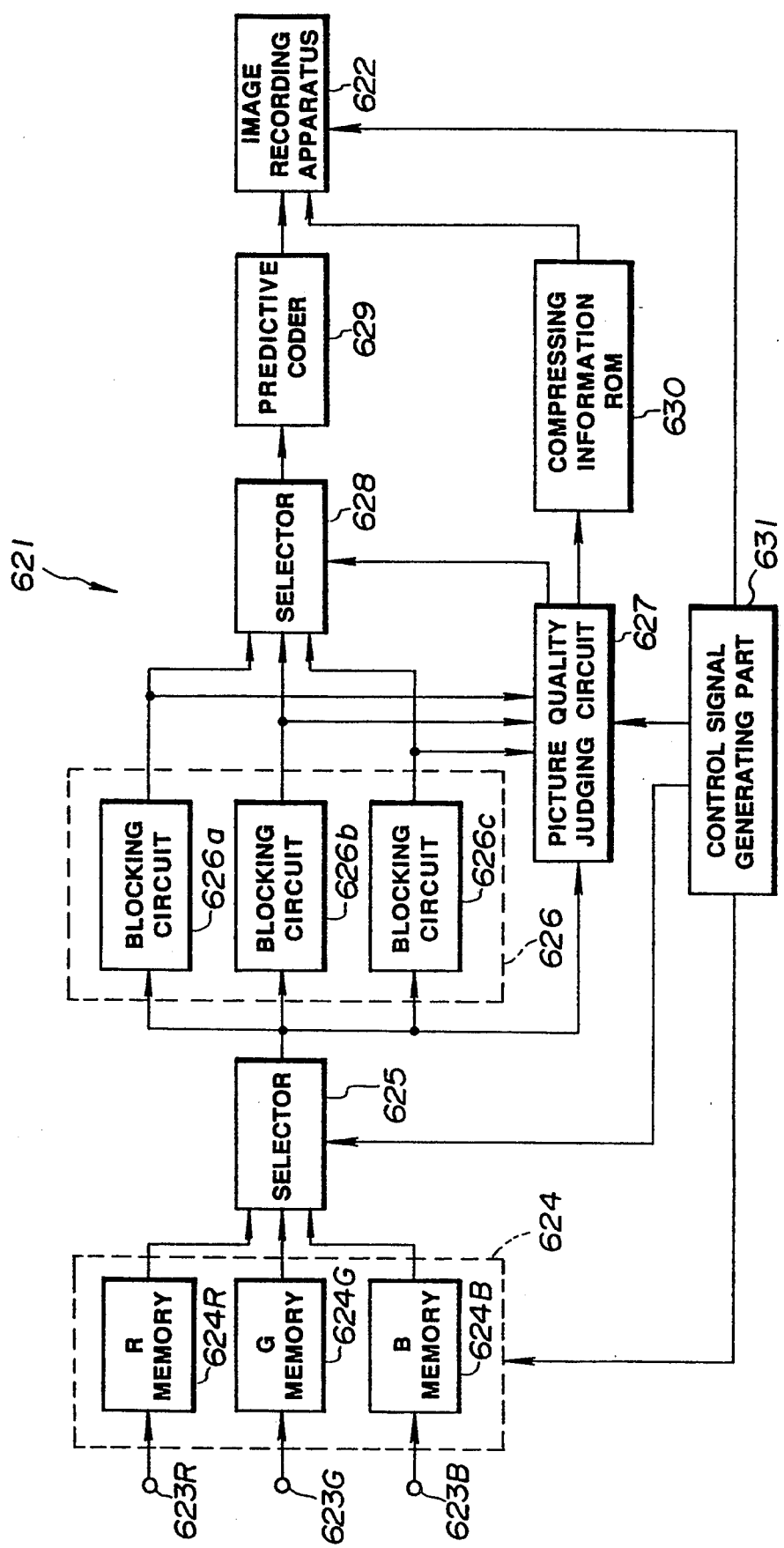

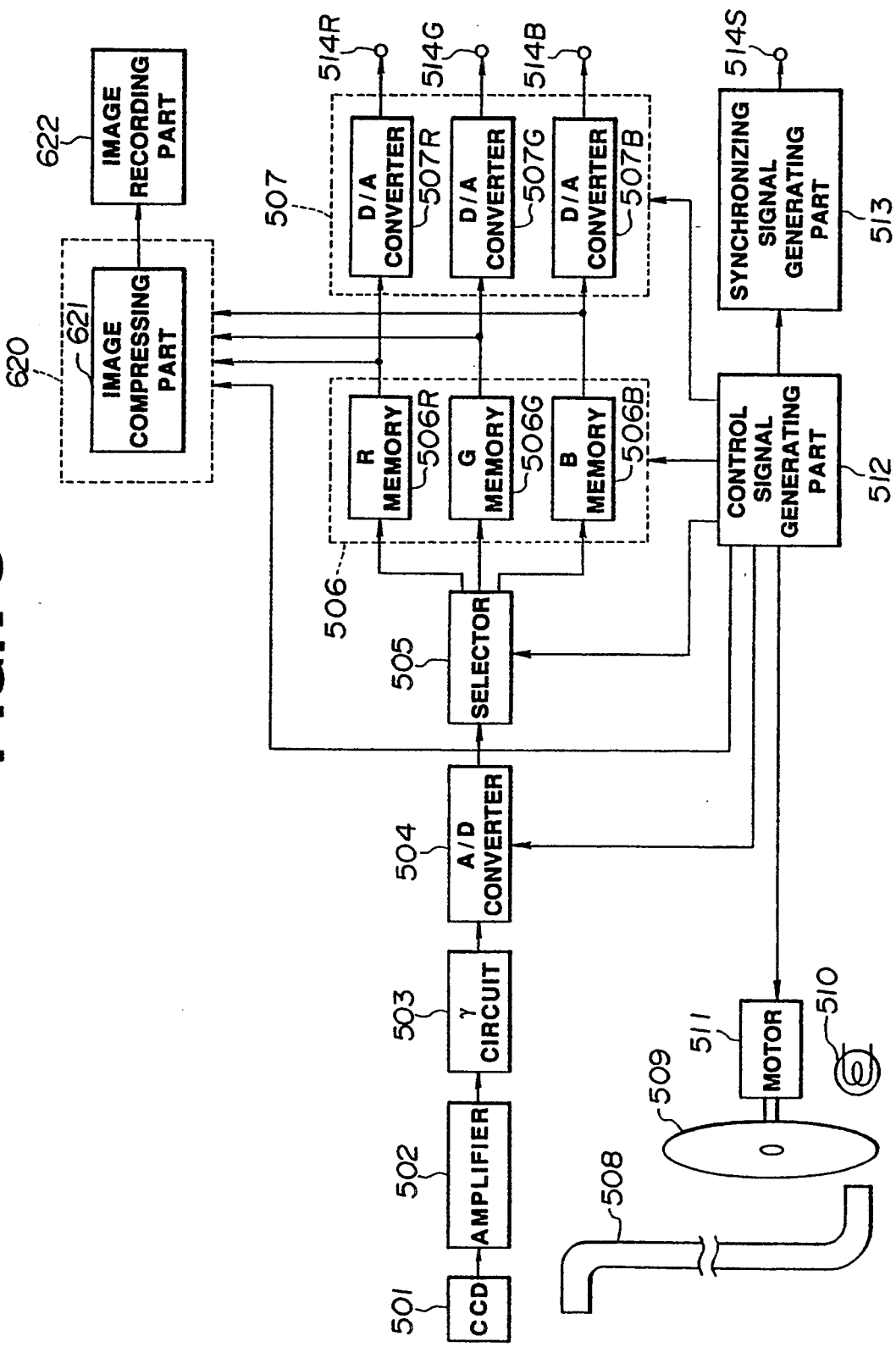

FIG.77
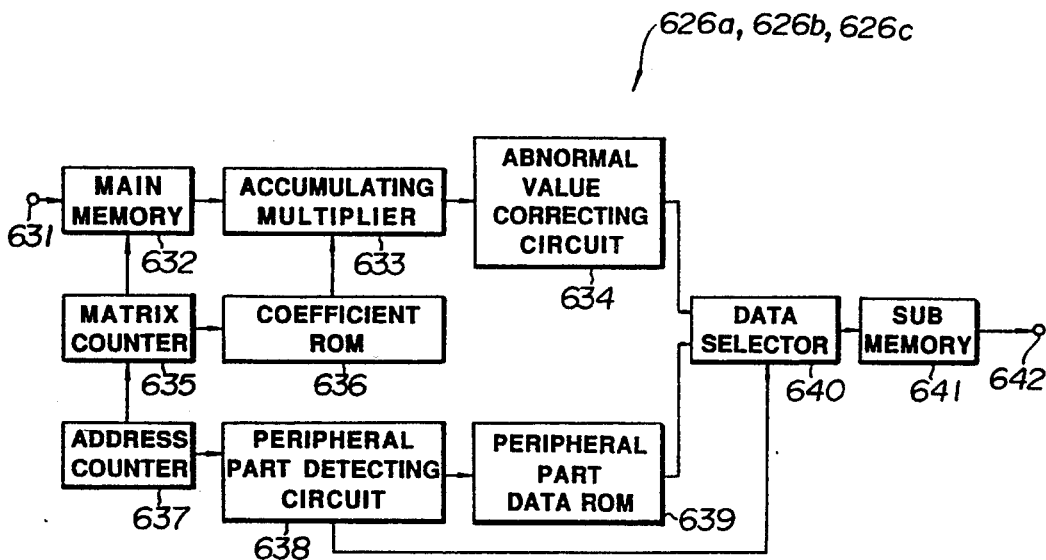
FIG.78(A) FIG.78(B) FIG.78(C)
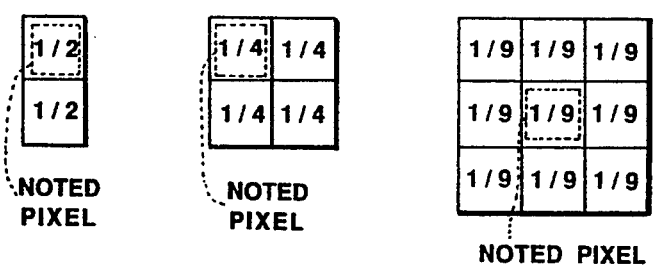

FIG. 80
n-1 LINE  ○○○○○○○○○○     ○ VALUE IS KNOWN
               b c d
n LINE    ○○○○● • • • • • •     ● NOTED PIXEL
               a x
n+1 LINE  • • • • • • • • • • •     • VALUE IS UNKNOWN
FIG. 81(A)  FIG. 81(B)  FIG. 81(C)
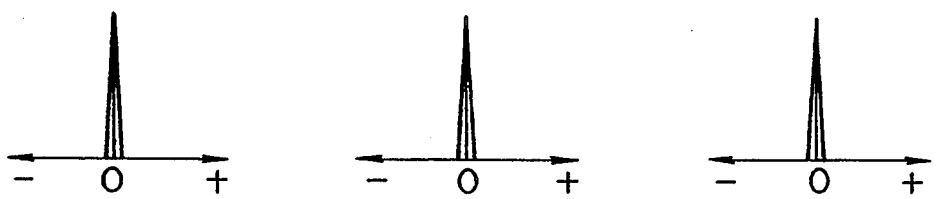
FIG. 82(A)  FIG. 82(B)  FIG. 82(C)
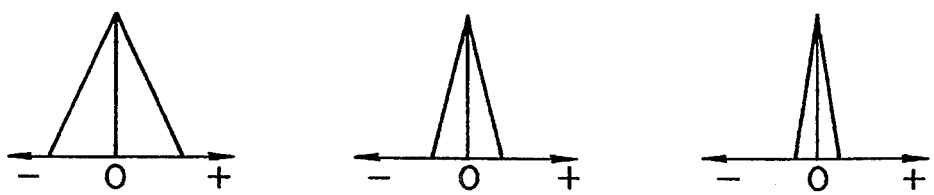

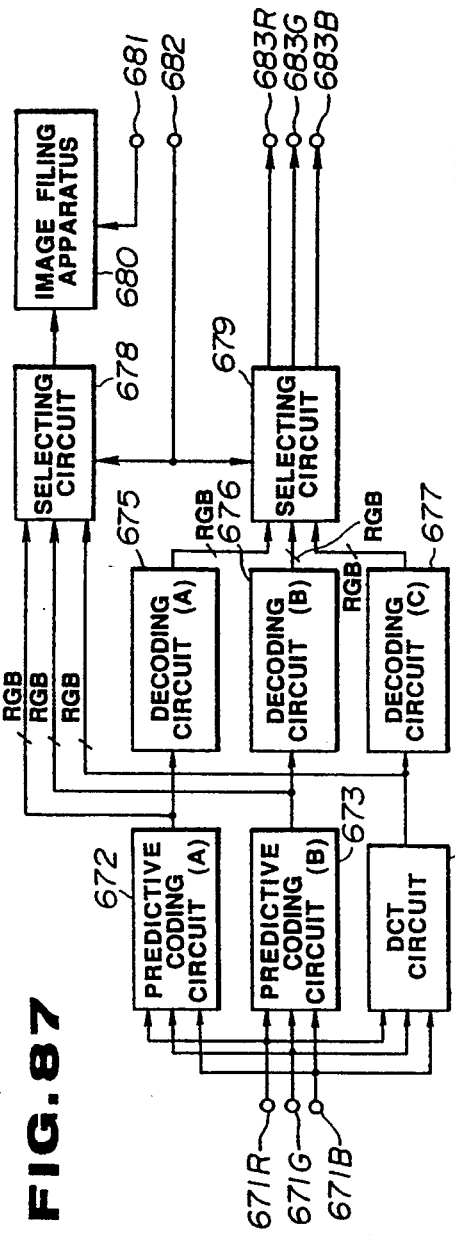

METHOD OF COMPRESSING ENDOSCOPE IMAGE DATA BASED ON IMAGE CHARACTERISTICS

This is a division of application Ser. No. 07/574,401, filed Aug. 28, 1990, now U.S. Pat. No. 5,209,220.

BACKGROUND OF THE INVENTION

1. Field of the Invention

This invention relates to an endoscope image data compressing apparatus for compressing endoscope image data.

2. Description of the Related Art

Endoscopes have recently come to be extensively used in medical and industrial fields.

In the medical field, generally, endoscope images are recorded so that an endoscope image in the case of an inspection with an endoscope may be later investigated in detail. In such a case, the endoscope image is photographed but electric recording and reproducing apparatuses, such as a VTR and photodisc apparatus easy to record/reproduce images, are extensively used.

Generally, image information requires a recording capacity far greater than in the case of recording character information and therefore there are problems that, if an image is recorded so as to be able to be reproduced with a high fidelity, the number of recordable image sheets will become small and that, in the case of transmitting an image, the transmitting speed will be low.

Therefore, in the publication of Japanese Patent Application Laid Open No. 1700/1990 there is suggested an image compressing and expanding apparatus wherein, at the time of recording, image data will be compressed and recorded but, at the time of reproducing, the compressed data will be expanded and will be displayed on a television monitor.

An example of an endoscope system including the above-mentioned image compressing and expanding apparatus shall be explained in the following with reference to FIGS. 97 to 99.

FIG. 97 is a schematic view of an entire endoscope system comprising an electronic endoscope apparatus and image recording apparatus. An endoscope 891 inserted in a living body 892 is connected to an observing apparatus 893 to which are connected an observing monitor 894 and an image recording apparatus 896, including an image data compressing apparatus. A sucker 895 is connected to the endoscope 891.

FIG. 98 shows a flow of an image signal in the endoscope 891 and observing apparatus 893. The image signal from a CCD 901 in the tip part of the endoscope 891 enters an amplifier 902, is amplified to a voltage level in a predetermined range, then enters a $\gamma$ circuit 903 and has the $\gamma$ corrected. In the case of an RGB frame sequential system, the signal having had the $\gamma$ corrected is analog-digital converted by an A/D converter 904, then enters a selector 905 and has R, G and B recorded in respective memories 906R, 906G and 906B. The image signals having had R, G and B recorded in the respective memories 906R, 906G and 906B are called out by the timing of a TV signal and are respectively digital-analog converted by D/A converters 907R, 907G and 907B. The image signals of R, G and B, having been converted to analog signals, are transmitted to RGB output terminals R, G and B together with a synchronizing signal (SYNC) of a synchronizing signal generating circuit 913. The thus obtained RGB signals are displayed in a monitor 894 to make an endoscope observation. Also, these RGB signals can be recorded by an image recording apparatus 896.

When a white color light of a lamp 910 is passed through a rotary filter 909 rotated by a motor 911, respective red, green and blue color passing filters provided in this rotary filter 909 will be interposed in the light path and lights of respective wavelengths of red, green and blue will be radiated to a light guide 903 of said endoscope 891. Therefore, image signals imaged under respective illuminating lights of red, green and blue will be written into R, G and B memories 906R, 906G and 906B. The motor 911, A/D converter 904, selector 905, memories 906R, 906G and 906B, D/A converters 907R, 907G and 907B and synchronizing signal generating circuit 913 are all controlled by a control signal generating part 912.

FIG. 99 shows a flow of an image signal in an image recording apparatus 896. The image signals from the RGB signal output terminals R, G and B are input into an input part of the image recording apparatus 897. The RGB signals are analog-digital converted by an A/D converter part 898 through a switching switch and are then led to a compressing circuit 899 utilizing a compression theory, such as predictive coding. The compressed image data are recorded in such recording system part 920 as a photodisc or photomagnetic disc. In the case of reproducing the images, the image data on the recording system part 920 are restored to the original image signals in an expanding circuit part 921. The image signals are then digital-analog converted by a D/A converter part 922 and are transmitted to an output part 923. On the other hand, a control signal generating part 924 controls the destinations of the image signals and the transferring timing at the time of transferring the image signals and is connected to the A/D converter part 898, compressing circuit part 899, recording system part 920, expanding circuit part 921 and D/A converter part 922. Also, from the control signal generating part 204, a synchronizing signal (SYNC) is transmitted to the input part 897 and output part 923.

Now, an imaging device, such as an imaging means of an electronic endoscope, has various numbers of pixels and therefore the spatial frequency of the obtained image may be different depending, for example, on the kind of the unit of the electronic endoscope. Also, the size and shape of the endoscope image on a television monitor may be different depending on the kind of the unit of the electronic endoscope.

In a conventional image compressing apparatus, there are problems in that the data obtained from an endoscope, for example, having a large number of pixels will be compressed in excess but, on the contrary, the data obtained from an endoscope of a small number of pixels will be too small in the compressing rate to make an efficient compression.

In the picture on the monitor, there is often another portion of the screen which is not part of the effective image corresponding to an endoscope image. If a compression is made by excluding such portion, a high compression will be possible but, because the size and shape of the endoscope image on the television monitor are different depending on the kind of the unit of the electronic endoscope, various endoscope images cannot be treated with one compressing mode.

Also, the endoscope image varies in the characteristics with the observing position and method. However, in the conventional image compressing apparatus, the compression is in only one mode and therefore an optimum compression will not always be made and the picture quality deteriorates depending on the image.

Now, today there are suggested various compressing means. Among them, there is a predictive coding means whereby, in the compression of an endoscope image having no movement at all or very small movement, if any, on the picture, the image is digitized, the value of pixels to be coded is predicted from the nearby pixels and the predictive error is quantized by use of a discrete cosine converting means. For example, in the compression of an endoscope image by the predictive coding means, the predictive error by the predictive coding of respective RGB is quantized as it is in an ordinary density gradation, for example, a density gradation of 5 bits. Now, in investigating an endoscope image, it is found that there are bright portions such as an adjacent body wall and dark portions such as a comparatively far body wall in or around a hole. In this endoscope image, the portion to be recorded in detail and to be required for the later observation and investigation is a bright portion. In a somewhat darker portion, noises are so many that the anticipation error need not be small or the minute part cannot be definitely observed and therefore, even if the compressing rate is elevated, there will be no trouble. When such an endoscope image is uniformly compressed, if the compressing rate is high, the picture quality of the bright part will deteriorate and, if the compressing rate is low, the data amount of the dark portion will also become large and the efficiency will be low.

Now, in an ordinary endoscope image, the image color is so reddish and the correlation between the adjacent pixels is so high that, when an ordinary compressing method is used, a high compression will be possible. However, an observing method wherein a part to be inspected is painted with such dyeing agent as methylene blue so that the affected part may be definitely observed has recently come to be used for the observation with an endoscope. When this observing method is used, in the observed image, a bluish color and reddish color will be present as mixed and the correlation between the adjacent pixels will be low. Therefore, there are problems that, if such an image is compressed the same as in the ordinary observed image, the picture quality will deteriorate and the compressing rate will be reduced.

Also, there has recently come to be used an observing method wherein such fluorescent agent as fluorescein is injected into a part to be inspected to observe a fluorescence emitted by this fluorescent agent. If this observing method is carried out in a frame sequential system in which an illuminating light is sequentially switched to R, G and B, a fluorescence will be emitted from the fluorescent agent at the time of the illumination of B and therefore the observed image will be an image in which a blue color will be present as mixed in an image based on a reddish color and which will be different from an ordinary observed image. Therefore, there are the same problems as at the time of observing the above-described dyed image.

Now, there are compressing methods, for example, wherein an intra-image correlation with an adjacent pixel within the same field or frame is utilized and wherein an inter-image correlation with an image of a past field or frame is utilized. In case the correlation between the present image and former image is large as in the case of recording a moving image, if the inter-image correlation is utilized, the image will be able to be efficiently compressed. On the other hand, in case the correlation between the present image and former image is small as in the case of recording an image in sometime after the former image is recorded, if said inter-image correlation is utilized, no image will be able to be efficiently compressed.

On the other hand, in case the correlation with the former recorded image is small, it will be effective to use the intra- image correlation but, in case the correlation with the former recorded image is large, the image will not be able to be compressed more efficiently than in the case of utilizing the inter-image correlation.

SUMMARY OF THE INVENTION

An object of the present invention is to provide an endoscope image data compressing apparatus which can change the compressing mode in response to the characteristics of endoscope image data to be input, or the like.

Another object of the present invention is to provide an endoscope image data compressing apparatus with little deterioration of the picture quality while obtaining a high compression.

Another object of the present invention is to provide an endoscope image data compressing apparatus which can efficiently compress endoscope image data.

Another object of the present invention is to provide an endoscope image data compressing apparatus which can efficiently compress not only ordinary endoscope image data but also endoscope image data in such special observation as in dyeing.

Another object of the present invention is to provide an endoscope image data compressing apparatus which can efficiently compress endoscope image data even in such using environment as varies the correlation between endoscope images.

The endoscope image data compressing apparatus of the present invention comprises a plurality of image compressing means not equivalent to each other for compressing input endoscope image data and outputting the compressed data and a selecting means for selecting the compressed data output from at least one of said image compressing means. Said selecting means selects the compressed data in response to the kind of the endoscope, characteristics of the image, picture quality of the compressed image and recording time intervals. When said endoscope image data are dyed image data, said endoscope image data will be, for example, divalued for the compression and the difference between the divalued data and original data will be determined.

The other features and advantages of the present invention will become apparent enough with the following explanations.

BRIEF DESCRIPTION OF THE DRAWINGS

FIGS. 2 to 5 relate to the second embodiment of the present invention.

FIG. 2 is a block diagram showing a recording part.

FIG. 3 is a block diagram showing a reproducing part.

FIGS. 4(A) and (B) are explanatory views respectively of displaying pictures of TV monitors.

FIG. 5 is an explanatory view showing an example of a format of recorded data.

FIGS. 6 to 10 relate to the third embodiment of the present invention.

FIG. 6 is a block diagram showing a recording part.

FIG. 7 is a block diagram showing a reproducing part.

FIGS. 8(A) to (C) are explanatory views showing respectively effective images in monitor images.

FIG. 15 is an explanatory view showing the formation of an endoscope system in the eighth embodiment of the present invention.

FIGS. 16 and 17 relate to the ninth embodiment of the present invention.

FIG. 16 is an explanatory view showing the formation of an endoscope system.

FIG. 17 is a block diagram showing a predictive coding circuit.

FIGS. 19 to 28 relate to the eleventh embodiment of the present invention.

FIG. 19 is a block diagram showing the formation of an image recording apparatus.

FIG. 20 is an explanatory view showing the whole of an endoscope image filing system.

FIG. 21 is a block diagram showing the formation of an observing apparatus.

FIG. 22 is a block diagram showing the formation of an image analyzing part.

FIG. 24 is a block diagram showing the formation of a compressing circuit part.

FIG. 25 is a flow chart showing a recording operation of an image recording apparatus.

FIG. 26 is a flow chart showing a reproducing operation of an image recording apparatus.

FIG. 28 is an explanatory view showing a recording system to a recording system part.

FIGS. 30 to 33 relate to the thirteenth embodiment of the present invention.

FIG. 30 is a block diagram showing the formation of a compressing circuit part.

FIG. 31 is a block diagram showing the formation of a predictive error calculating circuit.

FIG. 32 is an explanatory review for explaining a predictive error calculating method.

FIG. 33 is an explanatory view of a smoothing filter.

FIGS. 34 to 37 relate to the fourteenth embodiment of the present invention.

FIG. 34 is a block diagram showing the formation of an image recording apparatus.

FIG. 35 is a block diagram showing the formation of a compressing circuit part.

FIG. 36 is a block diagram showing the formation of a band limit switching circuit.

FIG. 37 is an explanatory view showing passing bands of respective LPF's in FIG. 36.

FIGS. 38 to 42 relate to the fifteenth embodiment of the present invention.

FIG. 38 is a block diagram showing the formation of an image analyzing part.

FIGS. 39(A) and (B) are explanatory views showing compressing rate tables.

FIG. 40 is a flow chart showing a recording operation.

FIG. 41 is an explanatory view showing a recording system to a recording system part.

FIG. 42 is an explanatory view showing a block size.

FIG. 43 is a block diagram showing the formation of an image analyzing part.

FIG. 44 is an explanatory view showing an (R-Y) (B-Y) plane.

FIG. 45 is a flow chart showing a recording operation.

FIG. 46 is a block diagram showing the formation of an image analyzing part.

FIG. 47 is an explanatory view showing an (R-Y) (B-Y) plane.

FIG. 48 is an explanatory review showing divided images.

FIG. 49 is a flow chart showing a recording operation.

FIGS. 50 to 53 relate to the eighteenth embodiment of the present invention.

FIG. 50 is a block diagram showing the formation of an endoscope apparatus.

FIG. 51 is a block diagram showing the formation of an image compression recording part.

FIGS. 52(A) to (C) are explanatory views showing respectively histograms of R, G and B of a general endoscope image.

FIGS. 53(A) to (C) are explanatory views showing respectively histograms of R, G and B of a dyed endoscope image.

FIGS. 54 to 56 relate to the nineteenth embodiment of the present invention.

FIG. 54 is a block diagram showing the formation of an image compression recording part.

FIGS. 55(A) and (B) are explanatory views showing endoscope images at the time of far views and their frequency distributions.

FIGS. 56(A) and (B) are explanatory views showing endoscope images at the time of near views and their frequency distributions.

FIGS. 60 to 64 relate to the twenty-third embodiment of the present invention.

FIG. 60 is a block diagram showing the formation of an image recording apparatus.

FIG. 61 is a block diagram showing the formation of an image analyzing part.

FIG. 62 is a flow chart determining a compressing rate.

FIG. 64 is an explanatory view showing a recording system to a recording system part.

FIGS. 65 to 71 relate to the twenty-fourth embodiment of the present invention.

FIG. 65 is a block diagram showing the formation of an endoscope apparatus.

FIG. 66 is a block diagram showing an image data compressing apparatus.

FIG. 67 is a block diagram showing the formation of a second predictive coder.

FIGS. 68(A) to (C) are explanatory views showing respectively histograms of R, G and B of general endoscope images.

FIGS. 69(A) to (C) are explanatory views showing respectively histograms of R, G and B of dyed endoscope images.

FIGS. 71(A) and (B) are explanatory views for explaining a predictive coding.

FIGS. 73 and 74 relate to the twenty-sixth embodiment of the present invention.

FIG. 73 is a block diagram showing an image data compressing apparatus.

FIGS. 75 to 78 relate to the twenty-seventh embodiment of the present invention.

FIG. 75 is a block diagram showing an image compressing part.

FIG. 76 is a block diagram showing the formation of an electronic endoscope apparatus.

FIG. 77 is a block diagram showing a blocking circuit.

FIGS. 78(A) to (C) are explanatory views showing respectively blocks.

FIGS. 79 to 83 relate to the twenty-eighth embodiment of the present invention.

FIG. 79 is a block diagram showing the formation of an electronic endoscope apparatus.

FIG. 80 is an explanatory view for explaining a predictive coding.

FIGS. 81(A) to (C) are histograms of predictive errors in ordinary observed images.

FIGS. 82(A) to (C) are histograms of predictive errors in special observed images.

FIGS. 84 and 85 relate to the twenty-ninth embodiment of the present invention.

FIG. 84 is a block diagram showing an image compressing part.

FIGS. 86 and 87 relate to the thirtieth embodiment of the present invention.

FIG. 86 is a block diagram showing the formation of an electronic endoscope apparatus.

FIG. 87 is a block diagram showing an image compressing part.

FIG. 88 is a block diagram showing an image compressing part in the thirty-first embodiment of the present invention.

FIG. 89 is a block diagram showing the formation of an image filing apparatus.

FIG. 90 is an explanatory view showing the formation of an image filing system.

FIG. 91 is an explanatory view showing the formation of an endoscope apparatus.

FIG. 92 is a block diagram showing the formation of an image file controller.

FIG. 93 is a flow chart showing a recording operation.

FIG. 94 is a flow chart showing a searching operation.

FIG. 97 is an explanatory view showing the formation of an endoscope system.

FIG. 98 is an explanatory view showing the formations of an endoscope and observing apparatus.

FIG. 99 is a block diagram showing the formation of an image recording apparatus.

DETAILED DESCRIPTION OF THE PREFERRED EMBODIMENTS

Figure 1:
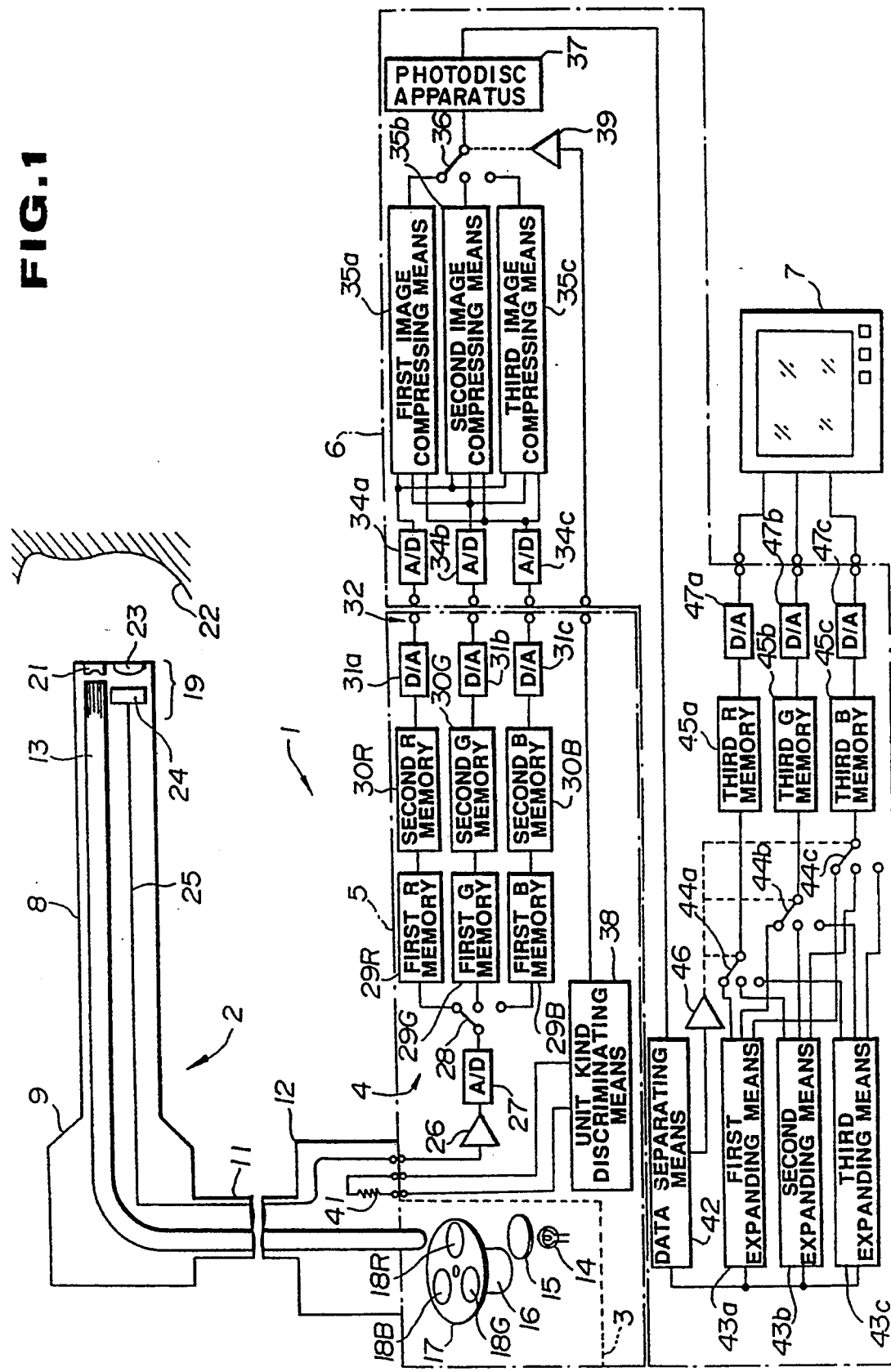
FIG. 1 is an explanatory view showing the formation of an endoscope system in the first embodiment of the present invention.

FIG. 1 shows the first embodiment of the present invention. In this embodiment, an endoscope system 1 comprises an electronic endoscope (briefly mentioned as an electronic scope hereinafter) 2 having an imaging means built-in, an endoscope controlling apparatus 5 having a light source part 3 feeding an illuminating light to the electronic scope 2 and a built-in signal processing part 4 for processing a signal for said electronic scope 2, an endoscope image recording and reproducing apparatus (briefly mentioned merely as an image recording and reproducing apparatus hereinafter) 6 of the first embodiment for image-compressing and recording a video signal output from the endoscope controlling apparatus 5 and expanding and outputting it at the time of reproducing it and a TV monitor 7 color-displaying the video signal output from the image recording and reproducing apparatus 6.

The electronic scope 2 has, for example, a flexible elongate insertable part 8, a thick operating part 9 formed at the rear end of the insertable part 8 and a universal cable 11 extended from the operating part 9 so that a connector 12 provided at the tip of the universal cable 11 may be connected to the endoscope controlling apparatus 5.

When the connector 12 is connected to the endoscope controlling apparatus 5, an illuminating light will be fed to the entrance end surface of a light guide 13 from the light source part 3.

That is to say, a white color light of a lamp 14 will be condensed by a condenser lens 15 and the condensed white color light will be separated into respective wavelength ranges of red, green and blue by red, green and blue color transmitting filters 18R, 18G and 18B fitted to a rotary filter disc 17, which is rotated by a motor 16 when said filters are interposed sequentially into an illuminating light path and radiated to the entrance end surface of a light guide 13.

The illuminating light radiated to the entrance end surface will be transmitted by the light guide 13 inserted through the universal cable 11 and insertable part 8 and will be radiated to such object part 22 as within a body cavity through an illuminating lens 21 from the exit end surface fixed in the tip part 19.

The illuminated object part 22 will be formed by an objective lens 23 fitted to the tip part 19 to form an image on a CCD 24 as a solid state imaging device arranged in the focal plane of the objective lens 23. The optical image will be photoelectrically converted by the CCD 24 and will be accumulated as a signal charge.

When a CCD driving signal is applied to the CCD 24 from a driving circuit, not illustrated, the signal charge will be read out, will be input into a video amplifier 26 within the endoscope controlling apparatus 5 through a signal cable 25, will be amplified by this video amplifier 26 and will be converted to a digital signal by an A/D converter 27. This digital signal will be sequentially memorized in a first R memory 29R, first G memory 29G and first B memory 29B for synchronization with the rotation of the rotary filter disc 1 through a switching switch 28.

The signal imaged under the red illuminating light passed, for example, through the red color transmitting filter 18R will be memorized in the first R memory 29R. Thus, the image signal data memorized in the synchronizing first R, G and B memories 29R, 29G and 29B will be memorized, respectively, in second R, G and B memories 30R, 30G and 39B which are used for displaying a still picture.

The image signal data simultaneously read out of the second R, G and B memories 30R, 30G and 30B will be converted respectively to analog color signals R, G and B by A/D converters 31a, 31b and 31c and will be output from an output end 32. When a TV monitor 7 is connected to this output end 32, the endoscope image will be displayed in the displaying picture of the TV monitor 7.

In this system 1, the input end of the image recording and reproducing apparatus 6 of the first embodiment can be connected to this output end 32 so that the color signals R, G and B input from the input end may be converted to digital signals respectively by A/D converters 34a, 34b and 34c and may be input, for example, into three kinds of image compressing means, such as first, second and third image compressing means 35a, 35b and 35c to compress three kinds of images.

The respective compressing means are formed of hardware which can carry out algorithms such as a predictive coding, vector coding and discrete cosine conversion or computers and software.

The output signals of the three kinds of image compressing means 35a, 35b and 35c can be recorded in a photodisc apparatus 37 as a recording apparatus through a compression selecting switch 36.

The compression selecting switch 36 is controlled through a switch driver 39 discriminating data of a unit kind discriminating means 38. The unit kind discriminating means 38 is provided within the endoscope controlling apparatus 5 so that, when the electronic scope 2 is connected, the value of a resistance 41 is provided with the resistance value corresponding to the unit kind of the electronic scope 2 will be read out and discriminating data corresponding to the unit kind will be output. Operation of a release switch, not illustrated, the photodisc apparatus 37 records compressed image data together with said discriminating data.

By the way, among the three kinds of image compressing means 35a, 35b and 35c set in advance to be of a proper image compression in response to the respective unit kinds of the electronic scope 2, the most proper image compressing means 35i (i=a, b or c) is selected by the discriminating data by the compression selecting switch 36. The resistance 41 is provided on a means of generating the information of the unit kinds of the endoscope, for example, within the connector 12 of the respective electronic scopes 2 (but may be provided in any other part).

The endoscope image data compressed and recorded in the photodisc apparatus 37 are read out by operating a reproducing button and are separated into discriminating data and compressed image data by a data separating means 42. The compressed image data are input into three kinds of expanding means, that is, a first, second and third expanding means and are expanded by the respective algorithms. These expanding means 43a, 43b and 43c are set in advance to make proper expansions corresponding to the respective image compressions of the image compressing means 35a, 35b and 35c.

The image data (R, G and B component image data in this case) expanded by the expanding means 43a, 43b and 43c are memorized, respectively, in the third R, G and B memories 45R, 45G and 45B through three expansion selecting switches 44a, 44b and 44c.

The expansion selecting switches 44a, 44b and 44c are controlled in the selection through a switch driver 46 by the discriminating data separated by the data separating means 42. That is to say, the expanding means 43i (i=a, b or c) corresponding to the image compressing means 35i used in the image compression is to be selected.

The image data memorized in the third R, G and B memories 45a, 45b and 45c are simultaneously read out, are converted respectively to analog color signals R, G and B by D/A converters 47a, 47b and 47c and are color-displayed in the TV monitor 7. By the way, when a release switch, not illustrated, is operated, the second R, G and B memories 30R, 30G and 30B will hold frozen pictures which will be recorded by the photodisc apparatus 37.

The operation of the endoscope system 1 provided with the thus formed first embodiment shall be explained as follows:

(a) Recording Operation:

An image imaged by the CCD 24 of the electronic scope 2 is output as a video signal from the endoscope controlling apparatus 5 and is input into the A/D converters 34a, 34b and 34c within the image recording and reproducing apparatus 6. The outputs of the A/D converters 34a, 34b and 34c are input into the three kinds of image compressing means 35a, 35b and 35c and three kinds of image compressions are made.

The electronic scope 2 is provided with a resistance 41 having a value corresponding to the unit kind of the electronic scope 2. The value of this resistance 41 is read out by the unit kind discriminating means 38 within the endoscope controlling apparatus 5 and discriminating data corresponding to the unit kind are output.

This discriminating signal is input into the driver 39 within the image recording and reproducing apparatus 6 and the image compressing means 35i most adapted to the now connected electronic scope 2 is selected by the compression selecting switch 36.

When a release switch, not illustrated, is pushed, the discriminating data will be recorded together with the compressed image data in the photodisc apparatus 37.

(b) Reproducing Operation:

The discriminating data and compressed image data read out of the photodisc apparatus 37 by a reproducing order are separated from each other by the data separating means 42.

The compressed image data are input into the expanding means 43a, 43b and 43c and are expanded by respective algorithms. On the other hand, the discriminating data drive the expansion selecting switches 44a, 44b and 44c through the driver 46 and select the expanding means 43i most adapted to the discriminating data. The output of the selected expanding means 43i is memorized in the R memory 45a, G memory 45b and B memory 45c and is displayed in the TV monitor 7 through the D/A converters 47a, 47b and 47c.

According to the first embodiment, the unit kind of the connected electron scope 2 is discriminated and the image is compressed at a compressing rate adapted to the unit kind, the image will be able to be efficiently compressed without reducing the quality of the image by excessive compression or without compression at too low a compressing rate.

FIGS. 2 to 5 show the second embodiment of the present invention.

The second embodiment can cope with the case when the number of pixels of an imaging device is different depending on the unit kind of an electronic scope.

In case the number of pixels of an imaging device is large, as shown in FIG. 4(A), the image on the TV monitor will be able to be displayed up to the high spatial frequency component part.

On the other hand, in case the number of pixels is small, as shown in FIG. 4(B), the spatial frequency component that can be displayed will be low.

Therefore, if the image of an electronic scope having a large number of pixels is recorded up to the high spatial frequency component part and the image of an electronic scope having a small number of pixels is recorded only in the low spatial frequency component part, the image will be able to be efficiently recorded.

Figure 2:
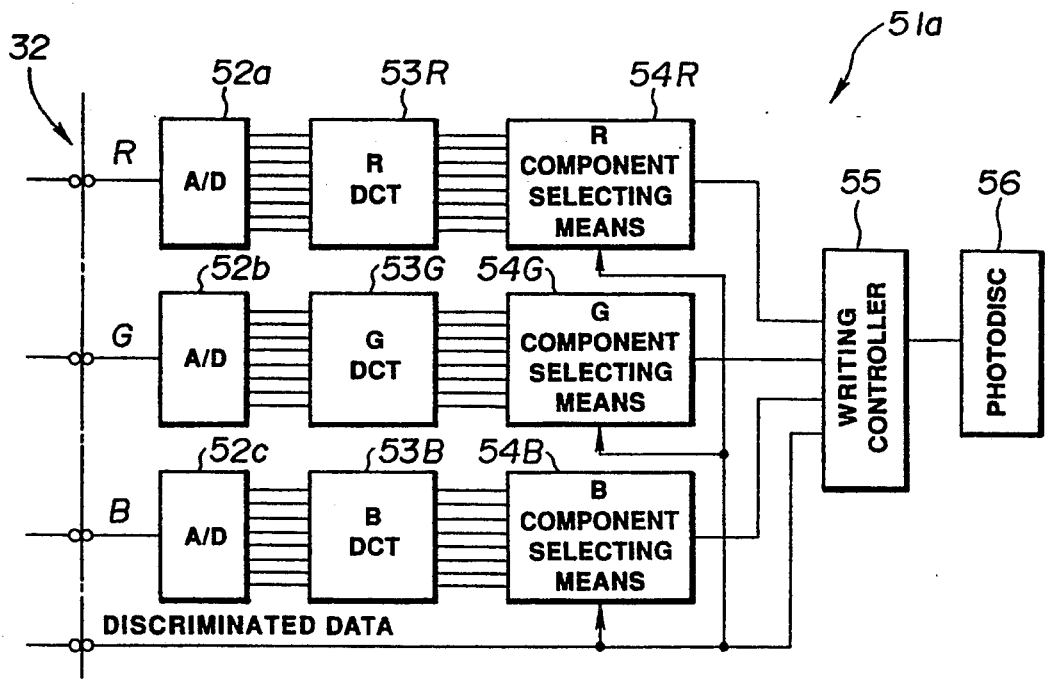
Figure 3:
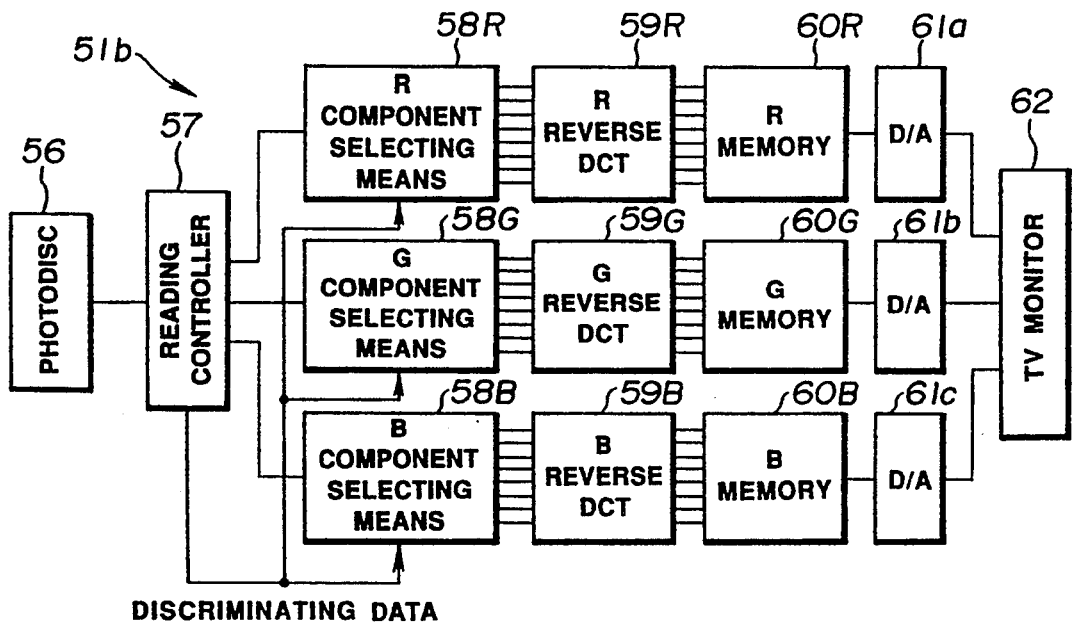

The formation of the second embodiment is shown in FIGS. 2 and 3.

In an endoscope controlling apparatus 5 shown in FIG. 1, analog color signals R, G and B output from an output end 32 are converted to digital signals respectively by A/D converters 52a, 52b and 52c of a recording part 51a and are input respectively into R, G and B discrete cosine converters 53R, 53G and 53B. These discrete cosine converters (abbreviated as DCT's hereafter) 53R, 53G and 53B can be formed, for example, of IMS-A121 made by INMOS Co., Britain.

The image data discrete-cosine-converted, respectively, by the DCT 53R, 53G and 53B are input, respectively, into R, G and B component selecting means 54R, 54G and 54B. Discriminating data corresponding to the unit kind of the electronic scope 2 connected and used by the unit kind discriminating means 38 are input into respective component selecting means 54R, 54G and 54B through the endoscope controlling apparatus 5 in FIG. 1 and the effective range of the frequency component resulting from the discrete cosine conversion is determined by the discriminating data.

The frequency component data selected by the respective component selecting means 54R, 54G and 54B can be recorded together with the discriminating data in a photodisc 56 through a writing controller 55. If the data to be recorded in the photodisc 56 are defined to be compressed image data compressed after discriminating data of one bit as shown, for example, in FIG. 5, both data will be able to be easily separated. By the way, the data length of the compressed image data may be determined in advance in response to the discriminating data.

The image data and discriminating data recorded in said photodisc 56 are separated by a reading controller 57, as shown in FIG. 3, and are input, respectively, into R, G and B component selecting means 58R, 58G and 58B. The respective component selecting means 58R, 58G and 58B output on the basis of the discriminating data effective frequency component data, respectively, to the frequency component input ends of reverse DCT 59R, 59G and 59B for R, G and B.

The respective reverse DCT 59R, 59G and 59B discrete-reverse-cosine-convert the input frequency components and write them, respectively, into R, G and B memories 60R, 60G and 60B. The image data written into these memories 60R, 60G and 60B are simultaneously read out, are converted to analog color signals R, G and B respectively by D/A converters 61a, 61b and 61c and are displayed in a TV monitor 62.

The operation of this second embodiment shall be explained in the following.

(a) Recording Operation:

The respective signals R, G and B are digitally converted by the A/D converters 52a, 52b and 52c, are input, respectively, into the R, G and B DCT 53R, 53G and 53B and are discrete-cosine-converted.

According to the input discriminating data correspond to the unit kind of the electronic scope, the component selecting means 54R, 54G and 54B determine the effective range of the frequency components among the data of the result of the discrete cosine conversion. The frequency component data selected by the component selecting means 54R, 54G and 54B are recorded in the photodisc 56 through the writing controller 55.

(b) Reproducing Operation:

The frequency component data and discriminating data read out of the photodisc 56 are separated by the reading controller 57.

Only the effective frequency components of the separated discriminating data are input into the reverse DCT 59R, 59G and 59B by the component selecting means 58R, 58G and 58B. The reverse DCT 59R, 59G and 59B discrete-reverse-cosine-convert the input frequency components and write the converted results into the R memory 60R, G memory 60G and B memory 60B. The outputs of the R memory 60R, G memory 60G and B memory 60B are displayed in the TV monitor 62, respectively, through the D/A converters 61a, 61b and 61c.

According to the second embodiment, as the effective frequency components in compressing the image by the discrete cosine conversion are selected in response to the unit kind by the discriminating data, the image will be able to be compressed properly in response to the unit kind. For example, in the case of a small pixel number, the discrete cosine conversion will be made so that the high spatial frequency component may not be made effective, therefore the number of bits of the compressed image data in this case will be able to be made small and the image will be efficiently recorded in response to the unit kind. Also, because the reproduction is made on the basis of the information in the recording, even in the case, for example, of a unit kind of a large pixel number, the picture quality will be able to be prevented from being deteriorated in the reproducing process.

The other formations, operations and effects are the same as in the first embodiment.

FIGS. 6 to 10 show a third embodiment of the present invention.

The third embodiment relates to the case where the displayed shape is different, as shown in FIGS. 8(A), (B) and (C), depending on the unit kind and maker of the electronic scope. In FIG. 8(A), a circular endoscope image is displayed in a rightward position on a monitor picture. In FIG. 8(B), a circular image is displayed in the central part on a monitor picture. In FIG. 8(C), a square endoscope image rounded in four corners is displayed in a rightward position on a monitor picture.

Japanese Patent Application Laid Open No. 204188/1985 suggests such an image information processing method wherein an unnecessary part and an important part of an image are separated from each other and the boundary is simultaneously recorded as a numerical value so that, when the image is reproduced, a normal image will be restored. This method is used in the third embodiment.

In FIG. 6, an image signal (representing R, G and B) output from the endoscope controlling apparatus 5, for example, in FIG. 1 is input into a writing controlling circuit 74 through an A/D converter 73. On the other hand, a clock generating circuit 75 outputs to a scanning line pixel number counter 76 a clock locked in phase to a synchronizing signal of said image signal. The number of pixels of each scanning line is counted by this scanning line pixel number counter 76, and the counted output is then input into a scanning line end sensing circuit 77 and the scanning line end is sensed.

The output of the scanning line end sensing circuit 77 is input into a scanning line counter 78 and the number of all the effective scanning lines is counted and is input into a shape ROM 79 which is programmed to output an effective signal only in the period when the effective portion of the whole image is being scanned. Discriminating data are to be input into the uppermost address line of this shape ROM 79.

The writing controlling circuit 74 writes only the image data of the effective image into an image memory 80 from the output of this shape ROM 79 and the output of the A/D converter 73.

The image data written into the image memory 80 are recorded together with the discriminating data in a photodisc apparatus 81.

The image data and discriminating data recorded in the photodisc apparatus 81 are separated by a data separating means 82, as shown in FIG. 7. The separated image data are memorized in an image memory 83 and the discriminating data are input into the uppermost address of the shape ROM 79. The outputs of the scanning line pixel number counter 76 and scanning line counter 78 explained in FIG. 6 are applied to the other addresses of the shape ROM 79.

The outputs of the image memory 83 and shape ROM 79 are input into a writing controlling circuit 84 into which are also input the outputs of the scanning line end sensing circuit 77 and scanning line counter 78. Only when the effective image part is being scanned with reference to these counted values and the output of the shape ROM 79, the image data of the image memory 83 will be read out and will be written into a predetermined place of a whole image memory 85. When the image is entirely written into the whole image memory 85, it will be read out, will be converted to an analog video signal through a D/A converter 86 and will be displayed in a TV monitor 87.

Figure 9A:
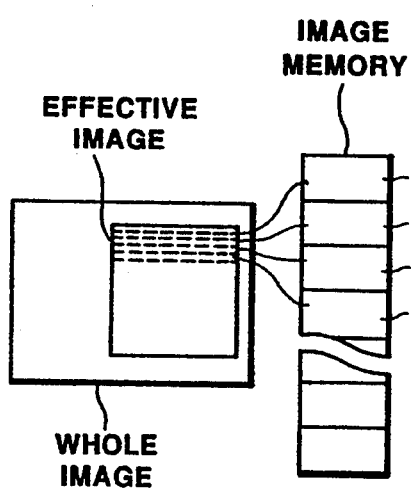
FIGS. 9(A) and (B) are explanatory views showing respectively the relations between an effective image shape and effective signal.

The operation of the third embodiment shall be explained in the following on the case that the effective image part is square and circular as shown in FIGS. 9(A) and (B).

(a) Recording Operation:

In FIGS. 9(A) and (B), when the size of the square or circular effective image and the position thereof with respect to the whole image are determined, the numbers of the effective pixels on the respective scanning lines will be directly determined.

Figure 9B:
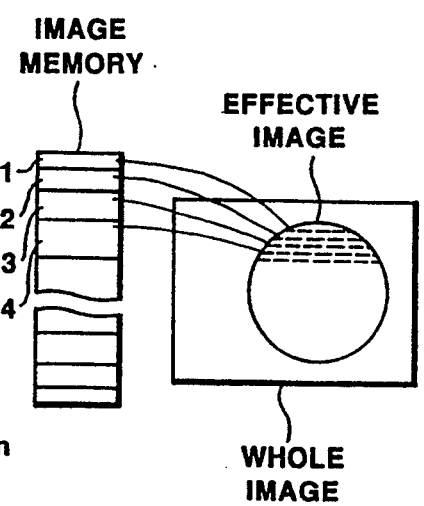

Therefore, the discriminating data are input into the uppermost address of the shape ROM 79 and a general selection is made so that a signal corresponding to the shape by the discriminating data may be output from the shape ROM 79. For example, as shown in FIG. 9(A), because the discriminating data have discriminated the effective image to be square, in the shape ROM 79, effective signals will be output for the respective scanning lines in the same fixed periods. On the other hand, as shown in FIG. 9(B), because the discriminating data have discriminated the effective image to be circular, the effective signal will be selected to be output so that the effective signal period may gradually become longer and may then become shorter.

As shown in FIG. 6, in the shape ROM 79, when the outputs of the scanning line pixel number counter 76 and scanning line counter 78 are input as other addresses, the effective signal will be output only in the period when the effective portion of the whole image is being scanned. In the period when this effective signal is being output, the writing controlling circuit 74 will write into the image memory 80 the image data digitally-converted by the A/D converter 73.

As described above, the effective signal output period varies in response to the shape of the effective signal and, therefore, in the case of a square, as shown in FIG. 9(A), fixed line image data will be written into the image memory 80 for the respective scanning lines 1, 2 ... of the effective image part. In the case of a circle, as shown in FIG. 9(B), line image data proportional to the scanning line width (period) will be written in for the respective scanning lines of the effective image part.

Figures 10A, 10B:
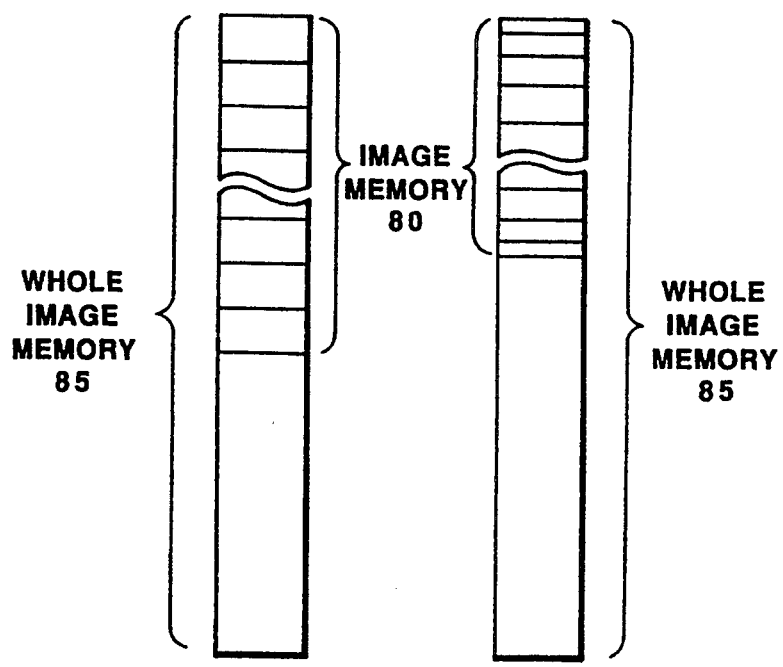
FIGS. 10(A) and (B) are explanatory views showing respectively image memories in which image data in whole image memories are memorized.

As a result, as shown in FIGS. 10(A) and (B), the image data will be compressed in an image memory 80 having a smaller capacity than a whole image memory 85. These image data are recorded together with the discriminating data in a photodisc apparatus 81.

(b) Reproducing Operation:

The image data and discriminating data read out of the photodisc apparatus 81 are separated by the data separating means 82, the image data are memorized in the image memory 83 and the discriminating data are input into the uppermost address of the shape ROM 79.

The input of the scanning line pixel number counter 76 is an original clock of an output synchronizing signal to the TV monitor 87 from the clock generating circuit 75 and the input of the scanning line counter 78 is an output of the scanning line end sensing circuit 77 sensing the end of the scanning line from the value of the scanning line pixel number counter 76.

The writing controlling circuit 84 will read out the data of the image memory 83 only when the effective image part is being scanned with reference to the values of the scanning line counter 78 and scanning line end sensing circuit 77 and the output of the shape ROM 79 and will write the image data in a predetermined place of the whole image memory 85.

When the image is all written into the whole image memory 85, the contents will be displayed in the TV monitor 87 through the D/A converter 86.

According to the third embodiment, because image data of only the effective image part are detected and recorded so as to be restored when they are to be reproduced but the image data not effective are excluded, the image will be able to be efficiently recorded without reducing the picture quality.

The other formations, operations and effects are the same as in the first embodiment.

Figure 11:
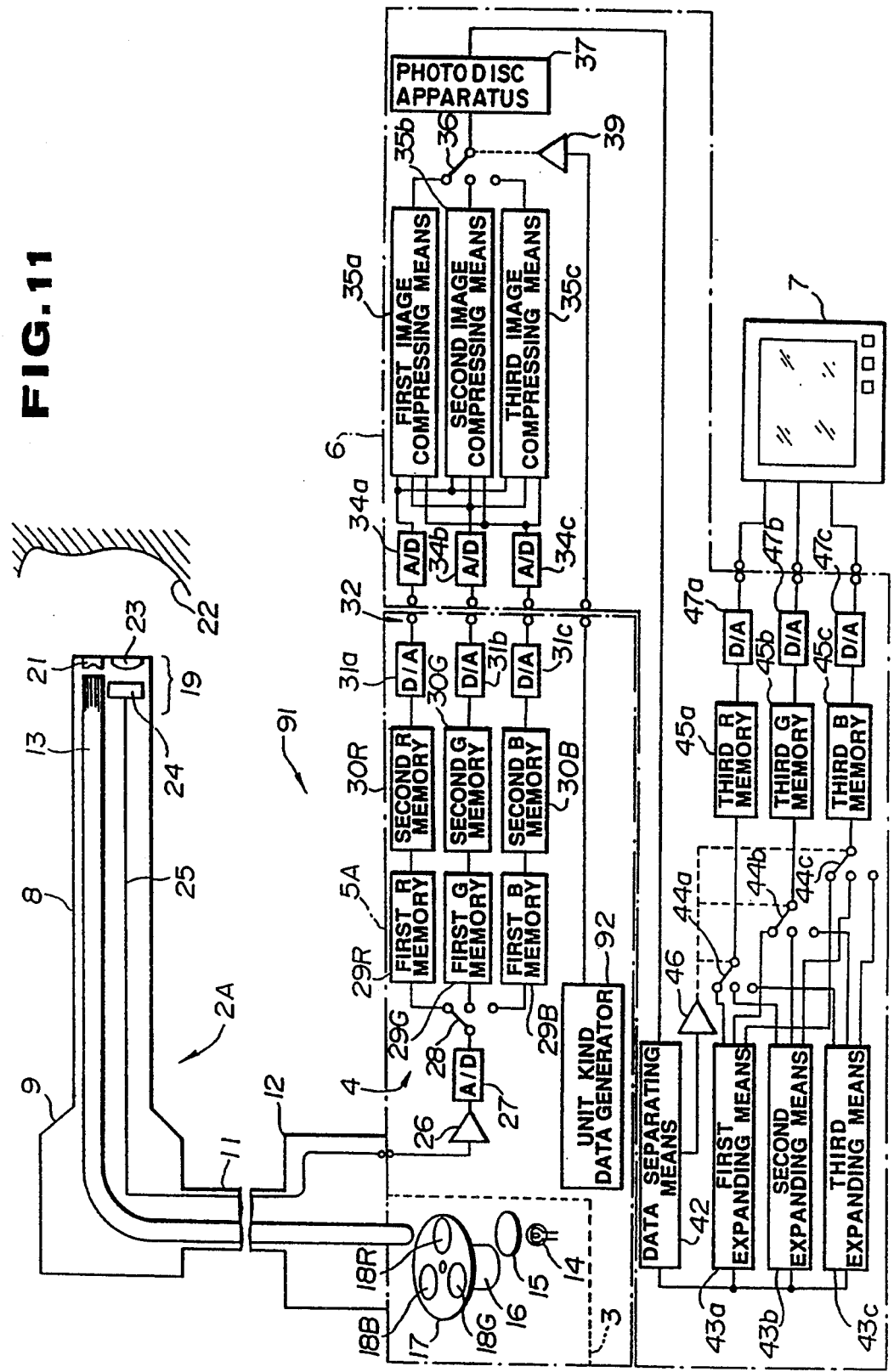
FIG. 11 is an explanatory view showing the formation of an endoscope system in the fourth embodiment of the present invention.

FIG. 11 shows a fourth embodiment of the present invention.

In this system 91, an electronic scope 2A having no built-in resistance 41 is used instead of the electronic scope 2 in the first embodiment, and an endoscope controlling apparatus 5A having a unit kind data generator 92 formed of a ROM or switch instead of the unit kind discriminating means 38 is used instead of the endoscope controlling apparatus 5 in the first embodiment.

This system 91 will be effective in case the endoscope controlling apparatus 5A is different from each unit kind of the electronic scope 2A.

The other formations, operations and effects are the same as in the first embodiment.

Figure 12:
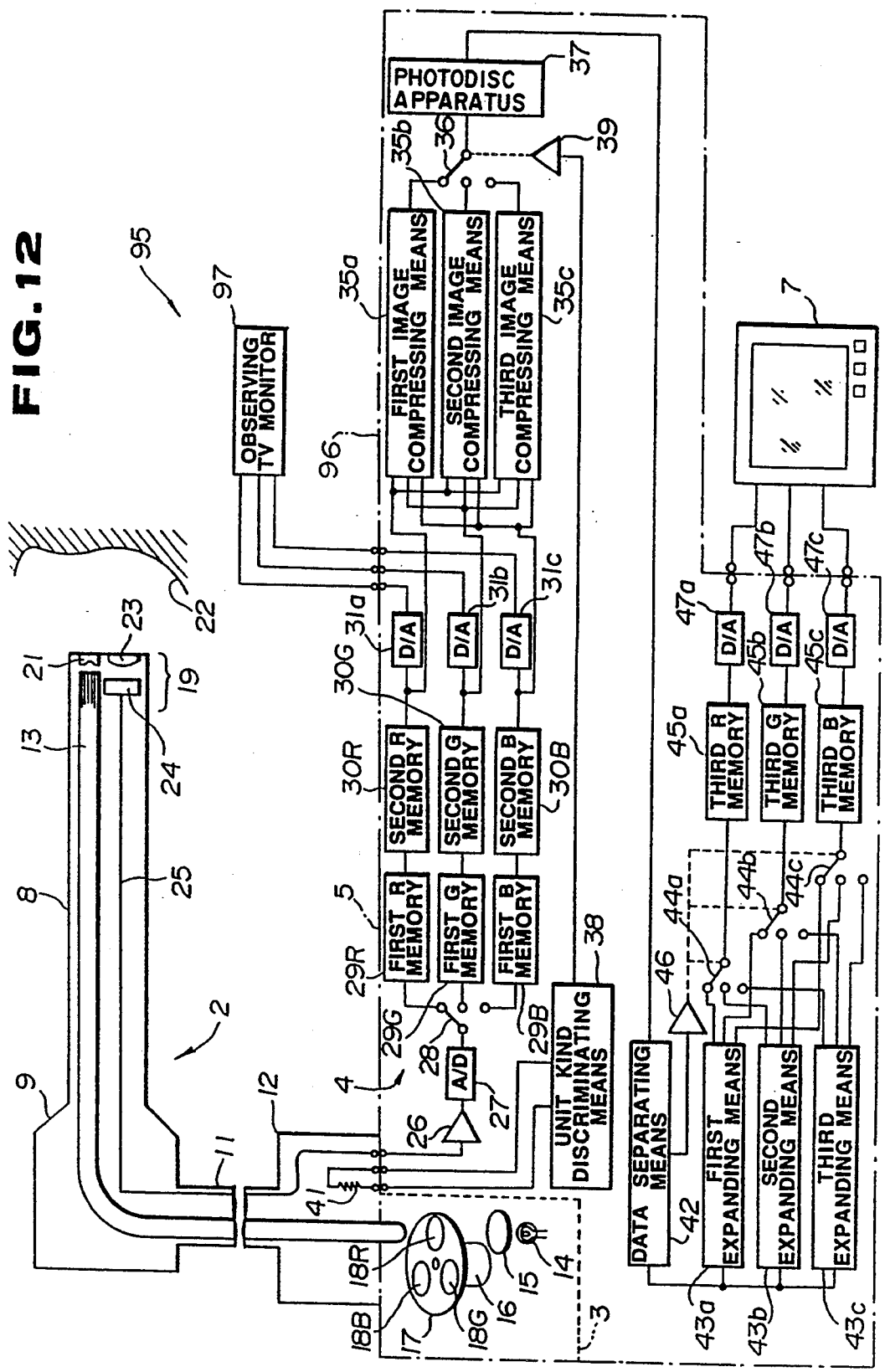
FIG. 12 is an explanatory view showing the formation of an endoscope system in the fifth embodiment of the present invention.

FIG. 12 shows a fifth embodiment of the present invention.

In this system 95, the endoscope controlling apparatus 5 and (endoscope) image recording and reproducing apparatus 6 in the first embodiment shown in FIG. 1 are made integral with each other to form an image recording and reproducing apparatus 96.

The digital image data of the second R, G and B memories 30R, 30G and 30B are to be input directly into image compressing means 35a, 35b and 35c, respectively. (Therefore, the A/D converters 34a, 34b and 34c in FIG. 1 are not provided.)

The analog color signals R, G and B output from the D/A converters 31a, 31b and 31c are input into an observing TV monitor 97 to display the image imaged by the electronic scope 2.

According to this embodiment, because the image data is in digital form as they are input into the image compressing means 35a, 35b and 35c, without being passed through the D/A converters 31a, 31b and 31c and A/D converters 34a, 34b and 34c, the picture quality shows little deterioration. By the way, the photodisc apparatus 37 may be incorporated into the image recording and reproducing apparatus 96, or may be separate instead.

In the above-described respective embodiments, the compressed image data and discriminating data are recorded in the same recording medium, but the present invention is not limited to this. They may be recorded in separate recording media, such as the compressed image data recorded in a photodisc and the discriminating data in a separate magnetic disc. If separate recording media are simultaneously reproduced, the same effect will be obtained.

Also, without using a plurality of image compressing means, one image compressing means may be used while being set in different states. Further, the image may be compressed by software instead of hardware. In such a case, a plurality of programs may be carried out in response to the discriminating data by using one CPU or the parameter of one program may be varied.

In the above-described respective embodiments, a frame sequential type electronic endoscope is shown but a simultaneous type electronic endoscope will also suffice.

An ordinary TV camera or frame sequential type imaging apparatus as fitted to the eyepiece part of an ordinary fiberscope is included in the electronic endoscope of the present application.

The data recording medium may be not only a photodisc but also any of a photomagnetic disc, magnetic disc and semiconductor memory.

The discriminating data may not be recorded as data but the recording medium may be provided with a specific region corresponding to the discriminating data and the compressed image data corresponding to the discriminating data may be recorded in the specific region so that the discriminating data may be found in the recording place. This includes such manner of use that, for example, a plurality of photodisc apparatus are prepared and the recording disc apparatus is determined in response to the discriminating data.

The unit kind discriminating need not be by the resistance method but may be by ROM or anything that can discriminate the kind.

Figure 13:
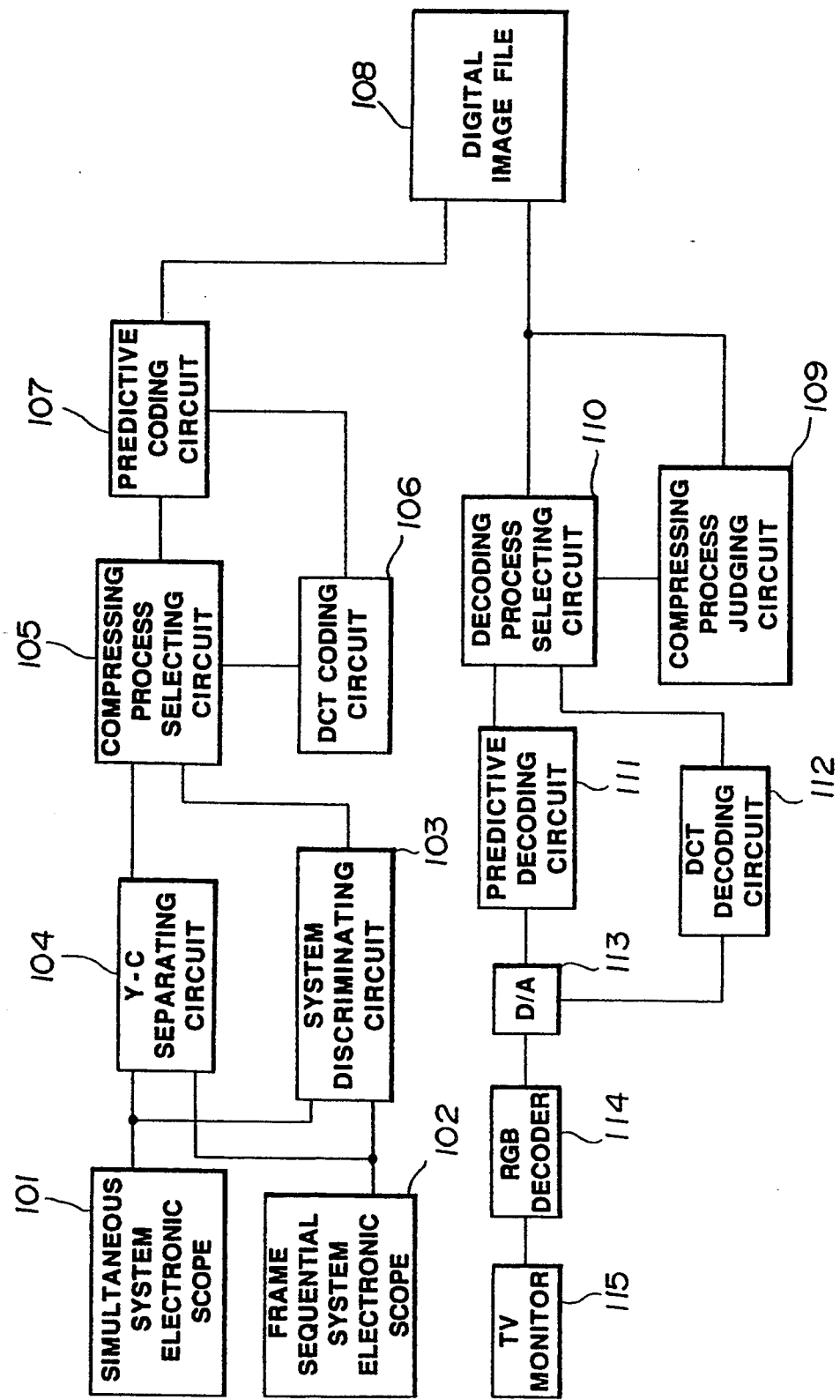
FIG. 13 is an explanatory view showing the formation of an endoscope system in the sixth embodiment of the present invention.

FIG. 13 shows a sixth embodiment of the present invention.

This embodiment describes an image compression most adapted to respective frame sequential system and simultaneous system electronic scopes and has as one of its features pre-processing of a frame sequential system electronic scope having high color resolution so as to be of the same color resolution as of a simultaneous system.

An endoscope system shown in FIG. 13 comprises a simultaneous system electronic scope 101 provided at a tip with a color separating filter to separate colors, a frame sequential system electronic scope 102 wherein an illuminating light is color-separated in time series to obtain a color image and a system discriminating circuit 13 discriminating both systems.

In the simultaneous system and frame sequential system, a common light source part is used and a frame sequential system illumination emitting RGB color lights in time series and a simultaneous system illumination emitting a white color light are switched to each other by a discriminating signal (system identifying signal) by the system discriminating circuit 103 (not illustrated).

On the other hand, image data of both system electronic scopes 101 and 102 are separated into a luminance signal and a color signal by a Y-C separating circuit 104. The image signal separated into the color signal and luminance signal is input into a compressing process selecting circuit 101. Here, a compressing process is selected on the basis of the system identifying signal from the system discriminating circuit 103.

Here, the simultaneous system electronic scope 101 is provided with a complementary color type filter. A G signal containing information regarding a plurality of bright and dark portions is included in respective pixels and is set at a high resolution but a color signal is set to have a smaller number of pixels than a luminance signal by utilizing the fact that the resolution of a color signal is lower than that of a luminance signal in human sight characteristics.

On the other hand, in the frame sequential system electronic scope 102, the image is color-separated into RGB color images by the illuminating system, therefore the numbers of pixels of the respective RGB images are equal and the resolutions of the luminance signal and color signal are equal. Therefore, in the frame sequential system endoscope image, the color signal is processed to compress the band by applying human sight characteristics so that a high efficiency compressing process may be possible while retaining the same picture quality of the simultaneous system.

Therefore, in the compressing process selecting circuit 105, on the frame sequential system electronic scope 102, the color signal separated by the Y-C separating circuit 104 is processed to be compressed by a DCT coding circuit 106 and the luminance signal is processed to be compressed by a predictive coding circuit 107. On the simultaneous system, by the selection by the compressing process selecting circuit 105, both the color signal and the luminance signal are processed to be compressed by the predictive coding circuit 107 without passing through the DCT coding circuit 106.

The compressed image signal is recorded in a digital image file 108. In case the image is to be read out of the digital image file 108, the image data from the digital image file 108 are input into a compressing process judging circuit 109 and decoding process selecting circuit 110. In the compressing process judging circuit 109, it is judged whether the digital image data output from the digital image file 108 are predictively coded or DCT-coded and the coding process is selected in the decoding process selecting circuit 110. The image data of the simultaneous system electronic scope 101 processed to be compressed only in the predictive coding circuit 107 are processed to be decoded in the predictive decoding circuit 111. On the other hand, the image data of the frame sequential system electronic scope 102 processed to be decoded by two of the predictive coding and DCT coding circuits 107 and 106 are processed to be decoded in the predictive decoding process circuit 111 on the luminance signal processed to be predictively coded and are processed to be decoded in a DCT decoding circuit 112 on the color signal coded in the DCT coding circuit 106.

The image data processed to be decoded are converted to an analog image signal by a D/A converter 113. The image signals Y-C-separated by an RGB decoder 114 are converted to RGB image signals and are displayed on a TV monitor 115.

According to the sixth embodiment, making the compressing process most adapted to either a respective frame sequential system or a simultaneous system produces an endoscope image compressing apparatus high in picture quality and efficiency can be realized.

Figure 14:
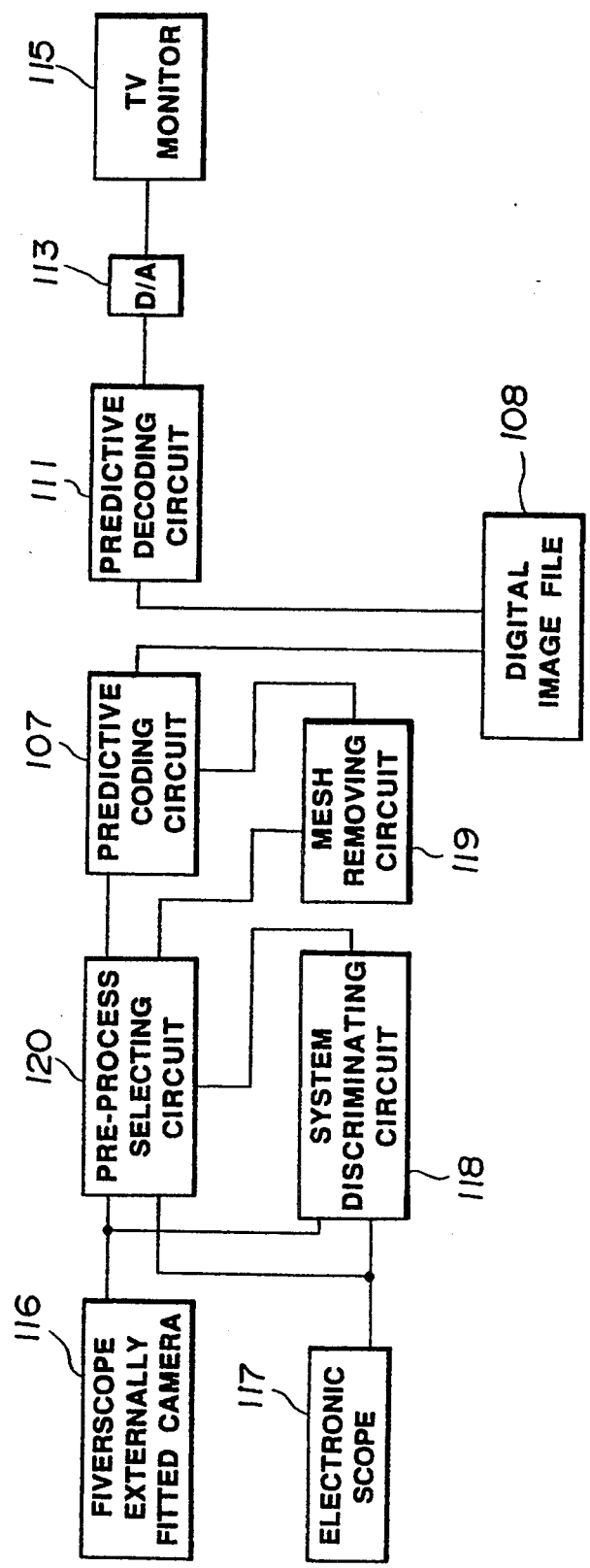
FIG. 14 is an explanatory view showing the formation of an endoscope system in the seventh embodiment of the present invention.

FIG. 14 shows a seventh embodiment of the present invention.

This embodiment makes the data compression most adapted to each of image data output by an externally fitted camera of a fiberscope and image data by an electronic scope and has as one of its features to provide a means of making a mesh removing process as a pre-process in making the same process as the compressing process by a video scope in the case of the image data by the externally fitted camera of the fiberscope.

As shown in FIG. 14, an externally fitted camera 116 of a fiberscope and an electronic scope 117 are discriminated by a system discriminating circuit 118.

The image data of the externally fitted camera 116 of the fiberscope and electronic scope 117 are input into a pre-process selecting circuit 120 and a pre-process is selected on the basis of the result of the discrimination by the system discriminating circuit 118.

The pre-process selecting circuit 120 transmits the input image data to a mesh removing circuit 119 in order to prevent the compressing rate from being reduced by the meshes of the fiberscope which represent unnecessary information in the case of the externally fitted camera 116 of the fiberscope. Because the meshes of the fiberscope are present with a fixed spatial frequency, this mesh removing circuit 119 is formed of a two-dimensional low pass filter. The output of this mesh removing circuit 119 is transmitted to the predictive coding circuit 107.

On the other hand, because no mesh is present, the image data of the electronic scope 117 are input as they are into the predictive coding circuit 107 by the selecting circuit 120 without being processed by the mesh removing circuit 119. In the predictive coding circuit 107, the image data are input and are compressed by the predictive coding as in the sixth embodiment. The image data compressed in the predictive coding circuit 107 are digitally-recorded in the digital image file 108. The digital image data recorded in the digital image file 108 are decoded in the predictive decoding circuit 111, are converted to analog image data by a D/A converter 113 and are then displayed on a TV monitor 115.

According to the seventh embodiment, in a compressing process apparatus for compressing image data in which meshes of a fiberscope and electronic scope are mixed, when the meshes of the fiberscope which are unnecessary image data are removed, a compressing process apparatus high in efficiency and picture quality will be able to be realized.

FIG. 15 shows an eighth embodiment of the present invention.

As shown in FIG. 15, a light guide 131 transmitting an illuminating light is inserted through an insertable part 130 of an electronic scope 129. The tip surface of this light guide 131 is arranged in the tip part 132 of the insertable part 130 so that the illuminating light may be emitted out of this tip surface.

Also, in said tip part 132, an objective lens system 133 is provided and a solid state imaging device 134 is arranged in the image forming position of this objective lens system 133. This solid state imaging device 134 has a sensitivity in a wide wavelength range from an ultraviolet region to an infrared region and including a visible region.

A lamp 135 emitting a light in a wide band from ultraviolet rays to infrared rays is provided to provide illumination of an observed part. This lamp 135 may be a general xenon lamp or strobe lamp.

Said xenon lamp or strobe lamp emits a large amount of not only visible light but also ultraviolet rays and infrared rays. The lamp 135 is fed with an electric power by a power source 136. A rotary filter 138 rotated and driven by motor 137 is arranged in front of the lamp 135 and is provided as arranged in the peripheral direction with color transmitting filters 138R, 138G and 138B transmitting, respectively, lights of respective wavelength regions of red (R), green (G) and blue (B) for ordinary observation.

The driving of the motor 137 is controlled in rotation by a motor driver 140.

The light transmitted through the rotary filter 137 and separated in time series into lights of respective wavelength regions of R, G and B further enters the light guide 131 at the entrance, is led through the light guide 131 to the end surface on the side of the tip part 132 and is emitted from the end surface to illuminate an observed part.

The light returning from the observed part by this illuminating light forms an image on the solid state imaging device 134 by the objective lens system 133 and the image is then photoelectrically converted. A driving pulse from the driver circuit 141 is applied to the solid state imaging device 134 through a signal line to read out and transfer a video signal. The video signal read out of the solid state imaging device 134 is input into a pre-amplifier 142 through a signal line. The video signal amplified by the pre-amplifier 142 is input into a process circuit 143, is processed to correct 7 and remove a carrier and to give a knee characteristic to the halation part and fit a bias of a pedestal level to the dark part. The signal is then converted to a digital signal by an A/D converter 144. The video signal of this digital signal is memorized selectively in three memories (1) 146R, (2) 146G and (3) 146B corresponding, for example, to red (R), green (G) and blue (B) by a selector 145.

The video signals memorized in the memory (1) 146R, memory (2) 146G and memory (3) 146B are converted to analog signals by a simultaneously read D/A converter 147 and are output, respectively, as R, G and B color signals.

On the other hand, a control signal from a picture frame generating circuit 148 generates a displaying picture frame, and synthesizes a displaying frame in the image signals in the D/A converter 147. The image signals are output to a superimposing circuit 149 in which patient information input in a character information input circuit 150 is superimposed. The image signals to which such character information as the displaying frame and patient information have been added are output as R, G and B signals and are displayed on an observing TV monitor 151.

On the other hand, the R, G and B signals output through the superimposing circuit 149 are separated into color difference signals and a luminance signal in a matrix circuit 152 and are converted to an NTSC signal in an encoder circuit 153 encoding NTSC and the NTSC signal is output and is recorded as a moving image in a VTR 154.

The synchronizing timing between respective circuits is synchronized by a synchronizing signal generated by a timing generator circuit 155.

On the other hand, the image data output from an RGB memory circuit 146 are input into a compressing apparatus 156.

The compressing apparatus 156 is provided with coding means 156a, 156b and 156c for carrying out compressing methods by three predictive types 1, 2 and 3 to cause compressing methods to be different in the compressing rate and restored picture quality so that the respective coding means may be selected by the selecting signal of a compressing system selecting circuit.

The image data compressed by the compressing apparatus 156 record the used predictive type together with the predictive type used in a predictive type information adding circuit 158 in a digital image filing apparatus 159 which digitally records image data. The digital image filing apparatus 159 judges the predictive type having compressed the compressed image data in a predictive type judging circuit 160 and decodes the image data in the respective predictive type decoding circuits, that is, predictive type 1 decoding, predictive type 2 decoding and predictive type 3 decoding circuits 161a, 161b and 161c provided within an image data decoding apparatus 161.

The image data decoded by the image data decoding apparatus 161 are converted from the digital image signal to an analog image signal by a D/A converter 162 and are displayed on a TV monitor 163.

According to the eighth embodiment, in case a doctor making an endoscope inspection wants to preferentially record the number of recording sheets as required in an ordinary routine inspection in a digital image file or in the case of such high picture quality as for an important observation, delicate tone variation or minute disease change, the most adapted compressing method will be able to be selected and an endoscope image compressing apparatus high in efficiency and picture quality will be able to be provided.

FIGS. 16 and 17 show a ninth embodiment of the present invention.

In this embodiment, a pre-process of a compressing process is switched with image data by a simultaneous system electronic scope 101 and image data by a frame sequential system electronic scope 102.

As shown in FIG. 16, the formation of an endoscope system of this embodiment is provided with a simultaneous system electronic scope 101 and frame sequential system electronic scope 102 instead of the externally fitted camera 116 of the fiberscope and the electronic scope 117 in the formation of the seventh embodiment shown in FIG. 14, is provided with a predictive coding circuit 173 utilizing an RGB color correlation as shown in FIG. 17 instead of the predictive coding circuit 107, and is provided with a color lag correcting circuit 17.4 instead of the mesh removing circuit 174.

In the case of a frame sequential system, due to an RGB sequential light illumination, in the case of a moving object, an image lag will be produced among the R, G and B images. This lag is called a color lag. Therefore, when a predictive coding circuit 173 utilizing an RGB color correlation is used, in case a color lag is produced, the compressing rate in the predictive encoding circuit 173 will be reduced.

In this embodiment, which of the simultaneous system electronic scope 101 and frame sequential system electronic scope is being used is discriminated in a system discriminating circuit 118. A pre-process selecting circuit 120 operates on the basis of the result of the judgment by the discriminating circuit 118. That is to say, the pre-process selecting circuit 120 will transmit the input image data as they are to the anticipation encoding circuit 173 in the case of the simultaneous system electronic endoscope 101 but will transmit the input image data to the color lag correcting circuit 174 in the case of the frame sequential system electronic scope 102. This color lag correcting circuit 174 may be such color lag correcting means as are shown, for example, in U.S. patent applications Nos. 100,859; 101,311; and 101,328.

The predictive coding circuit 73 is formed as shown in FIG. 17. A G image signal is input into difference operators 175 and 176 and a predictive coding circuit 177, an R image signal is input into said difference operator 175 and a B image signal is input into said difference operator 176. The difference operator 175 subtracts R image data from G image data and calculates difference data. In the same manner, the difference operator 176 subtracts B image data from G image data and calculates difference data. The outputs of the difference operators 175 and 176 are input, respectively, into predictive coding circuit 178 and 179.

The predictive coding circuits 177, 178 and 179 subtract the data of the front pixels from the data of the present pixels of the input image data and calculate predictive errors which are recorded in the digital image file 108. In the case of reproducing the recorded data, when an operation reverse to the operation of said predictive coding circuit 173 is made in the predictive coding circuit 111, the image will be able to be reproduced.

According to this embodiment, when the difference between the G image data and R image data and the difference between the G image data and B image data are determined by utilizing the correlation among the RGB images, and amount of data will be able to be reduced and further, when the differences are predictively coded, the data amount will be able to be more reduced. Also, in the case of the image data by the frame sequential system electronic scope 102, because the compressing process is made after the color lag is corrected, the compressing rate will improve.

Figure 18:
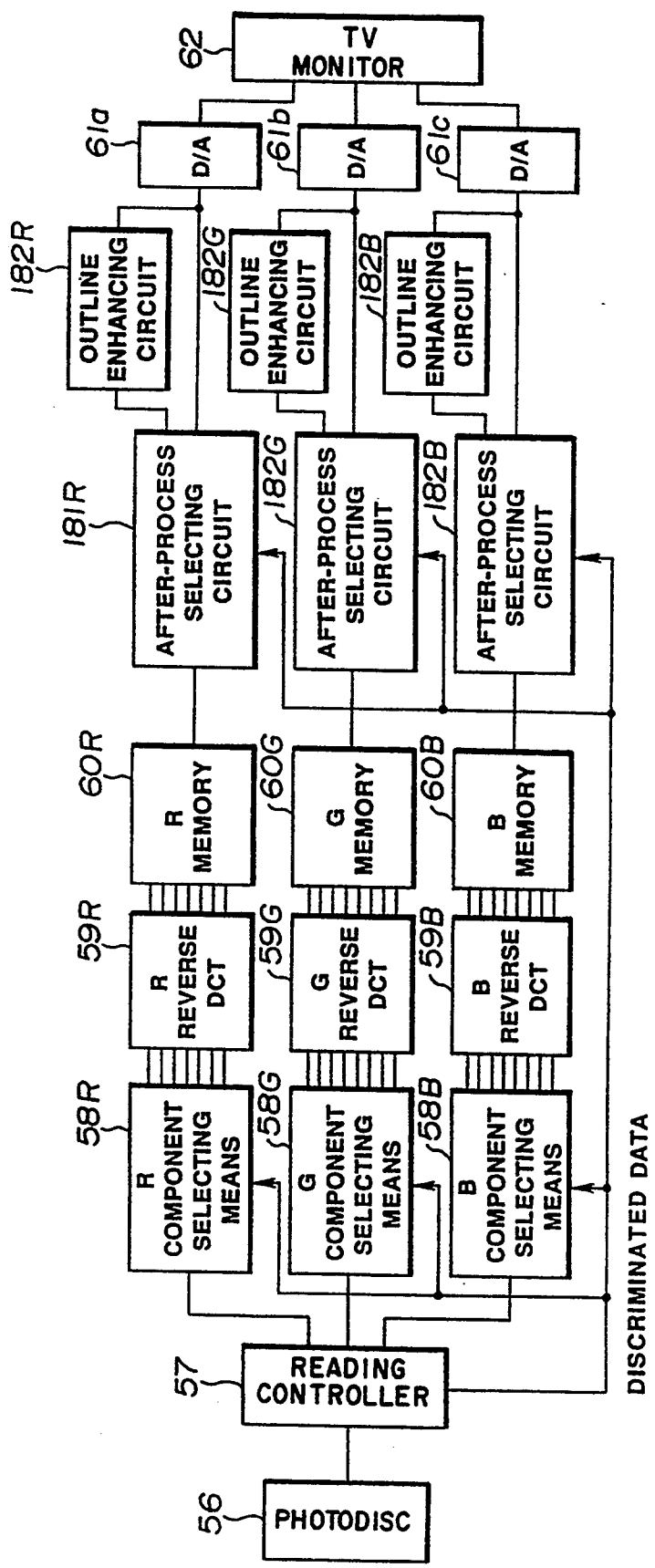
FIG. 18 is a block diagram showing a reproducing part in the tenth embodiment of the present invention.

FIG. 18 shows a tenth embodiment of the present invention.

In this embodiment, after-process selecting circuits 181R, 181G and 181B are provided, respectively, in the after-steps of the R memory 60R, G memory 60G and B memory 60B of the reproducing part 51b in the second embodiment shown in FIG. 3. The respective after-process selecting circuits 181R, 181G and 181B are controlled by discriminating data from the reading controller 57 and output data, respectively, to one of an outline enhancing circuit 182R and D/A converter 61a, one of an outline enhancing circuit 182G and D/A converter 61b and to one of an outline enhancing circuit 182B and D/A converter 61c. The outputs of the respective outline enhancing circuits 182R, 182G and 182B are input, respectively, into said D/A converters 61a, 61b and 61c. In case the outputs of the after-process selecting circuits 181R, 181G and 181B are discriminated by discriminating data to be image data by an electronic scope having a small number of pixels, the data will be output to the outline enhancing circuits 182R, 182G and 182B but, in case they are discriminated to be image data by an electronic scope having a large number of pixels, the data will be output as they are to the D/A converters 61a, 61b and 61c.

The other formations are the same as in the second embodiment.

In this embodiment, the same as in the second embodiment, when an electronic scope, for example, having a small number of pixels is used, the data will be discrete-cosine-converted by the DCT 53R, 53G and 53B, the high frequency components of the data after the discrete cosine conversion will be made ineffective by the component selecting means 54R, 54G and 54B and the resulting data will be recorded in the photodisc 56. In such a case, the reproduced images restored by the reverse DCT 59R, 59G and 59B will be obscure.

Therefore, in this embodiment, when an electronic scope having a small number of pixels is used, the high frequency components of the data after the discrete cosine conversion will be made ineffective and the resulting data will be recorded and, when the data are reproduced, as an after-process of reproducing and restoring the data, the outline enhancing circuits 182R, 182G and 182B will be selected and the reproduced image data will be processed to enhance the outlines with a view to preventing the deterioration of the picture quality.

The other operations and effects are the same as in the second embodiment.

As described above, according to the first to tenth embodiments, as the image compressing mode is selected to record the image on the basis of the discriminating data in response to the unit kind of the means of outputting the endoscope image data, even in case the unit kind is different, the image will be able to be efficiently recorded.

FIGS. 19 to 28 show an eleventh embodiment of the present invention.

Figure 20:
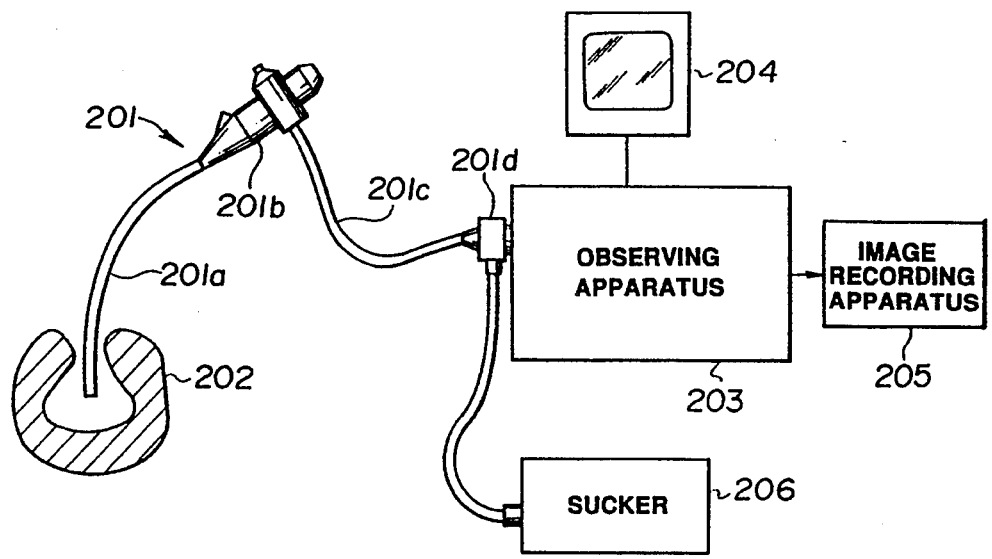

As shown in FIG. 20, an endoscope image filing system comprises an electronic endoscope 201, an observing apparatus 203 and sucker 206 connected with the electronic endoscope 201 and a monitor 204 and image recording apparatus 205 connected to the observing apparatus 203.

The electronic endoscope 201 has an elongate and, for example, flexible insertable part 201a to be inserted into a living body 202, a thick operating part 201b connected to this insertable part 201a at the rear end and a universal cord 201c extended from this operating part 201 and is provided at the end of the universal cord 201 with a connector 201d connected to the observing apparatus 203.

An illuminating window and observing window are provided in the tip part of the insertable part 201 of the electronic endoscope 201. A light distributing lens, not illustrated, is fitted inside the illuminating window. A light guide 218 is connected to the light distributing lens at the rear end, is inserted through the insertable part 201a, operating part 201b and universal cord 201 and is connected to the connector 201d. An objective lens system, not illustrated, is provided inside the observing window. Such a solid state imaging device as, for example, a CCD 208, is arranged in the image forming position of the objective lens system. The output signal of the CCD 208 is input into the observing apparatus 203 through a signal line inserted through the insertable part 201a, operating part 201b and universal cord 201c and connected to the connector 201d.

Figure 21:
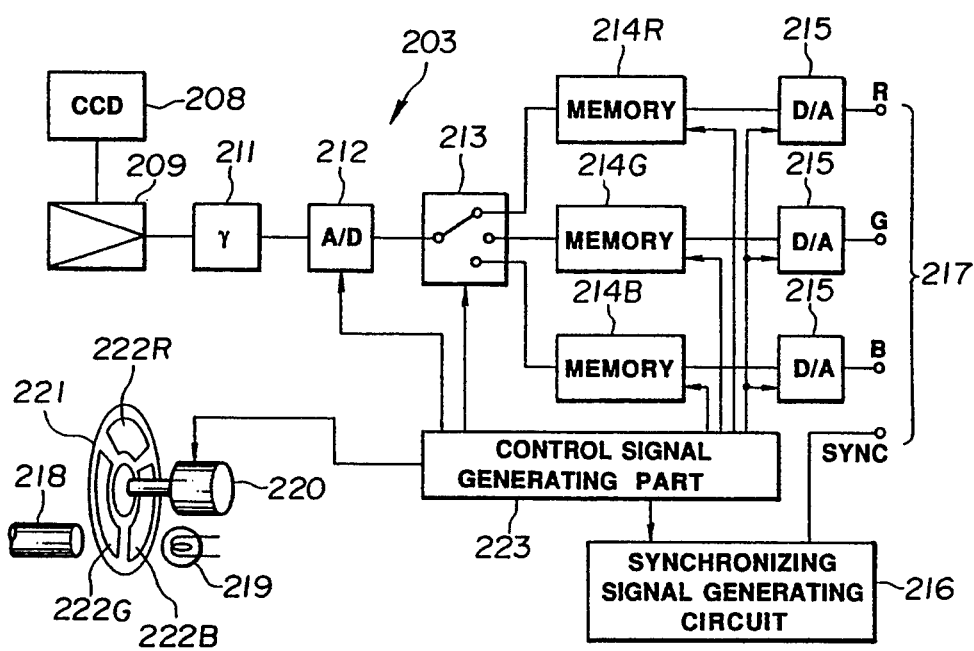

The observing apparatus 203 is formed as shown in FIG. 21.

The observing apparatus is provided with a lamp 219 for emitting a white color light and a rotary filter 221 provided between this lamp 219 and the entrance end of the light guide 218 and rotated and driven by a motor 220. The rotary filter 221 has filters 222R, 222G and 222B for transmitting the lights of respective wavelength regions of red (R), green (G) and blue (B) arranged in the peripheral direction so that, when the rotary filter 221 is rotated by the motor 220, the filters 222R, 222G and 222B will be sequentially inserted into the illuminating light path. The light separated in time series into the respective wavelength regions of R, G and B by the rotary filter 221 will be emitted from the tip part of the insertable part 201 of the electronic endoscope 201 through the light guide 218 and light distributing lens.

Also, the observing apparatus 203 has an amplifier 209 so that the output signal of said CCD 208 will be amplified to a voltage level in a predetermined range and will have γ corrected in a γ-correcting circuit 211. The signal having had γ corrected is converted to a digital signal by an A/D converter 212 and is then selectively input into memories 214R, 214G and 214B respectively corresponding to R, G and B by a switching switch 213. An R image, G image and B image are memorized, respectively, in the memories 214R, 214G and 214B. The memories 214R, 214G and 214B are simultaneously read out by the timing of a television signal and are converted, respectively, to analog signals by D/A converters 215. The respective image signals of the analog R, G and B are output from an RGB signal output end 217 together with a synchronizing signal SYNC from a synchronizing signal generating circuit 216 and are input into a monitor 204 and image recording apparatus 205. The motor 220, A/D converter 212, switching switch 213, memories 214R, 214G and 214B, D/A converter 215 and synchronizing signal generating circuit 216 are controlled by a control signal generating part 223.

Figure 19:
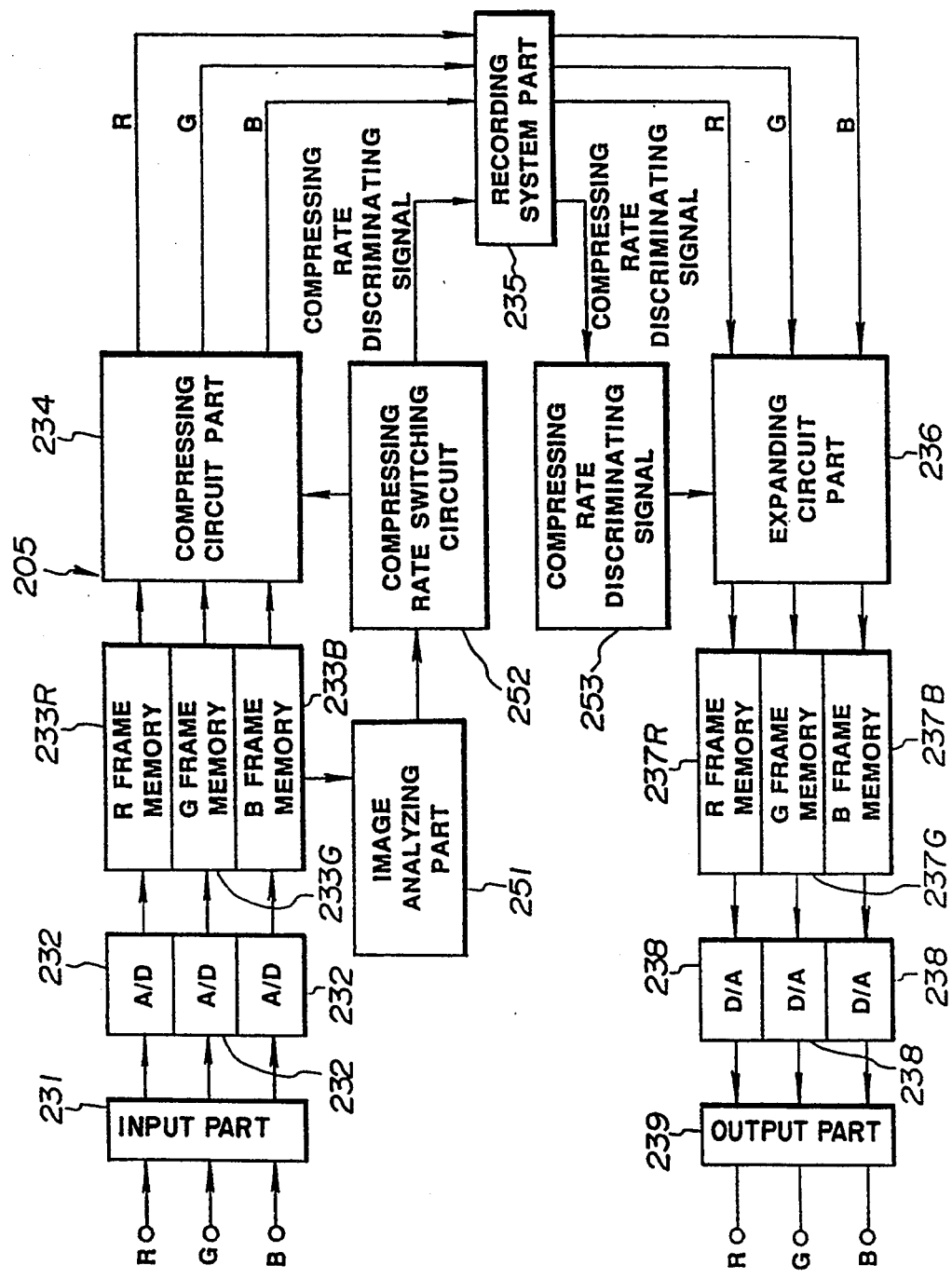

The image recording apparatus 205 including the image data compressing apparatus shall be explained in the following with reference to FIG. 19.

The respective R, G and B image signals output from the observing apparatus 203 are input from an input part 231, are converted to digital signals, respectively, by A/D converters 232 and are temporarily memorized in an R frame memory 233R, G frame memory 233G and B frame memory 233B. The respective R, G and B image signals read out of the respective frame memories 233R, 233G and 233B are compressed by a compressing circuit 234 and are then recorded in a recording system part 234.

When the image data are to be reproduced, the respective R, G and B image signals are read out of the recording system part 235 and are expanded in an expanding circuit part 236 and the data are restored. The restored respective R, G and B image data are temporarily memorized in an R frame memory 237R, G frame memory 237G and B frame memory 237B. The respective R, G and B image signals are read out of frame memories 237R, 237G and 237B as synchronized with a television signal, are converted to analog signals, respectively, by D/A converters 238 and are then output from an output part 239.

In this embodiment, there is provided an image analyzing part 251 for analyzing the characteristics of endoscope images from the image information memorized in the respective frame memories 233R, 233G and 233B. The output signal of this image analyzing part 251 is to be input into a compressing rate switching circuit 252. This compressing rate switching circuit 252 determines a compressing rate in the compressing circuit part 234 on the basis of a signal from the image analyzing part 251, transmits the compressing rate to the compressing circuit part 234 and transmits to the recording system part 235 the information of the compressing rate of the image as a compressing rate discriminating signal which is recorded by the recording system part 235 together with the compressed R, G and B image information.

There is also provided a compressing rate discriminating circuit 253 whereby the compressing rate is discriminated from the compressing rate discriminating signal reproduced from the recording system part 235 and the information of the compressing rate is transmitted to the expanding circuit part 236. At the time of reproduction, the compressing rate discriminating signal will be reproduced together with the compressed R, G and B image information from the recording system part 235, the compressing rate discriminating circuit 253 will discriminate the compressing rate of the image on the basis of the compressing rate discriminating signal and will transmit the compressing rate information to the expanding circuit 236, which will make an expansion in response to this compressing rate.

The image analyzing part 251 shall be explained in the following with reference to FIGS. 22 and 23.

As shown in FIG. 23, the image analyzing part 51 comprises a one-pixel delay line 255 delaying an input image signal by one pixel, a subtractor 256 determining the difference between the output of this one-pixel delay line 255 and the input image signal, a comparing circuit 257 comparing the output of the subtractor 256 with a predetermined threshold value, a counter 258 counting the output of the comparing circuit 257 and a frequency component discriminating signal generating circuit discriminating the frequency component on the basis of the output of the counter 258 so that the frequency component discriminating signal from the frequency component discriminating signal generating circuit 259 may be input into the compressing rate switching circuit 252.

Figure 23A:
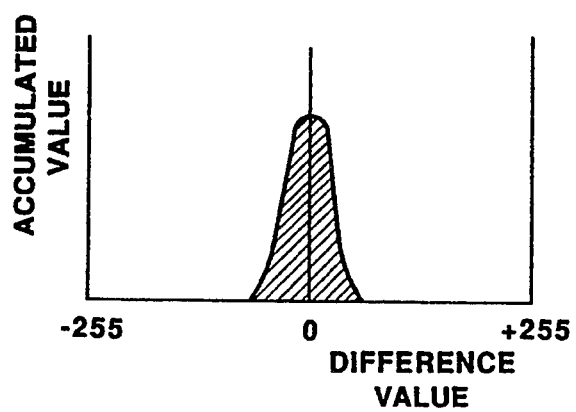
FIG. 23(A) is a histogram of a difference signal of an ordinary image.
Figure 23B:
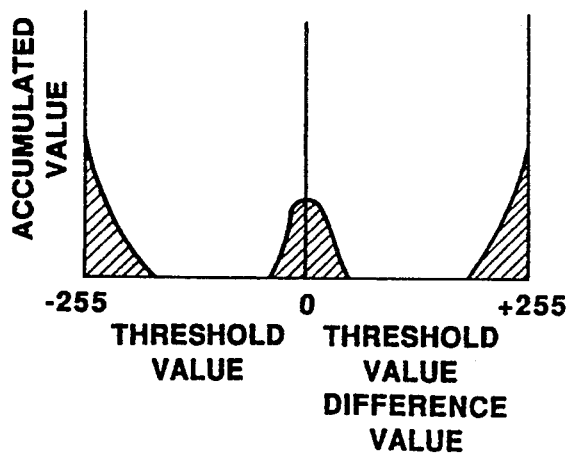
FIG. 23(B) is a histogram of a difference signal of a dyed image.

In this embodiment, said image analyzing part 251 discriminates particularly whether the endoscope image is a dyed image or an ordinary image. Generally, the dyed image becomes an image in which a very small portion of an endoscope diagnosed part is more enhanced than in the ordinary image. Therefore, the dyed image contains many high frequency components. When the difference of the density value between the adjacent pixels is determined and a histogram of the difference value is determined, in the ordinary image, as shown in FIG. 23(A), many high frequency components are distributed near the origin but, in the dyed image, as shown in FIG. 23(B), the value having a large absolute value is high and both images have distinctly different characteristics. Therefore, as shown in FIG. 23(B), a predetermined threshold value is determined and, by the size of the accumulated value of pixels having a difference larger in the absolute value than the threshold value, both images can be discriminated. The image analyzing part 205 shown in FIG. 22 thus discriminates between the dyed image and ordinary image. The difference between the adjacent pixels is determined by the subtractor 256, the difference and threshold value are compared with each other by the comparing circuit 257 and the accumulated value of pixels having a difference larger in the absolute value than the above-mentioned value is determined by the counter 258. The frequency component discriminating signal generating circuit 259 outputs a frequency component discriminating signal corresponding to the accumulated value. The image analyzing part 251 may analyze all the images of R, G and B and may analyze one or two images.

The compressing circuit 34 and expanding circuit 36 shall be explained as follows with reference to FIGS. 24 to 27.

As shown in FIG. 24, the compressing circuit part 234 is provided with a divided image frame memory 234a for dividing R, G and B signals from the frame memories 233R, 233G and 233B into a plurality of blocks and an average value operating circuit 234b for determining the average value of the density values within the respective blocks divided by this frame memory 234a.

Figure 25:
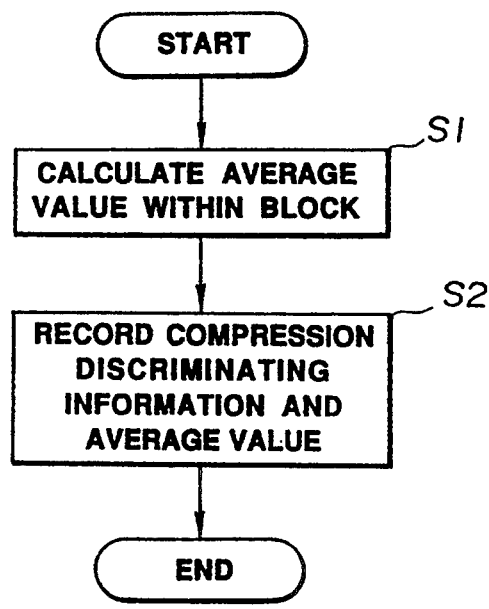

As shown in FIG. 25, in the compressing circuit part 234, in the step S1, the entire input image is divided with a predetermined number of pixels as one block in the divided image frame memory 234a and the average value of the density values of the pixels within the respective blocks is calculated in the average value operating circuit 234b. Then, in the step S2, the average value together with the compression discriminating information by the compressing rate discriminating signal from the compressing rate switching circuit 252 are recorded in the recording system part 235. In this embodiment, there are three compressing methods and three compressing rates. These compressing rates are switched by the ordinary image and dyed image on the basis of the signal from the compressing rate switching circuit 252. The compressing methods are switched depending on how many pixels are replaced by the average value as one block. For example, if two pixels are made one block, the image will be compressed to about ½, if four pixels are made one block, it will be compressed to about ¼ and, if nine pixels are made one block, the image will be compressed to about 1/9.

Figure 26:
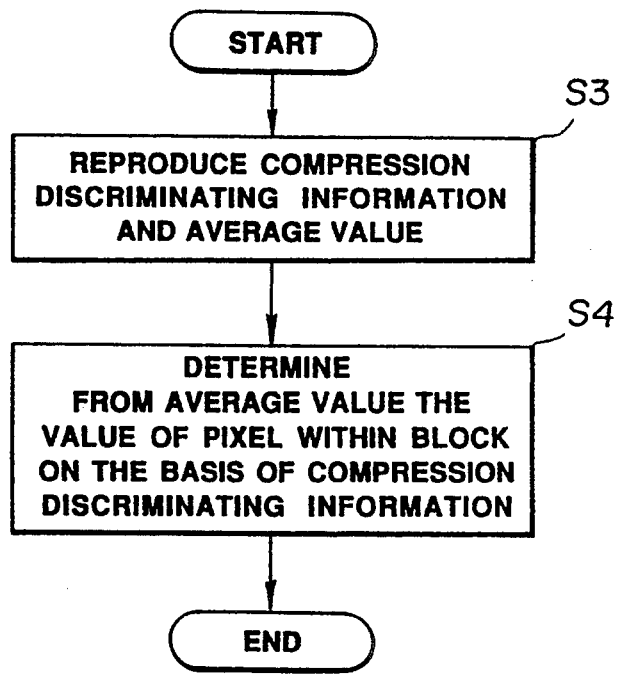

On the other hand, as shown in FIG. 26, by the expanding circuit part 236, in the step S3, the compression discriminating information and the average value of the respective blocks are reproduced from the recording system part 235 and, in the step S4, on the basis of the compression discriminating information, the pixels forming the block are restored with the density values of the respective pixels within the block as the average value.

Figure 27A:
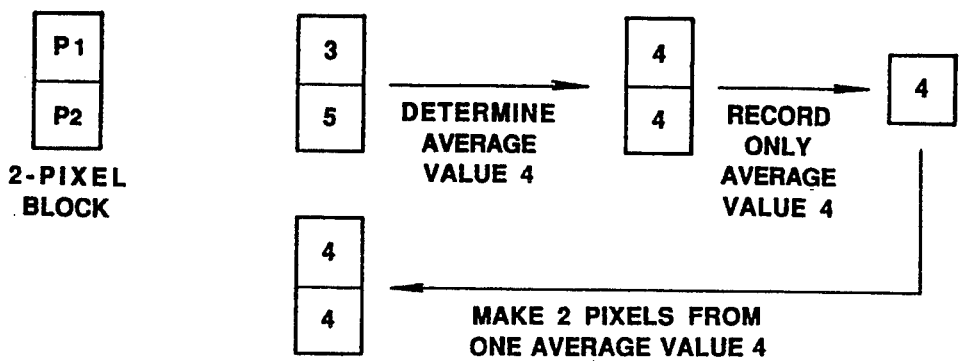
FIGS. 27(A) to (C) are explanatory views for explaining respectively compressing operations of compressing circuits.
Figure 27B:
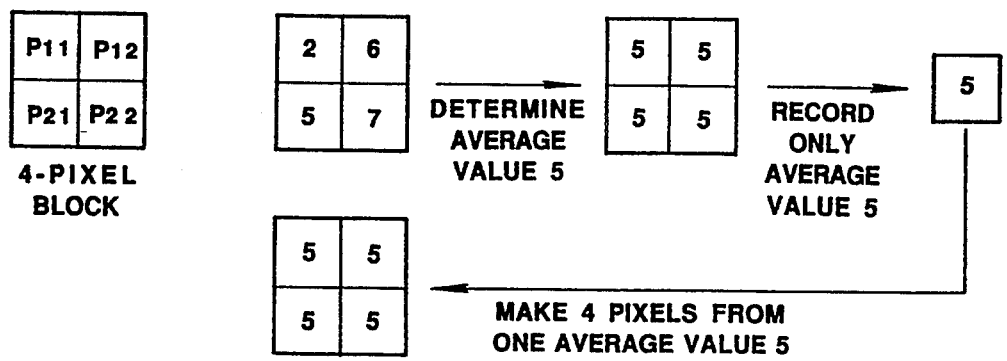
Figure 27C:
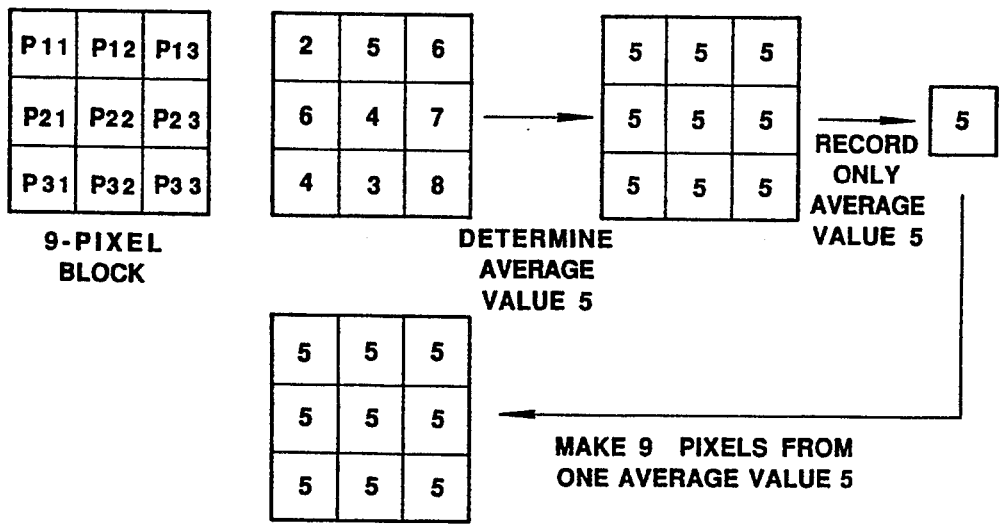

FIGS. 27(A) to (C) show an example of the compressing and expanding operations having concrete density values. FIG. 27(A) relates to a compressing method (Compression No. 1) in which two pixels are made one block. FIG. 27(B) relates to a compressing method (Compression No. 2) in which four pixels are made one block. FIG. 27(C) relates to a compressing method (Compression No. 3) in which nine pixels are made one block. As shown in FIG. 27(A), in the Compression No. 1, the entire input image is divided with the two pixels of $P_1$ and $P_2$ as one block, the average value (4) of the density values (3, 5) of the pixels within the block is calculated and is recorded in the recording system part 235. In the reproduction, the density values (4, 4) of two pixels are made from one average value (4) reproduced from the recording system part 235. In the same manner, as shown in FIG. 27(B), in the Compression No. 2, four pixels of $P_{11}$, $P_{12}$, $P_{21}$ and $P_{22}$ are made one block and the average value (5) of the density values (2, 6, 5, 7) of the pixels within the block is recorded in the recording system part 235 and, in the reproduction, the density values (5, 5, 5, 5) of the four pixels are made from the average value (5). In the same manner, as shown in FIG. 27(C), in the Compression No. 3, nine pixels of $P_{11}$ to $P_{13}$, $P_{21}$ to $P_{23}$ are made one block, the average value (5) of the density values (2, 5, 6, 6, 4, 7, 4, 3) of the pixels within the block is recorded in the recording system part 35 and, in the reproduction, the density values of the nine pixels are made from the average value (5).

The relation between the compression discriminating information and the block size is made as in the following table:

| Block Size | Compression Discriminating Information (Compression No.) |
| --- | --- |
| No blocking | 0 |
| 2 pixels | 1 |
| 4 pixels | 2 |
| 9 pixels | 3 |

Thus, in the case of the compression and expansion, the larger the number of pixels of one block, the higher the compressing rate and the lower the resolution at the time of reproduction. The relationships between the numbers of pixels of the Compression Nos. 1, 2 and 3 and the compressing rate and resolution at the time of the reproduction are as in the following table:

|  | Compression No. | | |
| --- | --- | --- | --- |
|  | 1 | 2 | 3 |
| Number of pixels of one block | 2 | 4 | 9 |
| Compressing rate | Low | Medium | High |
| Resolution in reproduction | Good | Medium | Bad |

In an ordinary image, high frequency components are few. Particularly, the image of the stomach wall has few high frequency components and is a so-called smooth image. Therefore, even if Compression No. 3 is selected, the deterioration of its picture quality will not be substantially noticed. Therefore, in case it is discriminated as an ordinary image in the image analyzing part 251, Compression No. 3 will be selected. On the other hand, in a dyed image, very small parts become definite and therefore, if Compression No. 3 is selected, the deterioration of the picture quality will be conspicuous. Therefore, in case it is discriminated as a dyed image in the image analyzing part 251, in response to the number of the high frequency components of the image, either Compression No. 1 or 2 will be selected.

Figure 28:
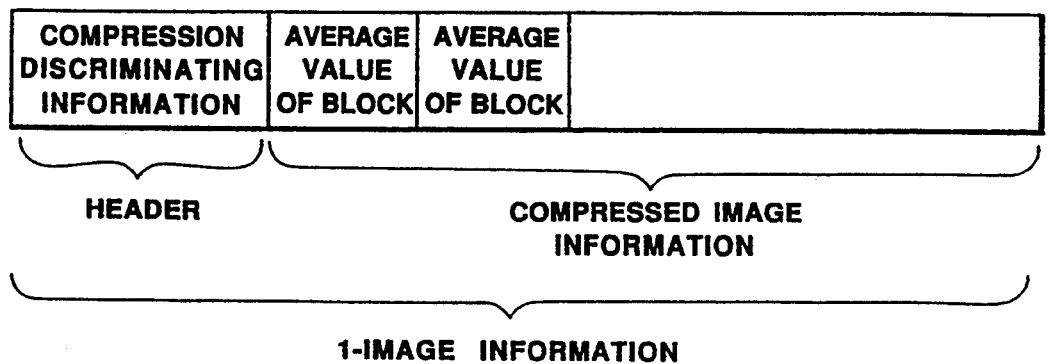

In the recording system in the recording system part 235, as shown in FIG. 28, the compression discriminating information in which Compression No. each image has been compressed is first recorded and then the average values of the respective blocks are recorded. In the reproduction, the expansion is performed on the basis of the compression discriminating information.

Thus, in this embodiment, by analyzing the frequency components of an endoscope image, an ordinary image and dyed image are automatically discriminated and, according to the discrimination result, the compressing method, that is, the compressing rate is changed. Therefore, in response to the characteristics of the endoscope image, the deterioration of the picture quality can be reduced and a high compression adapted to the image can be made.

In most cases, in the dyed image, the B components will become many and therefore, by the size of the B components against the R or G components, it may be discriminated as either an ordinary image or dyed image.

Also, the compressing method may be changed among the respective R, G and B images.

Figure 29:
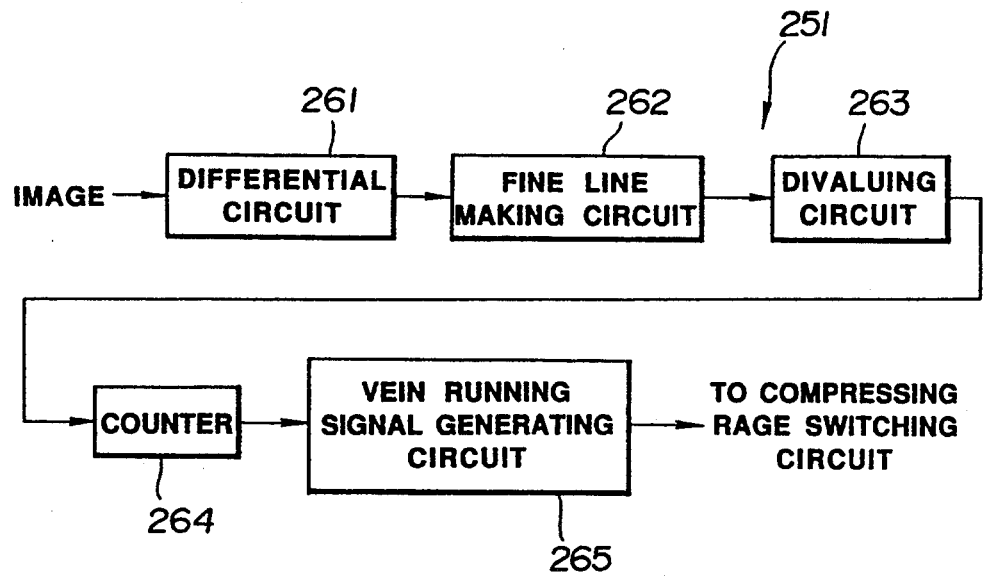
FIG. 29 is a block diagram showing the formation of an image analyzing part in the twelfth embodiment of the present invention.

FIG. 29 shows a twelfth embodiment of the present invention.

In this embodiment, the compressing rate is made variable in response to the running state of veins. This embodiment is different only in the formation of the image analyzing part 251 from the eleventh embodiment.

Because the image in which many veins run has an important value to the diagnosis, it is necessary to keep the compressing rate low so that a favorable picture quality may be obtained. Therefore, in this embodiment, the running state of veins is automatically discriminated and the compressing rate is varied.

As shown in FIG. 29, the image analyzing part 251 in this embodiment comprises a differential circuit 261 differentiating an input image signal, a fine line making circuit 262 making the output image of the differential circuit 261 a fine line, a divaluing circuit 263 divaluing the output image of the fine line making circuit 262, a counter 264 counting the number of pixels of the H level in the output image of the divaluing circuit 263 and a vein running signal generating circuit 265 generating a vein running signal in response to the output of the counter 264 so that the vein running signal may be input into the compressing rate switching circuit 252.

An R image signal containing many pieces of vein information is input into this image analyzing part 251 and is differentiated in the differential circuit 261 to further enhance the veins. Then, the differentiated image is made a fine line by the fine line making circuit 262 and is divalued by the divaluing circuit 263. Then, the number of pixels of the H level in the divalued image is counted by the counter 264 to quantitatively determine the vein amount. Then, on the basis of this quantitatively determined vein amount, the vein running signal generating circuit 265 generates a vein running signal to vary the compressing rate.

The relation of the vein amount, compressing rate and reproduction resolution is as in the following table:

| Vein amount | Small ← → Large |
| Compressing rate | High ← → Low |
| Resolution at the time of reproduction | Bad ← → Good |

The other formations, operations and effects are the same as in the eleventh embodiment.

FIGS. 30 to 33 show a thirteenth embodiment of the present invention.

The embodiment is different from the eleventh embodiment in the compressing circuit part 234 and expanding circuit part 236.

In this embodiment, as shown in FIG. 30, a compressing circuit 234 has a smoothing circuit 241 and predictive error calculating circuit 242 so that image signals from the frame memories 233R, 233G and 233B may be smoothed by the smoothing circuit 241, predictively coded by the predictive error calculating circuit 242 and memorized in the memorizing system part 235.

Figures 33, 35:
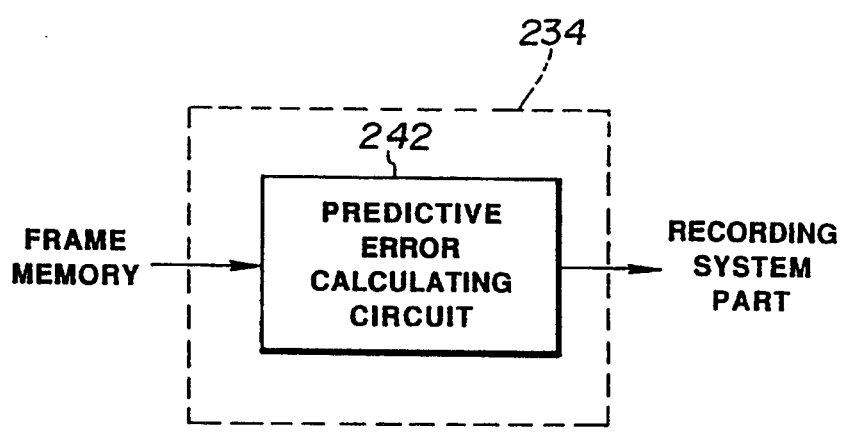

In the smoothing circuit 241, signals are smoothed by such two-dimensional filter of 3×3 (pixels), as is shown in FIG. 33. As the density value after the smoothing of each pixel, this filter outputs a value of the addition of (1-K) times the density value of the pixel and (K/8) times the density value of each of eight pixels near that pixel. K (0<K<1) is a smoothing coefficient. The larger the value of K, the greater the smoothing effect. The smaller the value of K, the lesser the smoothing effect. The value of the smoothing coefficient K is switched by the compressing rate switching circuit 252. By freely determining the value of this smoothing coefficient K, the spatial frequency band after the smoothing can be determined. The larger the value of K and the greater the smoothing effect, the greater is the deterioration of the high frequency components of the image.

In the predictive error calculating circuit 242, as shown in FIG. 31, the input data are delayed by one pixel by a one-pixel delay line 243 and are subtracted from the original input data by a subtractor 244 to determine the difference from the data one pixel before. As shown in FIG. 32, if the density value of a pixel (i, j) is x(i, j), the predictive error signal Δ x (i, j) output from the predictive error calculating circuit 242 will be represented by $$\Delta x (i, j) = x(i, j) - x (i, l, j).$$

As this predictive error signal is of a value smaller than of the input data, the data amount recorded in the recording system part 235 may be small.

On the other hand, in the expanding circuit part 236, the original data are restored by adding the predictive signal, that is, the data one pixel before to the predictive error signal reproduced from the recording system part 235.

Here, if the smoothing coefficient K in the smoothing circuit 241 is made large, the high frequency component of the image will deteriorate but the smoothing effect will be so great that the predictive error signal will become small as a whole and therefore the recorded data amount will become small, that is, the compressing rate will be high. On the contrary, in case K is small and the smoothing effect is small, the high frequency components will not be deteriorated but the predictive error signal will become large as a whole and therefore the recorded data amount will be large, that is, the compressing rate will be low. Thus, by freely setting the smoothing coefficient K in the smoothing circuit 241, the compressing rate can be also freely set. In this embodiment, when the high frequency components of the endoscope image are many, the smoothing coefficient K will be made small to reduce the compressing rate but, when the frequency components are few, the smoothing coefficient K will be made large to elevate the compressing rate.

The other formations are the same as in the eleventh embodiment.

In this embodiment, for example, in response to the diagnosed part, the compressing rate can be varied. Generally, when the upper digesting tube is observed, there will be a higher number of images at greater distances but, when the lower digesting tube is observed, there will be a higher number of shorter distances.

Therefore, the image when the lower digesting tube is observed will have very small parts displayed more definitely than in the image when the upper digesting tube is observed. Therefore, when the lower digesting tube is observed, it will not be desirable to elevate the compressing rate to deteriorate the picture quality.

In this embodiment, when the lower digesting tube is observed, it will be discriminated in the image analyzing part 251 that the high frequency components will be numerous and the compressing rate will become low. On the other hand, when the upper digesting tube is observed, it will be discriminated in the image analyzing part 251 that the high frequency components will become few and the compressing rate will become high.

The relation of the diagnosed part, compressing rate and reproducing time resolution is shown in the following table:

|  | Diagnosed part | |
| --- | --- | --- |
|  | Upper part | Lower part |
| Compressing rate | Low | High |
| Resolution in reproduction | Good | Bad |

The other formations, operations and effects are the same as in the eleventh embodiment.

FIGS. 34 to 37 show the fourteenth embodiment of the present invention.

Figure 34:
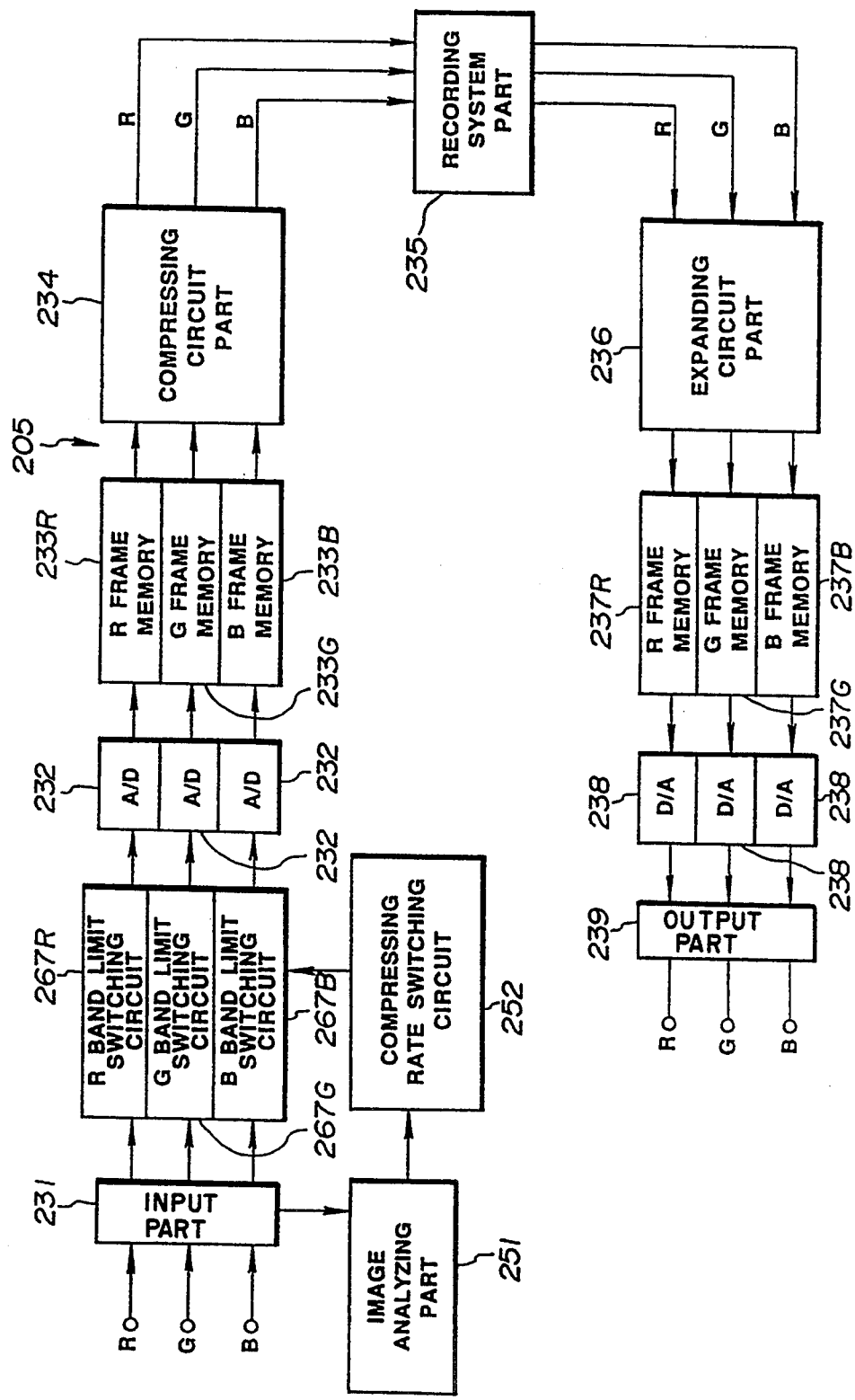

As shown in FIG. 34, in this embodiment, an R band limit switching circuit 267R, G band limit switching circuit 267G and B band limit switching circuit 267B are provided between the input part 231 and A/D converters 232 in the eleventh embodiment. The image signal from the input part 231 is input into the image analyzing part 51. The compressing rate switching circuit 252 controls the band limit switching circuits 267R, 267G and 267B.

As shown in FIG. 35, the compressing circuit 234 in this embodiment has the same predictive error calculating circuit 242 as in the thirteenth embodiment but, unlike the thirteenth embodiment, the smoothing circuit 241 is not provided. In the expanding circuit 236, as in the thirteenth embodiment, a predictive signal, that is, data one pixel before are added to the predictive error signal reproduced from the recording system part to restore the original data.

Figure 36:
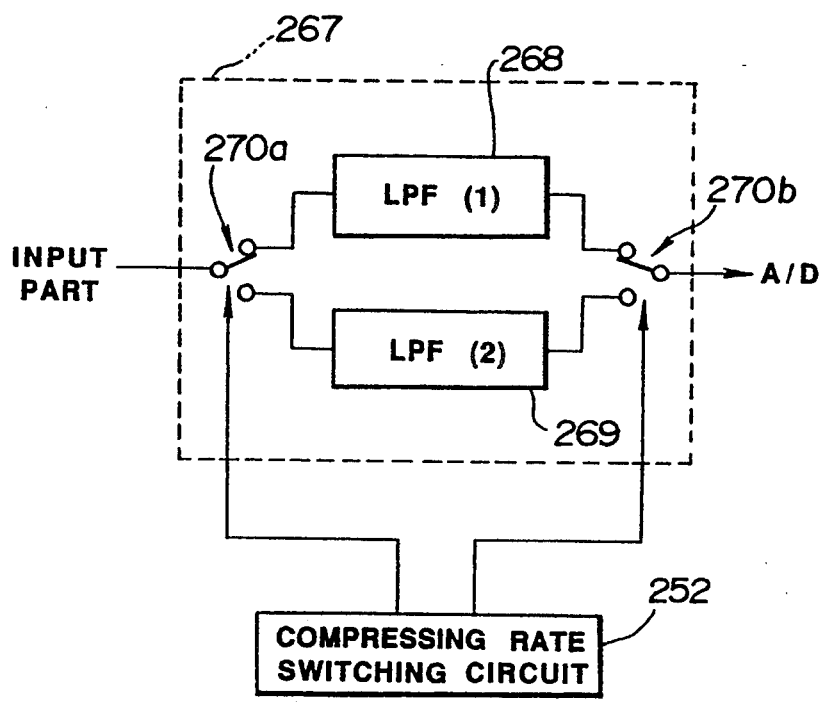

The band limit switching circuits 267R, 267G and 267B are formed as shown in FIG. 36.

Figure 37:
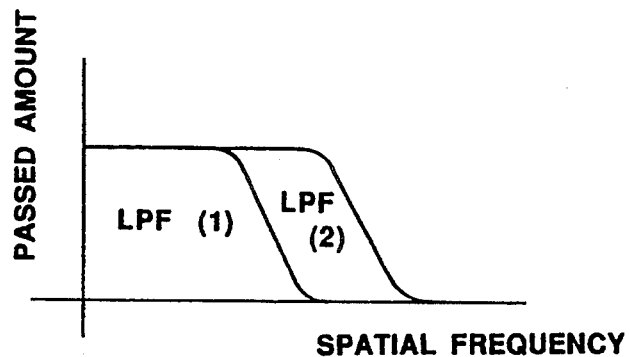

The input end of each band limit switching circuit 267 (representing 267R, 267G and 267B) is connected to the input end of a switching switch 270a of one input and two outputs. The input ends of low-pass filters (abbreviated as LPF's hereinafter) (1) 268 and LPF (2) 269 are connected, respectively, to the respective output ends of said switching switch 270a. The output ends of the respective LPF's 268 and 269 are respectively connected to the respective input ends of a switching switch of two inputs and one output. The output of the switching switch 270b is the output of the band limit switching circuit 267. The passing bands of the respective LPF's 268 and 269 are as shown in FIG. 37. That is to say, the LPF (1) 268 has a high frequency filtering characteristic and the LPF (2) 269 has a high frequency filtering characteristic which is not as extreme.

The image analyzing part 251 in this embodiment has the same formation as shown in FIG. 22 or 31 except that it has an A/D converter converting the analog image signal from the input part 231 to a digital signal and discriminates the frequency components of images and the running state of veins.

The switches 270a and 270b are switched by the compressing rate switching circuit 252. The image is discriminated by the image analyzing part 251 to be an image having few high frequency components or an image of few veins, the switches 270a and 270b will select the LPF (1) 268 side and, as a result, the data amount of the predictive error signal in the compressing circuit part 234 will become small. On the other hand, in case the image is discriminated by the image analyzing part 251 to be an image having many high frequency components or an image of many veins, the switches 270a and 270b will select the LPF (2) 269 side and, as a result, the data amount of the predictive error signal in the compressing circuit part 234 will become large but the picture quality will not deteriorate.

In the thirteenth embodiment, the band of the image signal is digitally limited by the smoothing circuit 241 within the compressing circuit part 234 but, in this embodiment, it is analogously limited by the LPF's 268 and 269 within the band limit switching circuit 267.

The other formations, operations and effects are the same as in the eleventh embodiment.

FIGS. 38 to 42 show a fifteenth embodiment of the present invention.

In the eleventh to fourteenth embodiments, the compressing rate is made variable for each image unit but, in the following fifteenth and seventeenth embodiments, the compressing rate is made variable for each part region within the image.

In the fifteenth embodiment, the compressing rate is made variable in the central part and peripheral part of an endoscope image.

Figure 38:
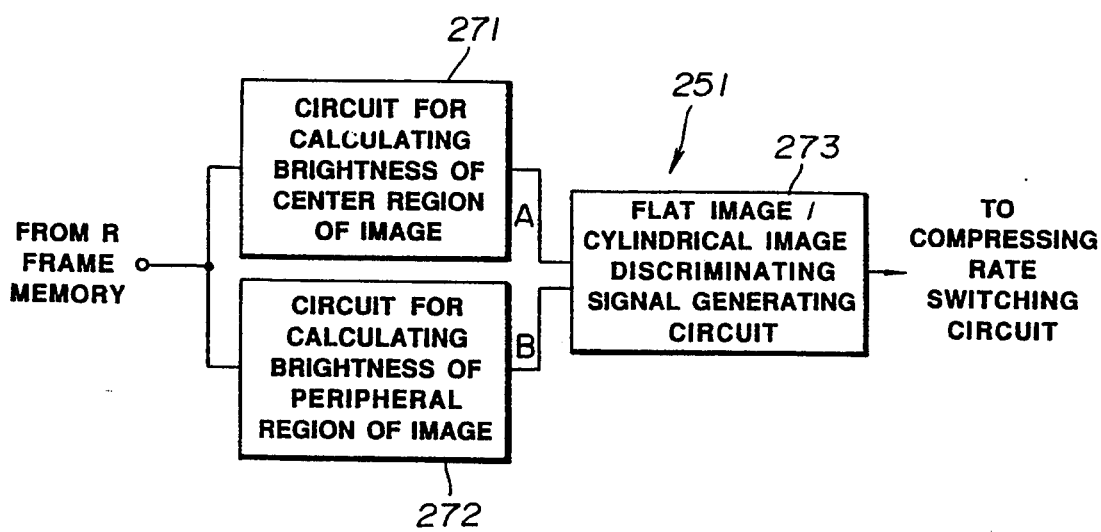

This embodiment is different from the eleventh embodiment in the formation of the image analyzing part 251. As shown in FIG. 38, the image analyzing part 251 has a circuit 271 for calculating the brightness of the center region of the image into which the image signal from the R frame memory 233R is to be input and a circuit 272 for calculating the brightness of the peripheral region of the image. The outputs of the respective calculating circuits 271 and 272 are input into a flat image/cylindrical image discriminating signal generating circuit 273. The output of the flat image/cylindrical image discriminating signal generating circuit 273 is transmitted to the compressing rate switching circuit 252.

The endoscope image can be largely divided into two images by the observing state. One is an image (mentioned as a flat image hereinafter) in which, as at the time of observing the stomach wall, the distance from the endoscope tip is substantially the same as from the image center to the periphery and therefore the brightness is also substantially fixed over the whole image. The other is an image (mentioned as a cylindrical image hereinafter) in which, at the time of observing the gullet, the distance from the endoscope tip is long in the image center and is therefore dark but is short on the periphery and is therefore bright. In the image analyzing part 251, the flat image and the cylindrical image are discriminated.

The recording operation of this embodiment shall be explained by using FIG. 40.

First of all, in step S11 (mentioned merely as S11 by omitting the word "step" hereinafter), the brightness of the center region of the image is calculated by the image center region brightness calculating circuit 271 and is represented by A.

Also, in S12, the brightness of the peripheral region of the image is calculated by the image peripheral region brightness calculating circuit 272 and is represented by B.

Then, in S13, whether or not said brightness is A<B is judged by the flat image/cylindrical image discriminating signal generating circuit 273. In the case of YES, the image will be judged to be a cylindrical image and its information will be transmitted to the compressing rate switching circuit 252 by which, in S14, such compressing rate table (a) as is shown in FIG. 39(A) will be selected. On the other hand, in the case of NO, the image will be judged to be a flat image and its information will be transmitted to the compressing rate switching circuit 252 by which, in S15, such compressing rate table (b), as is shown in FIG. 39(B), will be selected.

By the way, in the compressing rate table, the image is divided, for example, into 64 images and the compressing rate of each divided image is determined. The numerals in the drawing represent compressing rates. The larger the value, the higher the compressing rate. Therefore, in the compressing rate table (a), the center part is of a high compression and the peripheral part is of a low compression. In the compressing rate table (b), the whole image is of a low compression.

Next, in S16, according to the compressing rate table selected in S14 or S15, each divided image interior is compressed by the compressing circuit part 234.

Then, in S16, the compressed image information together with the compression discriminating information are recorded in the recording system part 235.

Figures 41, 42:
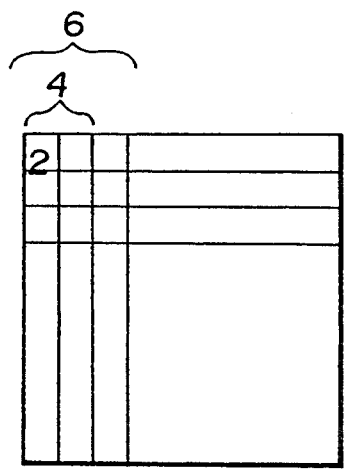

In this embodiment, as the compressing rate, that is, the block size, is different in each region within one pixel, in the recording system in the recording system part 235, as shown in FIG. 41, in each block, the compression discriminating information representing the compressing rate of the block is added before the average value. As shown in FIG. 42, there are three block sizes of $1\times2$, $2\times2$ and $2\times3$.

When the image is discriminated to be a cylindrical image, the relation of the observed part, compressing rate and reproducing time resolution are as shown in the following table:

| Part | Center | ← | → | Periphery |
|---|---|---|---|---|
| Compressing rate | 3 | 2 | 1 | 0 |
| | High compression | ← | → | Low compression |
| Resolution in reproduction | Bad | ← | → | Good |

The other formations, operations and effects are the same as in the eleventh embodiment.

Figure 43:
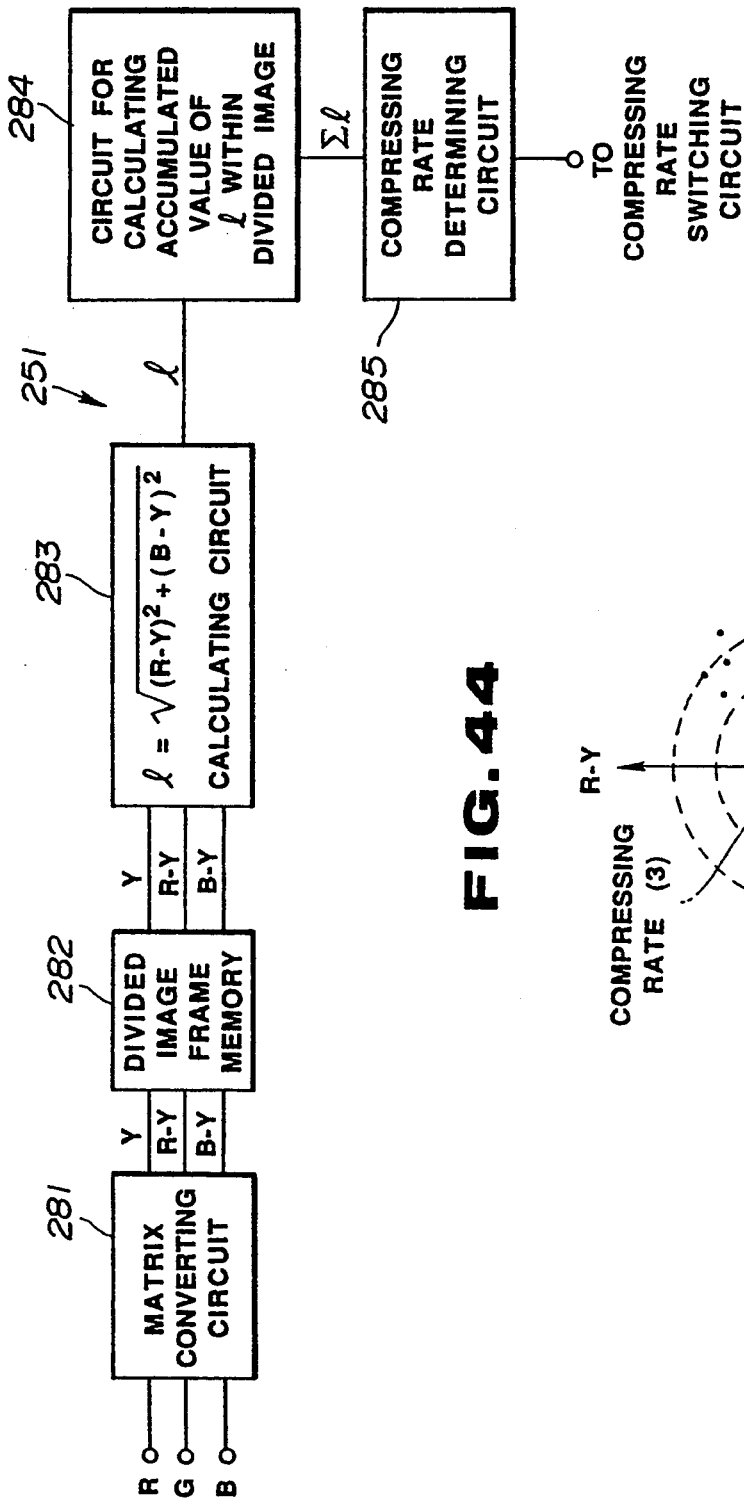
FIGS. 43 to 45 relate to the sixteenth embodiment of the present invention.
Figure 44:
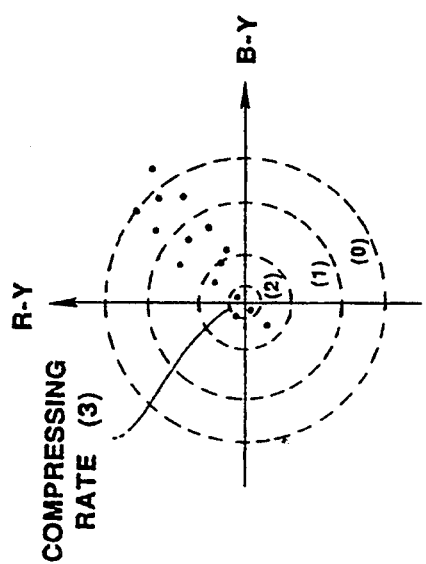
Figure 45:
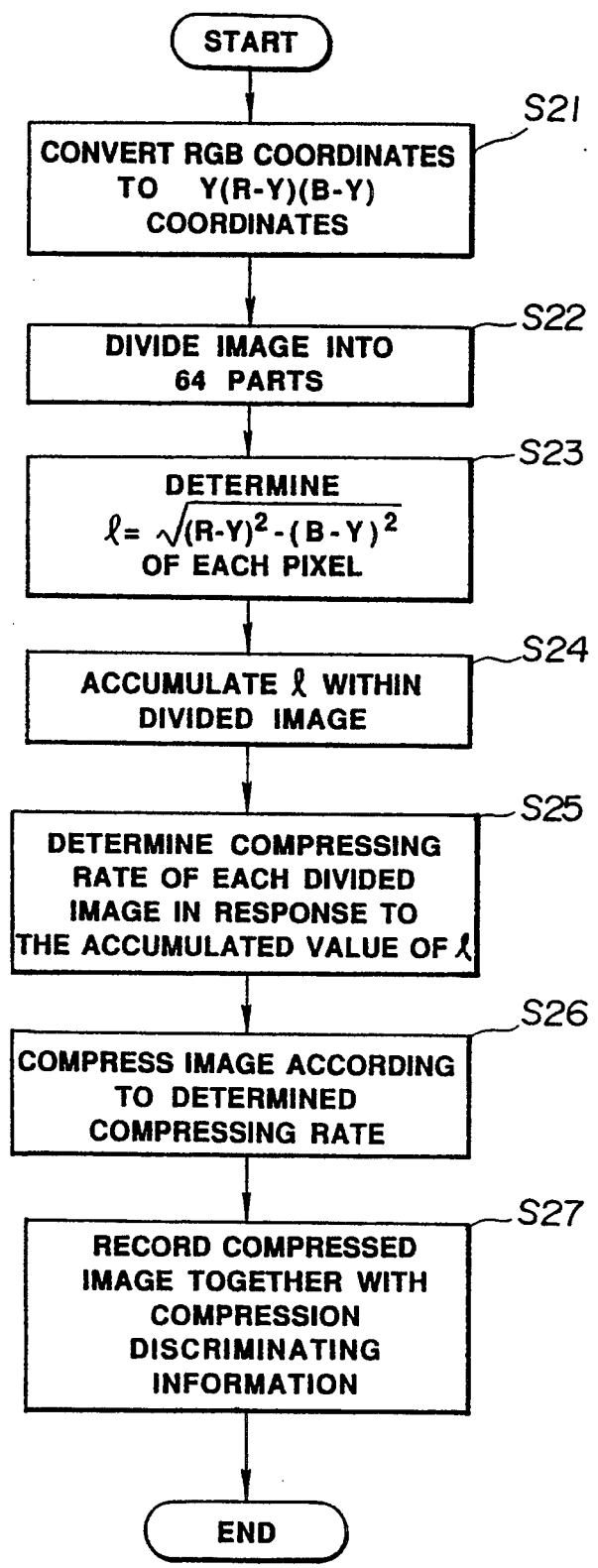

FIGS. 43 to 45 show a sixteenth embodiment of the present invention.

In this embodiment, the compressing rate is made variable in response to colors.

This embodiment is different in the formation of the image analyzing part 251 from the eleventh embodiment. As shown in FIG. 43, the image analyzing part 251 has a matrix converting circuit 281 into which the RGB image signals from the respective RGB frame memories 233R, 233G and 233B are to be input so that the R, G and B signals may be converted to a luminance signal Y and two color difference signals R-Y and B-Y by this matrix converting circuit 281. These Y, R-Y and B-Y signals are recorded in a divided image frame memory 282 and are then input 20 into a calculating circuit 283 and $$l = \sqrt{(R - Y)^2 + (B - Y)^2}$$

is calculated. l calculated by the calculating circuit 283 is input into a calculating circuit 284 so that the accumulated value $\Sigma$ l of l within the divided image may be calculated. $\Sigma$ l calculated by said calculating circuit 284 is input into a compressing rate determining circuit 285.

In the case of an endoscope diagnosis, the information of colors will be very important to the diagnosis. That is to say, such information low in the chroma saturation and near to black and white as a halation or shadow is not so significant. Particularly, the halation part will become a white region and will be insignificant to the diagnosis. Therefore, the image is divided and the chroma saturation of the image within the divided region is calculated. In case the chroma saturation is low, even if the compressing rate is elevated and the picture quality is more or less reduced, the diagnosis will not be substantially influenced.

The recording operation of this embodiment shall be explained by using FIG. 45.

First of all, in S21, the RGB coordinates are converted to Y (R - Y) (B - Y) coordinates by the matrix converting circuit 281.

Then, in S22, the image is divided, for example, into 64 images by the divided image frame memory 282.

Then, in S23, $$l = \sqrt{(R - Y)^2 + (B - Y)^2}$$

of each pixel is determined by the calculating circuit 283. That is to say, the information of the chroma saturation is determined.

Next, in S24, l is accumulated within the divided image by the calculating circuit 284.

Then, in S25, the compressing rate of each divided image is determined in response to the accumulated value $\Sigma$ l of l by the compressing rate determining circuit 285.

Next, in S26, each divided image interior is compressed by the compressing circuit 234 according to the determined compressing rate.

Then, in S27, the compressed image information together with the compression discriminating information are recorded in the recording system part 235.

The relation of the chroma saturation, compressing rate and reproducing time resolution is shown in the following table:

| Chroma saturation | Low | ← | → | High |
|---|---|---|---|---|
| Compressing rate | 3 | 2 | 1 | 0 |
| | High compression | ← | → | Low compression |
| Resolution in reproduction | Bad | ← | → | Good |

When the range of the compressing rates (0, 1, 2 and 3) in the above table is shown in the (R - Y) (B - Y) plane, it will be as shown, for example, by the broken lines in FIG. 44.

The other formations, operations and effects are the same as in the eleventh embodiment.

FIGS. 46 to 49 show a seventeenth embodiment of the present invention.

In this embodiment, the same as in the sixteenth embodiment, the compressing rate is made variable in response to colors. However, in this embodiment, the compressing rate in the region near the average color is made high.

Figure 46:
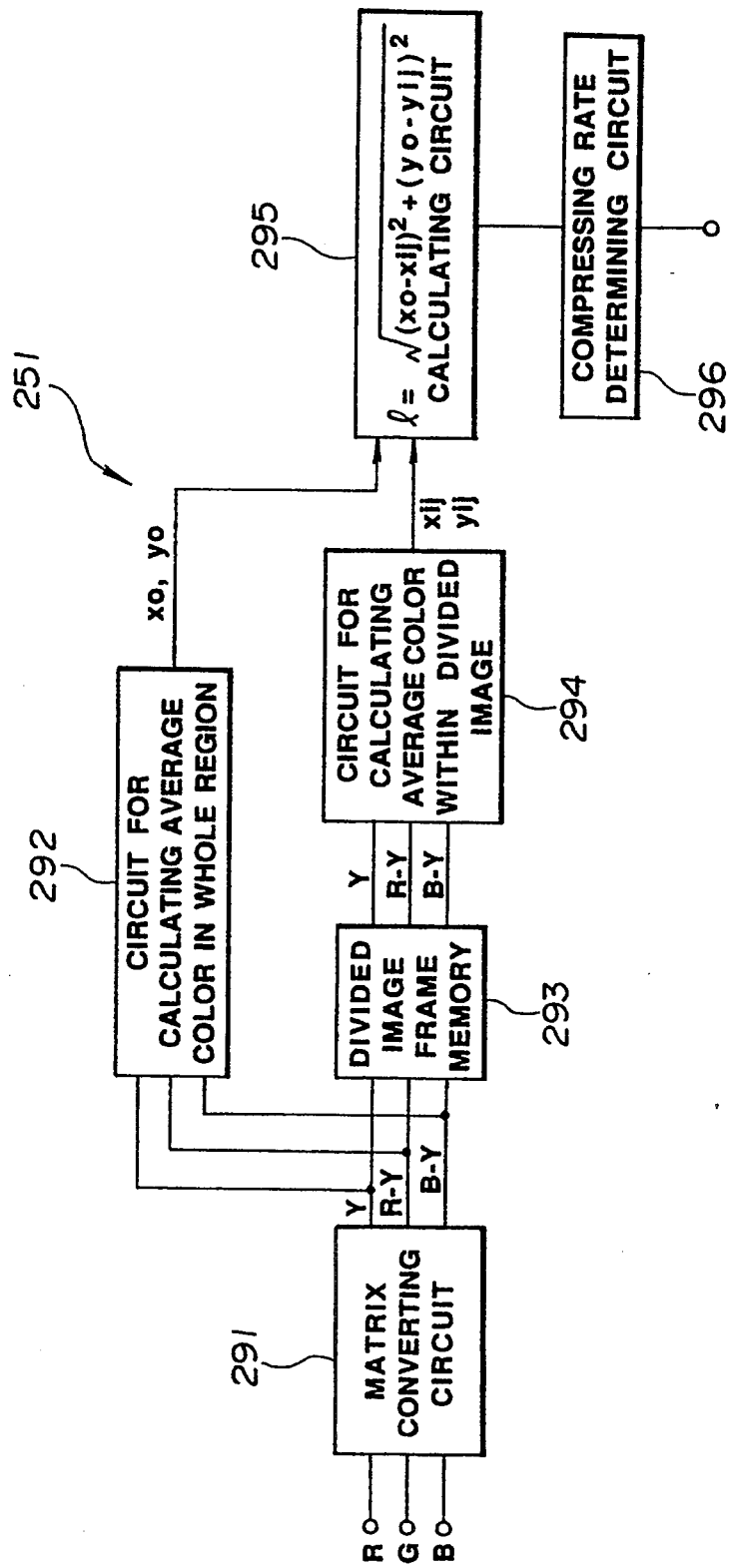
FIGS. 46 to 49 relate to the seventeenth embodiment of the present invention.

The embodiment is different from the eleventh embodiment in the formation of the image analyzing part 251 from the eleventh embodiment. As shown in FIG. 46, the image analyzing part 251 has a matrix converting circuit 291 into which the RGB image signals from the respective RGB frame memories 233R, 233G and 233B are input so that the RGB signals may be converted to a luminance signal Y and two color difference signals R-Y and B-Y in this matrix converting circuit 291. These Y, R-Y and B-Y signals are transmitted to a whole region average color calculating circuit 292 and divided image frame memory 293. The output of the divided image frame memory 293 is transmitted to a circuit 294 for calculating the average color within the divided image. The average color $(x_0, y_0)$ calculated by the average color calculating circuit 292 and the average color $(x_{ij}, y_{ij})$ calculated by the average color calculating circuit 294. are input into a calculating circuit 295 and $$l = \text{SYMBOL} \sqrt{(x_0 - x_{ij})^2 + (y_0 - y_{ij})^2}$$

is calculated. l calculated by the calculating circuit 293 is input into a compressing rate determining circuit 296.

In the case of an endoscope diagnosis, the region near the color of the whole image, that is, the average color is not important to the diagnosis but the region having a color separate from the average color generally shows an affected part. Therefore, even if the compressing rate is elevated and the picture quality is more or less reduced in the region near the average color, the diagnosis will not be substantially influenced.

Figure 49:
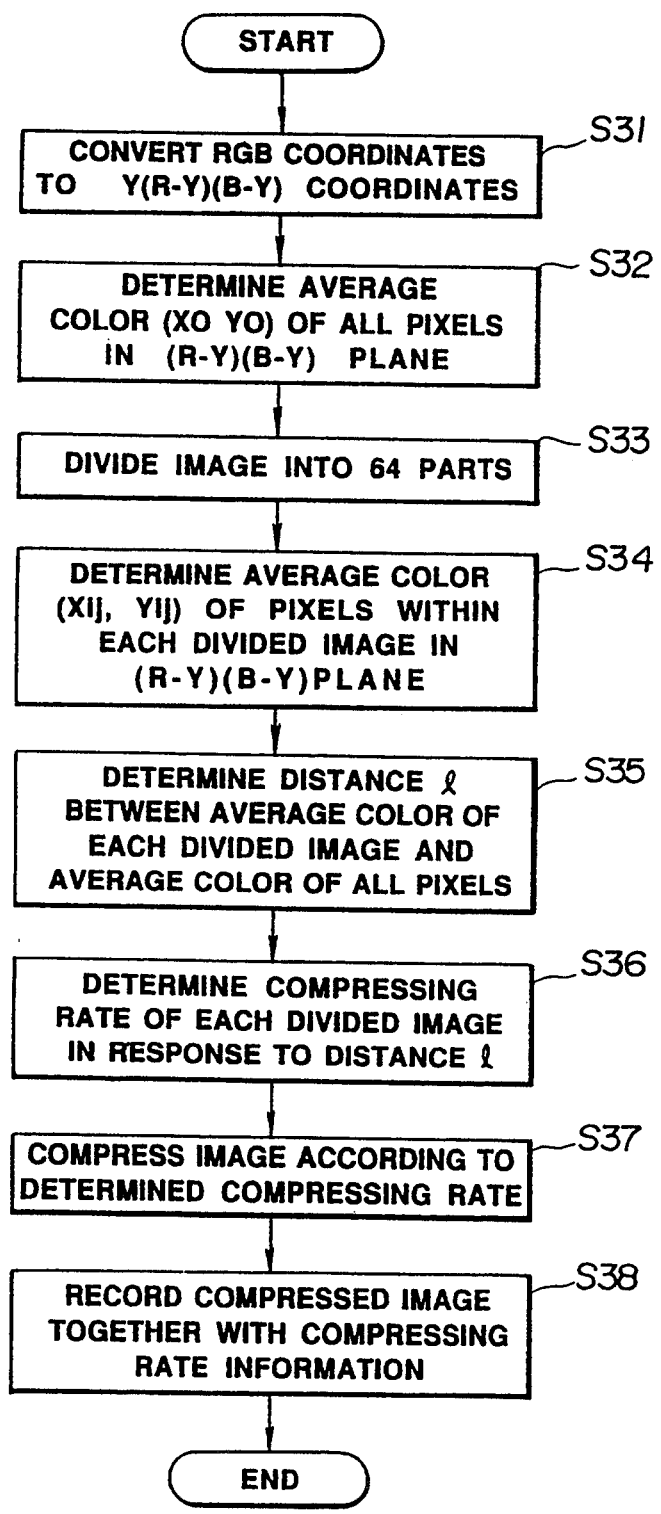

The recording operation of this embodiment shall be explained by using FIG. 49.

First of all, in S31, the RGB coordinates are converted to Y, (R-Y) and (B-Y) coordinates by the matrix converting circuit 291.

Then, in S32, the average color $(x_o, y_o)$ of all pixels is determined in the (R-Y) (B-Y) plane by the calculating circuit 292. By the way, $(x_o, y_o)$ represents the coordinate in the (R-Y) (B-Y) plane of the average color.

Figure 48:
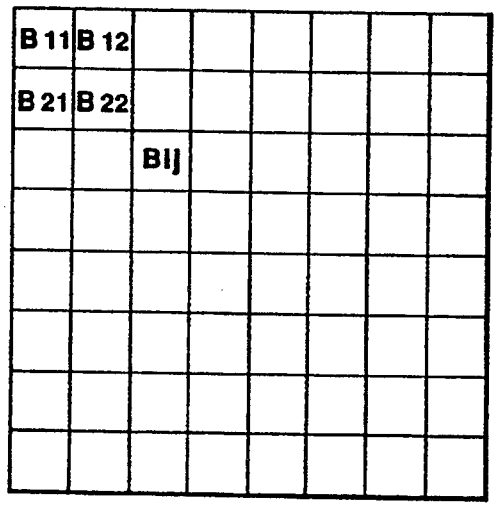

Also, in S33, the image is divided, for example, into 64 images by the divided image frame memory 293 and, in S34, the average color $(x_{ij}, y_{ij})$ of the pixels within each divided image is determined in the (R-Y) (B-Y) plane by the average color calculating circuit 294. As shown in FIG. 48, the divided image in the i line and j row when the image is divided shall be Bij and the coordinate in the (R-Y) (B-Y) plane of the average color of the divided image Bij shall be $(x_{ij}, y_{ij})$.

Next, in S35, the distance l between the average color of each divided image and the average color of all pixels in the (RY) (B-Y) plane is determined by the calculating circuit 295.

Then, in S36, the compressing rate of each divided image is determined in response to the distance l by the pressing rate determining circuit 296.

Next, in S37, each divided image interior is compressed by the compressing circuit part 234 according to the determined compressing rate.

Then, in S38, the compressed image information together with the compression discriminating information are recorded in the recording system part 235.

The relation of the distance from the average color, compressing rate and resolution at the time of the reproduction is as in the following table:

|  | Distance from average color | | | |
| --- | --- | --- | --- | --- |
|  | Short | | | Long |
| Compressing rate | 3 | 2 | 1 | 0 |
|  | High compression | Medium |  | Low compression |
| Resolution in reproduction | Bad | Medium |  | Good |

Figure 47:
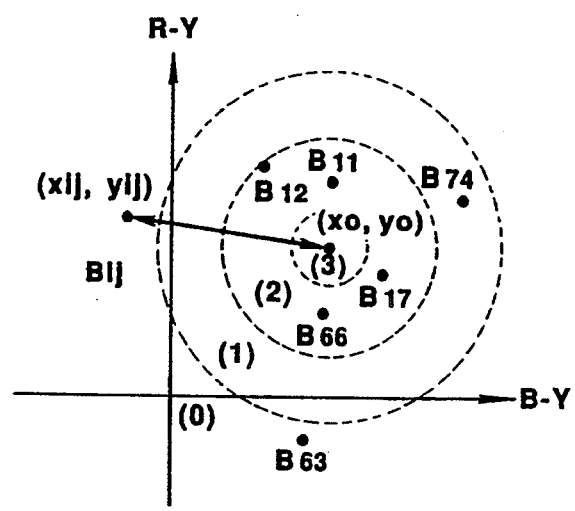

When the range of the compressing rates in the above table is shown in the (R-Y) (B-Y) plane, it will be as shown by the broken lines, for example, in FIG. 47.

The other formations, operations and effects are the same as in the eleventh embodiment.

FIGS. 50 to 53 show an eighteenth embodiment of the present invention.

Figure 50:
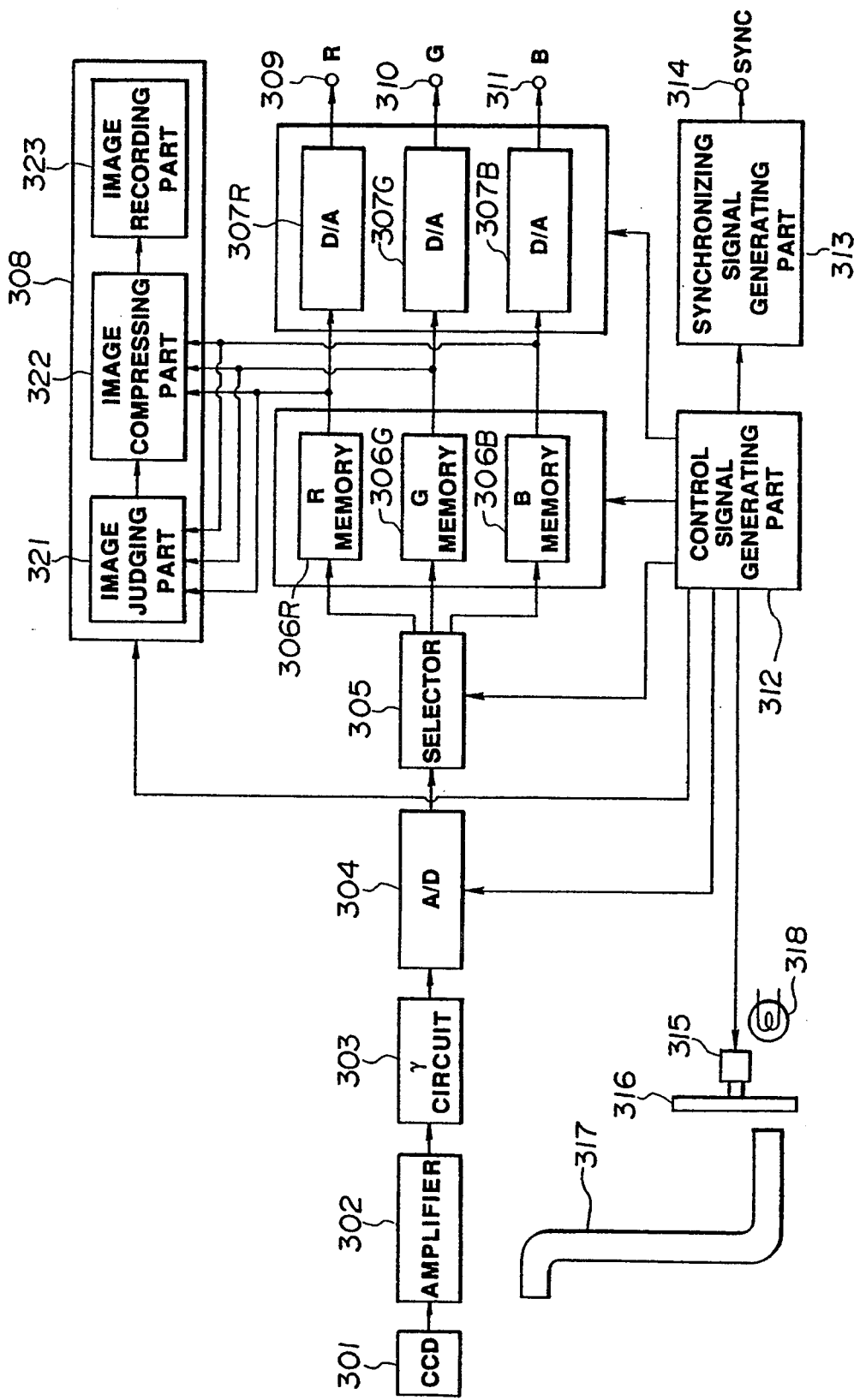

As shown in FIG. 50, a CCD 301 for converting the image of a living body to an electric signal is provided in the tip part of the insertable part of an endoscope. The output electric signal of this CCD 301 is input into an amplifier 302 for amplifying an electric signal in a predetermined range (for example, 0 to 1 volt). The output electric signal of this amplifier 302 is input into a selector 305 through a γ-correcting circuit 303 and A/D converter 304. This selector 305 has three output ends connected respectively to an R memory 306R, G memory 306G and B memory 306B. The respective memories 306R, 306G and 306B are connected to D/A converters 307R, 307G and 307B and an image compressing and recording part 308 consisting of an image judging part 321, image compressing part 322 and image recording part 323. The D/A converters 307R, 307G and 307B are connected to respective RGB signal output ends 309, 310 and 311.

Also, a control signal generating part 312 for controlling the destination of the image signal and the transferring timing at the time of transferring the image signal is provided, is connected to the A/D converter 304, selector 305, respective RGB memories 306R, 306G and 306B, D/A converters 307R, 307G and 307B and image compressing and recording part 308 and is connected also to a synchronizing signal generating circuit 313 from which a synchronizing signal SYNC for the RGB signal outputs is output to a synchronizing signal output end 314.

Also, the control signal generating part 312 is connected to a motor 315 driving an RGB rotary filter 316. The light from a lamp 318 is emitted from the tip part of the insertable part of the endoscope through an RGB rotary filter 316 and a light guide of the endoscope.

Figure 51:
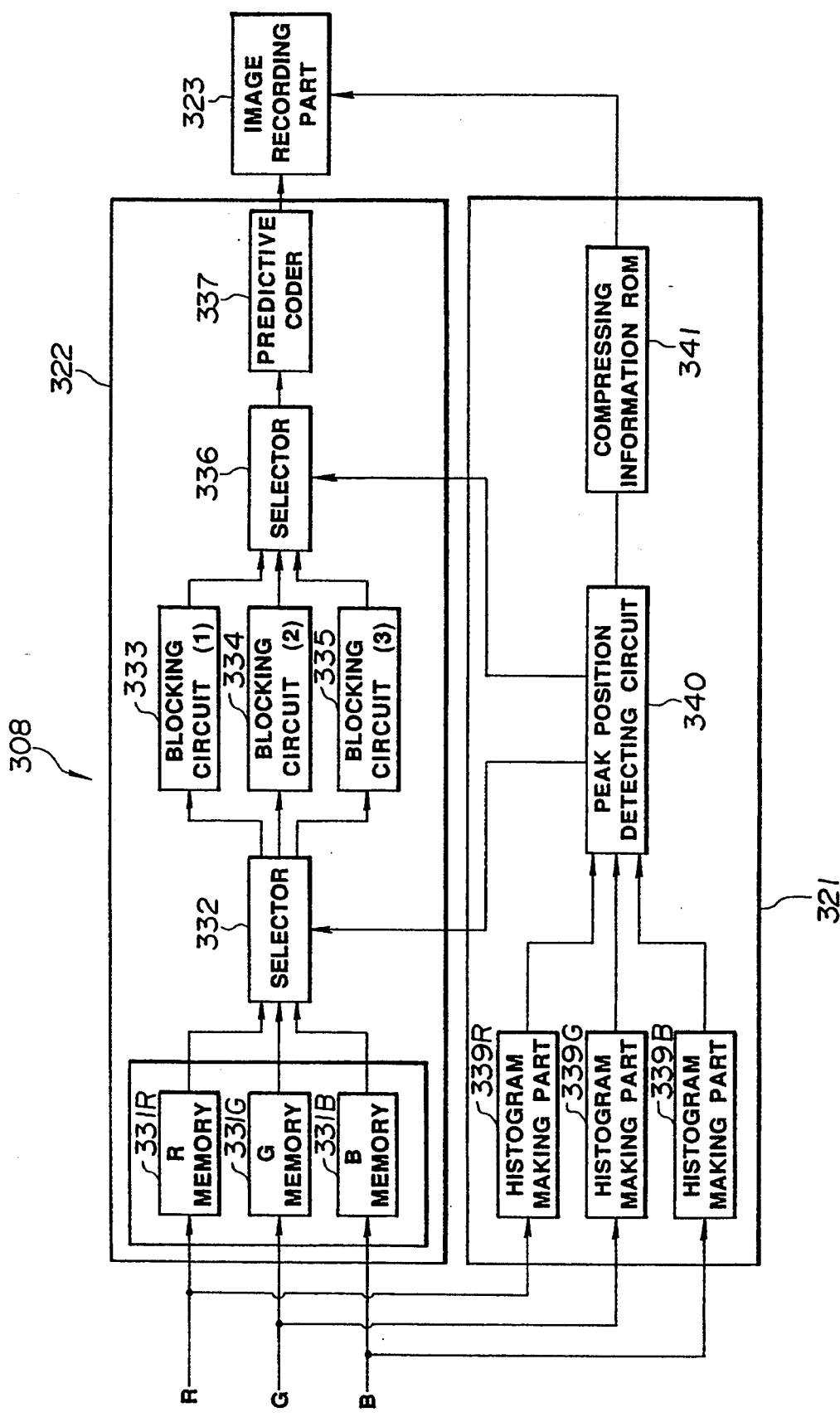

The image compressing and recording part 308 shall be explained by using FIG. 51.

The respective RGB input signals are led to a peak position detecting circuit 340 through histogram making parts 339R, 339G and 339B. The output of the peak position detecting circuit 340 is connected to selectors 332 and 336 and a compressing information ROM 341. The image judging part 321 is formed of the histogram making parts 339R, 339G and 339B, peak position detecting circuit 340 and compressing information ROM 341. The respective RGB input signals are led to the selector 332 through a working R memory 331R, G memory 331G and B memory 331B. The output of the selector 332 is connected to blocking circuits (1) 333, (2) 334 and (3) 335 whose outputs are input into a predictive coder 337 through the selector 336. An image compressing part 322 is formed of the memories 331R, 331G and 331B, selector 332, blocking circuits 333, 334 and 335, selector 336 and predictive coder 337. The respective outputs of the predictive coder 337 and compressing information ROM are recorded in an image recording part 323.

The operation of this embodiment shall be explained in the following.

In FIG. 50, the flow of the signal shall be explained. The image signal from the CCD 301 is converted to be of a voltage in a predetermined range (of 0 to 1 volt in this embodiment) by the amplifier 302, is input into the $\gamma$-correcting circuit 303, is converted to an image signal having a predetermined $\gamma$ characteristic and is then digitized on a predetermined quantizing level (for example, of 8 bits) in the A/D converter 304. Then, through the selector 305, by the control signal from the control signal generating part 312, the image when the video entering the CCD 301 is a red (R) illumination is recorded in the R memory 306R, the image at the time of a green (G) illumination is recorded in the G memory 306G and the image at the time of a blue (B) illumination is recorded in the B memory 306B. The signals read out of the respective memories 306R, 306G and 306B are transmitted to the image compressing and recording part 308 and D/A converters 307R, 307G and 307B. The RGB image signals from said D/A converters 307R, 307G and 307B are output, respectively, from the RGB image signal output ends 309, 310 and 311 together with a synchronizing signal SYNC made in the synchronizing signal generating circuit 313 under the control of the control signal generating part 312. On the other hand, a motor controlling signal is transmitted from the control signal generating part 312 to the motor 315 rotating and driving the RGB rotary filter 316. The motor 315 rotates the RGB rotary filter 316 in conformity with the switching timing of the selector 305 by the control signal. The illuminating light from the lamp 318 is decomposed in time series into three colors of R, G and B by this RGB rotary filter 316, is led through the light guide 317 of the endoscope and is emitted from the tip part of the insertable part of the endoscope. This illuminating system is known as the RGB frame sequential color system.

The operation of the image compressing and recording part 308 shall be explained below. The signals read out of the respective RGB memories 306R, 306G and 306B are recorded into the working R memory 331R, G memory 331G and B memory 331B within the image compressing and recording part 308 and the histogram making parts 339R, 339G and 339B under the control of the control signal generating part 312. The histograms of the respective RGB signals are made in the histogram making parts 339R, 339G and 339B. Then, the peak positions of the respective histograms are determined by the peak position detecting circuit 340. The control signal is output to the selectors 332 and 336 and compressing information ROM 341 on the basis of the size relation of the peak positions of the three RGB signals.

On the other hand, the signals read out of the respective memories 331R, 331G and 331B are led to the selector 332 which leads the RGB signals to any one of the blocking circuits (1) 333, (2) 334 and (3) 335 on the basis of the control signal of the peak position detecting circuit 340. The three blocking circuits 333, 334 and 335 respectively output blocked video signals of sizes, for example, of $1\times2$, $2\times2$ and $3\times3$. The larger the blocked size, the higher the compressing rate but, on the contrary, the lower the picture quality. The selector 336 leads the output of the blocking circuit selected on the basis of the control signal of the peak position detecting circuit 340 to the predictive coder 337 which determines the predictive error by the predictive coding method mentioned on pages 217 to 219 of "Image Process Handbook" by Shokodo Co. and outputs it to the image recording part 323. The image recording part 323 records the data in such large capacity recording medium as a photodisc or magnetic disc.

The peak position detecting circuit 340 transmits a control signal to the compressing information ROM 341 so that such information as the blocked size required in restoring the image may be simultaneously recorded in the image recording part 323. The compressing information ROM 341 outputs to the image recording part 323 such information as the blocked size corresponding to the selected output signal.

FIGS. 52(A), (B) and (C) respectively show histograms of the respective RGB components of a general endoscope image. FIGS. 53(A), (B) and (C) respectively show histograms of the density values of the respective RGB components of a dyed endoscope image. As shown in FIGS. 52(A) to (C), in the general endoscope image, the R component deflects to a high luminance level and the B component deflects to a low luminance part. Therefore, when the peak positions of the three RGB signal histograms are determined and their sizes are investigated, $R>G>B$. On the other hand, in case the image is dyed with such bluish color as methylene blue, as shown in FIGS. 53(A) to (C), in the peak positions in the histograms, B and R are substantially equal to each other and G is a low level. That is to say, the size relation is $B \leq R > G$. Thus, from the peak positions in the RGB histograms, the general endoscope image and dyed endoscope image can be easily discriminated from each other.

In the general endoscope image, the R component has few high frequency components and the B component is low in the luminance level. Therefore, even if the resolution is reduced with respect to R and B, the picture quality deterioration will be hard to detect by sight. Therefore, the R and B components can be highly compressed by blocking respectively $2\times2$ and $3\times3$ sizes. On the other hand, the G component has many high frequency components and has a high luminance level. The picture quality deterioration is easy to detect by sight and therefore the G component can be compressed at a high picture quality by blocking a $1\times2$ size. In the dyed endoscope image, the three RGB components have many high frequency components and therefore are compressed at a high picture quality by blocking a $1\times2$ size.

Thus, in this embodiment, three kinds of blocking processes are selected in response to the characteristics of the input image. Then, the image is predictively coded and is further compressed. Therefore, an image having high correlation between the adjacent pixels and having few high frequency components as in an ordinary endoscope image can be highly compressed by selecting to block a large size. On the other hand, such special image as in dyeing in which the correlation between the adjacent pixels is low and the high frequency components are numerous can be compressed by selecting to block a small size without reducing the picture quality.

From the above, compression of image data can be adapted to the characteristics of various endoscope images so that there is little picture quality deterioration. Further, as three kinds of compressing processes are made in parallel, the processing time will be always constant.

Figure 54:
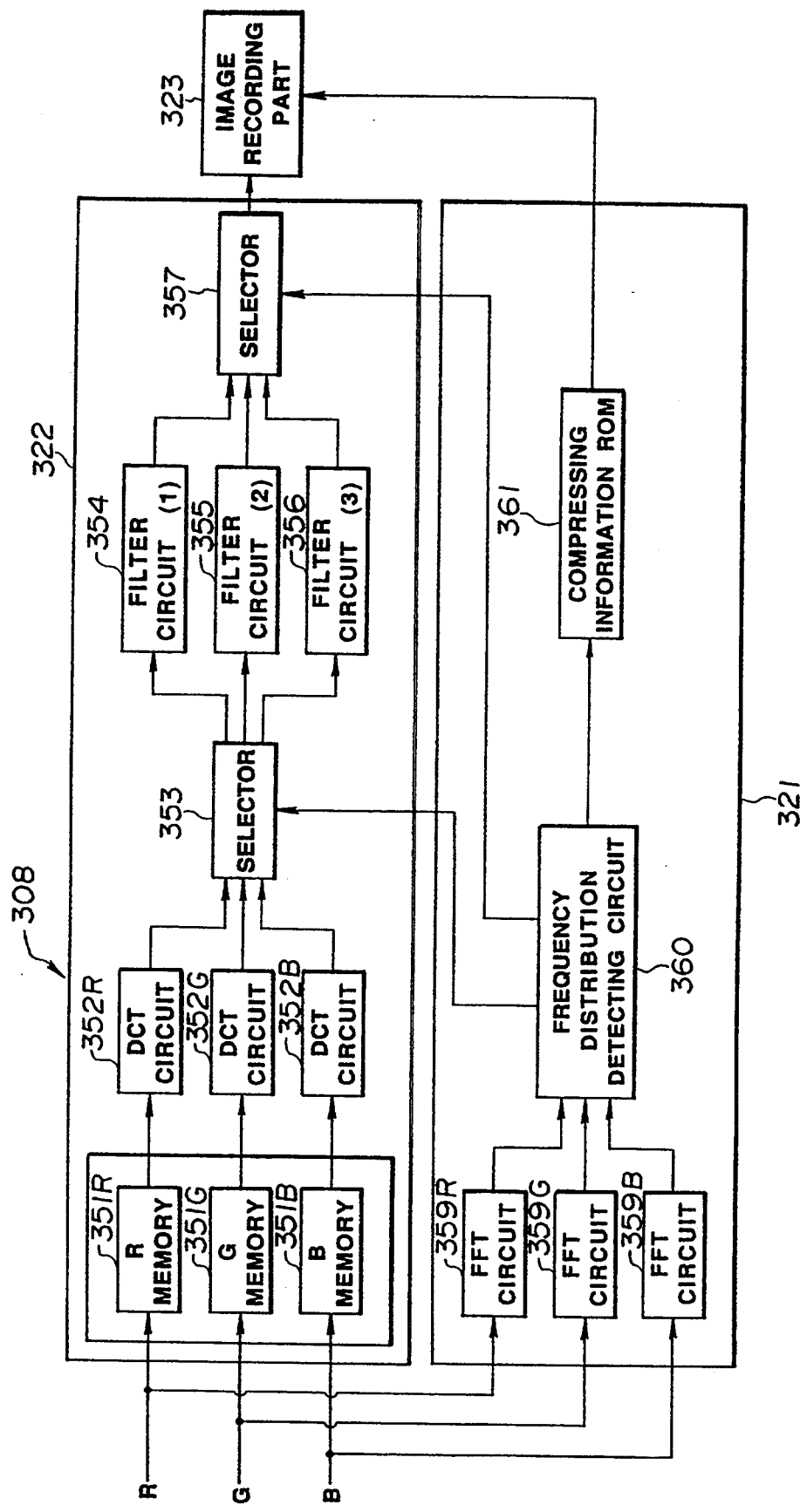

FIGS. 54 to 56 show a nineteenth embodiment of the present invention.

This embodiment is the same as the eighteenth embodiment except for differences in the formation of the image compressing and recording part 308. The formation of the image compressing and recording part 308 shall be explained by using FIG. 54. Respective RGB input signals are led to a frequency distribution detecting circuit 360, respectively, through FFT circuits 359R, 359G and 359B. The output of the frequency distribution detecting circuit 360 is input into selectors 353 and 357 and a compressing information ROM 361. An image judging part 321 is formed of the FFT circuits 359R, 359G and 359B, frequency distribution detecting circuit 360 and compressing information ROM 361. The respective RGB input signals are led to the selector 353 respectively through a working R memory 351R, G memory 351G and B memory 351B and DCT circuits 352R, 352G and 352B. The output of the selector 353 is input into filter circuits (1) 354, (2) 355 and (3) 356. The outputs of the filter circuits 354, 355 and 356 are input into the selector 357. An image compressing part 322 is formed of the memories 351R, 351G and 351B, DCT circuits 352R, 352G and 352B, selector 353, filter circuits 354, 355 and 356 and selector 357. The respective outputs of the selector 357 and compressing information ROM 361 are recorded in the image recording part 323.

The operation of the image compressing and recording part 308 shall be explained below. The signals read out of the respective RGB memories 306R, 306G and 306B are recorded into the working R memory 351R, G memory 351G and B memory 351B and FFT circuits 359R, 359G and 359B under the control of the control signal generating part 312. In the FFT circuits 359R, 359G and 359B, the respective RGB signals are Fourier-converted and their power spectra are calculated. Then, the frequency distribution ranges of the respective signals are determined in the frequency distribution detecting circuit 360. On the basis of these distribution ranges, control signals are output to the selectors 353 and 357 and compressing information ROM 361.

On the other hand, the signals read out of the respective memories 351R, 351G and 351B are led, respectively, to the DCT circuit 352R, 352G and 352B, have the 8×8 size discretely cosine-converted as mentioned, for example, on pages 90 to 93 of "IEEE Trans. Vol. 1C-23" and are output to the selector 353 which leads the RGB signals to any one of the filter circuits (1) 354, (2) 355 and (3) 356 on the basis of the control signal of the frequency distribution detecting circuit 360. The three filter circuits 354, 355 and 356 are, for example, transmitting type filters of 2×2, 3×3 and 4×4 sizes with the left upper part as the origin. The smaller the filter size, the higher the compressing rate but, on the contrary, the lower the picture quality. The selector 357 outputs to the image recording part 323 the output of the filter circuit selected on the basis of the control signal of the frequency distribution detecting circuit 360. On the other hand, the frequency distribution detecting circuit 360 transmits the control signal to the compressing information ROM 361 so that such information as the filter size required in the restoration may be simultaneously recorded. The compressing information ROM 361 outputs to the image recording part 323 such information as the filter size corresponding to the selected output signal.

Here, the frequency distribution of the endoscope image shall be explained by using FIGS. 55(A) and (B) and 56(A) and (B). In this embodiment, the case of observing the same object by varying the observing distance shall be considered. FIGS. 55(A) and (B) show, respectively, an endoscope image at the time of a far view and a power spectrum showing its frequency distribution. FIGS. 56(A) and (B) show, respectively, an endoscope image at the time of a close-up view and a power spectrum showing its frequency distribution. At the time of a distant view, high frequency components, such as the mucous membrane structure of a living body, will be masked by the resolution of the optical system and will not be detected. In such case, if the frequency distribution is made an image as a power spectrum, as shown in FIG. 57(B), it will be an image concentrating at the origin, that is, the low frequency component. On the other hand, at the time of the close-up view, high frequency components, such as the mucous membrane structure of a living body, will be detected. In this case, as shown in FIG. 57(B), the frequency will be distributed in a wide range with the origin as a center. Thus, by determining a power spectrum, the rate of high frequency components can be judged.

In an endoscope image, even in case the same object is photographed, the amount of information in the video signal will be different depending on the observing distance. Whenever the observing distance is small and the high frequency components are numerous, the image will be able to be compressed while maintaining a high picture quality by making the filter size 4×4. On the contrary, in case the observing distance is great and the high frequency components are few, high compression will be able to be made by making the filter size 2×2. Also, even at the same observing distance, the amount of information will be greatly different between the upper digesting tube and lower digesting tube, because, in such upper digesting tube as the stomach, a vein image will not be substantially detected but, in such lower digesting tube as the large intestine, a vein image will be detected. In the lower digesting tube in which a vein image is detected, high frequency components are many but, in the upper digesting tube in which no vein image is detected, high frequency components are few. Therefore, the filter size is made, for example, 2×2 in the upper digesting tube and 3×3 in the lower digesting tube so that the picture quality and compressing rate may be balanced.

The other formations, operations and effects are the same as in the eighteenth embodiment.

The eleventh to nineteenth embodiments can be applied not only to a frame sequential type electronic endoscope using RGB signals but also to a monoplate type electronic endoscope decoding a composite video signal. The endoscope may be of either a type having the imaging device in the tip part or a type in which the image is led out of the observed object through an image guide by optical fibers and is received by the imaging device.

As explained above, according to the eleventh to nineteenth embodiments, the compressing method can be varied in response to the characteristics of the endoscope image. Therefore, various endoscope images can be highly compressed with little deterioration of the picture quality.

Figure 57:
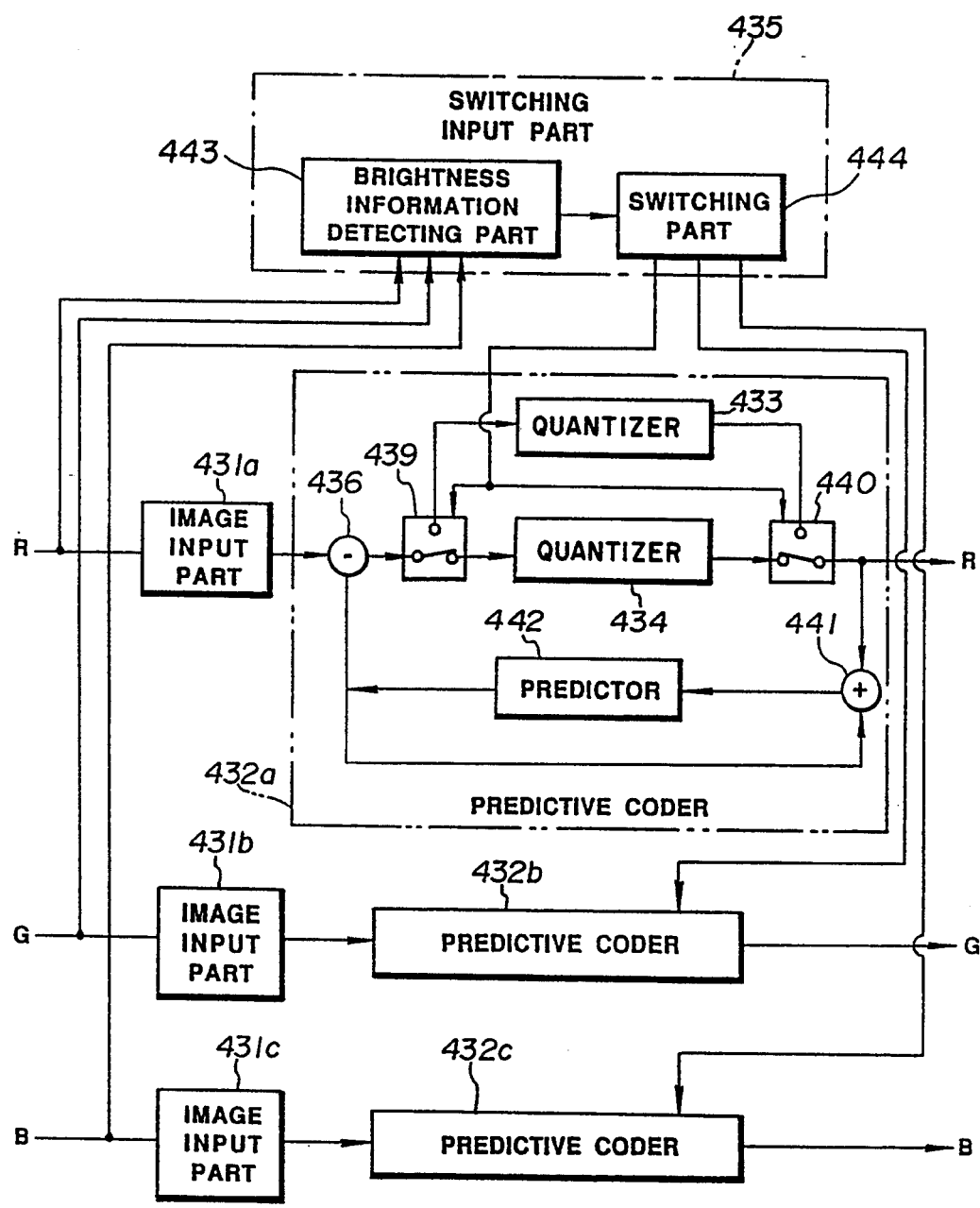
FIG. 57 is a block diagram showing a compressing apparatus in the twentieth embodiment of the present invention.

FIG. 57 shows a twentieth embodiment of the present invention.

The formation of the endoscope image filing system in this embodiment is substantially the same as in the eleventh embodiment shown in FIG. 20, differing only in the formation of the image data compressing apparatus within the image recording apparatus 205. Also, the formation of the observing apparatus in this embodiment is the same as in the eleventh embodiment shown in FIG. 21.

The image recording apparatus 205 in this embodiment includes the image data compressing apparatus of FIG. 57. The image data compressing apparatus shall be explained in the following by using FIG. 57.

The RGB image signals output from the observing apparatus 203 are input, respectively, into predictive coders 432a, 432b and 432c through respective image input parts 431a, 431b and 431c, are predictively coded here and are output to the recording system part of the image recording apparatus 205. Also, the respective RGB image signals are input into a switching input part 435 which switches later described quantizers 433 and 434 by the brightness information. Each of the predictive coders 432a, 432b and 432c comprises a subtractor 436, a plurality or two kinds in this embodiment of quantizers 433 and 434, switches 439 and 440, respectively, switching these two kinds of quantizers 433 and 434 on the input side and output side, an adder 441 and a predictor 442. The R signal input into the predictive coder 432a is input into one input end of the subtractor 436. Here, the output of the predictor 42, that is, the signal one pixel (or one horizontal line or one field/-frame also hereinafter) before is subtracted from the input signal to obtain a difference signal which is input predictor 422 and is input into the other input end of the subtractor 436 and the next R image signal input from the image input part 431a is subtracted to obtain the difference signal.

Now, this embodiment has two kinds of quantizers 433 and 434 which differ in quantizing gradation. In one quantizer 433, the reference numerals of predictive errors shown in Table 1 are allotted. In the other quantizer 434, the reference numerals of predictive errors shown in Table 2 are allotted.

On the other hand, the respective R, G and B color signals are input into the switching input part 435 and are converted to the brightness information by a brightness information detecting part 443 within the switching input part 435.

This conversion is made by the conversion formula:

$$Brightness = 0.3\ R + 0.5\ G + 0.2\ B$$

which is the same as the method of calculating an ordinary luminance signal. The brightness information from the brightness information detecting part 443 is input into the switching part 444 and the switches 439 and 440 are switched by the brightness information to select either the quantizer 433 or quantizer 434.

In this embodiment, the quantizer 433 is selected on the level of 0–30 of the 8-bit (256) gradation and the quantizer 434 is selected on the level of 31–255 of the brightness gradation.

In this formation, either the quantizer 433 or the quantizer 434 is selected by the brightness information of the respective R, G and B color signals so that an image signal somewhat dark may be quantized with a small number of bits, a bright image signal may be quantized with a large number of bits, the quantization may be weighted by the brightness of the image signal and a favorable picture quality may be obtained with a small number of bits.

Figure 58:
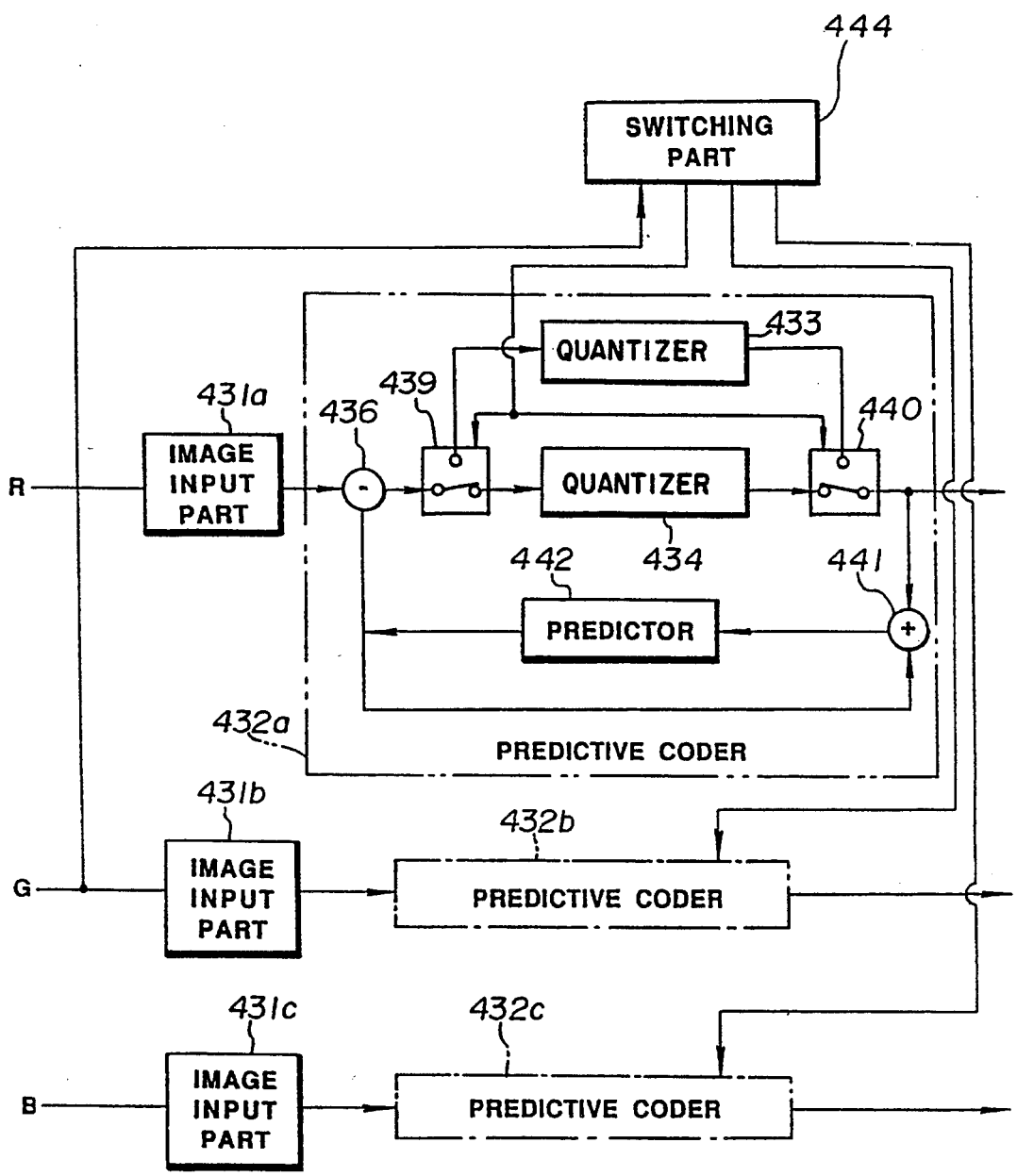
FIG. 58 is a block diagram showing a compressing apparatus in the twenty-first embodiment of the present invention.

FIG. 58 shows a twenty-first embodiment of the present invention.

Instead of making the brightness information in the brightness information detector 443 from the respective RGB color

TABLE 1

| ΔP | 3-Bit Gradation: | | | | | | |
|---|---|---|---|---|---|---|---|
| | $-1 \sim +1$ | $+2 \sim +6$ | $-6 \sim -2$ | $+7 \sim +15$ | $-15 \sim -7$ | $+16 \sim +255$ | $-255 \sim -16$ |
| Output value | 0 | +4 | −4 | +10 | −10 | +20 | −20 |
| Reference numeral | 1 | 2 | 3 | 4 | 5 | 6 | 7 |

TABLE 2

| ΔP | 4-Bit Gradation: | | | | | | | | | | | | | | |
|---|---|---|---|---|---|---|---|---|---|---|---|---|---|---|---|
| | $-1 \sim +1$ | $+2, +3$ | $-2, -3$ | $+4 \sim +6$ | $-6 \sim -4$ | $+7 \sim +9$ | $-9 \sim -7$ | $+10 \sim +15$ | $-15 \sim -10$ | $+16 \sim +25$ | $-25 \sim -16$ | $+26 \sim +35$ | $-35 \sim -26$ | $+36 \sim +255$ | $-255 \sim -36$ |
| Output value | 0 | +2 | −2 | +5 | −5 | +8 | −8 | +12 | −12 | +20 | −20 | +30 | −30 | +50 | −50 |
| Reference numeral | 1 | 2 | 3 | 4 | 5 | 6 | 7 | 8 | 9 | 10 | 11 | 12 | 13 | 14 | 15 | into the quantizer 433 or 434 in the next step. In the quantizers 433 and 434, the difference signal is quantized. This quantized R signal is output to the recording system part of the image recording apparatus 205 and is also input into the adder 441 and is added, for example, to the signal one pixel before being memorized in the predictor 442. This added signal is memorized in the signals and converting it in the twentieth embodiment, the G signal is substituted for the brightness information and the switching part 444 is operated by this G signal in this embodiment. The other formations, operations and effects are the same as in the twentieth embodiment.

Figure 59:
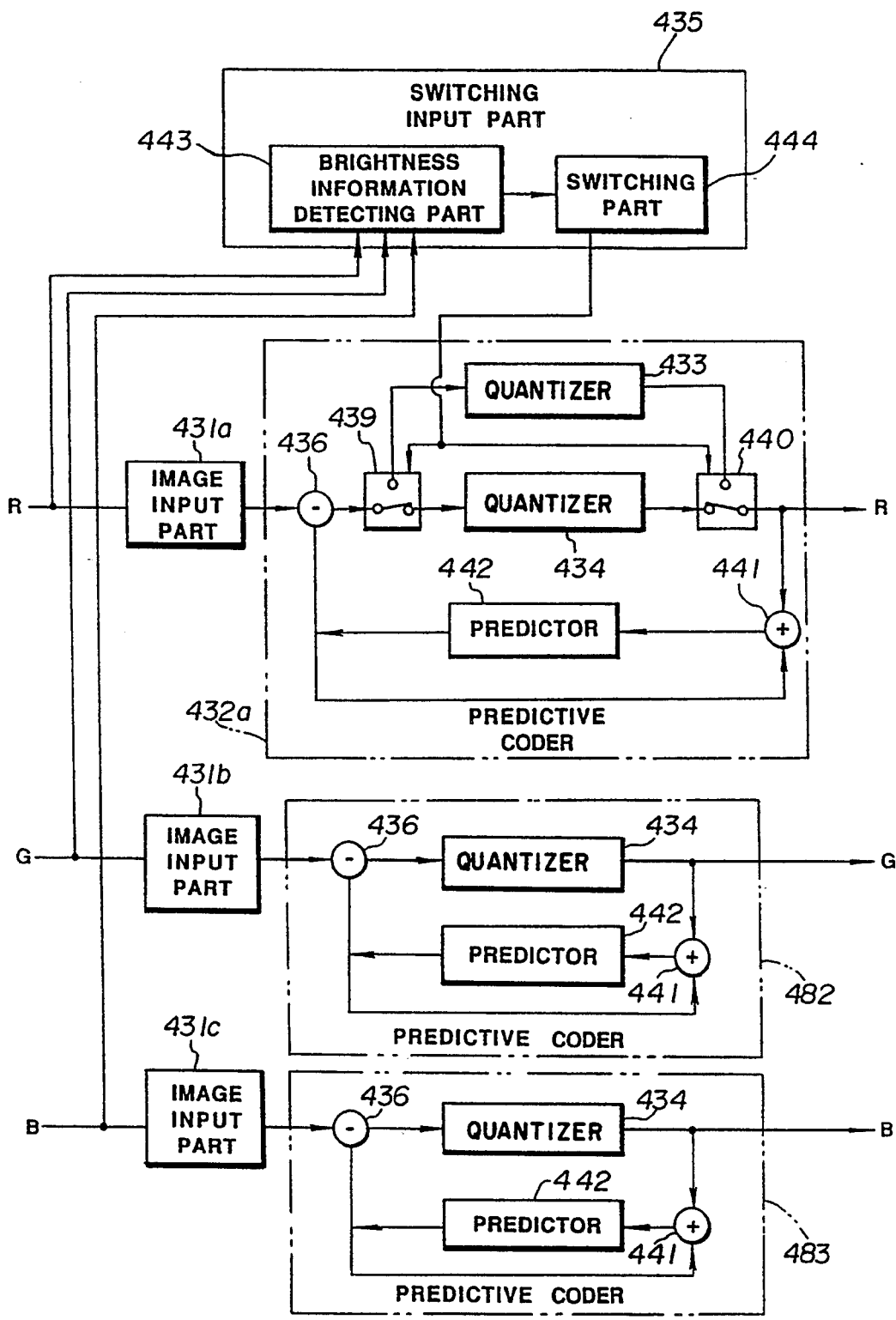
FIG. 59 is a block diagram showing a compressing apparatus in the twenty-second embodiment of the present invention.

FIG. 59 shows the twenty-second embodiment of the present invention. In this embodiment, the gradation of the quantizing error of only the R signal is varied and selected on the basis of the brightness information obtained by the conversion in the brightness information detecting part 443 by the RGB signals. Therefore, the G signal and B signal predictive coders 482 and 483 replacing the predictive coders 432b and 432c in the twentieth embodiment are provided, respectively, with one quantizer 434. The other formations, operations and effects are the same as in the twentieth embodiment.

FIGS. 60 to 64 show a twenty-third embodiment of the present invention.

In the twentieth to twenty-second embodiments, the brightness is determined from the RGB signals and a plurality of quantizers different in the quantizing gradation are selected by the brightness information. However, in this embodiment, one picture is divided into many blocks and the compressing rate of each block is set in response to the average brightness of each block.

Figure 60:
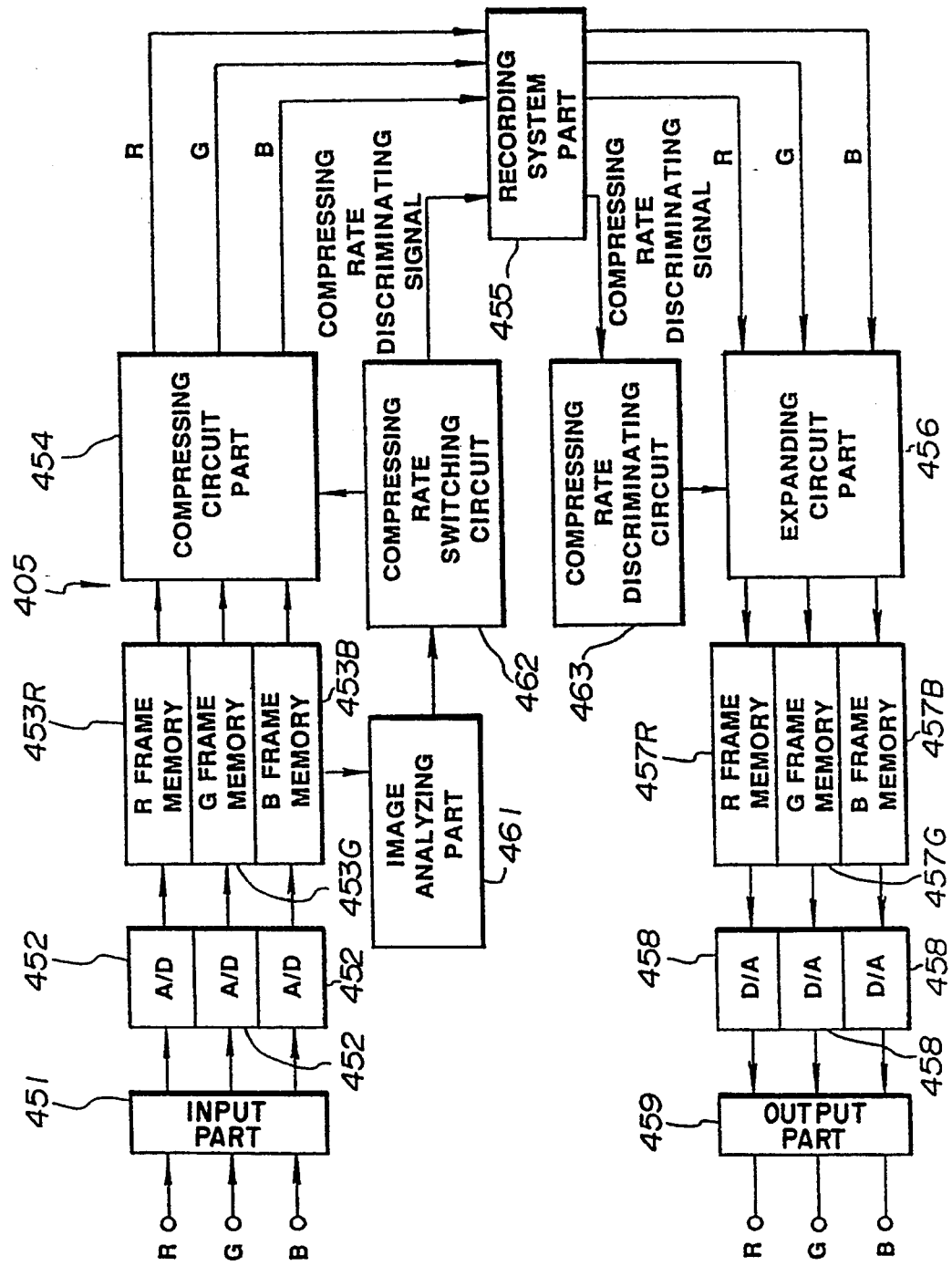

In an image recording apparatus 405 in this embodiment shown in FIG. 60, the respective R, G and B image signals output from the observing apparatus 203 shown in FIG. 21 are input into an input part 451, are converted to digital signals, respectively, by A/D converters 452 and are temporarily memorized, respectively, in an R frame memory 453R, G frame memory 453G and B frame memory 453B. The respective R, G and B image signals read out of the respective frame memories 453R, 453G and 453B are compressed in a compressing circuit part 454 and are then memorized in a recording system part 455.

In reproducing the image data, the respective R, G and B image signals are read out of the recording system part 455 and are respectively expanded in the expanding circuit part 456 to restore the data. The restored R, G and B image data are temporarily memorized respectively in an R frame memory 457R, G frame memory 457G and B frame memory 457B. The respective R, G and B image signals are read out of the respective frame memories 457R, 457G and 457B as synchronized with the television signal, are converted to analog signals by D/A converters 458 and are then output from an output part 459.

In this embodiment an image analyzing part is provided for analyzing the characteristics of the endoscope image from the image information memorized within the frame memories 453R, 453G and 453B. The output signal of the image analyzing part 461 is input into a compressing rate switching circuit 462. The compressing rate switching circuit 462 determines the compressing rate in the compressing circuit part 454 on the basis of the signal from the image analyzing part 461, transmits the compressing rate to the compressing circuit part 454 and transmits the information of the compressing rate of the image as a compressing rate discriminating signal to the recording system part 455 which memorizes the compressing rate discriminating signal together with the compressed R, G and B image information.

There is also provided a compressing rate discriminating circuit 463 which discriminates the compressing rate from the compressing rate discriminating signal reproduced from the recording system part 455 and transmits the information of the compressing rate to the expanding circuit part 456. In the reproduction, the compressing rate discriminating signal is reproduced together with the compressed R, G and B image information from the recording system part 455 and the compressing rate discriminating circuit 463 discriminates the compressing rate of that image on the basis of the compressing rate discriminating signal and transmits the information of the compressing rate to the expanding circuit part 456. The expanding circuit part 456 expands the image in response to the compressing rate.

Figure 61:
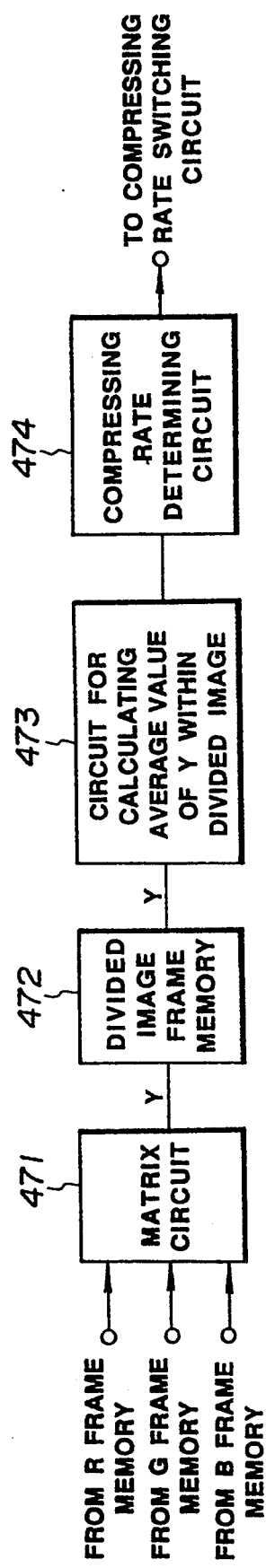

The image analyzing part 461 in FIG. 60 is formed as shown in FIG. 61. The input image signals from the respective R, G and B frame memories are input into a matrix circuit 471, a luminance signal (Y signal) is formed here and is input into a divided image frame memory 472 and one picture is divided, for example, into 16 parts.

The respective divided image signals divided by the divided image frame memory 472 are input into a circuit 473 for calculating average luminance values within the divided images, the average values of the luminances within the respective divided images are determined here and are input into a compressing rate determining circuit 474 in which, in response to the average values of the luminances within the respective divided images, for example, if the average luminance within the divided image is any one of the four gradations of 0, 1, 2 and 3 (the larger the numeral, the higher the luminance), the compressing rate of the corresponding gradation of the four steps of 0, 1, 2 and 3 (the smaller the numeral, the higher the compressing rate) will be determined and this determined information is input into the compressing rate switching circuit 462 shown in FIG. 60.

Figure 62:
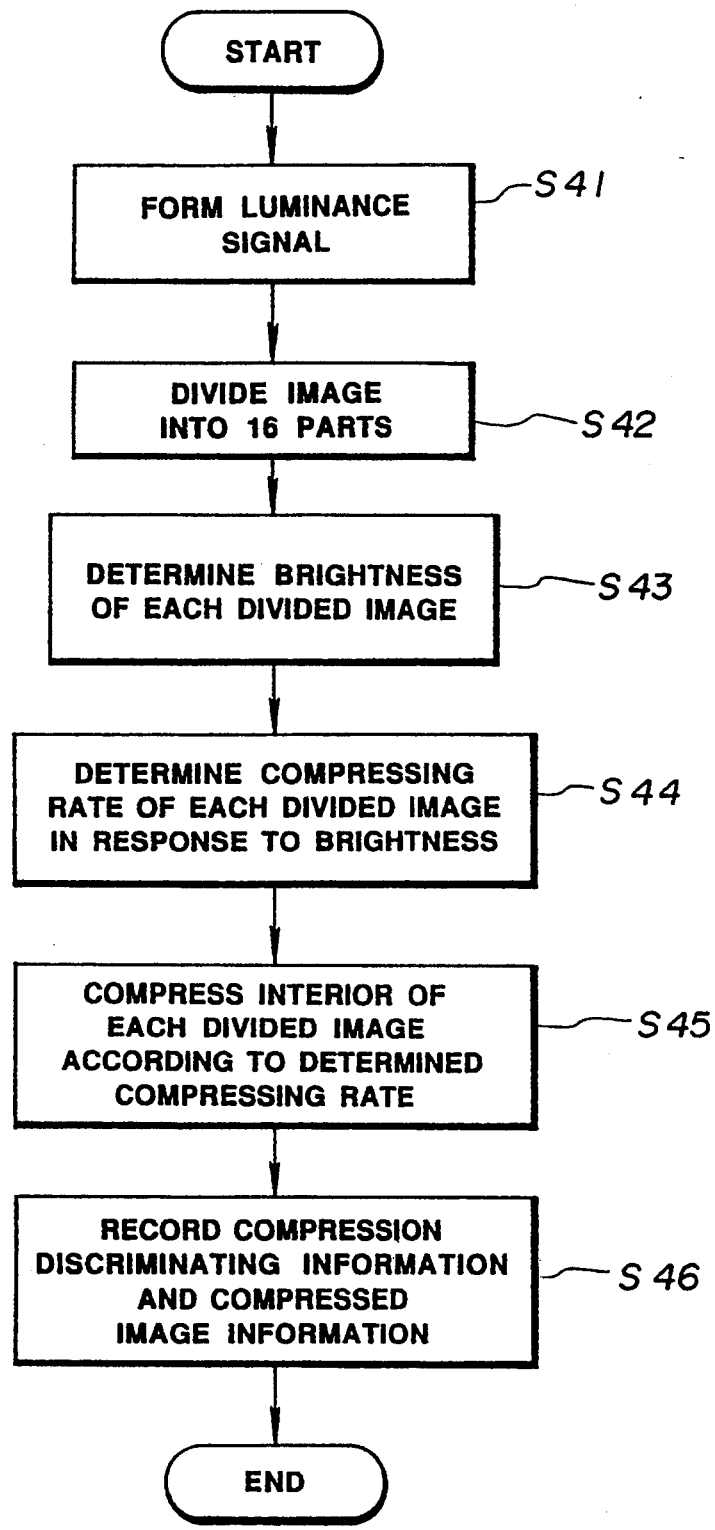
Figures 63A, 63B, 63C:
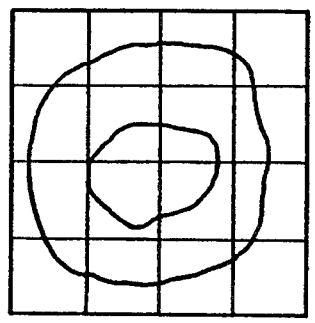
FIGS. 63(A) to (C) are explanatory views for explaining the determination of a compressing rate in response to the brightness and darkness of an original image.

The operation of determining the compressing rate shall be explained below with reference to a flow chart shown in FIG. 62. First of all, the matrix circuit 471 inputting image signals from the R, G and B memories forms a luminance signal from the R, G and B image signals, as shown in the step S41, inputs the luminance signal into the next divided image frame memory 472 and divides one image, for example, into 16 images as shown in FIG. 63(A) in the step S42. The divided images are input into the next circuit 473 for calculating the average values of the luminances within the divided images and the average of the brightness of each divided image is determined, for example, in 0~3 gradations as shown in the step S43 and FIG. 63(B). On the basis of the brightness information of each divided image, in the compressing rate determining circuit 474 of the next step, as shown in the step S44, the compressing rate of 0~3 steps shown, for example, in FIG. 63(C) in response to the brightness is determined, each divided image interior is compressed in the step S46 according to this determination and further, in the step S46, the compression discriminating information and compressed image information are recorded.

Figure 64:
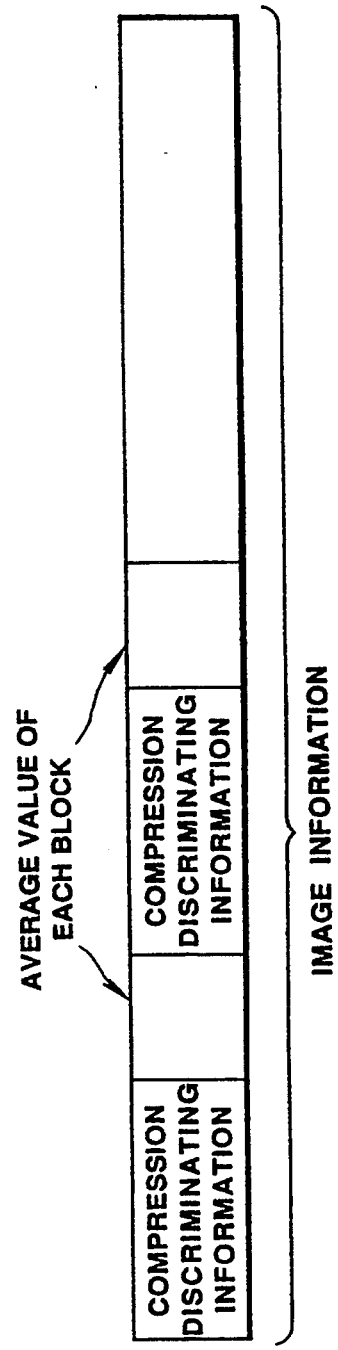

In the recording system for the recording system part 455, as shown in FIG. 64, the compression discriminating information regarding what compression number each image is compressed is recorded at the top and then the average value of each block is recorded. In the reproduction, the expansion is made on the basis of said compression discriminating information.

Thereby, as shown in the following table, in response to the brightness within each block of one image, the compressing rate of each block is varied and the darker, the higher the compression and the lower the picture quality in the reproduction. Because the very small part of such dark part within one image cannot be clearly observed, even if the picture quality is (more or less)

reduced by elevating the compressing rate, the diagnosis by reproducing the image will not be substantially influenced.

|  | Brightness | |
| --- | --- | --- |
|  | Dark ← | → Bright |
| Compressing rate | 0 < 1 < 2 < 3 | |
|  | High compression | Low compression |
| Picture quality in reproduction | Bad ← | → Good |

The compressing rate, for example, of 0~3 steps is determined by providing a plurality of, preferably, four kinds, of quantizers different in the quantizing gradation shown in the above-described twentieth and twenty-second embodiments and selecting one of them in response to the brightness information. In this twenty-third embodiment, the image compressing method is not limited to the predictive coding method but may be a DCT method as required.

The twentieth and twenty-third embodiments can be applied not only to a frame sequential type electronic endoscope using RGB signals but also to a monoplate type electronic endoscope decoding composite video signals. The endoscope may be either of a type having an imaging device in the tip part or a type in which an image is led out of an observed object through an image guide by optical fibers and is received by an imaging device.

As explained above, according to the twentieth to twenty-third embodiments, the compressing rate is varied in the bright part and dark part of a compressed image so that a favorable picture quality may be obtained with a small number of bits.

FIGS. 65 to 71 show a twenty-fourth embodiment of the present invention.

As shown in FIG. 65, an electronic endoscope apparatus of a frame sequential imaging system comprises a control signal generating part 512 generating a predetermined control signal in each later described block, a CCD (charge coupled device) 501 which is a solid state imaging device imaging an object to be imaged, an amplifier 502 amplifying and processing the imaging signal of this CCD 501 to convert it to a video signal, a γ-circuit 503 correcting the gamma of the video signal amplified by this amplifier 502 and an analog-to-digital converter (mentioned as an A/D converter hereinafter) 504 converting the video signal which is the above-described analog signal having had γ corrected to the data of a digital signal by the control signal of said control signal generating part 512. The electronic endoscope apparatus further comprises a selector 505 which switches the digital signal from the A/D converter 504 to the respective memories of a memory part 506 by the control signal of the control signal generating part 512 and outputs it, a red wavelength region memorizing R memory 506R, green wavelength region memorizing G memory 506G and blue wavelength region memorizing B memory 506B provided in said memory part 506, a D/A converter part 507 which includes digital-to-analog converters (mentioned as D/A converters hereinafter) converting the data memorized in the memory part 506 from the digital signals to analog signals by the control signal of the control signal generating part 512 and is provided with a D/A converter 507R corresponding to the R memory 506R, a D/A converter 507G corresponding to the G memory 506G and a D/A converter 507B corresponding to the B memory 506B and a synchronizing signal generating circuit 513 generating such predetermined synchronizing signal as a horizontal synchronizing signal required by a monitor, (not illustrated) by the control signal of the control signal generating part 512. The electronic endoscope apparatus further comprises a lamp 510 generating an illuminating light to be fed to the part or the like to be imaged by said CCD 501, a rotary filter 509 on which are arranged filters separating the light of this lamp into a red wavelength region, green wavelength region and blue wavelength region, a motor 511 rotating the rotary filter 509 by the control signal of the control signal generating part 512 and a light guide 508 leading the above-described separated illuminating light to the part to be imaged by said CCD 501.

The CCD 501 is connected to the input end of the amplifier 502. The output end of the amplifier 502 is connected to the input end of the γ circuit 503. The output end of the γ circuit 503 is connected to the input end of the A/D converter 504. The output end of the D/A converter 504 is connected to the input end of the selector 505.

The input ends of the R memory 506R, G memory 506G and B memory 506B are respectively connected to the output end of the selector 505. The output end of the R memory 506R is connected to the input end of the D/A converter 507R and to the input end of a later-described endoscope image data compressing apparatus (hereinafter mentioned as an image data compressing apparatus) 520. The output end of the G memory 506G is connected to the input end of the D/A converter 507G and to the input end of the later-described image data compressing apparatus 520. The output end of the B memory 506B is connected to the input end of the D/A converter 507B and to the input end of the later-described image data compressing apparatus 520.

The output end of the D/A converter 507R is connected to a monitor (not illustrated) through an output terminal 514R. The output end of the D/A converter 507G is connected to a monitor (not illustrated) through an output terminal 514G. The output end of the D/A converter 507B is connected to a monitor (not illustrated) through an output terminal 514B. The output end of the synchronizing signal generating circuit 513 is connected to a monitor (not illustrated) through an output terminal 514S.

The control signal input ends of the A/D converter 504, selector 505, memory part 506, D/A converter 507, motor 511 and synchronizing signal generating circuit 513 are respectively connected to the output ends of the control signal generating part 512. Also, one output end of the control signal generating part 512 is connected to the input end of the later-described image data compressing apparatus 520.

The image data compressing apparatus 520 is provided with an image judging part 521 for judging whether or not an ordinary image from the data of the memory part 506 and an image compressing part 522 compressing data by the result of the image judging part 521.

The image recording part 523 records the data compressed by the image data compressing apparatus 520 by using such a large capacity recording medium as a photodisc or photomagnetic disc.

Figure 66:
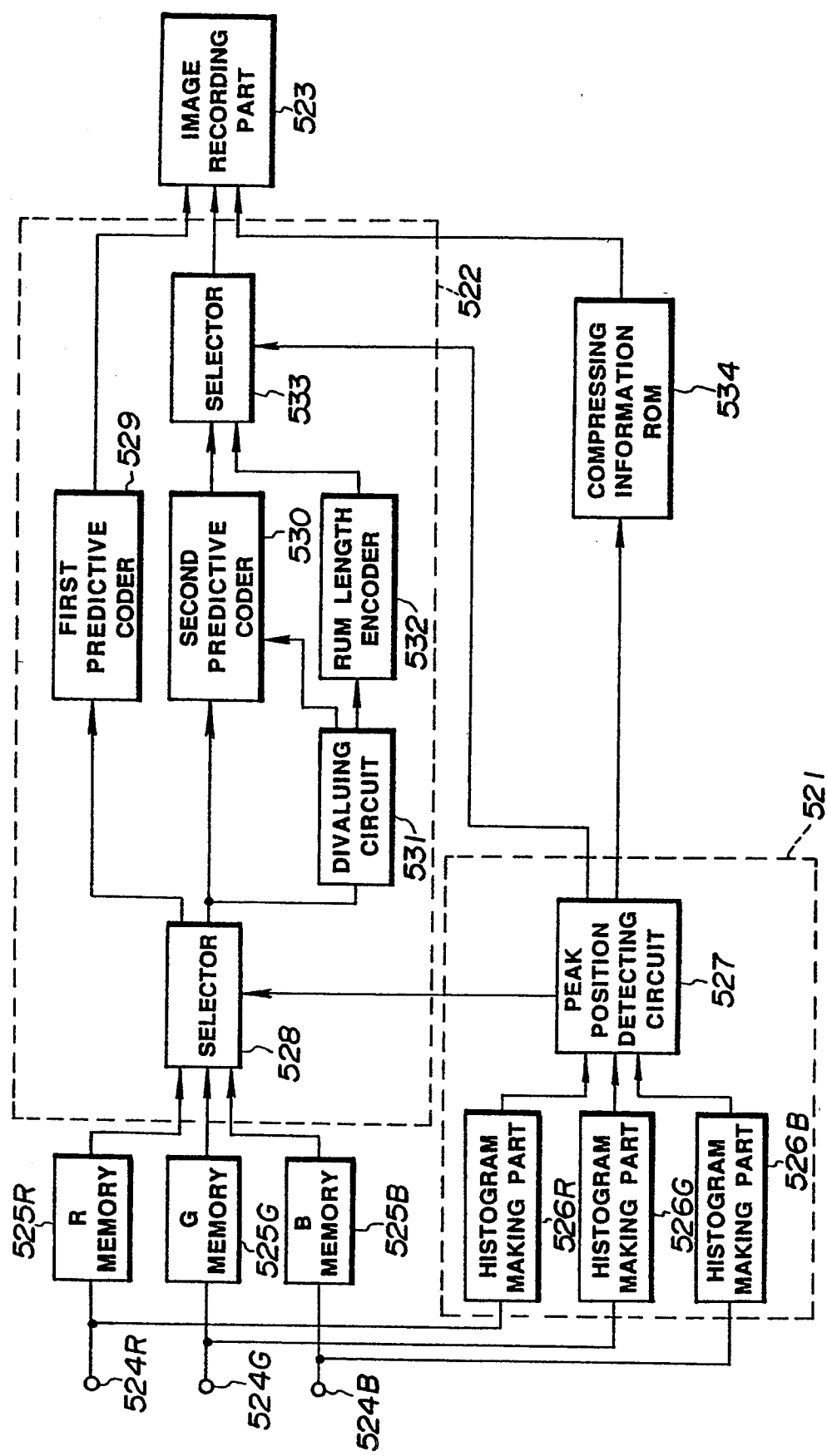

As shown in FIG. 66, the image data compressing apparatus 520 comprises input terminals 524R, 524G and 524B, an R memory 525R which is a working memory memorizing the input data in the red wavelength region, a G memory 524G the same in the green wavelength region, a B memory 525B the same in the blue wavelength region, the above-described image judging part 521 and image compressing part 522 and a compressing information ROM 534 memorizing such discriminating information as of the compression.

The image judging part 521 comprises a histogram making part 526R making a histogram of the red wavelength region from the input data of the red wavelength region, a histogram making part 526G the same of the green wavelength region, a histogram making part 526B the same of the blue wavelength region and a peak position detecting circuit 527 which detects the peak positions of the respective histograms of said histogram making parts 526R, 526G and 526B and controls the later-described selectors 528 and 533 and compressing information ROM 534 by this detecting result.

The image compressing part 522 comprises a selector 528 switching the outputs of said R memory 525R, G memory 525G and B memory 525B to the later-described first predictive coder 529, second predictive coder 530 and divaluing circuit 531, a first predictive coder 529 which is a first compressing means, a second predictive coder 530 which is a second compressing means, a divaluing circuit 531 divaluing the signal from said selector 528, for example, to 0 and 255, a run length coder 532 converting the output signal of the divaluing circuit 531 to a run length code and compressing it and a selector 533 switching the outputs of the second predictive coder 530 and run length coder 532 to the image recording part 523 and outputting them. As shown in FIG. 67, the second predictive coder 530 comprises a subtractor 530a determining the difference between the original image data from the selector 528 and the divalued image data from the divaluing circuit 531 and a predictive coder 530b predictively coding the output data of this subtractor 530a.

The input ends of the R memory 525R and the histogram making part 526R are connected to the input terminal 524R. The input ends of the G memory 525G and the histogram making part 526G are connected to the input terminal 524G. The input ends of the B memory 525B and the histogram making part 526B are connected to the input terminal 524B.

The output ends of the R memory 525R, G memory 525G, B memory 525B are respectively connected to the input end of the selector 528.

The output ends of the histogram making parts 526R, 526G and 526B are respectively connected to the input end of the peak position detecting circuit 527.

In the peak position detecting circuit 527, the first output end is connected to the control end of the selector 528, the second output end is connected to the control end of the selector 533 and the third output end is connected to the compressing information ROM 534.

In the selector 533, the first input end is connected to the output end of the second predictive coder 530 and the second input end is connected to the run length coder 532.

In the image recording part 523, the first input end is connected to the output end of the first predictive coder 529, the second input end is connected to the output end of the first predictive coder 529 and the third input end is connected to the compressing information ROM 534.

The operation of the thus-formed image data compressing apparatus shall be explained.

As shown in FIG. 65, the rotary filter 509 is rotated by the motor 511 rotated in synchronization with the control signal of the control signal generating part 512 and separates the illuminating light of the lamp 510 into red, green and blue wavelength regions. These separated illuminating lights are led through the light guide 508 and are radiated to an object to be imaged.

The object light bundle of the object illuminated by the above-described illuminating lights forms an image on the imaging surface of the CCD 501 by an objective lens (not illustrated) and the image is photoelectrically converted to be an imaging signal which is input into the amplifier 502.

The amplifier 502 removes noises from the above-described imaging signal and is amplified as a video signal so as to be in a fixed voltage range, for example, of 0~1 V and is output to the $\gamma$ circuit 503.

The $\gamma$ circuit 503 converts the above-described video signal to have gamma characteristics and outputs it to the A/D converter 507.

The A/D converter 507 converts the video signal having the above-described gamma characteristics to a digital signal having, for example, 8 bits, that is, quantizes it and outputs it to the selector 505.

The selector 505 synchronizes the digital signal with the control signal of the control signal generating part 512 and outputs it to the respective memories of the memory part 506. Whenever the wavelength region of the separated light of the illuminating light is red, the digital signal will be output to the R memory 506R, and in the same manner, whenever the wavelength region is green, it will be output to the G memory 506G and, in case the region is blue, it will be output to the B memory 506B. It is input and recorded in the memory equal to the wavelength region of the light bundle of the imaged object.

The respective memories of the memory part 506 output the memorized data to the D/A converter part 507 and image data compressing apparatus 520 by the control signal. The data sequentially input by the selector 505 are simultaneously output to the D/A converter part 507, that is, the sequentially imaged object light bundles of the respective wavelength regions are synchronized.

The D/A converter 507R of the D/A converter part 507 converts the digital signal of the data memorized in the R memory 506R to an analog signal and outputs it to the output terminal 514R. The D/A converter 507G converts the digital signal of the data memorized in the G memory 506G to an analog signal and outputs it to the output terminal 514G. The D/A converter 507B converts the digital signal of the data memorized in the B memory 506B to an analog signal and outputs it to the output terminal 514B.

At the same time, by the control signal of the control signal generating part 512, the synchronizing signal generating circuit 513 generates such predetermined synchronizing signal as a horizontal synchronizing signal required by a monitor (not illustrated) and outputs it to the output terminal 514S.

By the signals output to the output terminals 514R, 514G, 514B and 514S, a monitor (not illustrated) displays, as a color image, the object imaged by the CCD 501.

The data memorized in the R memory 506R of the memory part 506 are input into the input terminal 524R of the image data compressing apparatus 520, as shown in FIG. 66, by the control signal of the control signal generating part 512. In the same manner, the data memorized in the G memory 506G are input into the input terminal 506G and the data memorized in the B memory 506B are input into the input terminal 524B.

The data of the red wavelength region input into the input terminal 524R are memorized in the R memory 524R and are input into the histogram making part 526R. The data of the green wavelength region input into the input terminal 524G are memorized in the G memory 525G and are input into the histogram making part 526G. The data of the blue wavelength region input into the input terminal 524B are memorized in the B memory 525B and are input into the histogram making part 526B.

The histogram making part 526R makes a histogram of the red wavelength region from the data input as described above and outputs it to the peak position detecting circuit 527. The histogram making part 526G makes a histogram of the green wavelength region from the data input as described above and outputs it to the peak position detecting circuit 527. The histogram making part 526B makes a histogram of the blue wavelength region from the data input as described above and outputs it to the peak position detecting circuit 527.

The output signals of said histogram making parts 526R, 526G and 526B, as described later, cause the peak position detecting circuit 527 to detect the peak positions of the respective histograms of the red wavelength region, green wavelength region and blue wavelength region and controls the selectors 528 and 533.

The operation of the peak position detecting circuit 527 shall be explained by using FIGS. 68(A) to (C) and 69(A) to (C). FIGS. 68 (A) to (C) are explanatory diagrams showing examples of density value histograms of R, G and B respectively. In the ordinary observation, in the histogram, for example, of the red wavelength region (R), the generating frequency is high in the part of a high level, in the histogram of the green wavelength region (G), the generating frequency is high in the part of an intermediate level and, in the histogram of the blue wavelength region (B), the generating frequency is high in the part of a low level. Therefore, if the level high in the generating frequency in the red wavelength region (R) is represented by PR, the level high in the generating frequency in the green wavelength region (G) is represented by PG and the level high in the generating frequency in the blue wavelength region (B) is represented by PB, the relation of PR>PG>PB will hold.

FIGS. 69(A) to (C) are explanatory diagrams showing, respectively, examples of histograms of the density values of R, G and B of the observed image in case the image is dyed, for example, with methylene blue and is observed. In the observation by dyeing or the like, in the histogram, for example, of the red wavelength region (R), the generating frequency is high in the part of the high level, in the histogram of the green wavelength region (G), the generating frequency is high in the part of the low level and, in the histogram of the blue wavelength region (B), the generating frequency is high in the part of the high level. Therefore, if the level high in the generating frequency in the red wavelength region (R) is represented by PR, the level high in the generating frequency in the green wavelength region (G) is represented by PG and the level high in the generating frequency in the blue wavelength region (B) is represented by PB, the relation of PB≧PR>PG will hold.

Therefore, the peak position detecting circuit 527 detects the above-described relation and judges whether the observation is ordinary or by dyeing.

The peak position detecting circuit 527 controls the selector 528 so that, in the case of the ordinary observation as described above, the output of the selector 528 may be output to the first predictive coder 529 and, in the case of the observation by dyeing or the like, the output of the selector 528 may be output to the second predictive coder 529 and divaluing circuit 531.

The selector 528 outputs the signals of the R memory 525R, G memory 525G and B memory 525B to the first predictive coder 529, second predictive coder 529 and divaluing circuit 531, as described above.

The first predictive coder 529 calculates a predictive error by the predictive coding method mentioned, for example, on pages 217 to 219 of "Image Processing Handbook" (published by Shokodo Co.) and outputs it to the image recording part 528 as data.

Figure 70A:
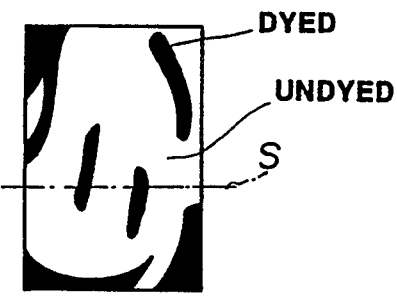
FIGS. 70(A) to (C) are explanatory views for explaining compressing operations of dyed images.
Figure 70B:
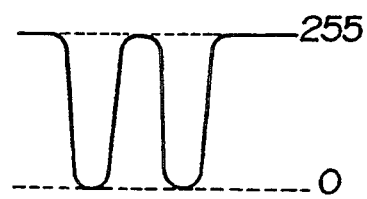
Figure 70C:
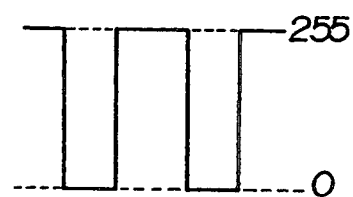

The operation of the divaluing circuit 531 shall be explained by using FIGS. 70(A) to (C).

As described above, as shown, for example, in FIG. 70(A), the image by dyeing becomes an image in which signals of an intermediate brightness level in which the dyed part and non-dyed part are definitely distinguished from each other are few in number. This is the same in the respective wavelength regions. In the part of the scanning position S, as shown in FIG. 70(B), it is limited to the data of substantially 0 and substantially 255. Therefore, the signals between 0 and 255 are of an information amount in a negligible range and can be represented substantially by two values. The divaluing circuit 531 converts the substantially divalued signals shown in FIG. 70(B) to be of two values of 0 and 255 as shown in FIG. 70(C).

The calculation of predictive errors by using the above-described divaluing shall be explained by using FIGS. 71(A) and (B).

Figure 71:
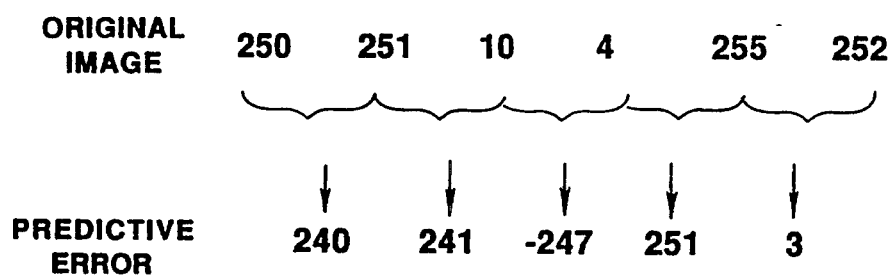
Figure 71B:
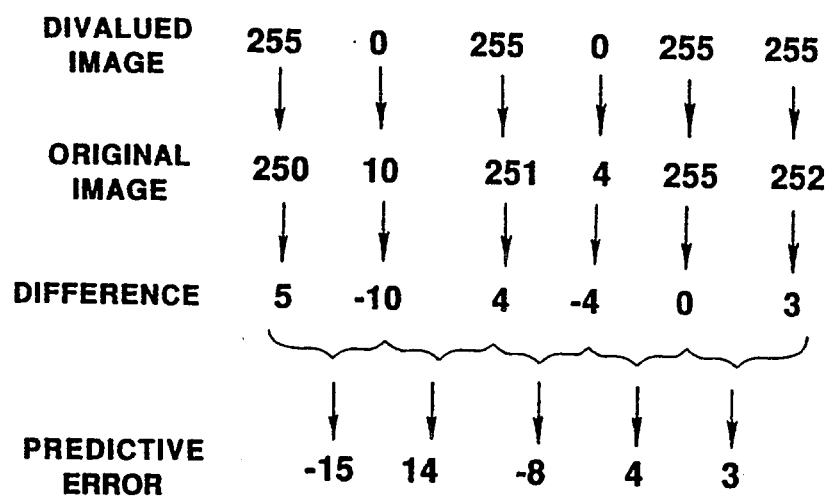

If the predictive errors are calculated from the original image, as shown, for example, in FIG. 71(A), the range of the predictive errors as a result of the calculation will expand. However, if the original image is divalued, as described above, the difference of subtracting the original image from the divalued data is used and the predictive errors are calculated by the difference, as shown by FIG. 71(B), the range of the predictive errors will become narrow. That is to say, the compressing rate will improve.

The second predictive coder 530 determines by the subtractor 530a the difference as described above from the data of the original picture and the divalued data of the original image by the divaluing circuit 31, calculates by the predictive coder 530b the predictive errors the same as by the first predictive coder 529 and outputs them to the selector 530.

Also, the run length coder 532 further compresses the data input from the divaluing circuit 531 by converting them to run length codes and outputs them to the selector 533.

The selector 533 sequentially switches the data output from the second predictive coder 530 with the data output from the run length coder 532 by the control of the peak position detecting circuit 527 and outputs them to the image recording part 523.

At the same time, the peak position detecting circuit 527 controls the compressing information ROM 534 so that the compressing information ROM 534 may output to the image recording part 523 the discriminating information as to whether an ordinary observed image has been compressed and recorded or an observed image by dyeing or the like has been compressed and recorded.

The image recording part 523 records in such large capacity recording medium as a photodisc or photomagnetic disc the data input from the first predictive coder 529 or selector 533 and compressing information ROM 534.

As described above, in the image obtained by ordinary observation, the variation of the density in the red, green and blue wavelength regions is comparatively smooth and the correlation between adjacent pixels is high. Also, the image observed by dyeing is similar to a divalued image, is sharp in the density variation and is low in the correlation between adjacent pixels.

In this embodiment, it is judged by the histogram of the observed image whether by an ordinary observation or by an observation by dyeing. In case the image is by an ordinary observation, it will be compressed by the predictive coding. In case the image is by dyeing, a divalued image will be formed and the difference between the original image and the divalued image will be obtained and will be compressed by the predictive coding. The difference is so small in the variation between adjacent pixels as to be able to be highly compressed by the predictive coding.

There is an effect that either an image by an ordinary observation or an image observed by dyeing can be made high in compressing efficiency.

In the case of an image by dyeing, a divalued image will be recorded as compressed by a run length code and therefore the original image will be able to be faithfully restored.

Figure 72:
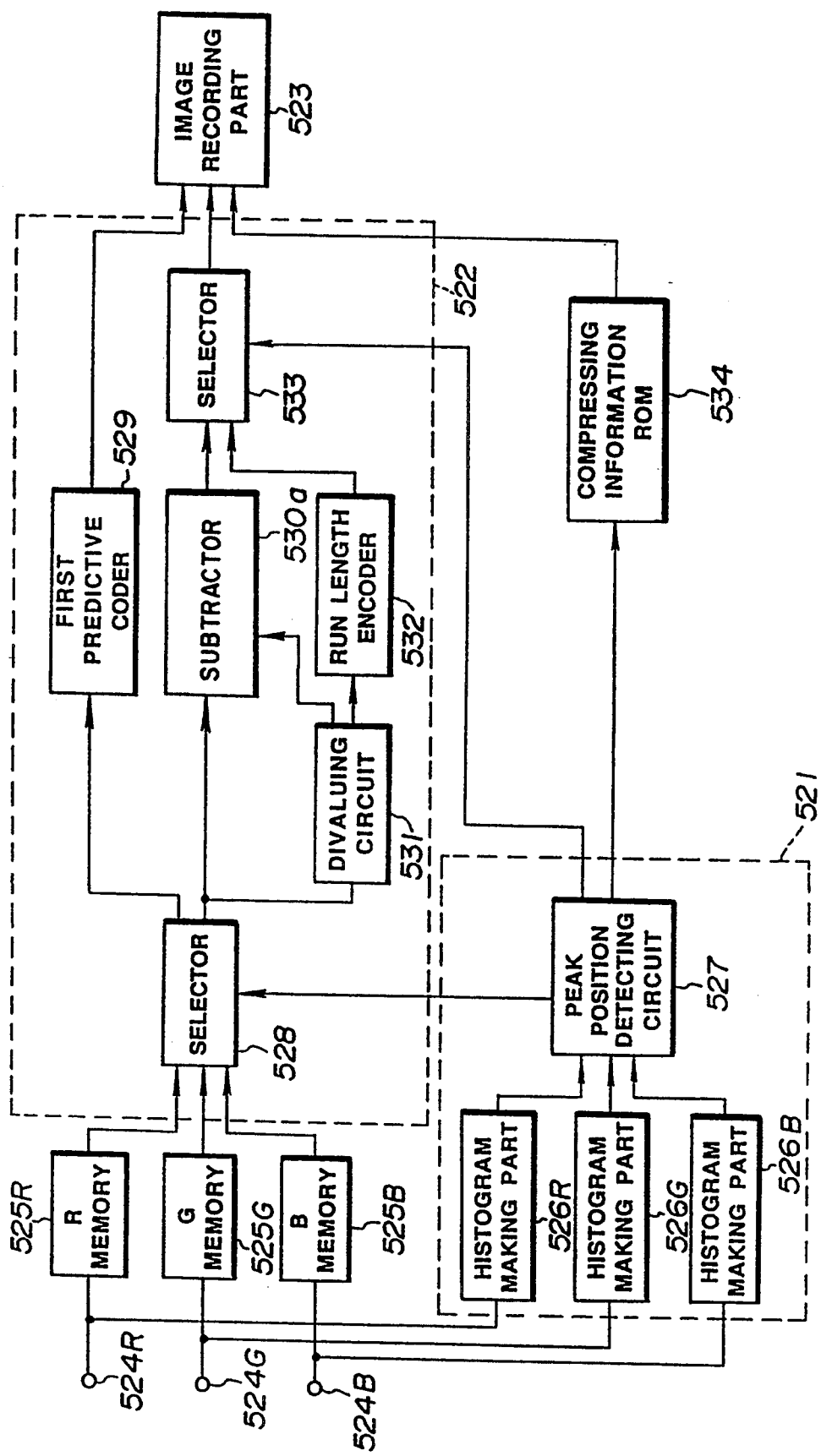
FIG. 72 is a block diagram showing an image data compressing apparatus in the twenty-fifth embodiment of the present invention.

FIG. 72 shows a twenty-fifth embodiment of the present invention.

In this embodiment, a subtractor 530a determining the difference between the original image data from the selector 528 and the divalued image data from the divaluing circuit 531 is provided instead of the second predictive coder 530 in the twenty-fourth embodiment. The output data of this subtractor 530a and the output data of the run length coder 532 are recorded in the image recording part 523 through the selector 533.

As shown in FIG. 71(B), the difference between the original image data and divalued image data is so small in the variation between the adjacent pixels that, by determining this difference, the data are compressed. By recording this difference and the run length-coded divalued image data, the original image can be faithfully restored from these data.

The other formations, operations and effects are the same as in the twenty-fourth embodiment.

Figure 73:
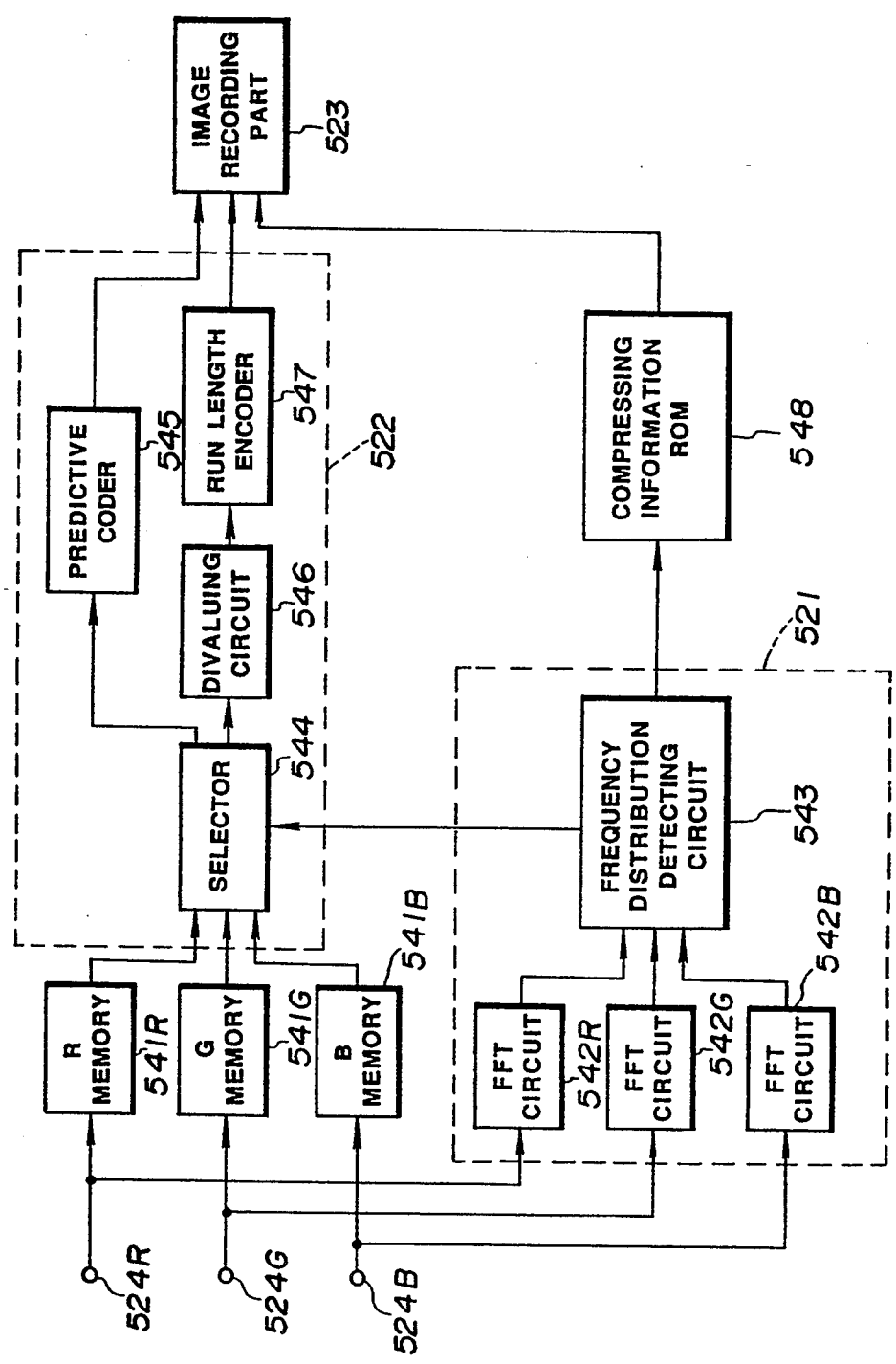

FIGS. 73 and 74 show the twenty-sixth embodiment of the present invention. The same components as in the twenty-fourth embodiment shall bear the same reference numerals and shall not be explained here. The frame sequential imaging type electronic endoscope apparatus is of the same formation and operation as are shown in FIG. 65 of the twenty-fourth embodiment and shall not be explained here.

As shown in FIG. 73, an image data compressing apparatus 520 in this embodiment comprises an R memory 541R which is a working memory memorizing input red wavelength region data, a G memory 541G which is the same of the green wavelength region, a B memory 541B which is the same of the blue wavelength region, the above-described image judging part 521 and image compressing part 522 and an image information ROM 548 in which such discriminating information as the compression is memorized.

The image judging part 521 comprises an FFT (Fast Fourier Transforming) circuit 542R calculating a power spectrum of the red wavelength region from the input red wavelength region data, an FFT circuit 542G of the same of the green wavelength region, an FFT circuit 542B of the same of the blue wavelength region and a frequency distribution detecting circuit 542 which detects the frequency distributions of the respective wavelength regions from the respective power spectra of said FFT circuits 542R, 542G and 542B and controls the later-described selector 544 and compressing information ROM 548 by the detected results.

The image compressing part 522 comprises a selector 544 switching the outputs of said R memory 541R, G memory 541G and B memory 541B to the later-described predictive coder 545 and divaluing circuit 546, a predictive coder 545 which is a first compressing means, a divaluing circuit 546 divaluing the signal from said selector 528, for example, to 0 and 255 and a run length coder 547 which is a second compressing means converting the output signal of said divaluing circuit 531 to a run length code and compressing it.

The input ends of the R memory 541R and FFT circuit 542 are connected to the input terminal 524R. The input ends of the G memory 541G and FFT circuit 542G are connected to the input terminal 524G. The input ends of the B memory 541B and FFT circuit 542B are connected to the input terminal 524B.

The outer ends of the R memory 541R, G memory 541G and B memory 541B are connected to the input end of the selector 544.

The output ends of the FFT circuit 542R, FFT circuit 542G and FFT circuit 542B are connected to the input end of the frequency distribution detecting circuit 543.

The frequency distribution detecting circuit 543 has the first output end connected to the control end of the selector 544 and the second output end connected to the compressing information ROM 548.

The image recording part 523 has the first input end connected to the output end of said predictive coder 545, the second input end connected to the output end of the run length coder 547 and the third input end connected to the compressing information ROM 548.

The operation of the thus-formed image data compressing apparatus shall be explained.

As in the twenty-fourth embodiment, red wavelength region data are input into the input terminal 524R, green wavelength region data are input into the input terminal 524G and blue wavelength region data are input into the input terminal 524B.

The red wavelength region data input into the input terminal 524R are memorized in the R memory 541R and are input into the FFT circuit 542R. The green wavelength region data input into the input terminal 524G are memorized in the G memory 541G and are input into the FFT circuit 542G. The blue wavelength region data input into the input terminal 524B are memorized in the B memory 541B and are input into the FFT circuit 512B.

The FFT circuit 542R Fourier-converts the data input as described above, calculates the power spectrum of the red wavelength region and outputs it to the frequency distribution detecting circuit 543. The FFT circuit 542G calculates the power spectrum of the green wavelength region in the same manner and outputs it to the frequency detecting circuit 543. The FFT circuit 542B calculates the power spectrum of the blue wavelength region in the same manner and outputs it to the frequency detecting circuit 543.

The frequency distribution detecting circuit 543 calculates the respective frequency distribution ranges of the red wavelength region, green wavelength region and blue wavelength region by the output signals of the FFT circuits 542R, 542G and 542B as described later and controls the selectors 523 and 533.

The operation of the frequency distribution detecting circuit 543 shall be explained by using FIGS. 74(A) to (D).

Figure 74A:
FIGS. 74(A) to (D) are explanatory views for explaining peripheral frequency distributions of endoscope images.
Figure 74B:
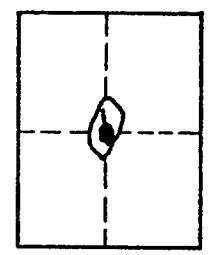
Figure 74C:
Figure 74D:
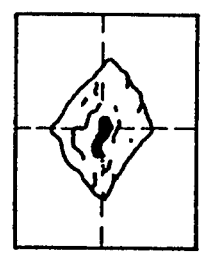

As shown, for example, in FIG. 74(A), the image by the ordinary observation is low in the contrast and is slow in the variation of the density. Therefore, if the frequency distribution is illustrated as a power spectrum, as shown in FIG. 74(B), an image with a low frequency component concentrated at an origin will be made. Also, as shown, for example, in FIG. 74(C), the image of the observation by dyeing will be high in contrast and sharp in the variation of the density. Therefore, if the frequency distribution is illustrated as a power spectrum, as shown in FIG. 74(D), an image containing high frequency components distributed in a wide range with the origin as a center will be made. The frequency distribution detecting circuit 543 judges whether the image is by the ordinary observation or of the observation by dyeing by the rate of the above-described high frequency components.

As described above, the frequency distribution detecting circuit 543 controls the selector 544 so that the output of the selector 544 may be output to the predictive coder 545 in the case of the ordinary observation but to the divaluing circuit 546 in the case of the observation by dyeing or the like.

As described above, the selector 544 outputs the signals of the R memory 541R, G memory 541G and B memory 541B to the predictive coder 545 and divaluing circuit 546.

The predictive coder 545 calculates predictive errors by the same predictive coding method as in the twenty-fourth embodiment and outputs them as data to the image recording part 523.

In the case of quantizing the input data, for example, with 8 bits, in the divaluing circuit 546, 128 and more are made 255, less than 128 are made 0 and the data are output to the run length coder 547.

The run length coder 547 converts the data, for example, of 0 or 255 input from the divaluing circuit 516 to run length codes, further compresses them and outputs them to the image recording part 523.

At the same time, the frequency distribution detecting circuit 543 controls the compressing information ROM 548 so that the compressing information ROM 548 may output to the image recording part 523 discriminating information as to whether the ordinary observed image is compressed and recorded or the observed image by dyeing is compressed and recorded.

The image recording part 523 records the data input from the predictive coder 545 or the run length coder 547 and compressing information ROM 548 in a large capacity recording medium such as a photodisc or photomagnetic disc.

In this embodiment, by the frequency distribution of the observed image, whether the image is by the ordinary observation or of the observation by dyeing is judged, in the case of the image by the ordinary observation, the image will be compressed by the predictive coding and, in the case of the image by dyeing, the dyed part required in the diagnosis by the image by two values and the non-dyed part will be made definite and the image by these two values will be converted to a run length code and will be compressed.

There is an effect that either an image by the ordinary observation or an image observed by dyeing can be compressed at a high efficiency.

The image by the ordinary observation and the image of the observation by dyeing may be switched with each other by a switch.

Also, a conversion coding, for example, of a discrete cosine conversion (DCT) and a vector quantizing may be used for the compressing means.

The reference value of the divaluing may be made variable by the characteristics of the observed image.

In the twenty-fourth to twenty-sixth embodiments, an electronic endoscope apparatus of a frame sequential imaging system is used in the explanation. However, for example, a composite signal decoding means may be provided in the front step of the video signal input terminal of each wavelength region so that a composite video signal may be input.

Also, an externally fitted TV camera apparatus may be fitted to an endoscope using an image guide to be used for this video processor.

As explained above, according to the twenty-fourth to twenty-sixth embodiments, a compressing means adapted to the observed image can be selected by judging whether or not the image is an ordinary observed image and an observed image high in the compressing effect either in an ordinary observed image or in such specially observed image as by dyeing can be recorded.

FIGS. 75 to 78 show a twenty-seventh embodiment of the present invention.

In the endoscope apparatus in this embodiment, as shown in FIG. 76, an image data compressing apparatus 620 is provided instead of the image data compressing apparatus 520 of the endoscope apparatus in the twenty-fourth embodiment shown in FIG. 65 and an image recording apparatus 622 is provided instead of the image recording apparatus part 523. The other formations and operations of the endoscope apparatus of this embodiment are the same as in the twenty-fourth embodiment.

The image data compressing apparatus 620 is provided with such image compressing part 621 as is shown in FIG. 75 wherein data from the memory part 506 are compressed.

The image recording apparatus 622 records the data compressed by the image data compressing apparatus 620 by using a large capacity recording medium such as a photodisc or photomagnetic disc.

As shown in FIG. 75, the image compressing part 621 within the image data compressing apparatus 620 comprises a memory part 624 having respective R, G and B working memories 624R, 624G and 624B, a selector 625 selecting and outputting the respective memories of said memory part 624, a compressing part 626 having blocking circuits 626a, 626b and 626c which are compressing means, a picture quality judging circuit 627 comparing and evaluating the output signal of the compressing part 626 and the present signal and controlling a later described selector 628 and compressing information ROM 630, the selector 628 selecting and outputting one of the blocking circuits of the compressing part 626 by the control of the picture quality judging circuit 627, a predictive coder 629 predictively coding and compressing the signal selected by the selector and a control signal generating part 631 generating a control signal to the memory part 624, selector 625, picture quality judging circuit 627 and image recording apparatus 622.

The input end of the R memory 624R is connected to an input terminal 623R. The input end of the G memory 624G is connected to an input terminal 623G. The input end of the B memory 624B is connected to an input terminal 623B.

The output ends of the R memory 624R, G memory 624G and B memory 624B are connected, respectively, to the input ends of the selector 625.

The output end of the selector 625 is connected to the original image input ends of the blocking circuits 626a, 626b and 6262c and picture quality judging circuit 627.

The output ends of the blocking circuits 626a, 626b and 626c are connected to the input ends of the picture image judging circuit 627 and selector 628.

The image judging circuit 627 has the first output end connected to the control end of the selector 628a and the second output end connected to the input end of the compressing information ROM 630.

The output end of the selector 628 is connected to the input end of the predictive coder 629 whose output end is connected to the first input end of the image recording apparatus 622.

The output end of the compressing information ROM 630 is connected to the second input end of the image recording apparatus 622.

The control signal generating part 631 has the respective output ends connected to the control signal input ends of the memory part 624, selector 625, picture quality judging circuit 627 and image recording apparatus 622.

As shown in FIG. 77, each of the blocking circuits 626a, 626b and 626c comprises a main memory 632 memorizing input signals, an address counter 637 which is a counter for reading out a noted pixel of the main memory 632 and a matrix counter 635 generating the address of the noted pixel with the address by the address counter 637 in the center. The blocking circuit further comprises a coefficient ROM 636 in which the coefficient for the address of the matrix counter 635 is recorded, an accumulating multiplier 633 multiplying the main memory 632 by the coefficient in the matrix range with the noted pixel of the coefficient ROM 636 in the center and accumulatively adding the products and an abnormal value correcting circuit 634 concentrating the output results of the accumulating multiplier 633 in a predetermined range in case the output results deviate from the predetermined range. The blocking circuit further comprises a peripheral part detecting circuit 638 detecting that the value of the address counter 637 is in the peripheral part of the picture, a peripheral part data ROM 639 generating video data of the peripheral part by the peripheral part detecting circuit 638, a selector 640 switching the outputs of the abnormal value correcting circuit 634 and peripheral part data ROM 639 by the control of the peripheral part detecting circuit 638 and a sub-memory 641 memorizing the video data switched and input by the data selector 640.

The main memory 632 has the input end connected to an input terminal 631 and the output end connected to the first input end of the accumulating multiplier 633.

The address counter 637 has the first output end connected to the matrix counter 635 and the second output end connected to the peripheral part detecting circuit 638.

The matrix counter 635 has the first output end connected to the address end of the main memory 632 and the second output end connected to the coefficient ROM 636.

The output end of the coefficient ROM 636 is connected to the second input end of the accumulating multiplier 633.

The output end of the accumulating multiplier 633 is connected to the input end of the abnormal value correcting circuit 634.

The output end of the abnormal value correcting circuit 634 is connected to the input end of the data selector.

The peripheral part detecting circuit 638 has the first output end connected to the input end of the peripheral part data ROM 639 and the second output end connected to the control end of the data selector 640.

The output end of the peripheral part data ROM 639 is connected to the second input end of the data selector 640.

The output end of the data selector 640 is connected to the input end of the sub-memory 641.

The output end of the sub-memory 641 is connected to an output terminal 642.

The operation of the thus-formed image data compressing apparatus 620 is explained below.

The data memorized in the R memory 506R of the memory part 506 in FIG. 76 are input into the input terminal 623R of the image data compressing apparatus 620, as shown in FIG. 75, by the control signal of the control signal generating part 512. In the same manner, the data memorized in the G memory 506G are input into an input terminal 623G. In the same manner, the data memorized in the B memory 506B are input into an input terminal 623B.

The R data input into the input terminal 624R are memorized in the R memory 625R by the control signal of the control signal generating part 631. The G data input into the input terminal 624G are memorized in the G memory 625G in the same manner. The B data input into the input terminal 624B are memorized in the B memory 625B in the same manner.

The selector 625 outputs sequentially in the order of R, G and B the R, G and B data memorized respectively in the R memory 624R, G memory 624G and B memory 624B to the blocking circuits 626a, 626b and 626c and image judging circuit 627 by the control of the control signal generating part 631.

As shown in FIG. 77, the blocking circuits 626a, 6262b and 626c sequentially process the R, G and B data input sequentially into the input terminal 631.

The signal input into the input terminal 631 is memorized in the main memory 632.

The address counter 637 outputs an address for reading out a noted pixel to the matrix counter 635 and peripheral part detecting circuit 638.

Thereby, the matrix counter 635 controls the main memory 632 so that the noted pixel and its peripheral pixels (called a matrix hereinafter) may be input into the accumulating multiplier 633 from the main memory 632, as shown in FIGS. 78(A) to (C).

At the same time, the matrix counter 635 controls the coefficient ROM 636 so that the coefficient of the matrix corresponding to the noted pixel may be input into the accumulating multiplier 633 from the coefficient ROM 636.

The noted pixel shall be the upper side pixel in case the matrix is of 2 vertical pixels and 1 horizontal pixel (called a connected to the control end of the selector 628a and the second 1×2 matrix hereinafter) as shown, for example, in FIG. 78(A), shall be the upper left pixel in case the matrix is of 2 vertical pixels and 2 horizontal pixels (called a 2×2 matrix hereinafter) as shown, for example, in FIG. 78(B) and shall be the center pixel in case the matrix is of 3 vertical pixels and 3 horizontal pixels (called a 3×3 pixel) as shown, for example, in FIG. 78(C).

The coefficient recorded in the coefficient ROM 636 shall be ½ in the case, for example, of a 1×2 matrix, shall be ¼ in the case of a 2×2 matrix and shall be 1/9 in the case of a 3×3 matrix.

The accumulating multiplier 633 multiplies the matrix input from the main memory 632, as described above, and having the noted pixel in the center by the coefficient recorded in the coefficient ROM 636 as described above, further accumulatively adds the products and outputs the sum to the abnormal value correcting circuit 634.

The abnormal value correcting circuit 634 corrects the data input, as described above, and deviating from a predetermined range so as to be concentrated in the predetermined range and outputs them to the data selector 640.

The peripheral part detecting circuit 638 detects whether or not the present noted pixel is in the center part of the picture by the address value input from the address counter 637, controls the peripheral part data ROM 639 in case the noted pixel is in the peripheral part of the picture so as to output data corresponding to the peripheral part and controls the data selector 640 to output the data of the peripheral part data ROM 639, because, in the peripheral part of the picture, the peripheral part of the noted pixel drops and no correct operation result can be obtained from said accumulating multiplier 633.

The data selector 640 will output the data of said peripheral part data ROM 639 to the sub-memory 641 in case the noted pixel is in the peripheral part of the picture, as described above, but will output to the sub-memory 641 the data from the abnormal value correcting circuit 634 in the other case.

Further, the address counter 637 designates the noted address value so that the matrix may not overlap, repeats the above-described operation until one picture ends and further repeats the operation until all the R, G and B pictures end.

Therefore, the processed data of the three R, G and B pictures are recorded in the sub-memory 641.

If a matrix is used as described above, the data amount will be ½ in the case, for example, of a 1×2 matrix, will be ¼ in the case of a 2×2 matrix and will be 1/9 in the case of a 3×3 matrix.

The images compressed by the blocking circuits 626a, 626b and 626c, as described above, are input into the selector 628, as shown in FIG. 75, and are input into the picture quality judging circuit 627.

In the picture quality judging circuit 627, the original image input from the selector 625 and the compressed images input from the blocking circuits 626a, 626b and 626c are evaluated on the basis of S/N (signal/noise) mentioned, for example, in the "Telecommunication Society Journal 77/5 Vol. J60-B No. 5" or the entropy and the blocking circuit above a predetermined evaluated value is selected. Whenever there are a plurality of blocking circuits above the predetermined evaluated value, the above-described blocking circuit of a large matrix, that is, of a high compressing rate, will be selected. Further, the picture quality judging circuit 627 controls the selector 628 so as to output the output of the blocking circuit selected as described above and controls the compressing information ROM 630 to output such information as to which matrix is used.

By the control of the picture quality judging circuit 627, the selector 628 outputs to the predictive coder 629 the signal input into any one of the blocking circuits 626a, 626b and 626c.

The predictive coder 629 calculates predictive errors by the predictive coding method mentioned, for example, on page 217 to 219 of "Image Processing Handbook" (published by Shokodo Co.) and outputs them to the image recording apparatus 622.

The image recording apparatus 622 records in a large capacity recording medium, such as a photodisc or photomagnetic disc, the compressed image and compressing information input, as described above.

In this embodiment, images are simultaneously compressed using three kinds of blocking circuits and are then judged. Therefore, the time required for the compression is always constant. Also, as the images are compressed by blocking and are then further compressed by the predictive coding, the compressing efficiency will improve.

A large matrix is used for an image having high correlation between adjacent pixels as, for example, in an ordinary observed image and having few high frequency components so that the compressing efficiency may be elevated and a small matrix is used for an image having low correlation between adjacent pixels as, for example, in a special observed image by dyeing and having many high frequency components so that the picture quality may be prevented from being reduced.

FIGS. 79 to 83 show the twenty-eighth embodiment of the present invention. The same components as in the twenty-seventh embodiment shall bear the same reference numerals and shall not be explained here.

Figure 79:
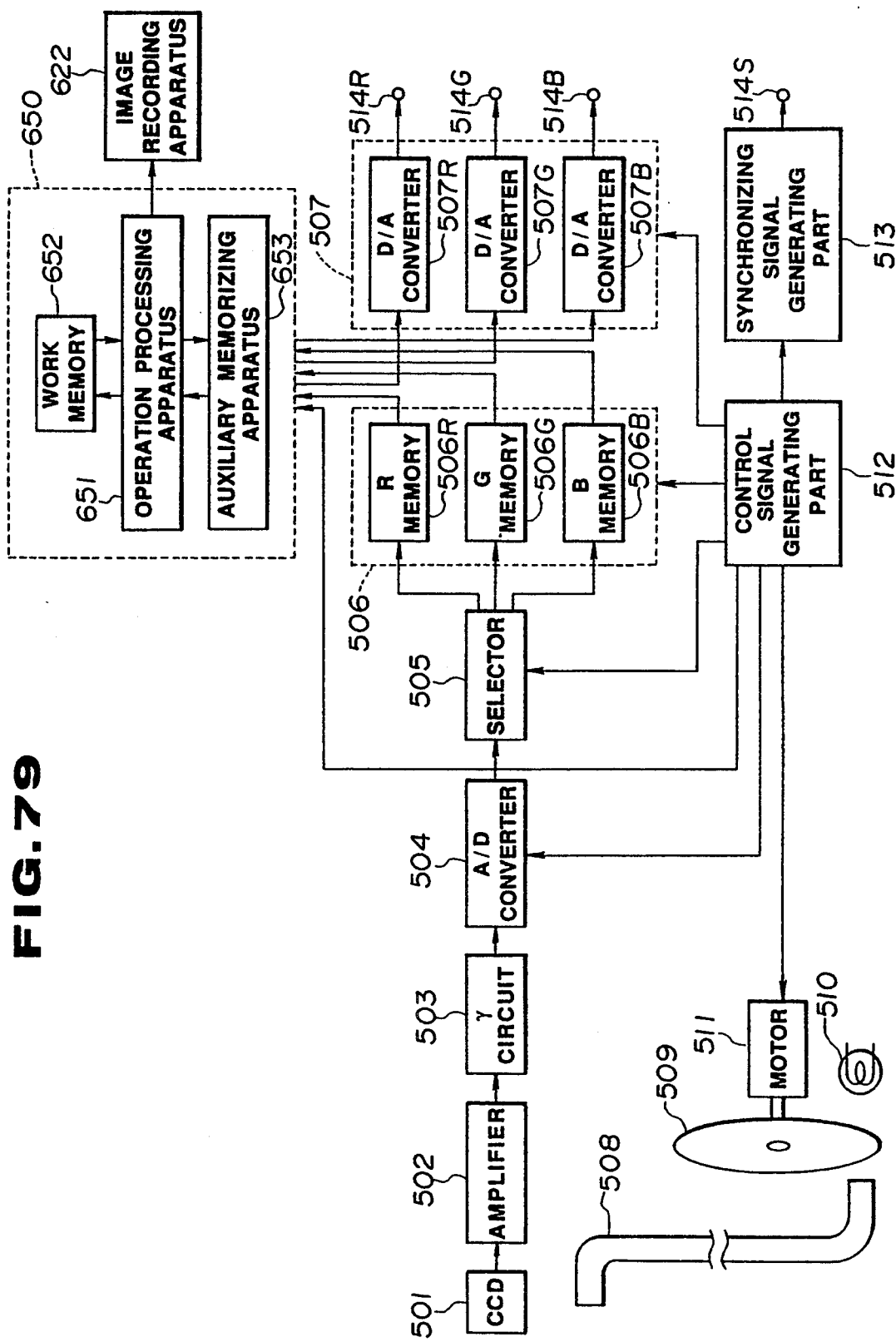

In this embodiment, an image data compressing apparatus 650 is provided instead of the image data compressing apparatus 620 in the twenty-seventh embodiment. As shown in FIG. 79, this compressing apparatus 650 comprises an operation processing apparatus 651, working memory 652 and auxiliary memorizing apparatus 653.

The working memory 652 and auxiliary memorizing apparatus 653 are connected to the operation processing apparatus 651.

The operation processing apparatus 651 is connected with an image recording apparatus 622.

To the image data compressing apparatus 650 are connected one of the control signal output ends of the control signal generating part 512, the output ends of the R memory 506R, G memory 506G and B memory 506B and the input ends of the D/A converters 507R, 507G and 507B.

The operation of the thus-formed image data compressing apparatus shall be explained below.

Usually, the output ends of the R memory 506R, G memory 506G and B memory 506B are connected, respectively, with the input ends of the D/A converters 507R, 507G and 507B within the image data compressing apparatus 650.

Therefore, as in the twenty-seventh embodiment, the image imaged by the CCD 501 is displayed as a color image on a monitor (not illustrated).

By the control signal of the control signal generating part 512, the outputs of the R memory 506R, G memory 506G and B memory 506B are input into the operation processing apparatus 651, are subjected to a later described image compressing process by the operation processing apparatus 651, working memory 652 and auxiliary memorizing apparatus 653 and are recorded in the image recording apparatus 622.

The operation processing apparatus 651 compresses the image input by predictive coding and outputs it to the image recording apparatus 622.

The predictive coding shall be explained by using FIGS. 80 to 82.

FIG. 80 illustrates signals of n' lines and n±1 lines. According to them, the n−1 lines are already read in and the value is already known. The n lines are read in until the noted pixel x and the value until said x is already known. The value of the n+1 lines is not yet known at all.

Here, if the pixel of −1 in the horizontal direction of the noted pixel x is represented by a, the pixel in the vertical direction of the noted pixel, that is, in the same horizontal position of the n−1 lines is represented by c, the pixel of −1 in the horizontal direction of this c is represented by b and the pixel of +1 in the horizontal direction of said c is represented by d, the predictive value x by a front value predicting type (front value), average predicting type (average) and composite predicting type (composite) will be as follows:

x=a (Front value)
x=½ (a+d) (Average)
x=⅝a+¼d+½c−½b (Composite)

The predictive error Δx thereby will be as follows:
Δx=x−x

Therefore, by recording the predictive error Δx, the data x of the original image can be restored from the known data. Generally the predictive error Δx is of a value smaller than of the original image x, and the information can be compressed.

FIGS. 81 and 82 show examples of frequency distributions of observed images. Whenever the prediction is made accurately, the predictive error will be zero. Whenever the predictive value is greater than the true value, the predictive error will be distributed to +but, in case the predictive value is smaller, the predictive error will be distributed to −.

FIGS. 81(A) to (C) show frequency distributions of ordinary observed images. FIG. 81(A) shows the case of using a front value predicting type. FIG. 81(B) shows the case of using an average predicting type. FIG. 81(C) shows the case of using a composite predicting type. In an ordinary observed image, the correlation between adjacent pixels is so high and high frequency components are so few that, even if the predicting type is different, the pixels will concentrate in the part in which the frequency distribution is near zero. Therefore, even if simple type, such as a front value predicting type, is used, the image will be able to be sufficiently compressed.

FIGS. 82(A) to (C) show frequency distributions of special observed images. FIG. 82(A) shows the case of using a front value predicting type. FIG. 82(B) shows the case of using an average predicting type. FIG. 82(C) shows the case of using a composite predicting type. In a special observed image, the correlation between adjacent pixels is so low and the high frequency components are so numerous that the frequency distribution is different depending on the predicting type. Therefore, if a simple type, such as the front value predicting type, is used, the image will not be able to be sufficiently compressed. Instead, a complicated predicting type, such as the composite predicting type, must be used.

Figure 83A:
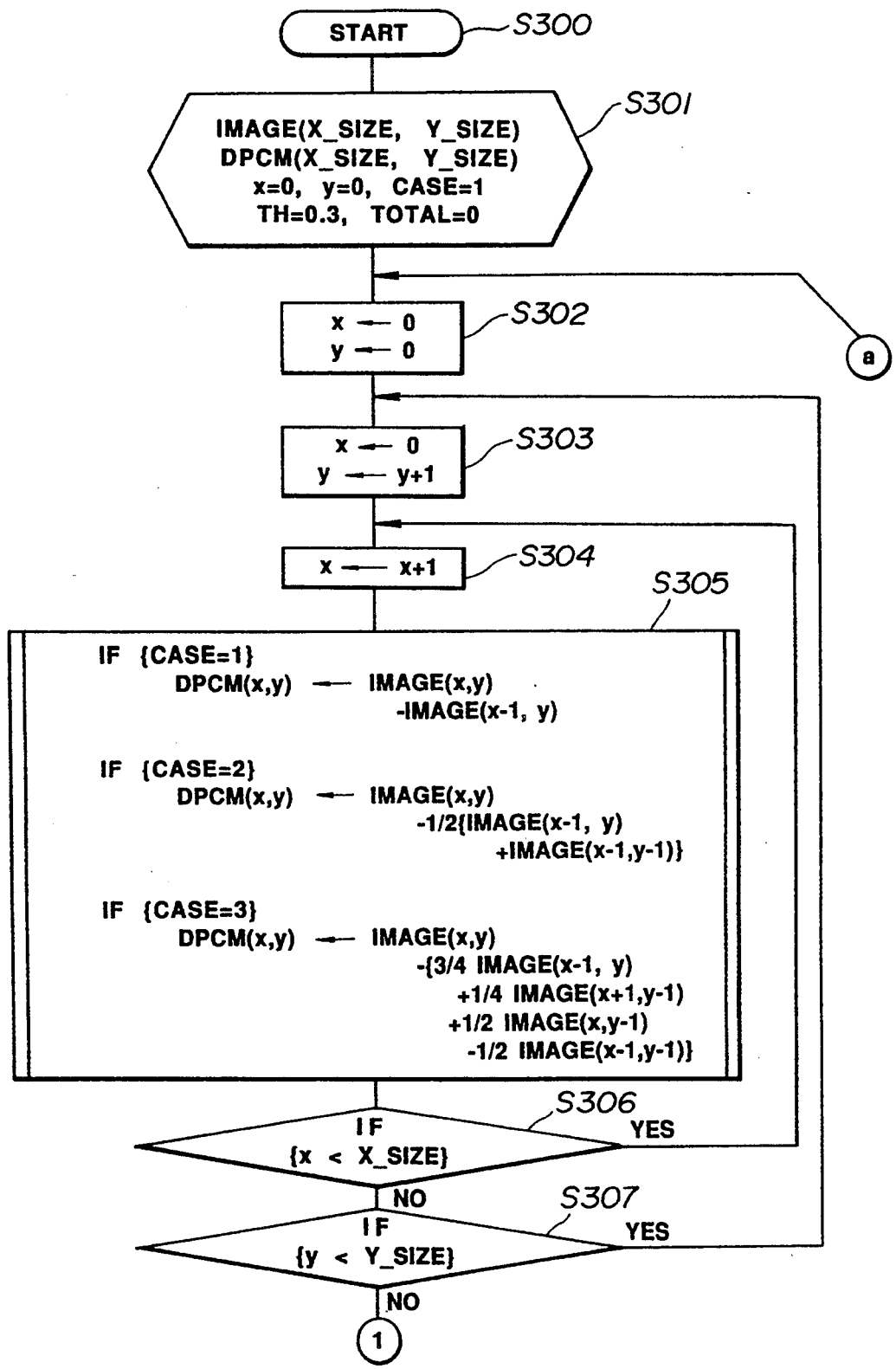
FIGS. 83(A) and (B) are flow charts showing compressing processes.

The process of the operation processing apparatus 651 shall be explained by using FIGS. 83(A) and (B).

As shown in FIG. 83(A), a process program is called out in step (called S hereinafter) 300 and is continued to S301.

Said S301 sets initial values in which "Image ( )", represents a data arrangement of any of RGB signals. "X_size" represents a number of horizontal pixels, "Y_size" represents a number of vertical pixels, "DPCM ( )" represents a data arrangement of a predictive error, "x_" and "y" represent working variables showing the position of a noted pixel, "Case" represents a working variable showing a predictive error type, "TH" represents a reference value of a compressing rate and is made 0.3 so as to compress the original image to be below 30% in this embodiment, and "Total" represents a variable housing the total number of bits of the predictive error. Then the step continues to S302. By the way, the smaller the data amount after the compression, the higher the compressing rate.

S302 sets the variables x and y at an initial value of zero and continues to S303.

S303 sets the variable x at zero, adds - to the variable y and continues to S304.

S304 adds 1 to the variable x and continues to S305.

S305 is a macro step calculating predictive errors. Whenever the Case is 1, a front value predicting type will be carried out. Whenever the Case is 2, an average predicting type will be carried out. Whenever the Case is 3, a composite predicting type will be carried out. Then, the step continues to S306.

S306 judges whether or not the noted pixel has reached the maximum value of the horizontal pixel and will continue to S304 if it has not reached the maximum value but to S307 if it has reached the maximum value.

Figure 83B:
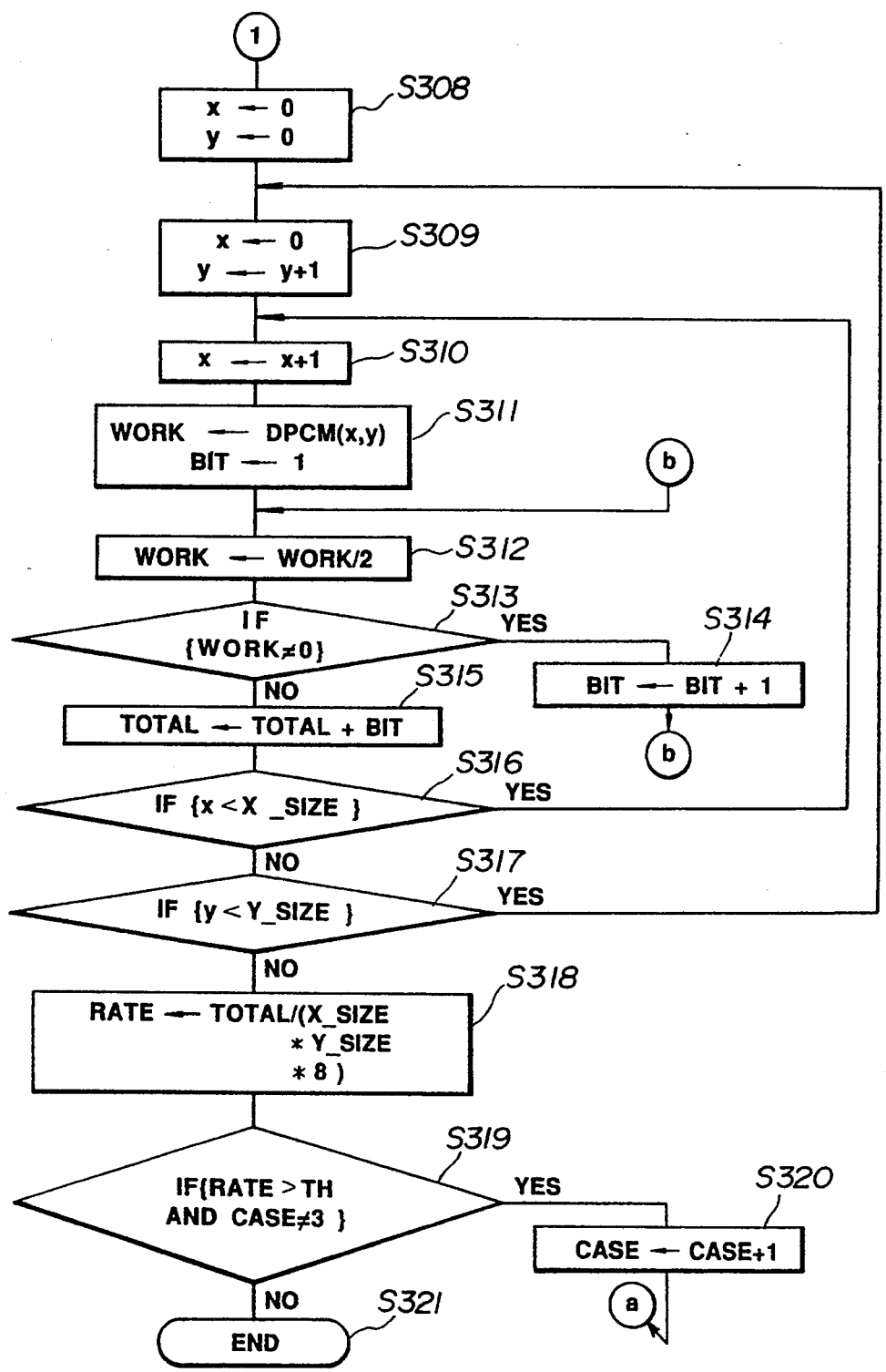

S307 judges whether or not the noted pixel has reached the maximum value of the vertical pixel and will continue to S303 if it has not reached the maximum value but to S308 of FIG. 83(B) if it has reached the maximum value.

S308 sets the variables x and y at an initial value of zero and continues to S309.

S309 sets the variable x at zero, adds 1 to the variable y and continues to S310.

S310 adds 1 to the variable x and continues to S311.

S311 substitutes (DPCM(x,y) for the variable Work, sets the variable Bit at 1 and continues to S312.

S312 divides the variable Work by 2, substitutes it for the variable Work and continues to S313.

S313 judges whether or not the variable Work is zero and will continue to S314 if it is not zero but will continue to S315 if it is zero.

S314 adds 1 to the variable Bit and continues to S312.

S315 adds the variable Bit to the variable total to be a new total and continues to S316.

S316 judges whether or not the noted pixel has reached the maximum value of the horizontal pixel and will continue to S310 if it has not reached the maximum value but to S317 if it has reached the maximum value.

S317 judges whether or not the noted pixel has reached the maximum value of the vertical pixel and will continue to S309 if it has not reached the maximum value but to S318 if it has reached the maximum value.

S318 divides the above-described Total by the total number of pixels, substitutes the compressing rate in the Rate and continues to S319.

S319 will continue to S320 if the data amount is larger than 30% (0.3 of the variable Th) and the variable Case is not 3 but to the S321 if they are reversed.

S320 adds 1 to the variable Case and continues to S302.

S321 ends the program.

As described above, in S301 to S317, the total bits of the predictive errors are calculated and, in S318, the data amount is calculated so that the most adapted predicting type may be selected. Also, as a simple predicting type is carried out, the compressing time can be reduced.

The other formations, operations and effects are the same as in the twenty-seventh embodiment.

Figure 84:
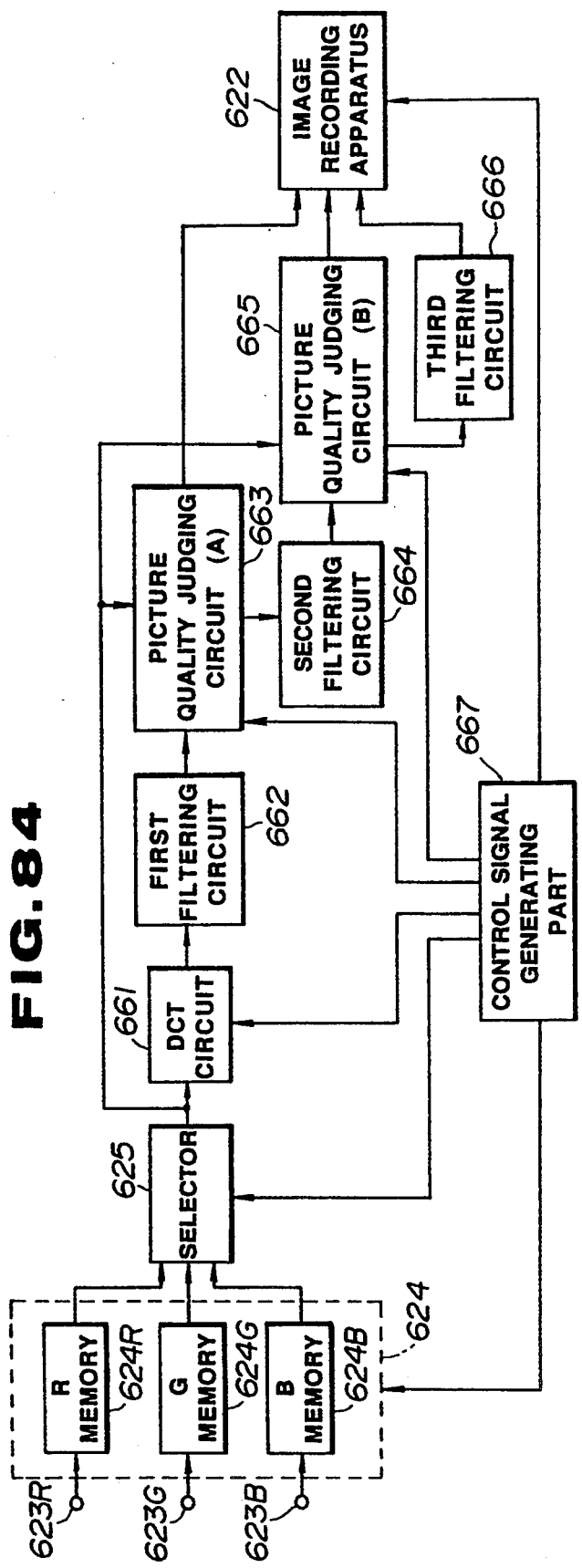

FIGS. 84 and 85 show a twenty-ninth embodiment of the present invention. The same components as in the twenty-seventh embodiment shall bear the same reference numerals and shall not be explained here. The frame sequential type electronic endoscope apparatus is the same as in the twenty-seventh or twenty-eighth embodiment and therefore shall not be explained here.

As shown in FIG. 84, an image data compressing apparatus comprises a memory part 624 having an R memory 624R, G memory 624G and B memory 624B, a selector 625 and a DCT circuit 661 making a discrete cosine conversion. The image data compressing apparatus further comprises a first filtering circuit 662 which is a first compressing means, a picture quality judging circuit (A) judging the picture quality of the image compressed by the first filtering circuit 662, a second filtering circuit 664 which is a second compressing means, a picture quality judging circuit (B) judging the picture quality of the image compressed by the second filtering circuit 664, a third filtering circuit 666 which is a third compressing means and a control signal generating part 667 feeding a control signal to the memory part 624, selector 625, DCT circuit 661, picture quality judging circuit (A) 663, picture quality judging circuit (B) 665 and image recording apparatus 622. The filtering circuits 662, 664 and 666 filter predetermined frequency components among the output data of the DCT circuit 661.

The output end of the selector 625 is connected to the input end of the DCT circuit 661, first input end of the picture quality judging circuit (A) 661 and first input end of the picture quality judging circuit (B) 665.

The output end of the DCT circuit 661 is connected to the input end of the first filtering circuit 662. The output end of the first filtering circuit 662 is connected to the second input end of the picture quality judging circuit (A) 663.

The picture quality judging circuit (A) 663 has the first output end connected to the first input end of the image recording apparatus 622 and the second output end connected to the second filtering circuit 664.

The output end of the second filtering circuit 664 is connected to the second input end of the picture quality judging circuit (B) 665.

The picture quality judging circuit (B) 665 has the first output end connected to the second input end of the image recording apparatus 622 and the second output end connected to the third filtering circuit 666.

The control ends of the memory part 624, selector 625, DCT circuit 661, picture quality judging circuit (A) 663, picture quality judging circuit (B) 665 and image recording apparatus 662 are connected, respectively, to the control output ends of the control signal generating part 667.

The operation of the thus-formed image data compressing apparatus shall be explained below.

Selector 625 outputs the signals of the R memory 624R, G memory 624G and B memory 624B sequentially to the DCT circuit 661, picture quality judging circuit (A) 663 and picture quality judging circuit (B) 665.

The DCT circuit 625 subjects the input signals to a discrete cosine conversion, for example, of an 8×8 size as mentioned, for example, on pages 90 to 93 of the "IEEE Trans. Vol. 1 C-23" and outputs them to the first filtering circuit 662.

Figures 85A, 85B, 85C:
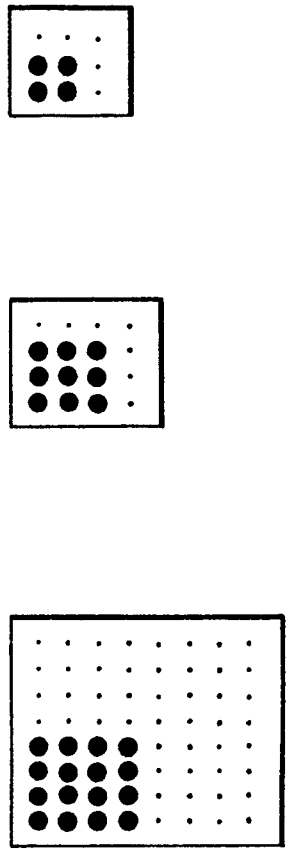
FIGS. 85(A) to (C) are explanatory views respectively showing filterings.

The first filtering circuit 662 compresses a pixel of an 8×8 size unit to a 4×4 size with the left end as an origin as shown, for example, in FIG. 85(A) and outputs it to the picture quality judging circuit (A) 663.

The picture quality judging circuit (A) 663 reversely discretely cosine-converts the signal converted and input as described above and compares it with the original image input from the selector 625. This comparison is made by the S/N or entropy or the like as explained in the twenty-seventh embodiment. Further, the picture quality judging circuit (A) 663 will output the signal from the first filtering circuit 662 to the image recording apparatus 622 whenever the picture quality of the compressed image is below the predetermined reference but to the second filtering circuit 664 whenever the picture quality exceeds the predetermined reference.

The second filing circuit 64 compresses a pixel of a 4×4 size unit of the signal input from the picture quality judging circuit (A) 663 to a 3×3 size with the left end as an origin as shown, for example, in FIG. 85(B) and outputs the signal to the picture quality judging circuit (B).

The picture quality judging circuit (B) 665 judges the compressed image the same as in the picture quality judging circuit (A) 663 and will output the signal from the second filtering circuit 664 to the image recording apparatus 622 whenever the picture quality of the compressed image is below the predetermined reference but to the third filtering circuit 666 whenever the picture quality exceeds the predetermined reference.

The third filtering circuit 666 compresses a 3×3 size unit pixel to a 2×2 size with the left end as an origin as shown, for example, in FIG. 85 and outputs it to the image recording apparatus 622.

In the picture quality judging circuit (A) 663, whenever the picture quality has not reached the predetermined reference, the original image may be output and, in the picture quality judging circuit (B) 655, whenever the picture quality has not reached the predetermined reference, the signal of the first filtering circuit 662 may be output.

According to this embodiment, the original image can be compressed to a predetermined range in which the original image is not deteriorated.

The other formations, operations and effects are the same as in the twenty-seventh embodiment.

Figure 86:
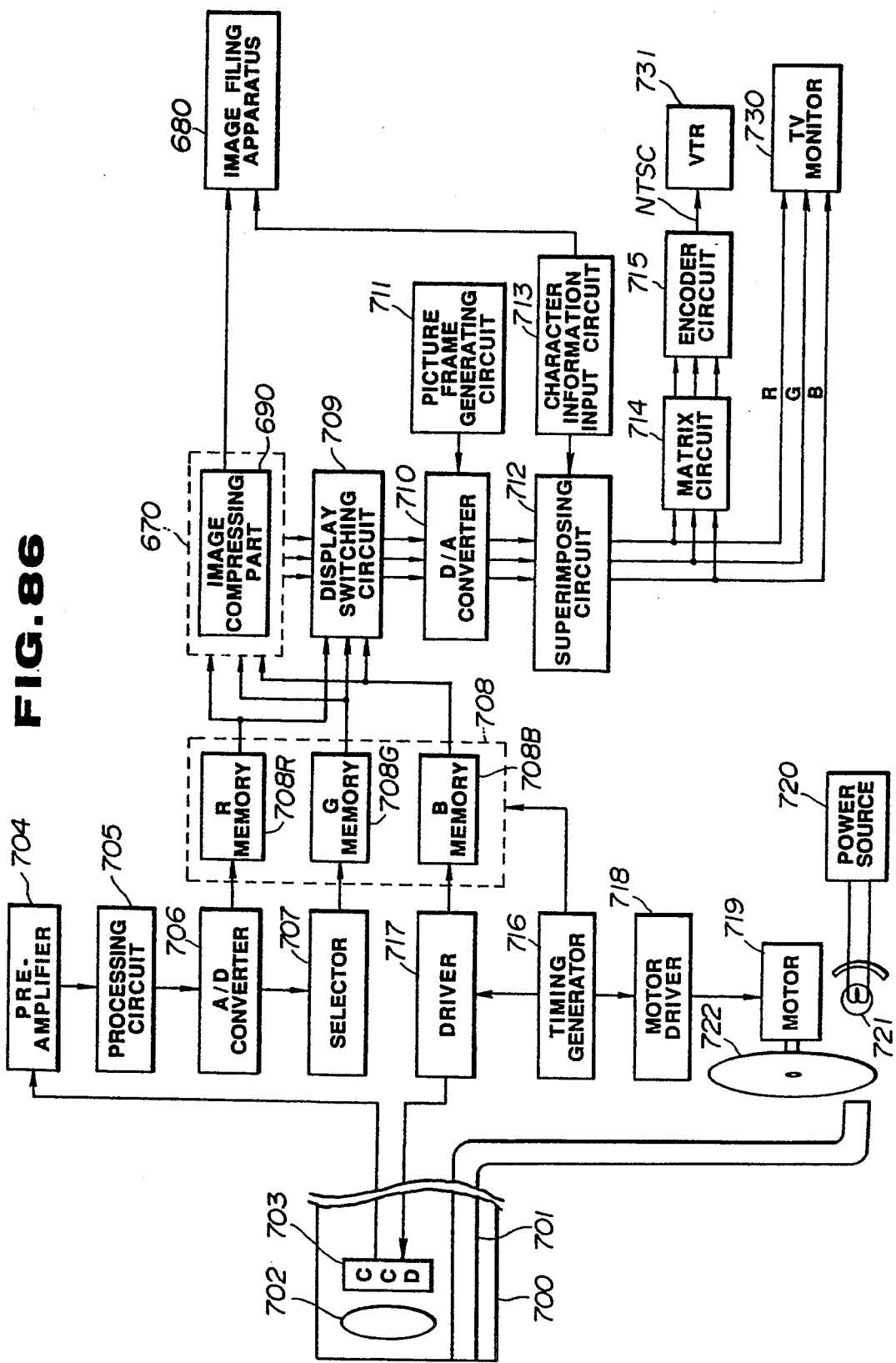

FIGS. 86 and 87 show a thirtieth embodiment of the present invention.

As shown in FIG. 86, an electronic endoscope apparatus of a frame sequential imaging system comprises a timing generator 716 generating a predetermined control signal to later described respective blocks, a solid state imaging device 703 which is, for example, a CCD (charge coupled device) imaging an object to be imaged, an objective lens system 702 making an object light bundle form an image on the solid state imaging device 703, a driver 717 feeding a driving signal to the solid state imaging device, a pre-amplifier 704 amplifying the imaging signal of the solid state imaging device 703 and a processing circuit 705 correcting gamma and removing the carrier of the video signal amplified by the pre-amplifier. The electronic endoscope apparatus further comprises an analog-to-digital converter (called an A/D converter hereinafter) 706 converting the video signal which is an analog signal having had $\gamma$ corrected in the processing circuit 705 to data of a digital signal, a selector 707 switching and outputting the digital signal to the respective memories of the memory part 708, an R memory 708R memorizing a red wavelength region (called R hereinafter) provided in the memory part 708, a G memory 708G memorizing a green wavelength region (called G hereinafter) and a B memory 708B memorizing a blue wavelength region (called B hereinafter). The electronic endoscope apparatus further comprises a display switching circuit 709 outputting the image signal memorized in the memory part 208 or the image signal of a later-described image data compressing apparatus 670 to a digital-analog converter (called a D/A converter hereinafter) 710, the D/A converter 710 converting the video signal memorized in the memory part 708 and the video signal from a later-described endoscope image data compressing apparatus (called an image data compressing apparatus hereinafter) to analog signals from the digital signals, a picture frame generating circuit 711 generating a displayed image frame to the D/A converter, a superimposing circuit 712 combining information such as patient information with a displayed picture, a character information input circuit 713 inputting information such as patient information to the superimposing circuit 712 and a later-described image filing apparatus 680, a TV monitor 730 displaying RGB signals from the superimposing circuit 712, a matrix circuit 714 converting the RGB signals of the superimposing circuit 712, for example, to a luminance signal and color difference signals, an encoder circuit 715 converting the signal of the matrix circuit 714, for example, to an NTSC signal and a VTR 731 recording the NTSC signal from the encoder 715. The electronic endoscope apparatus further comprises a lamp 721 generating an illuminating light to be fed to the part or the like to be imaged by the solid state imaging device 703, a power source 720 feeding an electric power to the lamp 721, a rotary filter 722 provided with filters separating the light of the lamp 721 into R, G and B, a motor 719 rotating the rotary filter 722, a motor driver 718 feeding a driving power to the motor 719 by the control signal of the timing generator 716 and a light guide 701 leading the above-described separated illuminating lights to the part to be imaged by the solid state imaging device 703.

The lamp 721 may be a xenon lamp or strobe-lamp which can generate an illuminating light not only in the visible light wavelength region but also in the ultraviolet ray wavelength region to infrared ray wavelength region.

The solid state imaging device 703 has a sensitivity not only in the visible light wavelength region but also in the ultraviolet ray wavelength region to infrared ray wavelength region.

The light guide 701 on the exit end surface, the objective lens system 702 and the solid state imaging device 703 are arranged in the tip part 700 of the endoscope.

The solid state imaging device 703 is arranged in the image forming position of said objective lens system 702.

The solid state imaging device 703 is connected to the input end of the pre-amplifier 704. The output end of the preamplifier 704 is connected to the input end of the processing circuit 705. The output end of the processing circuit 705 is connected to the input end of the A/D converter 706. The output end of the A/D converter 706 is connected to the input end of the selector 707.

The input ends of the R memory 708R, G memory 708G and B memory 708B are connected, respectively, to the output ends of the selector 707. The output ends of the R memory 708R, G memory 708G and B memory 708B are connected to the input ends of the display switching circuit 709 and to the input end of a later described image data compressing apparatus 670.

The output ends of the display switching circuit 709 are connected to the input ends of the D/A converter 710. The output ends of the D/A converter 710 are connected to the input ends of the superimposing circuit 712.

The output end of the picture frame generating circuit 711 is connected to the input end of the D/A converter 710. The character information input circuit 713 has the first output end connected to the superimposing circuit 712 and has the second output end connected to a later described image filing apparatus 630.

The output end of the superimposing circuit 712 is connected to the TV monitor 730 and to the matrix circuit 714.

The output end of the matrix circuit 714 is connected to the input end of the encoder circuit 715. The output end of the encoder circuit 715 is connected to the input end of the VTR 731.

The timing generator 716 has the first output end connected to the driver 717, the second output end connected to the memory part 708 and the third output end connected to the motor driver 718.

The output end of the driver 717 is connected to the driving end of the solid state imaging device 703. The output end of the motor driver 718 is connected to the motor 719.

The output end of the power source 720 is connected to the lamp 721.

The image data compressing apparatus 670 is provided with an image compressing part 690 compressing the data of the memory part 708.

The image filing apparatus 680 records the data compressed by the image data compressing apparatus 690 and the patient information input by the character information input circuit 713 by using a large capacity recording medium such as a photodisc or photomagnetic disc.

As shown in FIG. 87, the image data compressing apparatus 670 comprises a predictive coding circuit (A) 672 which is a compressing means, a predictive coding circuit (B) 673 which is a compressing means including divaluing, a DCT converting circuit 674 which is a compressing means by DCT (discrete cosine), a decoding circuit (A) which is an expanding means, a decoding circuit (B) 676, a decoding circuit (C), a selecting circuit 678 switching the compressing means and outputting to the image filing apparatus 680 and a selecting circuit 679 switching the expanding means and outputting to the display switching circuit 709.

The R, G and B input ends of the predictive coding circuit (A) 672, predictive coding circuit (B) 673 and DCT converting circuit 674 are connected, respectively, to input terminals 671R, 671G and 671B.

The output end of the predictive coding circuit (A) 672 is connected to the input end of the decoding circuit (A) and to the first input end of the selecting circuit 678.

The output end of the predictive coding circuit (B) 673 is connected to the input end of the decoding circuit (B) 676 and to the second input end of the selecting circuit 678.

The output end of the DCT circuit 674 is connected to the input end of the decoding circuit (C) 677 and to the third input end of the selecting circuit 678.

The output end of the decoding circuit (A) 675 is connected to the first input end of the selecting circuit 679. The output end of the decoding circuit (B) 676 is connected to the second input end of the selecting circuit 679. The output end of the decoding circuit (C) 677 is connected to the third input end of the selecting circuit 679.

The selecting signal input ends of the selecting circuits 678 and 679 are connected to a selecting terminal 682.

The output end of the selecting circuit 678 is connected to the output end of the selecting circuit 678.

The release end of the image filing apparatus 680 is connected to a release terminal 681.

The R, G and B output ends of the selecting circuit 679 are connected respectively to output terminals 683R, 683G and 683B.

The operation of the thus-formed image data compressing apparatus shall be explained below.

As shown in FIG. 86, the timing generator 716 feeds predetermined timing pulses to the memory part 708, driver 717 and motor driver 718.

The driver 717 feeds the solid state imaging device 703 with a photoelectric conversion signal and a driving signal for reading out the photoelectric conversion signal by the above-described timing pulses.

The lamp 721 produces the above-described illuminating light by the driving electric power of the power source 720.

The motor driver 718 generates a driving electric power synchronized with the control signal of the timing generator 716. The driving electric power causes the motor 719 to rotate and thereby said rotary filter 722 is rotated to separate the illuminating light of the lamp 721 into R, G and B. These separated illuminating lights are led through the light guide 701 and are radiated to the object from the exit end surface arranged on the endoscope tip surface.

The object light bundle of the object illuminated by the above-described illuminating lights forms a focus on the imaging surface of the solid state imaging device 703 by the objective lens system 702, is photoelectrically converted and is input as an imaging signal into the pre-amplifier 704.

The pre-amplifier 704 amplifies the above-described imaging signal to a predetermined voltage and outputs it to the processing circuit 705.

The processing circuit 705 processes the input signal to correct γ and remove the carrier and further to bias the halation part so as to have a "knee" characteristic and the dark part so as to have a pedestal level and outputs it to the A/D converter 706.

The A/D converter 706 converts, that is, quantizes the above-described signal to be a digital signal, for example, of 8 bits and outputs it to the selector 707.

The selector 707 outputs the above-described signal to the respective memories of the memory part 708. The digital signal will be output to the R memory 708R whenever the spectral wavelength region of the illuminating light passed by the rotary filter 722 is red, to the G memory 708G whenever green is passed in the same manner or to the B memory 708B whenever blue is passed in the same manner, that is, will be input and recorded in the memory equal to the wavelength region of the object light bundle.

The respective memories of the memory part 708 output the memorized data to the display switching circuit 709 and image data compressing apparatus 670 by the control signal of the timing generator 716. The data sequentially input by the selector 707 are simultaneously output to the display switching circuit 709. That is, the sequentially imaged object light bundles of the respective wavelength regions are synchronized.

The display switching circuit 709 selects the signals input from the memory part 708 or the signals input from the image data compressing apparatus 670 and outputs them to the D/A converter 710.

The D/A converter 710 synthesizes the signal input from the display converting circuit 709 and the signal input from the picture frame generating circuit 711 and forms a frame of a displayed picture, and further converts the digital signals to analog signals and outputs them to the superimposing circuit 712.

The superimposing circuit 712 forms signals of pictures in which, for example, the patient information from the character information input circuit 713 is synthesized with the signal input from the D/A converter 713 and outputs them to the TV monitor 730 and matrix circuit 714.

The TV monitor 730 displays in a picture the signals input from the superimposing circuit 712.

Also, the matrix circuit 714 makes the signals input from the superimposing circuit 712, for example, a luminance signal and color difference signals and outputs them to the encoder circuit 715.

The encoder circuit 715 converts the input luminance signal and color difference signals, for example, to an NTSC signal and outputs it to the VTR 731.

The VTR 731 records the NTSC signal as a moving picture in a video tape.

In the image data compressing apparatus 670, as shown in FIG. 87, the signal from the R memory 708R is input into an input terminal 671R, the signal from the G memory 708G is input into an input terminal 671G and the signal from the B memory 708B is input into an input terminal 671B.

The signals input into the input terminals 671R, 671G and 671B are input into the predictive coding circuit (A) 672 which is a compressing circuit, the predictive coding circuit (B) 673 which is a compressing circuit including divaluing and the DCT circuit 674 which is a compressing circuit by a discrete cosine conversion.

In the predictive coding circuit (A) 672, predictive coding circuit (B) 673 and DCT circuit 674, the input signals are compressed, respectively, by different compressing methods. The predictive coding circuit (A) 672 outputs the compressed signals to the decoding circuit (A) 675 and to the first input end of the selecting circuit 678. The predictive coding circuit (B) 673 outputs the compressed signals to the decoding circuit (B) 676 and to the second input end of the selecting circuit 678. The DCT circuit 674 outputs the compressed signals to the decoding circuit (C) 677 and to the third input end of the selecting circuit 678.

The decoding circuit (A) 675, decoding circuit (B) 676 and decoding circuit (C) 677 expand the signals input as described above. The decoding circuit (A) 675 outputs the expanded signals to the first input end of the selecting circuit 679. The decoding circuit (B) 676 outputs the expanded signals to the second input end of the selecting circuit 679. The decoding circuit (C) 677 outputs the expanded signals to the third input end of the selecting circuit 679.

The selecting signal input into a selecting terminal 682 from a switch provided in the outer fitting, for example, of the endoscope apparatus is input into the selecting circuits 678 and 679.

The selecting circuit 678 selects one of the signals input into the first to third input ends, as described above, by the above-described selecting signal and outputs it to the image filing apparatus 680.

At the same time, the selecting circuit 679 selects, respectively, one of the signals input into the first to third input ends, as described above, by the above-described selecting signal and outputs them to output terminals 683R, 683G and 683B connected to the display switching circuit 709.

Therefore, the images compressed and then expanded, as described above, are displayed in the TV monitor 730 and can be compared with the original image by switching the display switching circuit 709, for example, by a switching signal.

Thereby, the operator, for example, using vector quantization may be used.

In this embodiment, the operator, for example, a doctor evaluates the expanded images, selects the image adapted to be recorded and operates a switch provided in the outer fitting, for example, of the endoscope apparatus to input a release signal into the release terminal 681.

The above-described release signal, causes image filing apparatus 680 to record in a large capacity recording medium, such as a photofile or photomagnetic file, the signal input from the selecting circuit 678.

The explanation has been made by using the predictive coding circuit and DCT circuit for the compressing means but another compressing means, for example, a doctor can select and record the most adapted image and can select a compressing means adapted to the image thereby producing a recorded image high in picture quality and efficiency.

FIG. 88 shows a thirty-first embodiment of the present invention. The same components as in the thirtieth embodiment shall bear the same reference numerals and shall not be explained here. The endoscope apparatus of the frame sequential imaging system is the same as in the thirtieth embodiment and shall not be explained here.

An image data compressing apparatus in this embodiment comprises a predictive coding circuit (A) 672, a predictive coding circuit (B) 673, a DCT converting circuit 674, a decoding circuit (A) 675, a decoding circuit (B) 676, a decoding circuit (C) 677, a selecting circuit 678, a selecting circuit 679, a compressing rate calculating circuit 685 calculating the compressing rate of the above-described compressing means and controlling the selecting circuit and a displaying memory 686 accumulating the signals from said selecting circuit 679.

The input ends of the predictive coding circuit (A) 672, predictive coding circuit (B) 673, DCT converting circuit 674 and compressing rate calculating circuit 685 are connected, respectively, to the input terminals 671R, 671G and 671B.

The output end of the predictive coding circuit (A) 672 is connected to the decoding circuit (A) 675, the first input end of the selecting circuit 678 and the first input end of the compressing rate calculating circuit 685.

The output end of the predictive coding circuit (B) 673 is connected to the decoding circuit (B) 676, the second input end of the selecting circuit 678 and the second input end of the compressing rate calculating circuit 685.

The output end of the DCT circuit 674 is connected to the decoding circuit (C), the third input end of the selecting circuit 678 and the third input end of the compressing rate calculating circuit 685.

The output end of the decoding circuit (A) 675 is connected to the first input end of the selecting circuit 679. The output end of the decoding circuit (B) 676 is connected to the second input end of the selecting circuit 679. The output end of the decoding circuit (C) 677 is connected to the third input end of the selecting circuit 679.

The selecting signal input end of the selecting circuit 678 is connected to a selecting terminal 682.

The selecting signal input end of the selecting circuit 679 is connected to the output end of the compressing rate calculating circuit 685.

The output end of the selecting circuit 678 is connected to the input end of the image filing apparatus 680.

The release end of the image filing apparatus 680 is connected to a release terminal 681.

The R, G and B output ends of the selecting circuit 679 are connected to the input ends of the displaying memory 686 and the output ends of the displaying memory 686 are connected to output terminals 683R, 683G and 683B.

The operation of the thus-formed image data compressing apparatus shall be explained below.

The respective compressing rates of the signals compressed the same as in the thirtieth embodiment are calculated in the compressing rate calculating circuit 685.

Further, the compressing rate calculating circuit 685 controls the selecting circuit 679 to output in the order, for example, of higher compressing rates the signals of the decoding circuit (A) 675, decoding circuit (B) 676 and decoding circuit (c) 677.

The selecting circuit 679 is controlled, as described above, to sequentially output to the displaying memory 686 the signals of the decoding circuit (A) 675 decoding circuit (B) 676 and decoding circuit (C) 677.

The displaying memory 686 memorizes the signals input, as described above, so as to be displayable, for example, in one picture and outputs them to the output terminals 683R, 683G and 683B connected to the display switching circuit 709.

Therefore, in the TV monitor 730, a plurality of images compressed and then expanded, as described above, are displayed in the order of higher compressing rates. Also, by switching the display switching circuit 709, for example, by a switching signal, the images can be compared with the original image.

Thereby, the operator, for example, a doctor evaluates the expanded images, selects an image adapted to be recorded and operates a switch provided in the outer fitting, for example, of the endoscope apparatus to input a release signal into the release terminal 681.

The above-described release signal causes said image filing apparatus 680 to record in a large capacity memorizing medium, such as a photofile or photomagnetic file, the signal input from the selecting circuit 678.

Explanation has been made by using the predictive coding circuits and DCT circuit for the compressing means but such other compressing means as, for example, vector quantization may be used.

In this embodiment, images using a plurality of compressing means can be compared and evaluated at once and the operator, for example, a doctor can select and record the most adapted image.

The other operations and effects are the same as in the thirtieth embodiment.

In the twenty-seventh to thirty-first embodiments, the explanation has been made by using the electronic endoscope of the frame sequential system but, for example, a composite video signal decoding means may be provided in the front step of the video signal input terminal of each wavelength region to input composite video signals.

Also, an endoscope using an image guide may be fitted with an externally fitted TV camera apparatus and may be used for the video processor apparatus.

As explained above, according to the twenty-seventh to thirty-first embodiments, by the picture quality judging means, within the range in which the picture quality does not deteriorate, the original image can be compressed and recorded or the compressed image can be evaluated and recorded and the most adapted image compression can be made.

FIGS. 89 to 94 show a thirty-second embodiment of the present invention.

This embodiment is to be applied to an endoscope system.

Figure 90:
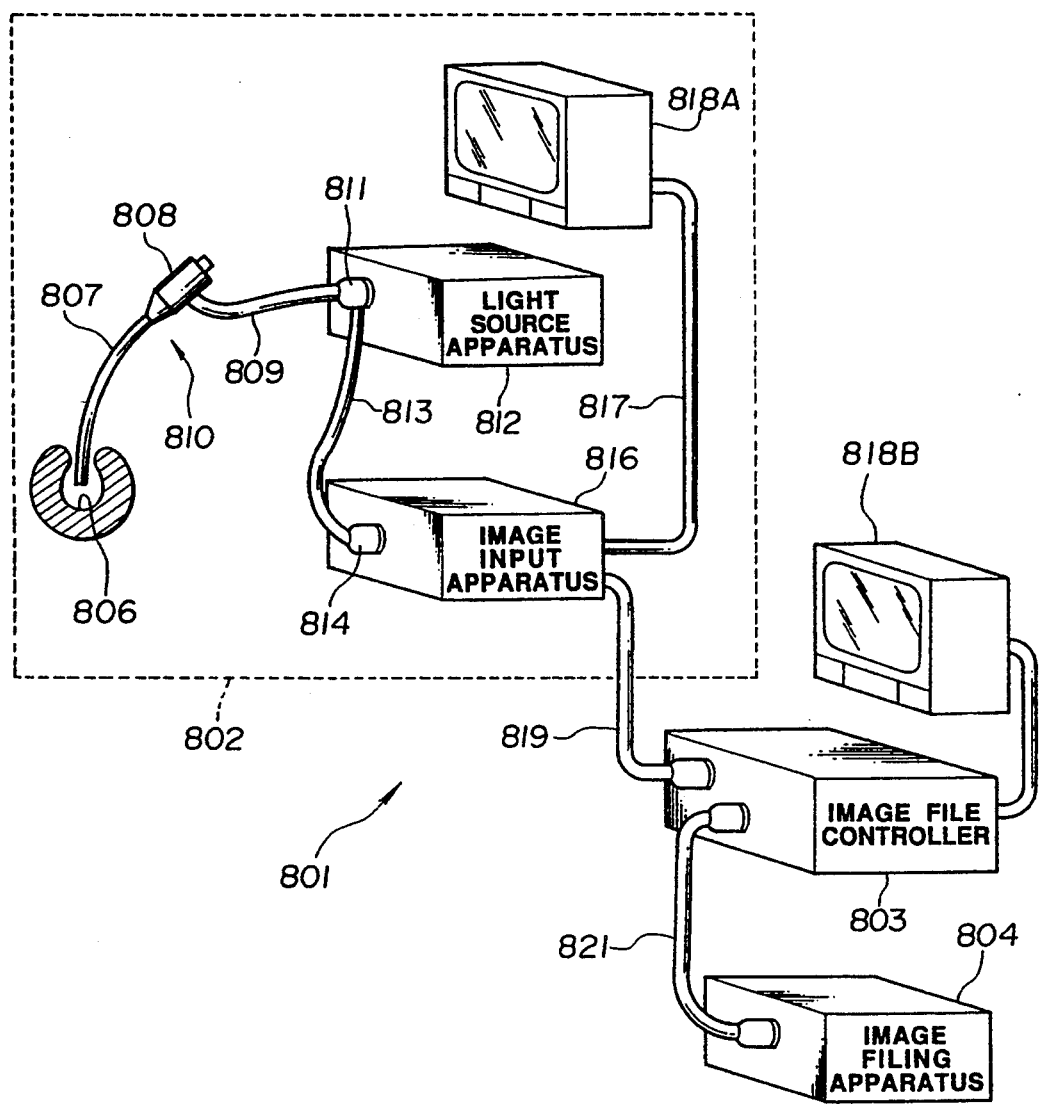

As shown in FIG. 90, an image filing system 801 as an endoscope image data compressing apparatus of this embodiment comprises an endoscope apparatus 802 as an image signal generating part, an image file controller 803 and an image filing apparatus 804.

The endoscope apparatus 802 has an insertable part 807 formed to be flexible and elongate and insertable into an observed part 806, an operating part 808 provided at the rear end of the insertable part 807 and a universal cord 809 extended out of the operating part 808 on the side.

The universal cord 809 is provided at the rear end with a connector 811 which is connected to a light source apparatus 812 feeding an illuminating light to an electronic scope 810. A signal cable 813 is extended out of the connector 811 on the side and is provided at the rear end with a connector 813 connected to an image input apparatus 816. The image input apparatus 816 processes the image signal obtained by the electronic scope 810 to produce such video signal as, for example, of three primary colors of R, G and B and can display an endoscope image in a TV monitor 818A through a cable 817.

The video signal produced by the image input apparatus 816 is to be delivered also to the image file controller 803 through a cable 819.

The image file controller 803 is connected to the image filing apparatus 804 by a cable 821.

Figure 91:
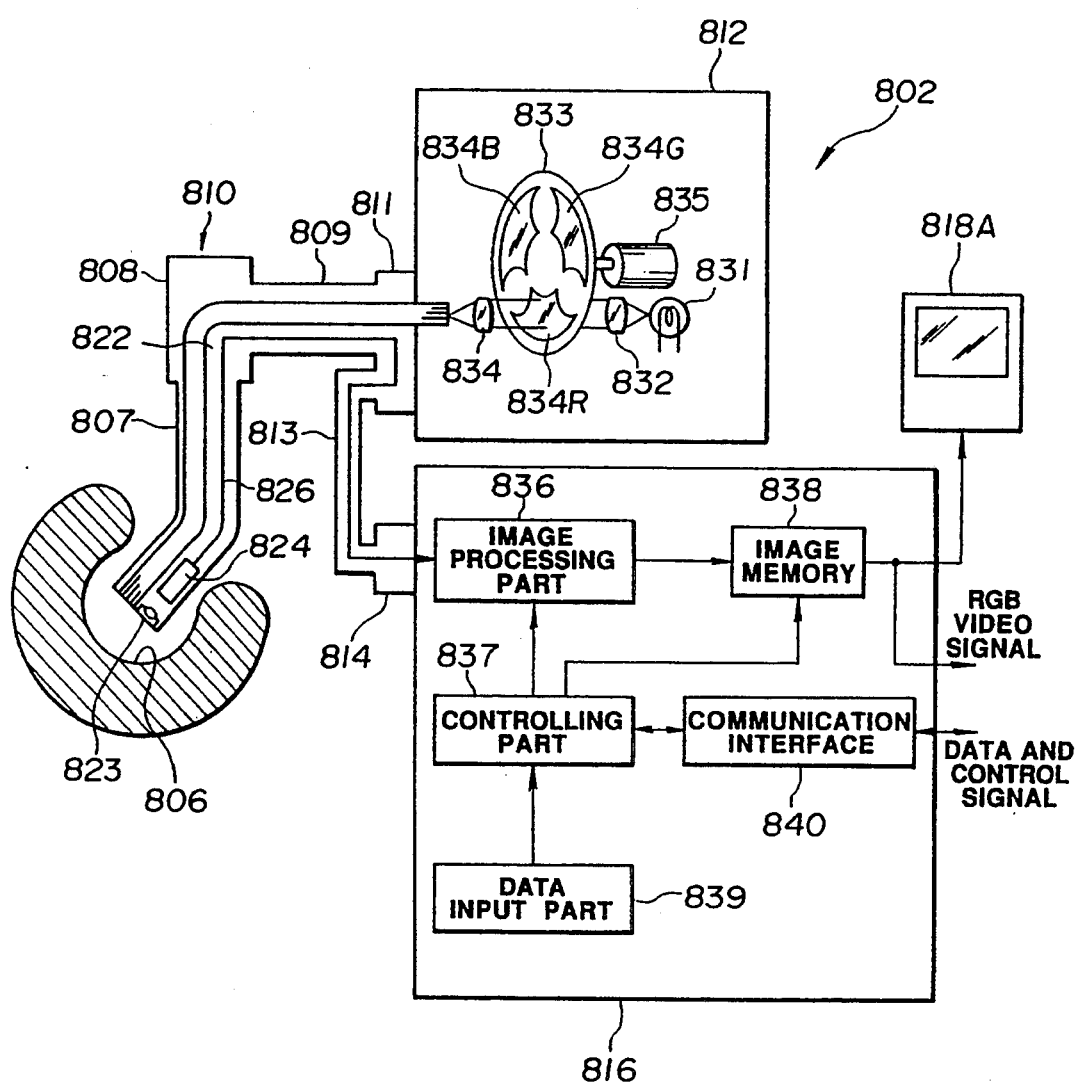

The endoscope apparatus 802 shall be explained with reference to FIG. 91.

The exit end surface of a light guide 822 formed of a fiber bundle emitting to an observed part 806 illuminating lights fed by the light source apparatus 812 is provided in the tip part of the insertable part 807 of the electronic scope 810.

An objective lens 823 is further provided in the tip part of the insertable part 807. An imaging surface provided on a solid state imaging device 824 is positioned in the image forming position of the objective lens 823. A signal line 826 through which an electric signal obtained as a result of photoelectrically converting the object image formed on the imaging surface and a driving clock driving this solid state imaging device 824 are to be transmitted is connected to the solid state imaging device 82. The signal line 826 leads to the connector 811 through the insertable part 807, operating part 808 and universal cable 809 and is further extended to the connector 814 through the signal cable 813 from the connector 811.

The light source apparatus 812 is provided with a light source lamp 831. A collimating lens 832 making the illuminating light of the light source lamp 831 a parallel light, a rotary filter 833 and a condensing lens 834 condensing the illuminating light and radiating it to the entrance end surface of the light guide 822 are provided from the light source lamp 831 side in the light path connecting this light source lamp 831 with the entrance end surface of the light guide 822.

The rotary filter 833 is disc-like in shape and is provided in the peripheral direction with color transmitting filters 834R, 834G and 834B transmitting the respective colors, for example, of red (R), green (G) and blue (B) so that the illuminating light made parallel by the collimating lens 832 may enter the respective color transmitting filters 834R, 834G and 834B. The rotary filter 833 is rotated and driven by a motor 835 to time-serially feed the light guide 822 with the respective color lights of red, green and blue.

By connecting said connector 814 to the image input apparatus 816, the signal line 826 is connected to an image processing part 836 provided within the image input apparatus 816. The image processing part 836 applies a driving clock to drive the solid state imaging device 824, converts the electric signal delivered from the solid state imaging device 824 to RGB video signals and outputs them. It also controls the G signal level to balance white by the level adjustment of R and B signals. It further superimposes on the RGB video signals patient data and error messages transmitted from a later described control part 837.

The output of the image processing part 836 is delivered to an image memory 838 which passes as they are or temporarily holds and repeatedly outputs as a still picture the input RGB video signals in response to the control signal from a controlling part 837. The output of the image memory 838 is branched and one branch is output to a TV monitor 818A to display on the picture the image of the observed part. The other branch is delivered to the image file controller 803.

The controlling part 837 is connected to such data input part 839 as, for example, a keyboard and a communication interface 840. From a data input part 839, by the operation of the user, such patient data as the name and date of birth of the patient, an image record (release) and such control signal as a search instructing order to be superimposed on the RGB signals are input. The patient data are delivered to the image processing part 836, as mentioned above, and are superimposed on the RGB video signals. The control signal is delivered to the image memory 838 and communication interface 840 as mentioned above. This communication interface 840 is a serial transmission interface part, for example, by the RS-232C Standard and inputs and outputs the data and control signal with the outside by the control from the controlling part 837.

The RGB signals, data and control signal are delivered to the image file controller 803 by said cable 819.

Figure 92:
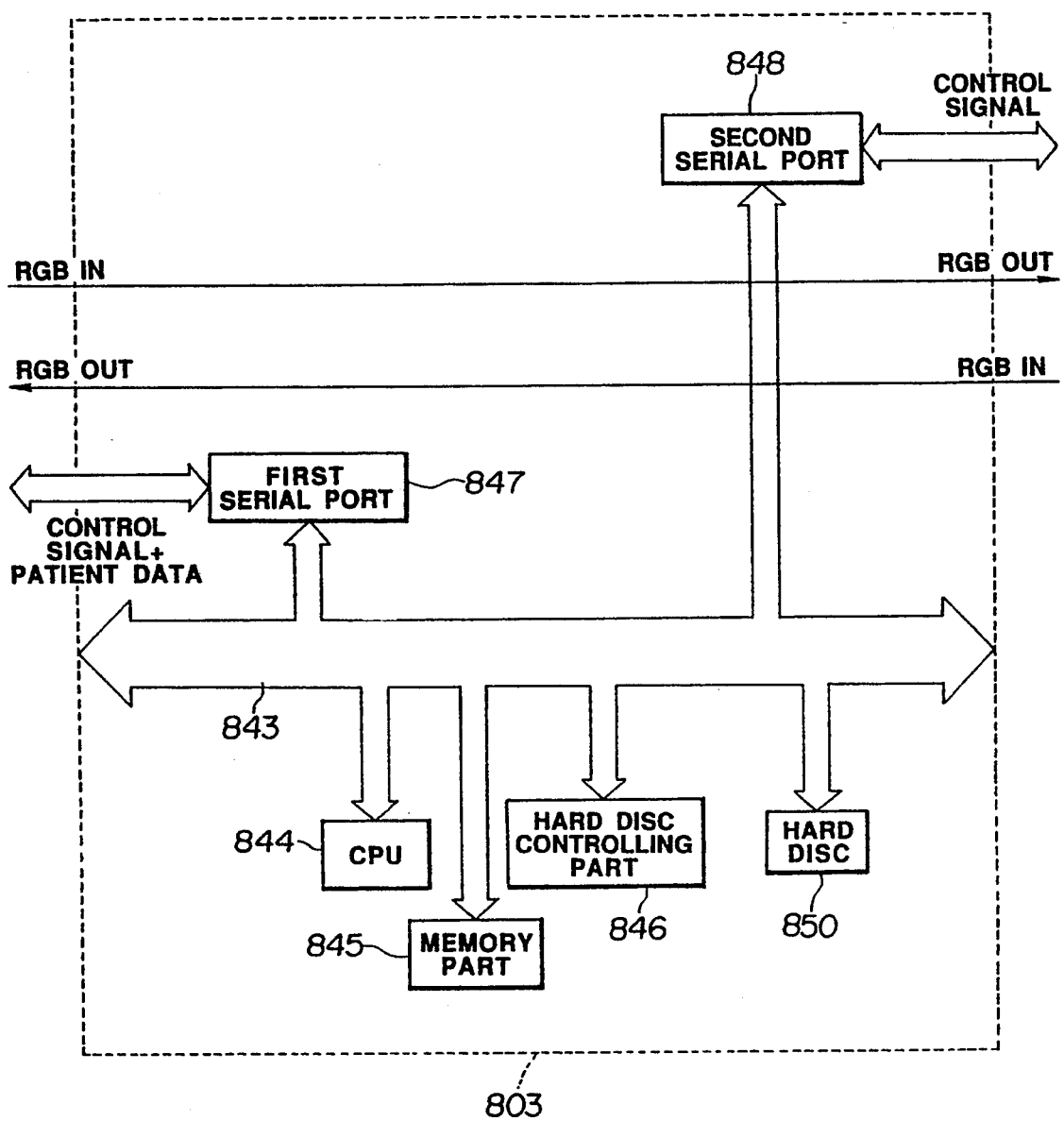

The image file controller 803 shall be explained in the following with reference to FIG. 92.

The RGB video signals from the image input apparatus are input into the image filing apparatus 804 through the image file controller 803. The data and control signal are input into and output out of a first serial port 847.

On the other hand, the first serial port 847 can input and output the data and control signal into and out of a CPU 844, memory part 845, hard disc control part 846 and second serial port 848 by a bath line 843. The CPU 844 houses in a hard disc 850 through the hard disc controller 846 the patient data input from the image input apparatus 816. Also, the CPU 844 transmits a release signal to the second serial port 848 by the control signal input into the first serial port 847. The information is memorized in the memory 845 and will be housed together with the patient data in the hard disc 850 when the control signal of the end of one inspection is input into the first serial port 847.

When the release signal is transmitted, the CPU 844 will start a timer (not illustrated) to measure the time until the next releasing time.

Further, when a search order from the image input apparatus 816 is input into the first serial port 847, the CPU 844 will transmit a search control signal to the second serial port 848 with reference to the data of the hard disc 850.

The second serial port 848 inputs and outputs such control signal relating into and out of the image filing apparatus 804 as a release signal.

Figure 89:
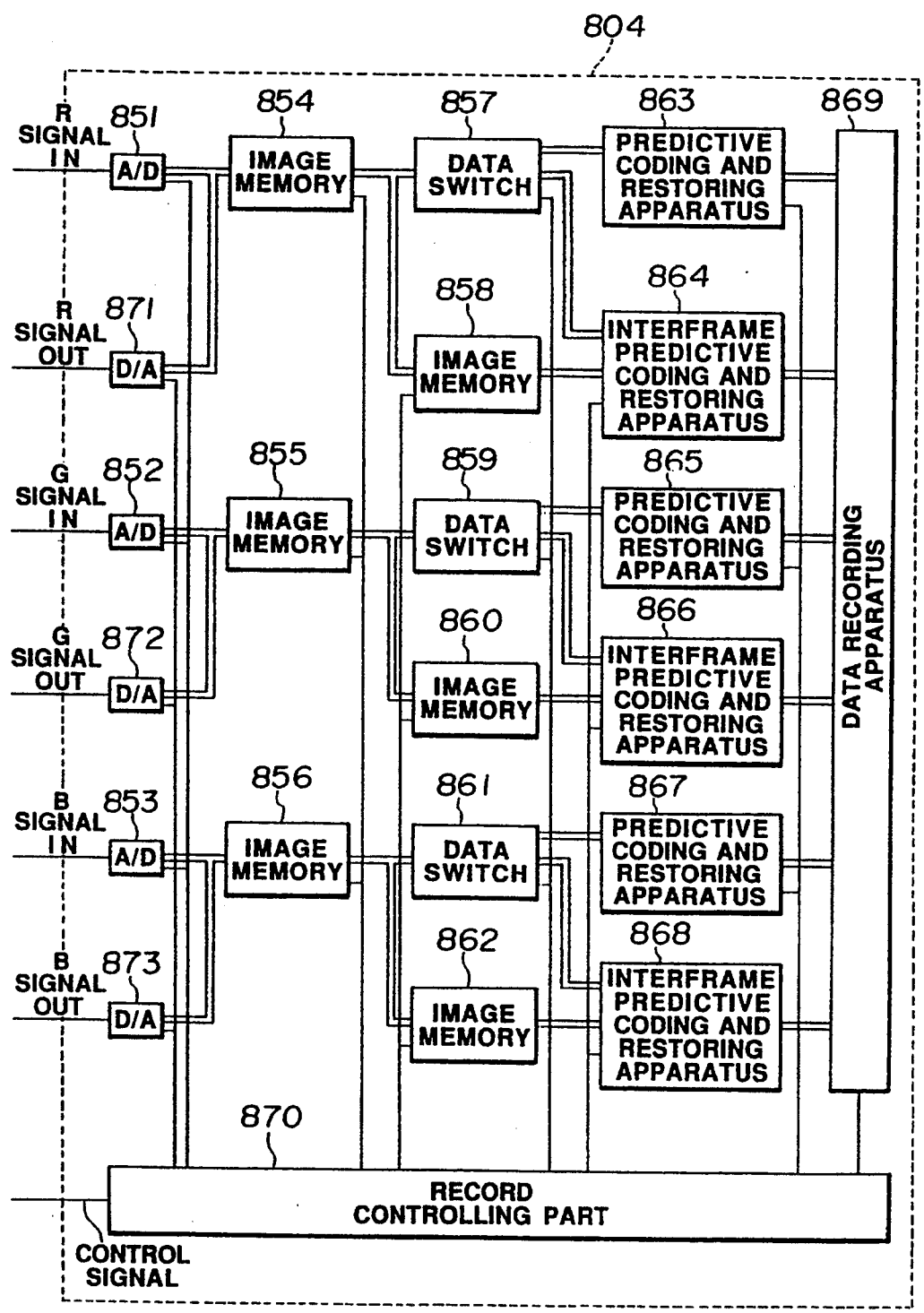
FIGS. 89 to 94 relate to the thirty-second embodiment of the present invention.

The image filing apparatus 804 shall be explained in the following with reference to FIG. 89.

The R video signal from the image file controller 803 is input into an A/D converter 851 provided in the image filing apparatus 804. In the same manner, the G video signal is input into an A/D converter 852 provided in the image filing apparatus 804. In the same manner, the B video signal is input into an A/D converter 853 provided in the image filing apparatus 804. The control signal from the second serial port 848 is input into a record controlling part 870. The R image data digitally-converted by the A/D converter 851 are input into an image memory 854. The image data output from the image memory 854 are input into a data switch 857 and also into an image memory 858.

Also, the image data output from the image memory 854 are input into a D/A converter 871.

The output of the D/A converter 871 is input into the TV monitor 818 through the image file controller 803.

The image data output from the image memory 854 through the data switch 857 are input into either a predictive coding and restoring apparatus 863 provided with a predictive coding function predictively coding the image data within the same image and their restoring function or an interframe predictive coding and restoring apparatus 864. This data switch 857 switches the data input through the predictive coding and restoring apparatus 863 and interframe predictive coding and restoring apparatus 864 and outputs them to the image memory 854.

The predictive error determined by the predictive coding and restoring apparatus 863 is input into a data recording apparatus 869. The image data output from the image memory 858 are input into the interframe predictive coding and restoring apparatus 864 predicting the image of the frame different from the past image data of the frame and provided with a restoring function. The predictive error determined by the interframe predictive coding and restoring apparatus 864 is input into the data recording apparatus 869.

The G image data digital-converted by the A/D converter 852 are input into an image memory 855. The image data output from the image memory 855 are input into a data switch 859 and into an image memory 860.

The image data output from the image memory 855 are input into a D/A converter 872.

The output of the D/A converter 872 is input into the TV monitor 818 through the image file controller 803.

The image data are input through a data switch 859 from the data memory 855 into either a predictive coding and restoring apparatus 865 or an interframe predictive coding and restoring apparatus 866. The predictive error determined by the predictive coding and restoring apparatus 865 is input into a data recording apparatus 869. The image data output from the image memory 860 are input into the interframe predictive coding and restoring apparatus 866. The predictive error determined by the interframe predictive coding and restoring apparatus 866 is input into the data recording apparatus 869.

The image data output from an image memory 856 are input into a D/A converter 873.

The output of the D/A converter 873 is input into the TV monitor 818B through the image file controller 803.

The image data from a data switch 861 are input into either a predictive coding and restoring apparatus 867 or an interframe predictive coding and restoring apparatus 868. The predictive error determined by the predictive coding and restoring apparatus 867 is input into the data recording apparatus 869. The image data output from the image memory 862 are input into the interframe predictive coding and restoring apparatus 868. The predictive error determined by the interframe predictive coding and restoring apparatus 868 is input into the data recording apparatus 869.

The record controlling part 870 outputs control signals respectively to the respective A/D converters 851, 852 and 853, respective D/A converters 871, 872 and 873, respective image memories 854,855 and 856, respective data switches 857,859 and 861, respective image memories 858, 860 and 862, respective predictive coding and restoring apparatus 863, 865 and 867, respective interframe predictive coding and restoring apparatus 864, 866 and 868 and data recording apparatus 869.

In the image filing system 801 formed as mentioned above, by noting the time intervals of recording images, it is judged whether the correlation within the images is to be utilized (that is, the predictive coding is used) or the correlation between the images is to be utilized (that is, the interframe predictive coding is used).

For example, the case of recording images at short time intervals will be considered to be nearly like recording moving pictures. That is to say, the correlation between the images will be considered to be high. Therefore, in this case, the images will be compressed by utilizing the correlation between the images.

On the other hand, in the case of recording images at time intervals larger than the set time intervals, the correlation between the images will be considered to be low. Therefore, it is characterized to compress the images by utilizing the correlation within the images.

The operation of this embodiment shall be explained in the following.

Figure 93:
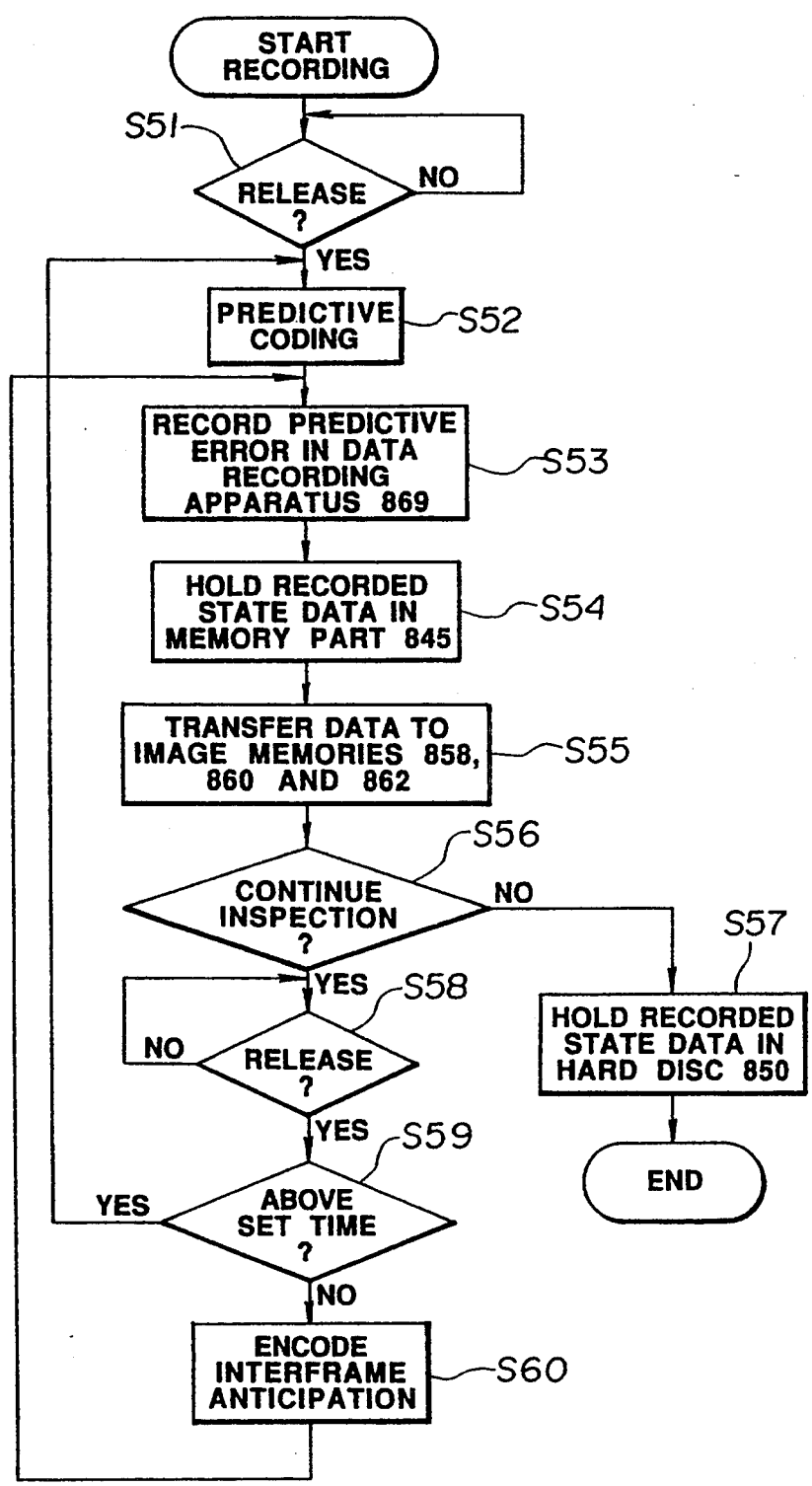

First of all, the summary of the recording operation shall be explained with reference to FIG. 93.

When a recording operation starts, first, in S51, it is judged whether or not a releasing operation has been made. In the case of NO, S51 is repeated. When the user makes the releasing operation, that is, in S51, in the case of YES, the image memory 838 outputting the images displayed in the TV monitor 818A is set to be in a freezing state and the images are transmitted to the image filing apparatus 804 through the image file controller 803. In S52, the images are predictively coded by the-predictive coding and restoring apparatus 863, 865 and 867. In S3, the predictive errors are recorded in the data recording apparatus 869. In S54, such recording state data as the patient data and release time are held in the memory part 845 within the image file controller 803.

When the recording in the data recording apparatus 869 ends, in S55, the R, G and B image data are transmitted to and held in the image memories 858, 860 and 862. Then, in S56, it is judged whether or not the inspection is to be continued. If the inspection is to end, in S57, the recording state data are recorded in the hard disc 850 and the recording ends. On the other hand, in case the inspection is to continue, in S58, it is judged whether or not the releasing operation has been made. In the case of NO, S58 is repeated. When the releasing operation is then made, in S59, the CPU 844 within the image file controller 803 judges whether or not the time interval from the last releasing operation to the present releasing operation is above the present time. If it is above the set time, returning to S52, the same predictive coding as in the last releasing operation is made. If it is below the set time, in S60, the interframe predictive coding is made and the operation returns to S53.

That is to say, when the releasing operation is made, at the first releasing time of one inspection, the images are compressed and recorded by the predictive coding. Then the time from the last releasing time to the next releasing time is measured. If it is below the set time, the correlation with the last image is predicted to be high and therefore the images are compressed by using the interframe predictive coding.

On the other hand, if it is above the set time, the correlation with the last image is considered to be small and therefore the images are compressed and recorded by the predictive coding.

The operation shall be explained in detail below.

The image input apparatus 816 is connected to the image file controller 803. From this image input apparatus 816, the RGB video signals are to be input into the respective A/D converters 851, 852 and 853 through the image file controller 803.

On the other hand, in the endoscope apparatus 802, prior to recording the images, the user selects an ID input mode from the data input part 839 and inputs such patient data as the name and date of birth of the patient. When the ID input mode is selected, the control part 837 will superimpose the patient data on the RGB video signals and will input the patient data into the communication interface 840. These patient data are transmitted to the first serial port 847 from the communication interface 840. The CPU 844 transmits a signal representing that the communication is possible to the communication interface 840 from the serial port 847. Also, the CPU 844 houses designated patient data in the hard disc 850 through the hard disc controlling part 846.

The signal representing that the communication is possible is transmitted from the communication interface 840 to the controlling part 837 which displays it in the picture, for example, of the TV monitor 818A.

The user sees it and inputs a release signal from the data input part 839. The controlling part 839 inhibits the image memory 838 from writing in new image data in order to still the images and repeatedly outputs the same image data. Further, the control part 837 transmits the release signal to the first serial port 847 from the communication interface 840. The CPU 844 senses this release signal transmitted to the first serial port 847 and transmits the release signal from the second serial port 843 to the record controlling part 870.

Also, the CPU 844 memorizes the release time in the memory part 845.

The record controlling part 870 senses the transmitted release signal, transmits a control signal to the A/D converter 851 and image memory 854 and has the image memory 854 hold one frame part of the R image. In the same manner, the record controlling part 870 transmits a control signal to the A/D converter 852 and image memory 855, has the image memory 855 hold one frame part of the G image, transmits a control signal to the A/D converter 853 and image memory 856 and has the image memory 856 hold one frame part of the B image.

Here, the record controlling part 870 outputs the control signal to the respective data switches 857, 859 and 861 so as to be input into the predictive coding and restoring apparatus 863, 865 and 867 to which they are usually respectively connected.

When the images are held by the respective image memories 854, 855 and 856, the record controlling part 870 will transmit an operation starting signal to the respective predictive coding and restoring apparatus 863, 865 and 867, will also transmit a control signal to the image memory 854 so as to deliver the held R image data to the predictive coding and restoring apparatus 863 through the data switch 857 from the image memory 854, will, at the same time, transmit a control signal to the image memory 855 so as to deliver the held G image data to the predictive coding and restoring apparatus 865 through the data switch 859 from the image memory 855 and will transmit a control signal to the image memory 856 so as to deliver the held B image data to the predictive coding and restoring apparatus 867 through the data switch 861 from the image memory 856.

The predictive error Pr determined by the predictive coding and restoring apparatus 863 is recorded in the data recording apparatus 869 by the control of the record controlling part 870.

Also, the predictive error Pg determined by the predictive coding and restoring apparatus 865 is recorded in the data recording apparatus 869 by the control of the record controlling part 870.

In the same manner, the predictive error Pb determined by the predictive coding and restoring apparatus 867 is recorded in the data recording apparatus 869 by the control of the record controlling part 870.

When the recording in the data recording apparatus 869 ends, the record controlling part 870 will output a control signal to the respective memories to hold in the respective image memories 858, 860 and 862 the image data held in the image memories 854, 855 and 856.

The record controlling part 870 delivers to the control part 837 a signal of the record end through the second serial port 848, first serial port 847 and communication interface 840 and the control part 837 displays the record end on the picture, for example, of the TV monitor 818.

Again, the user sees this and inputs a release signal from the data input part 839.

The same as in said operation, when the CPU 844 senses the release signal transmitted to the first serial port 847, it will transmit a release signal to the record controlling part 870 from the second serial port 848.

Also, the CPU 844 has the release time memorized in the memory part 845.

Here, if the release interval is above the set time, said recording operation will be repeated.

If the release interval is within the set time, the CPU 844 will write the information into the memory part 845 and will at the same time output a state changing order CH to the record controlling part 870 through the second serial port 848.

The record controlling part 870 receives the state changing order CH and outputs a control signal to the respective data switches 857, 859 and 861 so that the outputs of the respective data switches 857, 859 and 861 may be input into the interframe predictive coding and restoring apparatus 864, 866 and 868 to which they are respectively connected.

Then, the record controlling part 870 transmits an operation starting signal to the respective interframe predictive coding and restoring apparatus 864, 866 and 868 and transmits a control signal to the image memory 854 to be delivered to the interframe predictive coding and restoring apparatus 864 through the data switch 857 from the image memory 854.

At the same time, the record controlling part 870 transmits a control signal to the image memory 858 so as to deliver to the interframe predictive coding and restoring apparatus 864 the R image data one release before held by the image memory 858.

In the same manner, the record controlling part 870 transmits a control signal to the image memory 855 so as to deliver to the interframe predictive coding and restoring apparatus 866 the held G image data through the data switch 859 from the image memory 855.

At the same time, the record controlling part 870 transmits a control signal to the image memory 860 so as to deliver to the interface predictive coding and restoring apparatus 866 the G image data one release before held by the image memory 860.

In the same manner, the record controlling part 870 transmits a control signal to the image memory 856 to deliver to the interframe predictive coding and restoring apparatus 868 the held B image data through the data switch 861 from the image memory 856.

At the same time, the record controlling part 870 transmits a control signal to the image memory 862 so as to deliver to the interframe predictive coding and restoring apparatus 868 the B image data one release before held by the image memory 862.

The predictive error Fr determined by the interframe predictive coding and restoring apparatus 864 is recorded in the data recording apparatus 869 by the control of the record controlling part 870.

The predictive error Fg determined by the interframe predictive coding and restoring apparatus 866 is recorded in the data recording apparatus 869 by the control of the record controlling part 870.

In the same manner, the predictive error Fb determined by the interframe predictive coding and restoring apparatus 868 is recorded in the data recording apparatus 869 by the control of the record controlling part 870.

When the recording in the data recording apparatus 869 ends, the record controlling part 870 will output a control signal to the respective memories to hold in the respective image memories 858, 860 and 862 the image data held by the image memories 854, 855 and 856.

The record controlling part 870 delivers to the controlling part 837 a recording end signal through the second serial port 848, first serial port 847 and communication interface 840. The controlling part 837 displays said recording end on the picture, for example, of the TV monitor 818A.

When the operation is repeated and the end of one inspection is input into the data input part 839, the inspection end signal will be input into the first serial port 847 through the controlling part 837 and communication interface 810 and the CPU 844 will house in the hard disc 850 the data of the recording method of the image temporarily memorized in the memory part 845 together with the patient data through the hard disc controlling part 846.

Figure 94:
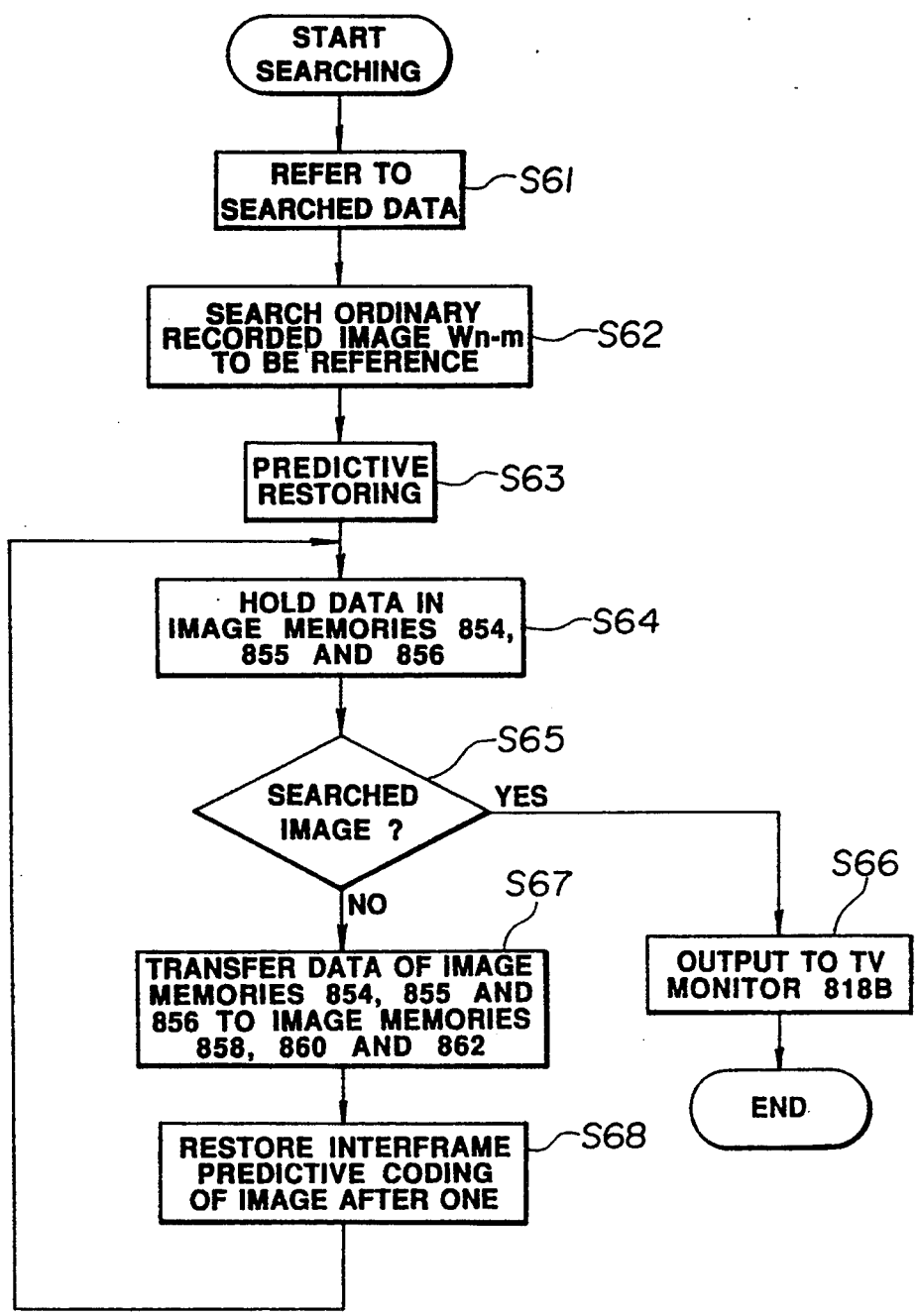

The summary of the image searching operation shall be explained in the following first with reference to FIG. 94.

When the search starts, in S61, the data relating to the searched image to be searched housed in the hard disc 850 of the image file controller 803 are referred to on the basis of the search data. Then, in S62, an ordinary recorded image Wn-m to be a reference of the time before the searched image and nearest to said searched image is searched from the data recording apparatus 869 within the image filing apparatus 804. Then, in S63, this searched image Wn-m is restored from its predictive coding. Then, in S64, these restored image data are held in the image memories 854, 855 and 856. In S65, it is judged whether or not these image data are of the searched image. If they are of the searched image, in S66, they are output to the TV monitor 818 and the search ends.

On the other hand, in said S65, if the data are not of the searched image (that is, m≠0), in S67, the image data held in the image memories 854, 855 and 856 are transferred respectively to the image memories 858. In S68, the image Wn-m+1 one after which has been predictively coded between frames is restored and reproduced. The operation returns to S64. By repeating the operations in S64 to S68, the images each one after are sequentially reproduced and the image coinciding with the searched image is output to the TV monitor 818 and the search ends.

Now, this searching operation shall be described in detail in the following.

When an image search and search data are input from the data input part 839, a search order signal and search data will be input into the first serial port 847 through the controlling part 837 and communication interface 840. The CPU 844 refers to the data housed in the hard disc 850 through the hard disc controlling part 846 by the order signal and search data and will order an ordinary search to the record controlling part 870 through the second serial port 848 if the data are of an ordinary record.

The record controlling part 870 transmits a control signal to the data recording apparatus 869 so as to output to the respective predictive coding and restoring apparatus 863,865 and 867 the data recorded in the data recording apparatus 869 and transmits a restoring starting signal to the respective predictive coding and restoring apparatus 863,865 and 867.

The image data restored by the respective predictive coding and restoring apparatus 863,865 and 867 are held, respectively, in the image memories 854,855 and 856, respectively, through the data switches 857, 859 and 861.

The image data held in the respective image memories 854, 855 and 856 are converted to analog image signals, respectively, by the D/A converters 871, 872 and 873 and are displayed in the TV monitor 818B through the image file controller 803.

Here, if the searched image Wn is of a record of the state change CH, the CPU will refer to the data Wn−1 of the image one release before. If the data Wn−1 of the image one release before are of an ordinary record, the same operation as of the ordinary search will be made to hold the image of Wn−1 in the respective memories 854, 855 and 856.

The record controlling part 870 transmits a control signal to the respective memories 854,855,856, 858, 860 and 862 so as to transfer to the respective image memories 858,860 and 862 the image data held in the respective image memories 854, 855 and 856.

Also, the record controlling part 87 transmits a control signal to the data recording apparatus 869 so as to output to the respective interframe predictive coding and restoring apparatus 864, 866 and 868 the data recorded in the data recording apparatus 869 and transmits a restoring starting signal to the respective interframe predictive coding and restoring apparatus 864, 866 and 868.

With reference to the image data held in the respective image memories 858, 860 and 862, the image data restored by the respective interframe predictive coding and restoring apparatus 864,866 and 868 are held respectively in the image memories 854, 855 and 856 through the respective data switches 857, 859 and 861.

The image data held in the respective image memories 854, 855 and 856 are converted to analog image signals respectively by the D/A converters 871, 872 and 873 and are displayed in the TV monitor 818B through the image file controller 803.

If the image Wn−1 one release before is also of a record of the state change CH, the CPU 844 will further search such ordinarily recorded images as the images Wn−2, Wn−3, . . . Wn−m m releases before, will repeat the restoring operation and will thereby display the searched image Wn in the TV monitor 818B.

The image filing system 801 is provided with a recording mode recording images by utilizing the correlation between images as in the following.

In case any image data are to be recorded by referring to the displayed image Wn and the correlation between images, when the user inputs from the data input part 839 an interimage reference recording order, the CPU 844 will transmit a reference record controlling signal to the record controlling part 870 from the second serial port 848.

The record controlling part 870 transmits a control signal to the respective memories 854,856,858,860 and 862 to transfer respectively to the image memories 858,860 and 862 the data held in the image memories 854, 855 and 856.

Also, the record controlling part 870 outputs a control signal to the respective data switches 857,859 and 861 to input the outputs of the respective data switches 857,859 and 861 into the interframe predictive coding and restoring apparatus 864,866 and 868 to which they are respectively connected.

When said operation ends, the record controlling part 870 will deliver a recording permitting signal to the controlling part 837 through the second serial port 848, first serial port 847 and communication interface 840 and the controlling part 837 will display the recording permit on the picture, for example, of the TV monitor 818A.

The user sees this and inputs a release signal from the data input part 839.

The same as in said recording time operation, when the CPU 44 senses the release signal transmitted to the first serial port 847, it will write the record information into the memory part 845 and will at the same output a recording order to the record controlling part 870 through the second serial port 848.

Then, as in the recording operation at the time of the state change, the data are recorded in the data recording apparatus 869.

According to this embodiment, in case the image is recorded at time intervals shorter than the set time intervals, the interimage correlation will be utilized to compress the image but, on the other hand, in case the time intervals are larger than the set time intervals, the intraimage correlation will be utilized to compress and record the image and therefore the image can be efficiently recorded.

Figure 95:
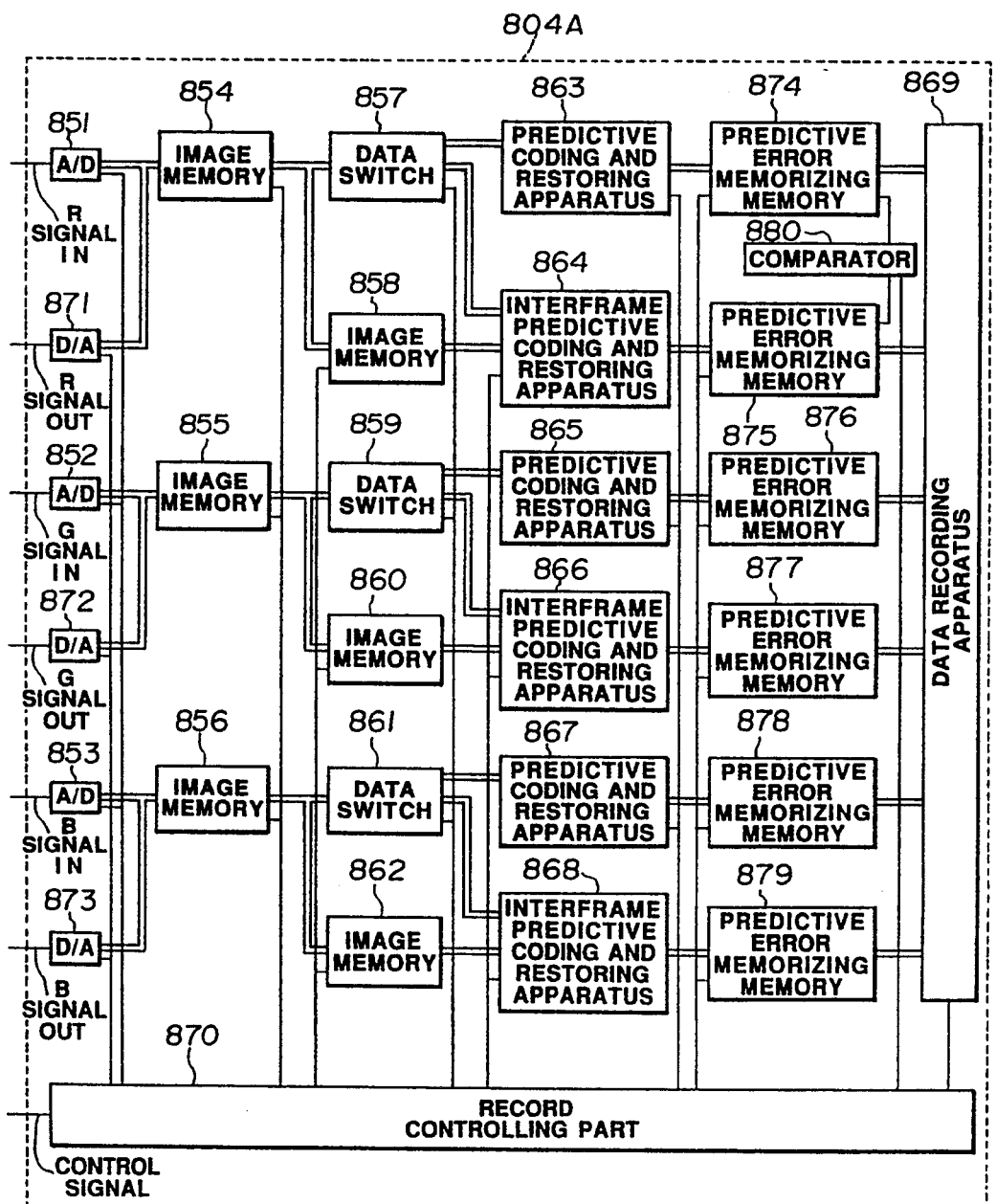
FIG. 95 is a block diagram showing the formation of an image filing apparatus in the thirty-third embodiment of the present invention.

FIG. 95 shows a thirty-third embodiment of the present invention.

FIG. 95 is a view showing the formation of an image filing apparatus 804A in this embodiment.

In FIG. 95, the predictive coding and restoring apparatus 863 is connected to the predictive error memorizing memory so that, when a signal is input from the predictive error memorizing memory 874, the predictive coding and restoring apparatus 863 will output a signal to said memory 874 (it shall be briefly mentioned hereinafter that the signal will be input and output).

The interframe predictive coding and restoring apparatus 864 is connected with the predictive error memorizing memory 875 so as to be able to input and output signals.

The predictive coding and restoring apparatus 865 is connected with the predictive error memorizing memory 876 so as to be input and output signals.

The interframe predictive coding and restoring apparatus 866 is connected with the predictive error memorizing memory 877 so as to be able to input and output signals.

The predictive coding and restoring apparatus 867 is connected with the predictive error memorizing memory 878 so as to be able to input and output signals.

The interframe predictive coding and restoring apparatus 868 is connected with the predictive error memorizing memory 879 so as to be able to input and output signals.

The predictive error memorizing memory 874 is connected with the comparator 880 so as to be able to input and output signals and is connected with the data recording apparatus 869 so as to be able to input and output signals.

The predictive error memorizing memory 875 is connected with the comparator 880 so as to be able to input and output signals and is connected with the data recording apparatus 869 so as to be able to input and output signals.

The respective predictive error memorizing memories 876, 877, 878 and 879 are connected with the data recording apparatus 869 so as to be able to input and output signals.

The output of the record controlling part 870 is input into the respective predictive error memorizing memories 874, 875, 876, 877, 878 and 879.

The record controlling part 870 is connected with the comparator 880 so as to be able to input and output signals.

The operation of the image filing system formed as mentioned above shall be explained below.

When the CPU 844 senses the first release signal transmitted to the first serial port 847, the CPU 844 will transmit a release signal from the second serial port 848 to the record controlling part 870 and an ordinary recording will be made.

Then, the image data of the first release will be held in the respective image memories 858, 860 and 862.

When the CPU 844 senses the first release signal transmitted to the first serial port 847, the CPU 844 will transmit a release signal from the second serial port 848 to the record controlling part 870.

When the record controlling part 870 senses the transmitted release signal, the record controlling part 870 will transmit a control signal to the A/D converter 851 and image memory 854 and will have the image memory 854 hold one frame part of the R image. In the same manner, the record controlling part 870 will transmit a control signal to the A/D converter 852 and image memory 855 and will have the image memory 855 hold one frame part of the G image and it will transmit a control signal also to the A/D converter 853 and image memory 856 and will have the image memory 856 hold one frame part of the B image.

Here, the record controlling part 870 outputs a control signal respectively to the data switches 857, 859 and 861 so that the outputs of the respective data switches 857, 859 and 861 may be usually input into the respective predictive coding and restoring apparatus 863, 865 and 867 to which they are respectively connected.

When the images are held in the respective image memories 854, 855 and 856, the record controlling part 870 will transmit an operation starting signal to the predictive coding and restoring apparatus 863, 865 and 867 and will transmit a control signal to the image memory 854 so as to deliver the held R image data to the predictive coding and restoring apparatus 863 through the data switch 857 from the image memory 854. At the same time, the record controlling part 870 will transmit a control signal to the image memory 855 so as to deliver the held G image data to the predictive coding and restoring apparatus 865 through the data switch 859 from the image memory 855 and will also transmit a control signal to the image memory 856 so as to deliver the held B image data to the predictive coding and restoring apparatus 867 through the data switch 861 from the image memory 856.

The predictive error Pr determined by the predictive coding and restoring apparatus 863 is held in the predictive error memorizing memory 874 by the control of the record controlling part 870.

Also, the predictive error Pg determined by the predictive coding and restoring apparatus 865 is held in the predictive error memorizing memory 876 by the control of the record controlling part 870.

In the same manner, the predictive error Pb determined by the predictive coding and restoring apparatus 867 is held in the predictive error memorizing memory 878 by the control of the record controlling part 870.

When the CPU 844 senses from the record controlling part 870 that the data have been held in the respective predictive error memorizing memories 874, 876 and 878, the CPU 844 will switch the data switches 857, 859 and 861 so as to be connected with the interframe predictive coding and restoring apparatus 864, 866 and 868 through the record controlling part 870.

Then, the record controlling part 870 transmits an operation starting signal to the respective interframe predictive coding and restoring apparatus 864, 866 and 868 and transmits a control signal to the image memory 854 so as to deliver the held R memory data to the interframe predictive coding and restoring apparatus 864 through the data switch 857 from the image memory 854.

In the same manner, the record controlling part 870 transmits a control signal to the image memory 858 so as to deliver the R image data one release before held in the image memory 858 to the interframe predictive coding and restoring apparatus 864.

In the same manner, the record controlling part 870 transmits a control signal to the image memory 855 so as to deliver the held G image data to the interframe predictive coding and restoring apparatus 866 through the data switch 859 from the image memory 855.

In the same manner, the record controlling part 870 transmits a control signal to the image memory 860 so as to deliver to the interframe predictive coding and restoring apparatus 866 the G image data one release before held in the image memory 860.

In the same manner, the record controlling part 870 transmits a control signal to the image memory 856 so as to deliver the held B image data to the interframe predictive coding and restoring apparatus 868 through the data switch 861 from the image memory 856.

In the same manner, the record controlling part 870 transmits a control signal to the image memory 862 so as to deliver to the interframe predictive coding and restoring apparatus 868 the B image data one release before held in the image memory 862.

The predictive error Fr determined by the interframe predictive coding and restoring apparatus 864 is held in the predictive error memorizing memory 875 by the record controlling part 870.

Also, the predictive error Fg determined by the interframe predictive coding and restoring apparatus 866 is held in the predictive error memorizing memory 877 by the record controlling part 870.

In the same manner, the predictive error Fb determined by the interframe predictive coding and restoring apparatus 868 is held in the predictive error memorizing memory 879 by the record controlling part 870.

When the data are held in the respective predictive error memorizing memories 875, 877 and 879, the CPU 844 will give the comparator 880 an order to compare the amounts of data of the predictive error memorizing memories 874 and 875.

The comparator 880 compares the data amounts and informs the CPU 844 of the controller amount of data.

When the recording in the data recording apparatus ends, the data recording apparatus 869 will output a control signal to the respective memories so as to hold in the respective image memories 858, 860 and 862 the image data held in the image memories 854, 855 and 856.

Also, the record controlling part 870 has a recording end signal delivered to the controlling part 837 through the second serial port 848, first serial port 847 and communication interface 840 and the controlling part 837 displays the recording end on the picture, for example, of the TV monitor 818A.

When the operation is repeated and the end of one inspection is input into the data input part 839, the inspection end signal will be input into the first serial port 847 through the controlling part 837 and communication interface 840 and the CPU 844 will house in the hard disc 850 through the hard disc controlling part 864 the data of the recording method of the image temporarily memorized in the memory part 845 together with the patient data.

Here, the R image has been compared but the G image and B image may be compared or their combination will do.

According to the thirty-third embodiment, as the smaller data amount by the interimage and the interimage predictive coding is selected by the comparator 880 to record the image, the image can be efficiently recorded.

The other formations, operations and effects are the same as in the thirty-second embodiment.

Figure 96:
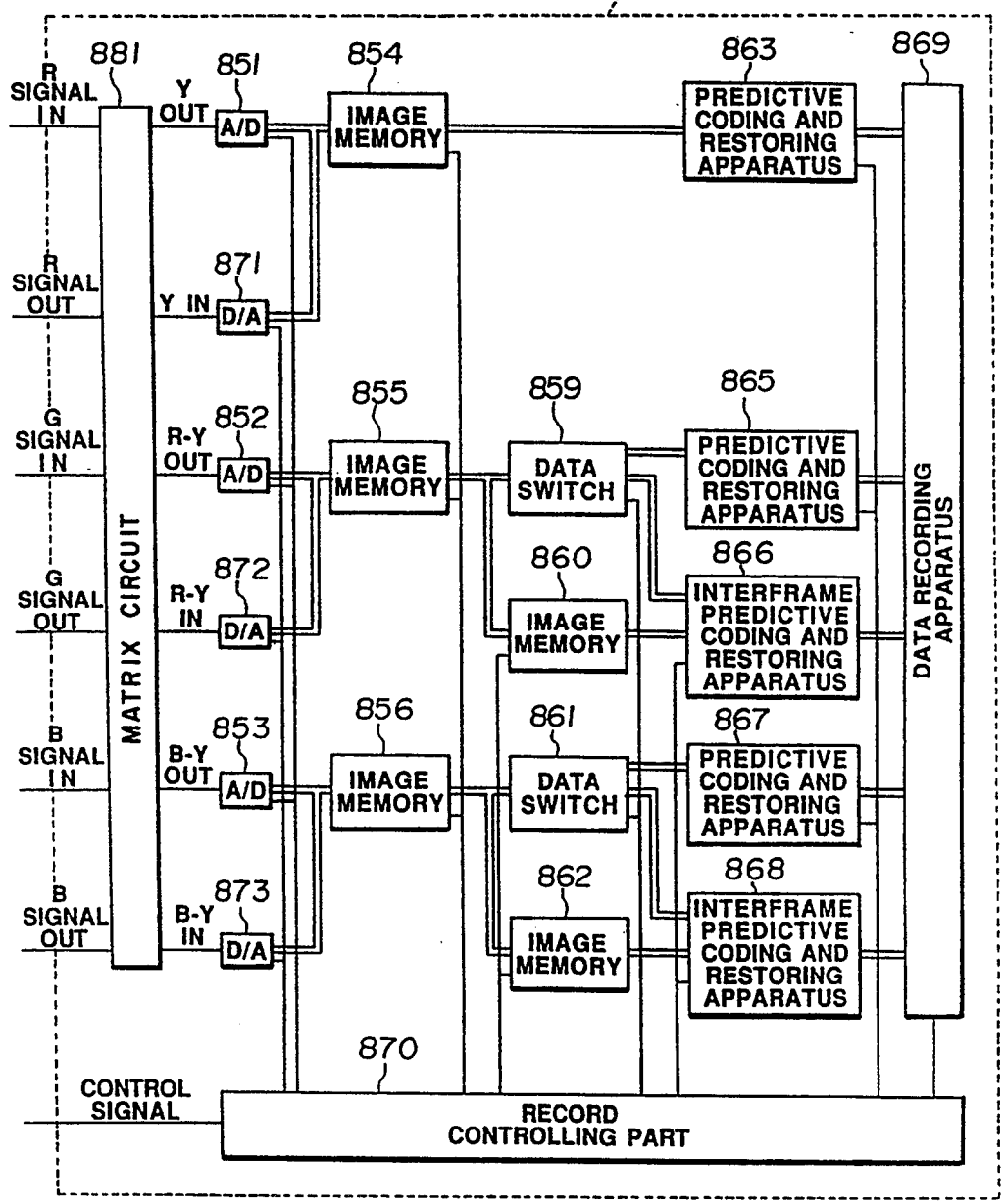
FIG. 96 is a block diagram showing the formation of an image filing apparatus in the thirty-fourth embodiment of the present invention.
Figure 97:
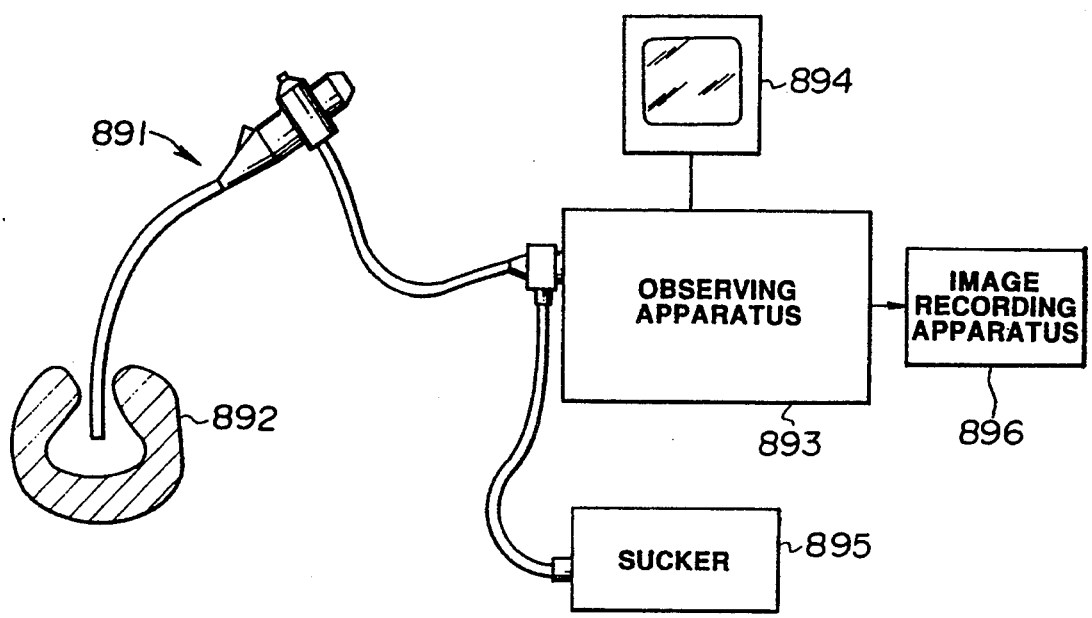
FIGS. 97 to 99 relate to related art examples.
Figure 98:
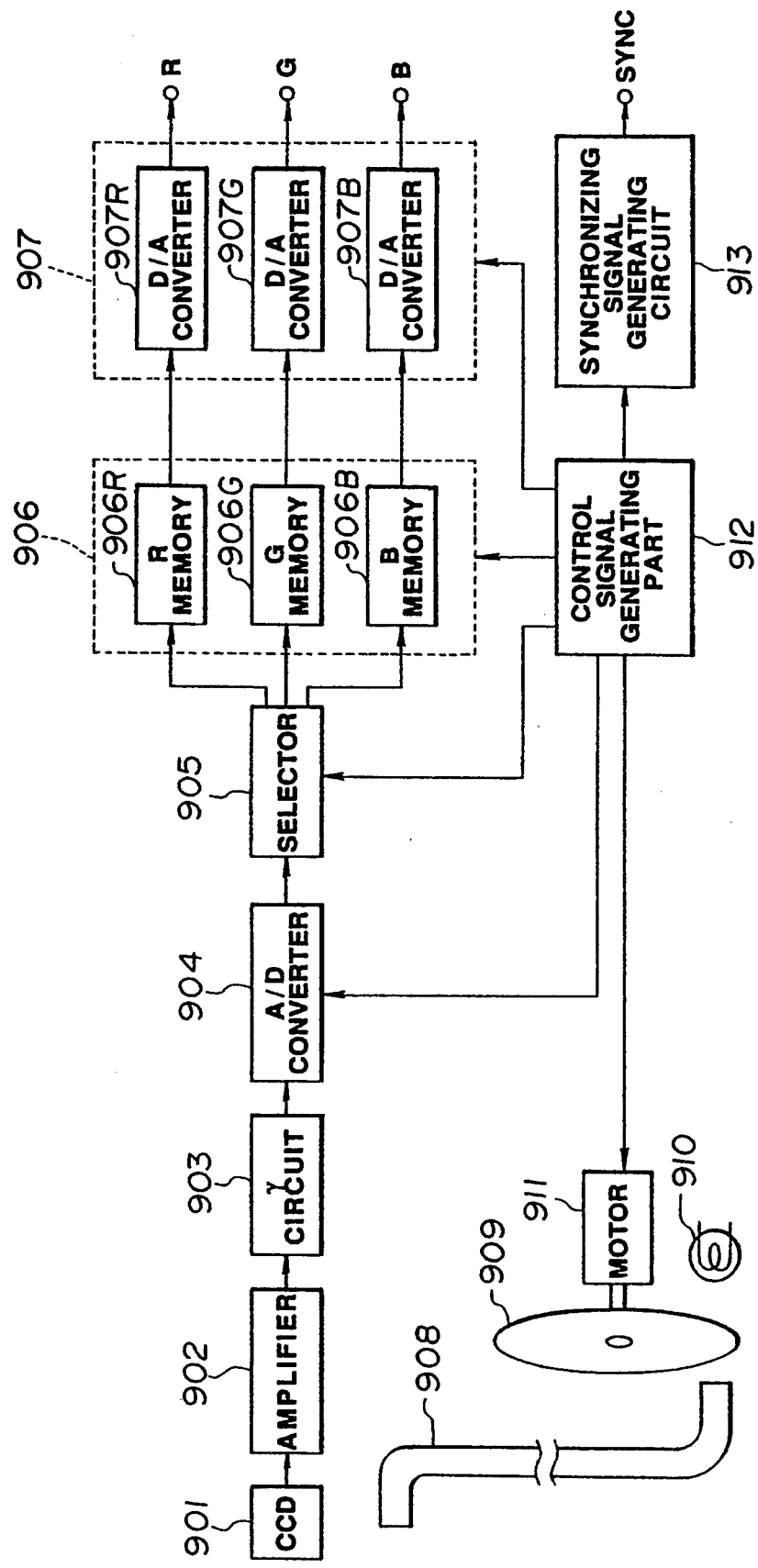
Figure 99:
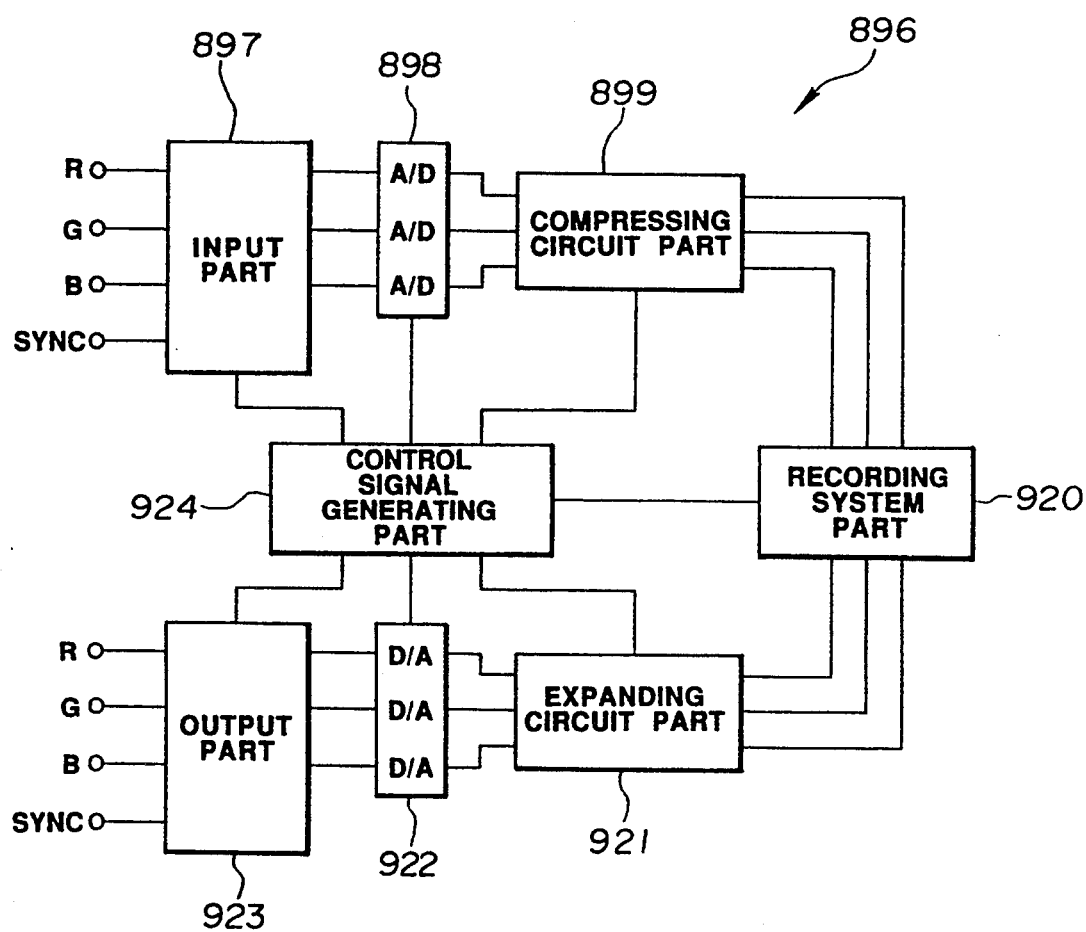

FIG. 96 shows a thirty-fourth embodiment of the present invention.

In FIG. 96, the RGB video signals from the image file controller 803 are input into the matrix circuit 881 provided in the image filing apparatus 804.

The luminance signal Y made in the matrix circuit 881 is input into the A/D converter 851.

In the same manner, the color difference signal R-Y made in the matrix circuit 881 is input into the A/D converter 852.

In the same manner, the color difference signal B-Y made in the matrix circuit 881 is input into the A/D converter 853.

The luminance signal Y digital-converted by the A/D converter 851 is input into the image memory 854. The image data are input into and output out of the predictive coding and restoring apparatus 863 from the image memory 854.

Also, the image data output from the image memory 854 are input into the D/A converter 871.

The output of the D/A converter 871 is input into the matrix circuit 881.

The predictive error determined by the predictive coding and restoring apparatus 863 is input into and output out of the data recording apparatus 869.

The color difference signal R-y digital-converted by the A/D converter 852 is input into the image memory 855.

The image data output out of the image memory 855 are input into and output out of the interframe predictive coding and restoring apparatus 866 and are input into the image memory 860.

Also, the image data output from the image memory 855 are input into the D/A converter 872.

The output of this D/A converter 872 is input into the matrix circuit 881.

The image data output from the image memory 860 are input into the interframe predictive coding and restoring apparatus 866. The predictive error determined by this interframe predictive coding and restoring apparatus 866 is input into and output out of the data recording apparatus 869.

The color difference signal B-Y digital-converted by the A/D converter 853 is input into the image memory 856.

The image data output from this image memory 856 are input into the interframe predictive coding and restoring apparatus 868 and into the image memory 862.

Also, the image data output from the image memory 856 are input into the D/A converter 873.

The output of this D/A converter 873 is input into the matrix circuit 881.

The image data output from the image memory 862 are input into the interframe predictive coding and restoring apparatus 868. The predictive error determined by the interframe predictive coding and restoring apparatus 868 is input into and output out of the data recording apparatus 869.

The matrix circuit 881 makes RGB video signals from the input luminance signal Y and color difference signals R-Y and B-Y. The video signals are input into the TV monitor 818 through the image file controller 803.

In this embodiment, on the luminance signal, the image is compressed always by the intraimage prediction, that is, the predictive coding and, on the color difference signals, the images except the first image are compressed by using the interframe predictive coding. (Needless to say, in searching, the restoration is made accordingly.)

The operation of the image filing system formed as mentioned above shall be explained.

The image input apparatus 816 is connected to the image file controller 803 and, from the image input apparatus 816, the RGB video signals are input into the matrix circuit 881 through the image file controller 803.

The luminance signal Y and color difference signals R-Y and B-Y made in the matrix circuit 881 are input respectively into the A/D converters 851, 852 and 853.

When the CPU 844 senses the first release signal transmitted to the first serial port 847, the CPU 844 will transmit a release signal to the record controlling part 870 from the second serial port 848.

When the record controlling part 870 senses the transmitted signal, the record controlling part 870 will transmit a control signal to the A/D converter 851 and image memory 854 and will have the image memory 854 hold one frame part of the luminance signal Y.

In the same manner, the record controlling part 870 will transmit a control signal to the A/D converter 852 and image memory 855 and will have the image memory 855 hold one frame part of the color difference signal R-Y image. It will transmit a control signal also to the A/D converter 853 and image memory 856 and will have the image memory 856 hold one frame part of the color difference signal B-Y image.

Here, the record controlling part 870 outputs a control signal to the respective data switches 850 and 861 so that the outputs of the respective data switches 859 and 861 may be input into the respective predictive coding and restoring apparatus 865 and 867 to which they are respectively connected.

When the images are held in the respective image memories 854, 855 and 856, the record controlling part 870 will transmit an operation starting signal to the respective predictive coding and restoring apparatus 863, 865 and 867 and will transmit a control signal to the image memory 854 so as to deliver the held luminance signal Y image data to the predictive coding and restoring apparatus 863 from the image memory 854, will, at the same time, transmit a control signal to the image memory 855 so as to deliver the held color difference signal R-Y image data to the predictive coding and restoring apparatus 865 through the data switch 859 from the image memory 855 and will transmit a control signal to the image memory 856 so as to deliver the held color signal B-Y image data to the predictive coding and restoring apparatus 867 through the data switch 861 from the image memory 856.

The predictive error Py determined by the predictive coding and restoring apparatus 863 is recorded in the data recording apparatus 869 by the control of the record controlling part 870.

Also, the predictive error Pr-y determined by the predictive coding and restoring apparatus 865 is recorded in the data recording apparatus 869 by the control of the record controlling part 870.

In the same manner, the predictive error Pb-y determined by the predictive coding and restoring apparatus 867 is recorded in the data recording apparatus 869 by the control of the record controlling part 870.

When the recording of the data recording apparatus 869 ends, the record controlling part 870 will transmit a control signal to the respective memories so as to hold in the respective image memories 860 and 862 the image data held in the image memories 855 and 856.

In the record controlling part 870, a recording end signal is delivered to the controlling part 837 through the second serial port 848, first serial port 847 and communication interface 840. The controlling part 837 displays the recording end on the picture, for example, of the TV monitor 818A.

Again the user sees this and inputs a release signal from the data input part 839.

As in the operation, when the CPU 844 senses the release signal transmitted to this first serial port 847, the CPU 844 will write the information of the interimage reference record into the memory part 845 and will at the same time transmit a release signal to the record controlling part 870 from the second serial port 848.

The record controlling part 870 outputs a control signal to the respective data switches 859 and 861 so that the outputs of the respective data switches 859 and 861 may be input into the interframe predictive coding and restoring apparatus 866 and 868 to which they are respectively connected.

Then, the record controlling part 870 transmits an operation starting signal to the predictive coding and restoring apparatus 863 and respective interframe predictive coding and restoring apparatus 866 and 868 and transmits a control signal to the image memory 854 to deliver the held luminance signal Y image data to the predictive coding and restoring apparatus 863 from the image memory 854.

Also, the record controlling part 870 transmits a control signal to the image memory 855 to deliver the held color difference signal R-Y image data to the interframe coding and restoring apparatus 866 through the data switch 859 from the image memory 855.

At the same time, the record controlling part 870 transmits a control signal to the image memory 860 to deliver to the interframe predictive coding and restoring apparatus 866 the color difference signal R-Y image data one release before held in the image memory 860.

In the same manner, the record controlling part 870 transmits a control signal to the image memory 856 so as to deliver the held color difference B-Y image data to the interframe predictive coding and restoring apparatus 868 through the data switch 861 from the image memory 856.

At the same time, the record controlling part 870 transmits a control signal to the image memory 862 so as to deliver to the interframe predictive coding and restoring apparatus 863 the color difference signal B-Y image data one release before held in the image memory 862.

The predictive error difference Py determined by the predictive coding and restoring apparatus 863 is recorded in the data recording apparatus 869 by the control of the record controlling part 870.

Also, the predictive error Fr-y determined by the interframe predictive coding and restoring apparatus 866 is recorded in the data recording apparatus 869 by the control of the record controlling part 870.

In the same manner, the predictive error Fb-y determined by the interframe predictive coding and restoring apparatus 868 is recorded in the data recording apparatus 869 by the control of the record controlling part 870.

When the recording in the data recording apparatus 869 ends, the record controlling part 870 will output a control signal to the respective memories so as to hold in the respective image memories 860 and 862 the image data held in the image memories 855 and 856.

Also, the record controlling part 870 delivers a recording end signal to the controlling part 837 through the second serial port 843, first serial port 847 and communication interface 840 and the controlling part 837 displays the recording end on the picture, for example, of the TV monitor 818A.

When the operation is repeated and the end of one inspection is input into the data input part 839, the inspection end signal will be input into the first serial port 847 through the controlling part 837 and communication interface 840 and the CPU 844 will house in the hard disc 850 the data of the image recording method memorized temporarily in the memory part 845 together with the patient data through the hard disc controlling part 846.

When an image search and search data are input from the data input part 839, a search order signal and search data will be input into the first serial port 847 through the controlling part 837 and communication interface 840. The CPU 844 will refer to the data housed in the hard disc 850 through the hard disc controlling part 846 by the order signal and search data and will order the record controlling part 870 through the second serial port 848 if the data are ordinary records.

The record controlling part 870 transmits a control signal to the data recording apparatus 869 so as to output to the respective predictive coding and restoring apparatus 863, 865 and 867 the respective data recorded in the data recording apparatus 869 and transmits a restoring starting signal to the respective predictive and restoring apparatus 863, 865 and 867.

The image data restored by the respective predictive coding and restoring apparatus 863, 865 and 867 are held, respectively, in the image memory 854 and image memories 855 and 856, respectively, through the data switches 859 and 861.

The image data held in the respective image memories 854, 855 and 856 are converted to analog image signals respectively by the D/A converters 871, 872 and 873, are converted to RGB video signals by the matrix circuit and are displayed on the TV monitor 818B through the image file controller 803.

Here, if the record is a record of the second release of the inspection of the searched image, said searching operation will be made for the luminance signal.

The image data Wn−1 one release before are referred to for the color difference signals R-Y and B-Y. If the data Wn−1 of the image one release before are ordinary records, the same operation as in the ordinary search will be made and the images of Wn−1 will be held in the respective image memories 855 and 856.

The record controlling part 870 transmits a control signal to the respective memories 855, 856, 860 and 862 so as to transfer the image data held in the respective image memories 855 and 856, respectively, to the image memories 860 and 862.

Also, the record controlling part 870 transmits a control signal to the data recording apparatus 869 to output the data recorded in the data recording apparatus 860 to the respective interframe predictive coding and restoring apparatus 866 and 868 and transmits a restoring starting signal to the respective interframe predictive coding and restoring apparatus 866 and 868.

The image data restored by the respective interframe predictive coding and restoring apparatus 866 and 868 by referring to the image data held in the respective image memories 860 and 862 are held in the image memories 855 and 856, respectively, through the data switches 859 and 861.

The image data held in the respective image memories 854, 855 and 856 are converted to analog image signals, respectively, by the D/A converters 871, 872 and 873, are converted to RGB video signals by the matrix circuit 881 and are displayed in the TV monitor 818 through the image file controller 803.

If the record is a record after the third release of the inspection, the CPU 844 will search out the first release image of the inspection as in such images m releases before as Wn−2, Wn−3, . . . Wn-m, will repeat the restoring operation and will thereby display the search image Wn in the TV monitor 818.

In this embodiment, the luminance signal is predictively coded within the image and the color difference signal is predictively coded between the images except the first image but the user may select either.

As described above, according to the thirty-second to thirty-fourth embodiments, as a compressing means utilizing the correlation between the images and a compressing means utilizing the correlation within the image are provided, the image can be compressed more effectively than in the case that only one of them is provided.

It is apparent that, in this invention, working modes different in a wide range can be formed on the basis of this invention without deviating from the spirit and scope of the invention. This invention is not restricted by its specific working modes except being limited by the appended claims.

We claim:

1. A method of compressing input endoscope image data comprising the steps of:
   analyzing whether said endoscope image data are ordinary image data or dyed image data; and
   varying the compressing manner by lowering the compressing rate for said dyed image data below the compressing rate for said ordinary image data on the basis of the result of said analyzing step.

* * * * *